(12) United States Patent
Van Os et al.

(10) Patent No.: US 11,574,041 B2
(45) Date of Patent: Feb. 7, 2023

(54) USER INTERFACE FOR MANAGING ACCESS TO CREDENTIALS FOR USE IN AN OPERATION

(71) Applicant: Apple Inc., Cupertino, CA (US)

(72) Inventors: Marcel Van Os, San Francisco, CA (US); Peter D. Anton, San Francisco, CA (US); Patrick L. Coffman, San Francisco, CA (US); Elizabeth Caroline Furches Cranfill, San Francisco, CA (US); Raymond S. Sepulveda, San Jose, CA (US); Chun Kin Minor Wong, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/667,174

(22) Filed: Oct. 29, 2019

(65) Prior Publication Data
US 2020/0065470 A1    Feb. 27, 2020

Related U.S. Application Data

(63) Continuation of application No. 15/782,068, filed on Oct. 12, 2017, now Pat. No. 10,496,808.
(Continued)

(51) Int. Cl.
G06F 21/00    (2013.01)
G06F 21/36    (2013.01)
(Continued)

(52) U.S. Cl.
CPC .......... *G06F 21/36* (2013.01); *G06F 3/03547* (2013.01); *G06F 3/048* (2013.01);
(Continued)

(58) Field of Classification Search
CPC .......... G06F 21/31; G06F 21/32; G06F 21/36; G06F 21/84; G06F 3/03547; G06F 3/048;
(Continued)

(56) References Cited

U.S. PATENT DOCUMENTS 5,237,159 A    8/1993    Stephens et al.
5,265,007 A    11/1993   Barnhard et al.
(Continued)

FOREIGN PATENT DOCUMENTS

AU    2015100708 A4    7/2015
AU    2015100709 A4    7/2015
(Continued)

OTHER PUBLICATIONS

Notice of Acceptance received for Australian Patent Application No. 2019250143, dated Jan. 29, 2021, 3 pages.
(Continued)

*Primary Examiner* — Joseph P Hirl
*Assistant Examiner* — Chi D Nguy
(74) *Attorney, Agent, or Firm* — Dentons US LLP

(57) ABSTRACT

The present disclosure generally relates to managing access to credentials. In some examples, an electronic device authorizes release of credentials for use in an operation for which authorization is required. In some examples, an electronic device causes display of one or more steps to be taken to enable an input device for user input. In some examples, an electronic device disambiguates between commands to change the account that is actively logged-in on the device and commands to cause credentials to be released from the secure element.

57 Claims, 95 Drawing Sheets

Related U.S. Application Data

(60) Provisional application No. 62/412,819, filed on Oct. 25, 2016, provisional application No. 62/413,300, filed on Oct. 26, 2016.

(51) Int. Cl.

| | |
|---|---|
| *G06Q 20/12* | (2012.01) |
| *H04W 12/06* | (2021.01) |
| *G06F 3/0488* | (2022.01) |
| *G06Q 20/40* | (2012.01) |
| *G06F 3/048* | (2013.01) |
| *G06F 3/0354* | (2013.01) |
| *G06F 21/31* | (2013.01) |
| *G06F 21/84* | (2013.01) |
| *G06F 21/32* | (2013.01) |
| *H04L 9/40* | (2022.01) |

(52) U.S. Cl.
CPC ............ *G06F 3/0488* (2013.01); *G06F 21/31* (2013.01); *G06F 21/32* (2013.01); *G06F 21/84* (2013.01); *G06Q 20/12* (2013.01); *G06Q 20/40145* (2013.01); *H04L 63/0861* (2013.01); *H04W 12/06* (2013.01); *H04L 63/10* (2013.01); *H04L 63/102* (2013.01)

(58) Field of Classification Search
CPC ... G06F 3/0488; H04L 63/0861; H04L 63/10; H04L 63/102; G06Q 20/12; G06Q 20/40145; H04W 12/06
See application file for complete search history.

(56) References Cited

U.S. PATENT DOCUMENTS

| | | |
|---|---|---|
| 5,484,988 A | 1/1996 | Hills et al. |
| 5,691,524 A | 11/1997 | Josephson |
| 5,717,868 A | 2/1998 | James |
| 5,783,808 A | 7/1998 | Josephson |
| 5,910,989 A | 6/1999 | Naccache |
| 5,983,197 A | 11/1999 | Enta |
| 6,016,484 A | 1/2000 | Williams et al. |
| 6,164,528 A | 12/2000 | Hills et al. |
| 6,189,785 B1 | 2/2001 | Lowery |
| 6,193,152 B1 | 2/2001 | Fernando et al. |
| 6,230,148 B1 | 5/2001 | Pare et al. |
| 6,260,027 B1 | 7/2001 | Takahashi et al. |
| 6,323,846 B1 | 11/2001 | Westerman et al. |
| 6,328,207 B1 | 12/2001 | Gregoire et al. |
| 6,398,646 B1 | 6/2002 | Wei et al. |
| 6,408,087 B1 | 6/2002 | Kramer |
| 6,570,557 B1 | 5/2003 | Westerman et al. |
| 6,581,042 B2 | 6/2003 | Pare et al. |
| 6,644,546 B2 | 11/2003 | George et al. |
| 6,662,166 B2 | 12/2003 | Pare et al. |
| 6,677,932 B1 | 1/2004 | Westerman |
| 6,950,810 B2 | 9/2005 | Lapsley et al. |
| 6,970,855 B2 | 11/2005 | Das et al. |
| 7,079,652 B1 | 7/2006 | Harris |
| 7,099,845 B2 | 8/2006 | Higgins et al. |
| 7,099,850 B1 | 8/2006 | Man et al. |
| 7,356,516 B2 | 4/2008 | Richey et al. |
| 7,359,880 B2 | 4/2008 | Abel et al. |
| 7,370,244 B2 | 5/2008 | Breitling et al. |
| 7,415,720 B2 | 8/2008 | Jung |
| 7,430,537 B2 | 9/2008 | Templeton et al. |
| 7,454,192 B1 | 11/2008 | Zhu |
| 7,496,527 B2 | 2/2009 | Silverstein et al. |
| 7,529,563 B1 | 5/2009 | Pitroda |
| 7,535,344 B2 | 5/2009 | Obradovich |
| 7,546,470 B2 | 6/2009 | Schultz |
| 7,644,019 B2 | 1/2010 | Woda et al. |
| 7,657,441 B2 | 2/2010 | Richey et al. |
| 7,689,508 B2 | 3/2010 | Davis et al. |
| 7,818,399 B1 | 10/2010 | Ross, Jr. et al. |
| 7,860,936 B1 | 12/2010 | Newstadt et al. |
| RE42,574 E | 7/2011 | Cockayne |
| 8,042,157 B2 | 10/2011 | Bennett et al. |
| 8,050,997 B1 | 11/2011 | Nosek et al. |
| 8,060,571 B2 | 11/2011 | Rao |
| 8,112,787 B2 | 2/2012 | Buer |
| 8,157,164 B1 | 4/2012 | Billman |
| 8,195,507 B2 | 6/2012 | Postrel |
| 8,195,576 B1 | 6/2012 | Grigg et al. |
| 8,254,647 B1 | 8/2012 | Nechyba et al. |
| 8,392,259 B2 | 3/2013 | MacGillivray et al. |
| 8,396,265 B1 | 3/2013 | Ross et al. |
| 8,452,654 B1 | 5/2013 | Wooters et al. |
| 8,452,978 B2 | 5/2013 | Alward et al. |
| 8,467,766 B2 | 6/2013 | Rackle et al. |
| 8,560,004 B1 | 10/2013 | Tsvetkov et al. |
| 8,571,937 B2 | 10/2013 | Rose et al. |
| 8,583,549 B1 | 11/2013 | Mohsenzadeh |
| 8,606,512 B1 | 12/2013 | Bogovich et al. |
| 8,606,640 B2 | 12/2013 | Brody et al. |
| 8,689,001 B1 | 4/2014 | Satish et al. |
| 8,762,272 B1 | 6/2014 | Cozens et al. |
| 8,763,896 B2 | 7/2014 | Kushevsky et al. |
| 8,769,624 B2 | 7/2014 | Cotterill |
| 8,827,153 B1 | 9/2014 | Rhoades et al. |
| 8,831,677 B2 | 9/2014 | Villa-Real |
| 8,880,055 B1 | 11/2014 | Clement et al. |
| 8,892,474 B1 | 11/2014 | Inskeep et al. |
| 8,924,259 B2 | 12/2014 | Neighman et al. |
| 8,942,420 B2 | 1/2015 | Kim et al. |
| 8,949,902 B1 | 2/2015 | Fabian-Isaacs et al. |
| 8,963,806 B1 | 2/2015 | Starner et al. |
| 9,002,322 B1 | 4/2015 | Cotterill |
| 9,053,293 B2 | 6/2015 | Latzina |
| 9,177,130 B2 | 11/2015 | Nechyba et al. |
| 9,253,375 B2 | 2/2016 | Milanfar et al. |
| 9,269,083 B1 | 2/2016 | Jarajapu et al. |
| 9,294,476 B1 | 3/2016 | Lurey et al. |
| 9,305,310 B2 | 4/2016 | Radhakrishnan et al. |
| 9,313,170 B1 | 4/2016 | Shoemaker et al. |
| 9,324,067 B2 | 4/2016 | Van Os et al. |
| 9,349,035 B1 | 5/2016 | Gerber et al. |
| 9,355,393 B2 | 5/2016 | Purves et al. |
| 9,411,460 B2 | 8/2016 | Dumont et al. |
| 9,477,872 B2 | 10/2016 | Sarve et al. |
| 9,483,763 B2 | 11/2016 | Van Os et al. |
| 9,519,901 B1 | 12/2016 | Dorogusker |
| 9,526,127 B1 | 12/2016 | Taubman et al. |
| 9,558,636 B1 | 1/2017 | Burdick |
| 9,569,605 B1 | 2/2017 | Schneider et al. |
| 9,584,463 B2 | 2/2017 | Ji et al. |
| 9,716,825 B1 | 7/2017 | Manzari et al. |
| 9,779,585 B2 | 10/2017 | Dupuis et al. |
| 9,817,549 B2 | 11/2017 | Chandrasekaran |
| 9,842,330 B1 | 12/2017 | Van Os et al. |
| 9,847,999 B2 | 12/2017 | Van Os et al. |
| 9,851,214 B1 | 12/2017 | Chintakindi |
| 9,881,198 B2 | 1/2018 | Lee et al. |
| 9,922,327 B2 | 3/2018 | Johnson et al. |
| 9,953,149 B2 | 4/2018 | Tussy |
| 10,003,738 B2 | 6/2018 | Lautenbach et al. |
| 10,019,904 B1 | 7/2018 | Chan et al. |
| 10,032,100 B2 | 7/2018 | Mullen et al. |
| 10,073,541 B1 | 9/2018 | Baldwin |
| 10,089,607 B2 | 10/2018 | Ziat et al. |
| 10,223,631 B2 | 3/2019 | Mullen et al. |
| 10,248,779 B2 | 4/2019 | Song et al. |
| 10,255,545 B2 | 4/2019 | Mullen et al. |
| 10,319,203 B1 | 6/2019 | Testanero et al. |
| 10,334,054 B2 | 6/2019 | Van Os et al. |
| 10,482,461 B2 | 11/2019 | Van Os et al. |
| 10,510,073 B2 | 12/2019 | Wong et al. |
| 10,698,701 B1 | 6/2020 | De Jong et al. |
| 10,749,967 B2 | 8/2020 | Van Os et al. |
| 2001/0039497 A1 | 11/2001 | Hubbard |
| 2001/0049627 A1 | 12/2001 | Simpson |
| 2002/0004760 A1 | 1/2002 | Yoshida et al. |
| 2002/0015024 A1 | 2/2002 | Westerman et al. |

(56) References Cited

U.S. PATENT DOCUMENTS

| | | |
|---|---|---|
| 2002/0046064 A1 | 4/2002 | Maury et al. |
| 2002/0059295 A1 | 5/2002 | Ludtke et al. |
| 2002/0065774 A1 | 5/2002 | Young et al. |
| 2002/0116276 A1 | 8/2002 | Ottley |
| 2003/0006280 A1 | 1/2003 | Seita et al. |
| 2003/0028639 A1 | 2/2003 | Yamamoto et al. |
| 2003/0097413 A1 | 5/2003 | Vishik et al. |
| 2003/0142227 A1 | 7/2003 | Van Zee |
| 2003/0181201 A1 | 9/2003 | Bomze et al. |
| 2003/0188183 A1 | 10/2003 | Lee et al. |
| 2003/0200184 A1 | 10/2003 | Dominguez et al. |
| 2003/0236746 A1 | 12/2003 | Turner et al. |
| 2004/0073432 A1 | 4/2004 | Stone |
| 2004/0122685 A1 | 6/2004 | Bunce |
| 2004/0143553 A1 | 7/2004 | Torget et al. |
| 2004/0169722 A1 | 9/2004 | Pena |
| 2004/0181695 A1 | 9/2004 | Walker |
| 2004/0215572 A1 | 10/2004 | Uehara et al. |
| 2004/0242200 A1 | 12/2004 | Maeoka et al. |
| 2004/0254891 A1 | 12/2004 | Blinn et al. |
| 2005/0021975 A1 | 1/2005 | Liu |
| 2005/0071188 A1 | 3/2005 | Thuerk |
| 2005/0093868 A1 | 5/2005 | Hinckley |
| 2005/0096009 A1 | 5/2005 | Ackley |
| 2005/0144452 A1 | 6/2005 | Lynch et al. |
| 2005/0187873 A1 | 8/2005 | Labrou et al. |
| 2005/0250538 A1 | 11/2005 | Narasimhan et al. |
| 2005/0253814 A1 | 11/2005 | Ghassabian |
| 2005/0278587 A1 | 12/2005 | Breitling et al. |
| 2006/0021003 A1 | 1/2006 | Fisher et al. |
| 2006/0056664 A1 | 3/2006 | Iwasaki |
| 2006/0064313 A1 | 3/2006 | Steinbarth et al. |
| 2006/0120707 A1 | 6/2006 | Kusakari et al. |
| 2006/0165060 A1 | 7/2006 | Dua |
| 2006/0179404 A1 | 8/2006 | Yolleck et al. |
| 2006/0192868 A1 | 8/2006 | Wakamori |
| 2006/0206709 A1 | 9/2006 | Labrou et al. |
| 2006/0208065 A1 | 9/2006 | Mendelovich et al. |
| 2006/0234764 A1 | 10/2006 | Gamo et al. |
| 2006/0288226 A1 | 12/2006 | Kowal |
| 2006/0294007 A1 | 12/2006 | Barthelemy |
| 2006/0294025 A1 | 12/2006 | Mengerink |
| 2007/0013662 A1 | 1/2007 | Fauth |
| 2007/0073649 A1 | 3/2007 | Kikkoji et al. |
| 2007/0078786 A1 | 4/2007 | Bous et al. |
| 2007/0131759 A1 | 6/2007 | Cox et al. |
| 2007/0150842 A1 | 6/2007 | Chaudhri et al. |
| 2007/0157089 A1 | 7/2007 | Van Os et al. |
| 2007/0180492 A1 | 8/2007 | Hassan et al. |
| 2007/0186106 A1 | 8/2007 | Ting et al. |
| 2007/0192168 A1 | 8/2007 | Van |
| 2007/0194113 A1 | 8/2007 | Esplin et al. |
| 2007/0219901 A1 | 9/2007 | Garbow et al. |
| 2007/0245148 A1 | 10/2007 | Buer |
| 2007/0255564 A1 | 11/2007 | Yee et al. |
| 2007/0260547 A1 | 11/2007 | Little |
| 2007/0260558 A1 | 11/2007 | Look |
| 2007/0284432 A1 | 12/2007 | Abouyounes |
| 2007/0294182 A1 | 12/2007 | Hammad |
| 2008/0041936 A1 | 2/2008 | Vawter |
| 2008/0042866 A1 | 2/2008 | Morse et al. |
| 2008/0052181 A1 | 2/2008 | Devitt-Carolan et al. |
| 2008/0054081 A1 | 3/2008 | Mullen |
| 2008/0059351 A1 | 3/2008 | Richey et al. |
| 2008/0114678 A1 | 5/2008 | Bennett et al. |
| 2008/0114980 A1 | 5/2008 | Sridhar |
| 2008/0120707 A1 | 5/2008 | Ramia |
| 2008/0208681 A1 | 8/2008 | Hammad et al. |
| 2008/0208762 A1 | 8/2008 | Arthur et al. |
| 2008/0229409 A1 | 9/2008 | Miller et al. |
| 2008/0275779 A1 | 11/2008 | Lakshminarayanan |
| 2008/0319875 A1 | 12/2008 | Levchin et al. |
| 2009/0031375 A1 | 1/2009 | Sullivan et al. |
| 2009/0036165 A1 | 2/2009 | Brede |
| 2009/0054044 A1 | 2/2009 | Ikemori et al. |
| 2009/0055910 A1 | 2/2009 | Lee |
| 2009/0063851 A1 | 3/2009 | Nijdam |
| 2009/0067689 A1 | 3/2009 | Porter et al. |
| 2009/0083850 A1 | 3/2009 | Fadell et al. |
| 2009/0094134 A1 | 4/2009 | Toomer et al. |
| 2009/0094681 A1 | 4/2009 | Sadler et al. |
| 2009/0119754 A1 | 5/2009 | Schubert |
| 2009/0122149 A1 | 5/2009 | Ishii |
| 2009/0135678 A1 | 5/2009 | Godat |
| 2009/0158390 A1 | 6/2009 | Guan |
| 2009/0159696 A1 | 6/2009 | Mullen |
| 2009/0160609 A1 | 6/2009 | Lin et al. |
| 2009/0165107 A1 | 6/2009 | Tojo et al. |
| 2009/0173784 A1 | 7/2009 | Yang |
| 2009/0187423 A1 | 7/2009 | Kim |
| 2009/0193514 A1 | 7/2009 | Adams et al. |
| 2009/0199188 A1 | 8/2009 | Fujimaki |
| 2009/0210308 A1 | 8/2009 | Toomer et al. |
| 2009/0228938 A1 | 9/2009 | White et al. |
| 2009/0241169 A1 | 9/2009 | Dhand et al. |
| 2009/0307139 A1 | 12/2009 | Mardikar et al. |
| 2010/0008535 A1 | 1/2010 | Abulafia et al. |
| 2010/0023449 A1 | 1/2010 | Skowronek et al. |
| 2010/0026453 A1 | 2/2010 | Yamamoto et al. |
| 2010/0027854 A1 | 2/2010 | Chatterjee et al. |
| 2010/0042835 A1 | 2/2010 | Lee et al. |
| 2010/0078471 A1 | 4/2010 | Lin et al. |
| 2010/0078472 A1 | 4/2010 | Lin et al. |
| 2010/0082462 A1 | 4/2010 | Yuan et al. |
| 2010/0082481 A1 | 4/2010 | Lin et al. |
| 2010/0082485 A1 | 4/2010 | Lin et al. |
| 2010/0107229 A1 | 4/2010 | Najafi et al. |
| 2010/0114731 A1 | 5/2010 | Kingston et al. |
| 2010/0131303 A1 | 5/2010 | Collopy et al. |
| 2010/0153265 A1 | 6/2010 | Hershfield et al. |
| 2010/0164864 A1 | 7/2010 | Chou |
| 2010/0174644 A1 | 7/2010 | Rosano et al. |
| 2010/0191570 A1 | 7/2010 | Michaud et al. |
| 2010/0205091 A1 | 8/2010 | Graziano et al. |
| 2010/0216425 A1 | 8/2010 | Smith |
| 2010/0223145 A1 | 9/2010 | Dragt |
| 2010/0225607 A1 | 9/2010 | Kim |
| 2010/0243741 A1 | 9/2010 | Eng |
| 2010/0248823 A1 | 9/2010 | Smith |
| 2010/0250376 A1 | 9/2010 | Nandiraju |
| 2010/0251243 A1 | 9/2010 | Gill et al. |
| 2010/0267362 A1 | 10/2010 | Smith et al. |
| 2010/0269156 A1 | 10/2010 | Hohlfeld et al. |
| 2010/0275259 A1 | 10/2010 | Adams et al. |
| 2010/0306107 A1 | 12/2010 | Nahari |
| 2010/0311397 A1 | 12/2010 | Li |
| 2011/0035799 A1 | 2/2011 | Handler |
| 2011/0054268 A1 | 3/2011 | Fidacaro et al. |
| 2011/0055763 A1 | 3/2011 | Utsuki et al. |
| 2011/0099079 A1 | 4/2011 | White |
| 2011/0106671 A1 | 5/2011 | Minnis et al. |
| 2011/0122294 A1 | 5/2011 | Suh et al. |
| 2011/0138166 A1 | 6/2011 | Peszek et al. |
| 2011/0138450 A1 | 6/2011 | Kesanupalli et al. |
| 2011/0142234 A1 | 6/2011 | Rogers |
| 2011/0145049 A1 | 6/2011 | Hertel et al. |
| 2011/0149874 A1 | 6/2011 | Reif |
| 2011/0161116 A1 | 6/2011 | Peak et al. |
| 2011/0164269 A1 | 7/2011 | Kamishiro |
| 2011/0187497 A1 | 8/2011 | Chin |
| 2011/0201306 A1 | 8/2011 | Ali Al-Harbi |
| 2011/0214158 A1 | 9/2011 | Pasquero et al. |
| 2011/0225057 A1 | 9/2011 | Webb et al. |
| 2011/0230769 A1 | 9/2011 | Yamazaki |
| 2011/0231914 A1 | 9/2011 | Hung |
| 2011/0251892 A1 | 10/2011 | Laracey |
| 2011/0254683 A1 | 10/2011 | Soldan et al. |
| 2012/0023185 A1 | 1/2012 | Holden et al. |
| 2012/0024947 A1 | 2/2012 | Naelon |
| 2012/0028609 A1 | 2/2012 | Hruska |
| 2012/0066731 A1 | 3/2012 | Vasquez et al. |
| 2012/0078751 A1 | 3/2012 | Macphail et al. |
| 2012/0089507 A1 | 4/2012 | Zhang et al. |
| 2012/0123806 A1 | 5/2012 | Schumann et al. |

(56) References Cited

U.S. PATENT DOCUMENTS

| | | |
|---|---|---|
| 2012/0123937 A1 | 5/2012 | Spodak |
| 2012/0185397 A1 | 7/2012 | Levovitz |
| 2012/0197740 A1 | 8/2012 | Grigg et al. |
| 2012/0209748 A1 | 8/2012 | Small |
| 2012/0215553 A1 | 8/2012 | Leston |
| 2012/0221464 A1 | 8/2012 | Pasquero et al. |
| 2012/0238363 A1 | 9/2012 | Watanabe et al. |
| 2012/0245985 A1 | 9/2012 | Cho et al. |
| 2012/0245986 A1 | 9/2012 | Regan et al. |
| 2012/0267432 A1 | 10/2012 | Kuttuva |
| 2012/0271712 A1 | 10/2012 | Katzin et al. |
| 2012/0280917 A1 | 11/2012 | Toksvig et al. |
| 2012/0284185 A1 | 11/2012 | Mettler et al. |
| 2012/0290376 A1 | 11/2012 | Dryer et al. |
| 2012/0290449 A1 | 11/2012 | Mullen et al. |
| 2012/0290472 A1 | 11/2012 | Mullen et al. |
| 2012/0310760 A1 | 12/2012 | Phillips et al. |
| 2012/0316933 A1 | 12/2012 | Pentland et al. |
| 2012/0322370 A1 | 12/2012 | Lee |
| 2012/0322371 A1 | 12/2012 | Lee |
| 2013/0013499 A1 | 1/2013 | Kalgi |
| 2013/0030934 A1 | 1/2013 | Bakshi et al. |
| 2013/0031217 A1 | 1/2013 | Rajapakse |
| 2013/0047233 A1 | 2/2013 | Fisk et al. |
| 2013/0047236 A1 | 2/2013 | Singh |
| 2013/0050263 A1 | 2/2013 | Khoe et al. |
| 2013/0054336 A1 | 2/2013 | Graylin |
| 2013/0060678 A1 | 3/2013 | Oskolkov et al. |
| 2013/0073321 A1 | 3/2013 | Hofmann et al. |
| 2013/0074194 A1 | 3/2013 | White et al. |
| 2013/0080272 A1 | 3/2013 | Ronca et al. |
| 2013/0080275 A1 | 3/2013 | Ronca et al. |
| 2013/0082819 A1 | 4/2013 | Cotterill |
| 2013/0085931 A1 | 4/2013 | Runyan |
| 2013/0085936 A1 | 4/2013 | Law et al. |
| 2013/0086637 A1 | 4/2013 | Cotterill |
| 2013/0103519 A1 | 4/2013 | Kountotsis et al. |
| 2013/0110719 A1 | 5/2013 | Carter et al. |
| 2013/0122866 A1 | 5/2013 | Huang |
| 2013/0124423 A1 | 5/2013 | Fisher |
| 2013/0144706 A1 | 6/2013 | Qawami et al. |
| 2013/0151360 A1 | 6/2013 | Scipioni et al. |
| 2013/0151414 A1 | 6/2013 | Zhu et al. |
| 2013/0159178 A1 | 6/2013 | Colon et al. |
| 2013/0166325 A1 | 6/2013 | Ganapathy et al. |
| 2013/0166332 A1 | 6/2013 | Hammad |
| 2013/0189953 A1 | 7/2013 | Mathews |
| 2013/0198112 A1 | 8/2013 | Bhat |
| 2013/0198823 A1 | 8/2013 | Hitchcock et al. |
| 2013/0200146 A1 | 8/2013 | Moghadam |
| 2013/0212655 A1 | 8/2013 | Hoyos et al. |
| 2013/0216108 A1 | 8/2013 | Hwang et al. |
| 2013/0218721 A1 | 8/2013 | Borhan et al. |
| 2013/0222323 A1 | 8/2013 | Mckenzie |
| 2013/0223696 A1 | 8/2013 | Azar et al. |
| 2013/0226792 A1 | 8/2013 | Kushevsky et al. |
| 2013/0232073 A1 | 9/2013 | Sheets et al. |
| 2013/0239202 A1 | 9/2013 | Adams et al. |
| 2013/0243264 A1 | 9/2013 | Aoki |
| 2013/0262857 A1 | 10/2013 | Neuman et al. |
| 2013/0275300 A1 | 10/2013 | Killian et al. |
| 2013/0282577 A1 | 10/2013 | Milne |
| 2013/0297414 A1 | 11/2013 | Goldfarb et al. |
| 2013/0304514 A1 | 11/2013 | Hyde et al. |
| 2013/0304651 A1 | 11/2013 | Smith |
| 2013/0326563 A1 | 12/2013 | Mulcahy et al. |
| 2013/0332358 A1 | 12/2013 | Zhao |
| 2013/0332364 A1 | 12/2013 | Templeton et al. |
| 2013/0332826 A1 | 12/2013 | Karunamuni et al. |
| 2013/0333006 A1 | 12/2013 | Tapling et al. |
| 2013/0336527 A1 | 12/2013 | Nechyba et al. |
| 2013/0336545 A1 | 12/2013 | Pritikin et al. |
| 2013/0346273 A1 | 12/2013 | Stockton et al. |
| 2013/0346302 A1 | 12/2013 | Purves et al. |
| 2014/0003677 A1 | 1/2014 | Han et al. |
| 2014/0006285 A1 | 1/2014 | Chi et al. |
| 2014/0019352 A1 | 1/2014 | Shrivastava |
| 2014/0025513 A1 | 1/2014 | Cooke et al. |
| 2014/0025520 A1 | 1/2014 | Mardikar et al. |
| 2014/0036099 A1 | 2/2014 | Balassanian |
| 2014/0052553 A1 | 2/2014 | Uzo |
| 2014/0058805 A1 | 2/2014 | Paesler et al. |
| 2014/0058935 A1 | 2/2014 | Mijares |
| 2014/0058939 A1 | 2/2014 | Savla |
| 2014/0058941 A1 | 2/2014 | Moon et al. |
| 2014/0068740 A1 | 3/2014 | Lecun et al. |
| 2014/0070957 A1 | 3/2014 | Longinotti-Buitoni et al. |
| 2014/0074635 A1 | 3/2014 | Reese et al. |
| 2014/0074716 A1 | 3/2014 | Ni |
| 2014/0089196 A1 | 3/2014 | Paya et al. |
| 2014/0094143 A1 | 4/2014 | Ayotte |
| 2014/0095225 A1 | 4/2014 | Williams et al. |
| 2014/0099886 A1 | 4/2014 | Monroe |
| 2014/0101056 A1 | 4/2014 | Wendling |
| 2014/0109018 A1 | 4/2014 | Casey et al. |
| 2014/0118519 A1 | 5/2014 | Sahin |
| 2014/0122331 A1 | 5/2014 | Vaish et al. |
| 2014/0128035 A1 | 5/2014 | Sweeney |
| 2014/0129435 A1 | 5/2014 | Pardo et al. |
| 2014/0129441 A1 | 5/2014 | Blanco et al. |
| 2014/0138435 A1 | 5/2014 | Khalid |
| 2014/0140587 A1 | 5/2014 | Ballard et al. |
| 2014/0143145 A1 | 5/2014 | Kortina et al. |
| 2014/0156531 A1 | 6/2014 | Poon et al. |
| 2014/0164082 A1 | 6/2014 | Sun et al. |
| 2014/0181747 A1 | 6/2014 | Son |
| 2014/0187163 A1 | 7/2014 | Fujita |
| 2014/0187856 A1 | 7/2014 | Holoien et al. |
| 2014/0188673 A1 | 7/2014 | Graham et al. |
| 2014/0195815 A1 | 7/2014 | Taveau et al. |
| 2014/0197234 A1 | 7/2014 | Hammad |
| 2014/0207659 A1 | 7/2014 | Erez et al. |
| 2014/0207680 A1 | 7/2014 | Rephlo |
| 2014/0222664 A1 | 8/2014 | Milne |
| 2014/0236840 A1 | 8/2014 | Islam |
| 2014/0244365 A1 | 8/2014 | Price et al. |
| 2014/0244493 A1 | 8/2014 | Kenyon et al. |
| 2014/0244495 A1 | 8/2014 | Davis et al. |
| 2014/0254891 A1 | 9/2014 | Lee et al. |
| 2014/0257871 A1 | 9/2014 | Christensen et al. |
| 2014/0258292 A1 | 9/2014 | Thramann et al. |
| 2014/0279442 A1 | 9/2014 | Luoma et al. |
| 2014/0279497 A1 | 9/2014 | Qaim-Maqami et al. |
| 2014/0279556 A1 | 9/2014 | Priebatsch et al. |
| 2014/0281561 A1* | 9/2014 | Etchegoyen ............ G06F 21/44 713/182 |
| 2014/0282987 A1 | 9/2014 | Narendra et al. |
| 2014/0292396 A1 | 10/2014 | Bruwer et al. |
| 2014/0293079 A1 | 10/2014 | Milanfar et al. |
| 2014/0298432 A1 | 10/2014 | Brown |
| 2014/0298478 A1 | 10/2014 | Kim et al. |
| 2014/0337931 A1 | 11/2014 | Cotterill |
| 2014/0344082 A1 | 11/2014 | Soundararajan |
| 2014/0344896 A1 | 11/2014 | Pak et al. |
| 2014/0344904 A1 | 11/2014 | Venkataramani et al. |
| 2014/0359140 A1 | 12/2014 | Shankarraman |
| 2014/0372309 A1 | 12/2014 | Shirey et al. |
| 2014/0375835 A1 | 12/2014 | Bos |
| 2015/0002696 A1 | 1/2015 | He et al. |
| 2015/0006207 A1 | 1/2015 | Jarvis et al. |
| 2015/0012417 A1 | 1/2015 | Joao et al. |
| 2015/0012435 A1 | 1/2015 | Ramavarjula et al. |
| 2015/0014141 A1 | 1/2015 | Rao et al. |
| 2015/0019944 A1 | 1/2015 | Kalgi |
| 2015/0039494 A1 | 2/2015 | Sinton et al. |
| 2015/0043790 A1 | 2/2015 | Ono et al. |
| 2015/0044965 A1 | 2/2015 | Kamon et al. |
| 2015/0046336 A1 | 2/2015 | Cummins |
| 2015/0051846 A1 | 2/2015 | Masuya |
| 2015/0054764 A1 | 2/2015 | Kim et al. |
| 2015/0056957 A1 | 2/2015 | Mardikar et al. |
| 2015/0058146 A1 | 2/2015 | Gaddam et al. |
| 2015/0058191 A1 | 2/2015 | Khan et al. |
| 2015/0067496 A1 | 3/2015 | Missig et al. |

(56) References Cited

U.S. PATENT DOCUMENTS

| | | |
|---|---|---|
| 2015/0067602 A1 | 3/2015 | Bernstein et al. |
| 2015/0074418 A1 | 3/2015 | Lee et al. |
| 2015/0074615 A1 | 3/2015 | Han et al. |
| 2015/0077362 A1 | 3/2015 | Seo |
| 2015/0089636 A1 | 3/2015 | Martynov et al. |
| 2015/0095174 A1 | 4/2015 | Dua |
| 2015/0095175 A1 | 4/2015 | Dua |
| 2015/0098309 A1 | 4/2015 | Adams et al. |
| 2015/0115028 A1 | 4/2015 | Montealegre |
| 2015/0120545 A1 | 4/2015 | Fiore et al. |
| 2015/0124053 A1 | 5/2015 | Tamura et al. |
| 2015/0127539 A1 | 5/2015 | Ye et al. |
| 2015/0127550 A1 | 5/2015 | Khan |
| 2015/0134956 A1 | 5/2015 | Stachura et al. |
| 2015/0135282 A1 | 5/2015 | Kong et al. |
| 2015/0149899 A1 | 5/2015 | Bernstein et al. |
| 2015/0154589 A1 | 6/2015 | Li |
| 2015/0154676 A1 | 6/2015 | Matousek et al. |
| 2015/0170146 A1 | 6/2015 | Ji et al. |
| 2015/0178878 A1 | 6/2015 | Huang |
| 2015/0186152 A1 | 7/2015 | Jothiswaran et al. |
| 2015/0186636 A1 | 7/2015 | Tharappel et al. |
| 2015/0186892 A1 | 7/2015 | Zhang et al. |
| 2015/0187019 A1 | 7/2015 | Fernandes et al. |
| 2015/0195133 A1 | 7/2015 | Sheets et al. |
| 2015/0208244 A1 | 7/2015 | Nakao |
| 2015/0213244 A1 | 7/2015 | Lymberopoulos et al. |
| 2015/0213542 A1 | 7/2015 | Wallaja |
| 2015/0213560 A1 | 7/2015 | Aabye et al. |
| 2015/0215128 A1 | 7/2015 | Pal |
| 2015/0220924 A1 | 8/2015 | Bakker |
| 2015/0227922 A1 | 8/2015 | Filler |
| 2015/0229750 A1 | 8/2015 | Zhou et al. |
| 2015/0230277 A1 | 8/2015 | Omeara et al. |
| 2015/0235018 A1 | 8/2015 | Gupta et al. |
| 2015/0235055 A1 | 8/2015 | An et al. |
| 2015/0242611 A1 | 8/2015 | Cotterill |
| 2015/0242837 A1 | 8/2015 | Yarbrough et al. |
| 2015/0249540 A1 | 9/2015 | Khalil et al. |
| 2015/0254661 A1 | 9/2015 | Lane |
| 2015/0257004 A1 | 9/2015 | Shanmugam et al. |
| 2015/0278799 A1 | 10/2015 | Palanisamy |
| 2015/0286694 A1 | 10/2015 | Kaplinger et al. |
| 2015/0295921 A1 | 10/2015 | Cao |
| 2015/0302493 A1 | 10/2015 | Batstone et al. |
| 2015/0302510 A1 | 10/2015 | Godsey et al. |
| 2015/0324113 A1 | 11/2015 | Kapp et al. |
| 2015/0324615 A1 | 11/2015 | Matsumoto et al. |
| 2015/0334567 A1 | 11/2015 | Chen et al. |
| 2015/0339652 A1 | 11/2015 | Park et al. |
| 2015/0346845 A1 | 12/2015 | Di censo et al. |
| 2015/0348001 A1 | 12/2015 | Van os et al. |
| 2015/0348002 A1 | 12/2015 | Van os et al. |
| 2015/0348014 A1 | 12/2015 | Van os et al. |
| 2015/0348018 A1 | 12/2015 | Campos et al. |
| 2015/0348029 A1 | 12/2015 | Van os et al. |
| 2015/0349959 A1 | 12/2015 | Marciniak |
| 2015/0363632 A1 | 12/2015 | Ahn et al. |
| 2015/0365400 A1 | 12/2015 | Cox |
| 2016/0005024 A1 | 1/2016 | Harrell |
| 2016/0005028 A1 | 1/2016 | Mayblum et al. |
| 2016/0012417 A1 | 1/2016 | Mizon |
| 2016/0012465 A1 | 1/2016 | Sharp |
| 2016/0019536 A1 | 1/2016 | Ortiz et al. |
| 2016/0021003 A1 | 1/2016 | Pan |
| 2016/0026779 A1 | 1/2016 | Grigg et al. |
| 2016/0034887 A1 | 2/2016 | Lee |
| 2016/0047666 A1 | 2/2016 | Fuchs |
| 2016/0050199 A1 | 2/2016 | Ganesan |
| 2016/0062487 A1 | 3/2016 | Foss et al. |
| 2016/0063235 A1 | 3/2016 | Tussy |
| 2016/0063298 A1 | 3/2016 | Tuneld et al. |
| 2016/0078281 A1 | 3/2016 | Gongaware et al. |
| 2016/0078434 A1* | 3/2016 | Huxham .............. G06Q 20/382 705/71 |
| 2016/0086176 A1 | 3/2016 | Silva pinto et al. |
| 2016/0092665 A1 | 3/2016 | Cowan et al. |
| 2016/0092877 A1 | 3/2016 | Chew |
| 2016/0100156 A1 | 4/2016 | Zhou et al. |
| 2016/0104228 A1 | 4/2016 | Sundaresan |
| 2016/0132864 A1 | 5/2016 | Barrese et al. |
| 2016/0134488 A1 | 5/2016 | Straub et al. |
| 2016/0142407 A1 | 5/2016 | Chun et al. |
| 2016/0147987 A1 | 5/2016 | Jang et al. |
| 2016/0148384 A1 | 5/2016 | Bud et al. |
| 2016/0164866 A1 | 6/2016 | Oberheide et al. |
| 2016/0165205 A1 | 6/2016 | Liu et al. |
| 2016/0171192 A1 | 6/2016 | Holz et al. |
| 2016/0171482 A1 | 6/2016 | Muncey et al. |
| 2016/0180305 A1 | 6/2016 | Dresser et al. |
| 2016/0188860 A1 | 6/2016 | Lee et al. |
| 2016/0210623 A1 | 7/2016 | Voege |
| 2016/0217310 A1 | 7/2016 | Shah et al. |
| 2016/0224966 A1 | 8/2016 | Van os et al. |
| 2016/0224973 A1 | 8/2016 | Van os et al. |
| 2016/0232513 A1 | 8/2016 | Purves et al. |
| 2016/0232516 A1 | 8/2016 | Dayan et al. |
| 2016/0234023 A1 | 8/2016 | Mozer et al. |
| 2016/0239701 A1 | 8/2016 | Lee et al. |
| 2016/0241543 A1 | 8/2016 | Jung et al. |
| 2016/0241555 A1 | 8/2016 | Vo et al. |
| 2016/0248840 A1 | 8/2016 | Bockhold et al. |
| 2016/0253665 A1 | 9/2016 | Van os et al. |
| 2016/0267779 A1 | 9/2016 | Kuang |
| 2016/0270144 A1 | 9/2016 | Thanayankizil et al. |
| 2016/0275281 A1 | 9/2016 | Ranjit et al. |
| 2016/0277371 A1 | 9/2016 | Maxwell |
| 2016/0277396 A1 | 9/2016 | Gardiner |
| 2016/0292525 A1 | 10/2016 | Aoki |
| 2016/0294557 A1 | 10/2016 | Baldwin et al. |
| 2016/0300100 A1 | 10/2016 | Shen et al. |
| 2016/0308859 A1 | 10/2016 | Barry et al. |
| 2016/0314290 A1 | 10/2016 | Baca et al. |
| 2016/0314451 A1 | 10/2016 | Martin |
| 2016/0335495 A1 | 11/2016 | Kim et al. |
| 2016/0342832 A1 | 11/2016 | Bud et al. |
| 2016/0345172 A1 | 11/2016 | Cotterill |
| 2016/0350522 A1 | 12/2016 | Chi et al. |
| 2016/0358180 A1 | 12/2016 | Van os et al. |
| 2016/0364561 A1 | 12/2016 | Lee |
| 2016/0364591 A1 | 12/2016 | El-Khoury et al. |
| 2016/0364600 A1 | 12/2016 | Shah et al. |
| 2016/0378961 A1 | 12/2016 | Park |
| 2016/0378966 A1 | 12/2016 | Alten |
| 2017/0017834 A1 | 1/2017 | Sabitov et al. |
| 2017/0024091 A1 | 1/2017 | Hosier, Jr. |
| 2017/0024581 A1 | 1/2017 | Grubel et al. |
| 2017/0032375 A1 | 2/2017 | Van os et al. |
| 2017/0046508 A1 | 2/2017 | Shin et al. |
| 2017/0046704 A1 | 2/2017 | Buchner et al. |
| 2017/0054731 A1 | 2/2017 | Cotterill |
| 2017/0063851 A1 | 3/2017 | Kim et al. |
| 2017/0063852 A1 | 3/2017 | Azar et al. |
| 2017/0070680 A1 | 3/2017 | Kobayashi |
| 2017/0076132 A1 | 3/2017 | Sezan et al. |
| 2017/0147186 A1 | 5/2017 | Velusamy et al. |
| 2017/0169202 A1 | 6/2017 | Duggan et al. |
| 2017/0169287 A1 | 6/2017 | Tokunaga et al. |
| 2017/0180637 A1 | 6/2017 | Lautenbach et al. |
| 2017/0185760 A1 | 6/2017 | Wilder |
| 2017/0193214 A1 | 7/2017 | Shim et al. |
| 2017/0193314 A1 | 7/2017 | Kim et al. |
| 2017/0244703 A1 | 8/2017 | Lee et al. |
| 2017/0300897 A1 | 10/2017 | Ferenczi et al. |
| 2017/0329949 A1 | 11/2017 | Civelli |
| 2017/0337542 A1 | 11/2017 | Kim et al. |
| 2017/0339151 A1 | 11/2017 | Van os et al. |
| 2017/0344251 A1 | 11/2017 | Hajimusa et al. |
| 2017/0357972 A1 | 12/2017 | Van os et al. |
| 2017/0357973 A1 | 12/2017 | Van os et al. |
| 2018/0004924 A1 | 1/2018 | Tieu |
| 2018/0021954 A1 | 1/2018 | Fischer et al. |
| 2018/0053157 A1 | 2/2018 | Roffey |
| 2018/0068313 A1 | 3/2018 | Van os et al. |

(56) References Cited

U.S. PATENT DOCUMENTS

| | | | |
|---|---|---|---|
| 2018/0082282 A1 | 3/2018 | Van os et al. |
| 2018/0109629 A1 | 4/2018 | Van os et al. |
| 2018/0114010 A1 | 4/2018 | Van os et al. |
| 2018/0117944 A1 | 5/2018 | Lee |
| 2018/0150627 A1 | 5/2018 | Rodefer |
| 2018/0158066 A1 | 6/2018 | Van os et al. |
| 2018/0181737 A1 | 6/2018 | Tussy |
| 2018/0213059 A1 | 7/2018 | Alsina et al. |
| 2018/0234496 A1 | 8/2018 | Ratias |
| 2018/0276673 A1 | 9/2018 | Van os et al. |
| 2018/0302790 A1 | 10/2018 | Cotterill |
| 2018/0310070 A1 | 10/2018 | Murray |
| 2019/0050867 A1 | 2/2019 | Van os et al. |
| 2019/0080066 A1 | 3/2019 | Van os et al. |
| 2019/0080070 A1 | 3/2019 | Van os et al. |
| 2019/0080071 A1 | 3/2019 | Van os et al. |
| 2019/0080072 A1 | 3/2019 | Van os et al. |
| 2019/0080189 A1 | 3/2019 | Van os et al. |
| 2019/0124510 A1 | 4/2019 | Cotterill |
| 2019/0156607 A1 | 5/2019 | Tao et al. |
| 2019/0289079 A1 | 9/2019 | Van os et al. |
| 2019/0347391 A1 | 11/2019 | Kim et al. |
| 2019/0370448 A1 | 12/2019 | Devine et al. |
| 2019/0370583 A1 | 12/2019 | Van Os et al. |
| 2020/0042685 A1 | 2/2020 | Tussy et al. |
| 2020/0065821 A1 | 2/2020 | Van Os et al. |
| 2020/0120503 A1 | 4/2020 | Cotterill |
| 2020/0184472 A1 | 6/2020 | Van Os et al. |
| 2020/0244659 A1 | 7/2020 | Kunda et al. |
| 2020/0311509 A1 | 10/2020 | Benkley et al. |
| 2020/0366742 A1 | 11/2020 | Van Os et al. |
| 2020/0372514 A1 | 11/2020 | Van Os et al. |
| 2021/0042549 A1 | 2/2021 | Van Os et al. |
| 2021/0049021 A1 | 2/2021 | De Jong et al. |
| 2021/0073823 A1 | 3/2021 | Van Os |
| 2021/0192530 A1 | 6/2021 | Van Os et al. |
| 2021/0201288 A1 | 7/2021 | Van Os et al. |
| 2021/0224785 A1 | 7/2021 | Van Os et al. |
| 2021/0272118 A1 | 9/2021 | Van Os et al. |
| 2021/0306344 A1 | 9/2021 | Han et al. |
| 2021/0397681 A1 | 12/2021 | Boule et al. |
| 2021/0400032 A1 | 12/2021 | Ryu et al. |
| 2022/0027446 A1 | 1/2022 | Van Os et al. |

FOREIGN PATENT DOCUMENTS

| | | |
|---|---|---|
| AU | 2017100556 A4 | 6/2017 |
| CN | 1452739 A | 10/2003 |
| CN | 1741104 A | 3/2006 |
| CN | 1846221 A | 10/2006 |
| CN | 1908981 A | 2/2007 |
| CN | 101171604 A | 4/2008 |
| CN | 101268470 A | 9/2008 |
| CN | 101299694 A | 11/2008 |
| CN | 101341718 A | 1/2009 |
| CN | 101341727 A | 1/2009 |
| CN | 101485128 A | 7/2009 |
| CN | 101610155 A | 12/2009 |
| CN | 101730907 A | 6/2010 |
| CN | 101796764 A | 8/2010 |
| CN | 101809581 A | 8/2010 |
| CN | 102004908 A | 4/2011 |
| CN | 102065148 A | 5/2011 |
| CN | 102096546 A | 6/2011 |
| CN | 102164213 A | 8/2011 |
| CN | 102202192 A | 9/2011 |
| CN | 102209321 A | 10/2011 |
| CN | 102282578 A | 12/2011 |
| CN | 102394838 A | 3/2012 |
| CN | 102396205 A | 3/2012 |
| CN | 102663303 A | 9/2012 |
| CN | 102737313 A | 10/2012 |
| CN | 102982144 A | 3/2013 |
| CN | 103001856 A | 3/2013 |
| CN | 103067248 A | 4/2013 |
| CN | 103188280 A | 7/2013 |
| CN | 103413218 A | 11/2013 |
| CN | 103701605 A | 4/2014 |
| CN | 103778533 A | 5/2014 |
| CN | 104038256 A | 9/2014 |
| CN | 104077534 A | 10/2014 |
| CN | 104252675 A | 12/2014 |
| CN | 104361302 A | 2/2015 |
| CN | 104487927 A | 4/2015 |
| CN | 104508618 A | 4/2015 |
| CN | 104539924 A | 4/2015 |
| CN | 104813354 A | 7/2015 |
| CN | 104903835 A | 9/2015 |
| CN | 105320864 A | 2/2016 |
| CN | 105389491 A | 3/2016 |
| CN | 105474224 A | 4/2016 |
| CN | 105612543 A | 5/2016 |
| CN | 105787718 A | 7/2016 |
| CN | 105794244 A | 7/2016 |
| CN | 105844468 A | 8/2016 |
| CN | 105868613 A | 8/2016 |
| CN | 105893814 A | 8/2016 |
| CN | 106020436 A | 10/2016 |
| CN | 106095247 A | 11/2016 |
| CN | 106156566 A | 11/2016 |
| CN | 106164934 A | 11/2016 |
| CN | 106355058 A | 1/2017 |
| CN | 106462383 A | 2/2017 |
| CN | 106485123 A | 3/2017 |
| CN | 106503514 A | 3/2017 |
| CN | 106778222 A | 5/2017 |
| CN | 109769397 A | 5/2019 |
| EP | 1950678 A1 | 7/2008 |
| EP | 2309410 A1 | 4/2011 |
| EP | 2654275 A1 | 10/2013 |
| EP | 2674889 A2 | 12/2013 |
| EP | 2701107 A1 | 2/2014 |
| EP | 2713298 A1 | 4/2014 |
| EP | 2725537 A1 | 4/2014 |
| EP | 2993619 A1 | 3/2016 |
| EP | 3057024 A1 | 8/2016 |
| EP | 3076334 A1 | 10/2016 |
| EP | 3273378 A1 | 1/2018 |
| GB | 2466038 A | 6/2010 |
| GB | 2500321 A | 9/2013 |
| JP | 62-84182 A | 10/1994 |
| JP | 11-39385 A | 2/1999 |
| JP | 11-73530 A | 3/1999 |
| JP | 2000-259477 A | 9/2000 |
| JP | 2001-331758 A | 11/2001 |
| JP | 2002-99854 A | 4/2002 |
| JP | 2003-16398 A | 1/2003 |
| JP | 2003-141541 A | 5/2003 |
| JP | 2003-178244 A | 6/2003 |
| JP | 2003-346059 A | 12/2003 |
| JP | 2004-252736 A | 9/2004 |
| JP | 2004-287592 A | 10/2004 |
| JP | 2004-356816 A | 12/2004 |
| JP | 2005-521961 A | 7/2005 |
| JP | 2005-523505 A | 8/2005 |
| JP | 2005-317049 A | 11/2005 |
| JP | 2006-31182 A | 2/2006 |
| JP | 2006-93912 A | 4/2006 |
| JP | 2006-114018 A | 4/2006 |
| JP | 2006-163960 A | 6/2006 |
| JP | 2006-197071 A | 7/2006 |
| JP | 2006-277670 A | 10/2006 |
| JP | 2007-34637 A | 2/2007 |
| JP | 2007-507011 A | 3/2007 |
| JP | 2007-226794 A | 9/2007 |
| JP | 2007-334637 A | 12/2007 |
| JP | 2008-70926 A | 3/2008 |
| JP | 2009-9434 A | 1/2009 |
| JP | 2009-49878 A | 3/2009 |
| JP | 2009-99076 A | 5/2009 |
| JP | 2009-258991 A | 11/2009 |
| JP | 2010-102718 A | 5/2010 |
| JP | 2010-517390 A | 5/2010 |
| JP | 2010-152506 A | 7/2010 |

(56) References Cited

FOREIGN PATENT DOCUMENTS

| | | |
|---|---|---|
| JP | 2010-524051 A | 7/2010 |
| JP | 2010-211577 A | 9/2010 |
| JP | 2010-211579 A | 9/2010 |
| JP | 2010-271779 A | 12/2010 |
| JP | 2011-97287 A | 5/2011 |
| JP | 2011-519439 A | 7/2011 |
| JP | 2012-8985 A | 1/2012 |
| JP | 2012-504273 A | 2/2012 |
| JP | 2012-73724 A | 4/2012 |
| JP | 2012-508930 A | 4/2012 |
| JP | 2012-99025 A | 5/2012 |
| JP | 2012-215981 A | 11/2012 |
| JP | 2012-529699 A | 11/2012 |
| JP | 2013-20496 A | 1/2013 |
| JP | 2013-34322 A | 2/2013 |
| JP | 2013-58828 A | 3/2013 |
| JP | 2013-114317 A | 6/2013 |
| JP | 2013-530445 A | 7/2013 |
| JP | 2013-149206 A | 8/2013 |
| JP | 2013-533532 A | 8/2013 |
| JP | 5267966 B2 | 8/2013 |
| JP | 2013-222410 A | 10/2013 |
| JP | 2014-44719 A | 3/2014 |
| JP | 2014-44724 A | 3/2014 |
| JP | 2014-75155 A | 4/2014 |
| JP | 2014-102845 A | 6/2014 |
| JP | 2014-191653 A | 10/2014 |
| JP | 2015-14923 A | 1/2015 |
| JP | 2015-75877 A | 4/2015 |
| JP | 2015-187783 A | 10/2015 |
| JP | 2016-53766 A | 4/2016 |
| JP | 2016-71655 A | 5/2016 |
| JP | 2016-521403 A | 7/2016 |
| JP | 6023162 B2 | 11/2016 |
| JP | 2016-224960 A | 12/2016 |
| JP | 2017-16170 A | 1/2017 |
| JP | 2017-500656 A | 1/2017 |
| JP | 2017-091129 A | 5/2017 |
| JP | 2017-102952 A | 6/2017 |
| JP | 2017-138846 A | 8/2017 |
| KR | 10-0403196 B1 | 10/2003 |
| KR | 10-2004-0049502 A | 6/2004 |
| KR | 10-2007-0120125 A | 12/2007 |
| KR | 10-0805341 B1 | 2/2008 |
| KR | 10-2008-0064395 A | 7/2008 |
| KR | 10-2009-0089472 A | 8/2009 |
| KR | 10-2011-0056561 A | 5/2011 |
| KR | 10-2012-0040693 A | 4/2012 |
| KR | 10-2013-0027326 A | 3/2013 |
| KR | 10-1253392 B1 | 4/2013 |
| KR | 10-2013-0116905 A | 10/2013 |
| KR | 10-1330962 B1 | 11/2013 |
| KR | 10-2013-0138659 A | 12/2013 |
| KR | 10-1342208 B1 | 12/2013 |
| KR | 10-2014-0001515 A | 1/2014 |
| KR | 10-2014-0018019 A | 2/2014 |
| KR | 10-2014-0026263 A | 3/2014 |
| KR | 10-2014-0055429 A | 5/2014 |
| KR | 10-2014-0121764 A | 10/2014 |
| KR | 10-2014-0137400 A | 12/2014 |
| KR | 10-2015-0013264 A | 2/2015 |
| KR | 10-2016-0012636 A | 2/2016 |
| KR | 10-2016-0026791 A | 3/2016 |
| KR | 10-2016-0045633 A | 4/2016 |
| KR | 10-2016-0048215 A | 5/2016 |
| KR | 10-2016-0054573 A | 5/2016 |
| KR | 10-2016-0099397 A | 8/2016 |
| KR | 10-2016-0099432 A | 8/2016 |
| KR | 10-2016-0105296 A | 9/2016 |
| KR | 10-1820573 B1 | 1/2018 |
| WO | 1999/44114 A1 | 9/1999 |
| WO | 02/01864 A1 | 1/2002 |
| WO | 2003/038698 A1 | 5/2003 |
| WO | 2003/083793 A2 | 10/2003 |
| WO | 2007/041834 A1 | 4/2007 |
| WO | 2007/073422 A1 | 6/2007 |
| WO | 2007/116521 A1 | 10/2007 |
| WO | 2008/147457 A1 | 12/2008 |
| WO | 2009/042392 A2 | 4/2009 |
| WO | 2010/039337 A2 | 4/2010 |
| WO | 2010/056484 A2 | 5/2010 |
| WO | 2010/077960 A2 | 7/2010 |
| WO | 2010/120972 A1 | 10/2010 |
| WO | 2010/128442 A2 | 11/2010 |
| WO | 2011/159579 A2 | 12/2011 |
| WO | 2012/083113 A2 | 6/2012 |
| WO | 2013/000150 A1 | 1/2013 |
| WO | 2013/023224 A2 | 2/2013 |
| WO | 2013/066659 A1 | 5/2013 |
| WO | 2013/103912 A1 | 7/2013 |
| WO | 2013/169877 A2 | 11/2013 |
| WO | 2013/177548 A1 | 11/2013 |
| WO | 2014/033939 A1 | 3/2014 |
| WO | 2014/105263 A1 | 7/2014 |
| WO | 2014/147297 A1 | 9/2014 |
| WO | 2015/057320 A1 | 4/2015 |
| WO | 2015/062382 A1 | 5/2015 |
| WO | 2015/062410 A1 | 5/2015 |
| WO | 2015/112868 A1 | 7/2015 |
| WO | 2015/120019 A1 | 8/2015 |
| WO | 2015/153990 A1 | 10/2015 |
| WO | 2015/187608 A1 | 12/2015 |
| WO | 2016/111808 A1 | 7/2016 |
| WO | 2016/123309 A1 | 8/2016 |
| WO | 2016/126374 A1 | 8/2016 |
| WO | 2016/126775 A1 | 8/2016 |
| WO | 2016/129938 A1 | 8/2016 |
| WO | 2016/201037 A1 | 12/2016 |
| WO | 2017/030223 A1 | 2/2017 |
| WO | 2017/218094 A1 | 12/2017 |
| WO | 2018/226265 A1 | 12/2018 |
| WO | 2020/039327 A1 | 2/2020 |

OTHER PUBLICATIONS

Notice of Allowance received for U.S. Appl. No. 15/823,269, dated Feb. 22, 2021, 7 pages.
Office Action received for Chinese Patent Application No. 201910744886.3, dated Jan. 18, 2021, 7 pages (1 page of English Translation and 6 pages of Official Copy).
Office Action received for Japanese Patent Application No. 2020-126751, dated Jan. 5, 2021, 8 pages (4 pages of English Translation and 4 pages of Official Copy).
Office Action received for Korean Patent Application No. 10-2020-7027862, dated Jan. 29, 2021, 8 pages (3 pages of English Translation and 5 pages of Official Copy).
Wang, Na, "Research of Face Detection System Based on Mobile Phone Platform", Video Engineering, vol. 36, No. 11, Nov. 2012, 5 pages (Official Copy Only) (See Communication under Rule 37 CFR § 1.98(a) (3)).
Non-Final Office Action received for U.S. Appl. No. 16/369,355, dated Apr. 29, 2021, 16 pages.
Notice of Allowance received for U.S. Appl. No. 16/990,974, dated Apr. 28, 2021, 5 pages.
Office Action received for Chinese Patent Application No. 201911199010.1, dated Mar. 29, 2021, 14 pages (8 pages of English Translation and 6 pages of Official Copy).
Office Action received for European Patent Application No. 17813737.8, dated Apr. 16, 2021, 7 pages.
Summons to Attend Oral Proceedings received for European Patent Application No. 18713408.5, dated Apr. 30, 2021, 5 pages.
Punchkick Interactive, "Punch kick hands-on review: Fitbit Surge", URL: https://www.youtube.com/watch?v=K2G7aebUYcA, Mar. 25, 2015, 3 pages.
Notice of Allowance received for U.S. Appl. No. 16/147,023, dated Feb. 27, 2020, 2 pages.
Office Action received for Chinese Patent Application No. 201811460172.1, dated Jan. 21, 2020, 17 pages (8 pages of English Translation and 9 pages of Official Copy).

(56) References Cited

OTHER PUBLICATIONS

Office Action received for Japanese Patent Application No. 2018-158482, dated Jan. 10, 2020, 9 pages (5 pages of English Translation and 4 pages of Official Copy).
Nomad, Studio, "Hajimete-no-smartphone-no-komatta-wo-sakutto-kaiketsu (Easy solution to troubles at your first smartphone)", Kazukuni Saito of Shuwa System Co., Ltd., 1st Ed, Jul. 1, 2016, 20 pages (Official Copy only) (See Communication under 37 CFR § 1.98(a) (3)).
Intention to Grant received for Danish Patent Application No. PA201870855, dated Jul. 13, 2020, 2 pages.
Notice of Allowance received for U.S. Appl. No. 16/147,023, dated Jul. 21, 2020, 2 pages.
Office Action received for Japanese Patent Application No. 2020-028315, dated Jul. 6, 2020, 18 pages (10 pages of English Translation and 8 pages of Official Copy).
Extended European Search Report received for European Patent Application No. 19194828.0, dated Dec. 19, 2019, 7 pages.
Final Office Action received for U.S. Appl. No. 15/433,320, dated Dec. 31, 2019, 30 pages.
Office Action received for Chinese Patent Application No. 201780002648.4, dated Nov. 26, 2019, 10 pages (4 pages of English Translation and 6 pages of Official Copy).
Notice of Allowance received for U.S. Appl. No. 15/823,269, dated Mar. 10, 2021, 6 pages.
Office Action received for Australian Patent Application No. 2017324176, dated Feb. 25, 2021, 6 pages.
Summons to Attend Oral Proceedings received for European Patent Application No. 18830326.7, dated Feb. 25, 2021, 6 pages.
International Search Report and Written Opinion received for PCT Patent Application No. PCT/US2020/035464, dated Sep. 14, 2020, 10 pages.
Office Action received for Chinese Patent Application No. 201910246439.5, dated Sep. 2, 2020, 15 pages (8 pages of English Translation and 7 pages of Official Copy).
Extended European Search Report received for European Patent Application No. 20186286.9, dated Nov. 2, 2020, 9 pages.
Notice of Acceptance received for Australian Patent Application No. 2020200685, dated Oct. 29, 2020, 3 pages.
Notice of Allowance received for Korean Patent Application No. 10-2020-7017803, dated Nov. 5, 2020, 6 pages (2 pages of English Translation and 4 pages of Official Copy).
Office Action received for European Patent Application No. 18713408.5, dated Nov. 4, 2020, 6 pages.
International Search Report and Written Opinion received for PCT Patent Application No. PCT/US2019/035092, dated Jan. 16, 2020, 16 pages.
Non-Final Office Action received for U.S. Appl. No. 16/434,865, dated Jan. 16, 2020, 9 pages.
Non-Final Office Action received for U.S. Appl. No. 16/542,084, dated Jan. 24, 2020, 21 pages.
Office Action received for Chinese Patent Application No. 201510284715.9, dated Dec. 18, 2019, 24 pages (7 pages of English Translation and 17 pages of Official Copy).
Office Action received for Chinese Patent Application No. 201910070375.8, dated Dec. 4, 2019, 23 pages (12 pages of English Translation and 11 pages of Official Copy).
Office Action received for Danish Patent Application No. PA201970127, dated Dec. 20, 2019, 3 pages.
Office Action received for Korean Patent Application No. 10-2018-7019643, dated Jan. 6, 2020, 7 pages (3 pages of English Translation and 4 pages of Official Copy).
Page, Sebastien, "Leaked iOS 11 GM details how you will set up Face ID on your iPhone 8", Online available at: https://www.idownloadblog.com/2017/09/08/leaked-ios-11-gm-details-how-you-will-set-up-face-id-on-your-iphone-8/, Sep. 8, 2017, 9 pages.
Final Office Action received for U.S. Appl. No. 16/125,267, dated Dec. 10, 2020, 20 pages.
Non-Final Office Action received for U.S. Appl. No. 16/670,949, dated Dec. 9, 2020, 11 pages.
Notice of Allowance received for Korean Patent Application No. 10-2020-7002929, dated Nov. 26, 2020, 3 pages (1 page of English Translation and 2 pages of Official Copy).
Notice of Allowance received for U.S. Appl. No. 15/823,269, dated Dec. 10, 2020, 10 pages.
Office Action received for Australian Patent Application No. 2019250143, dated Dec. 3, 2020, 5 pages.
Office Action received for Chinese Patent Application No. 201911199010.1, dated Nov. 4, 2020, 20 pages (10 pages of English Translation and 10 pages of Official Copy).
Office Action received for Japanese Patent Application No. 2020-028315, dated Nov. 9, 2020, 11 pages (6 pages of English Translation and 5 pages of Official Copy).
Applicant-Initiated Interview Summary received for U.S. Appl. No. 16/667,271, dated Apr. 8, 2020, 3 pages.
International Preliminary Report on Patentability received for PCT Patent Application No. PCT/US2018/049289, dated Mar. 19, 2020, 9 pages.
International Preliminary Report on Patentability received for PCT Patent Application No. PCT/US2018/015603, dated Mar. 19, 2020, 8 pages.
Non-Final Office Action received for U.S. Appl. No. 15/274,910, dated Apr. 6, 2020, 33 pages.
Notice of Acceptance received for Australian Patent Application No. 2020201306, dated Mar. 12, 2020, 3 pages.
Notice of Allowance received for Korean Patent Application No. 10-2019-7014494, dated Mar. 19, 2020, 4 pages (1 page of English Translation and 3 pages of Official Copy).
Notice of Allowance received for U.S. Appl. No. 16/147,023, dated Apr. 3, 2020, 2 pages.
Notice of Allowance received for U.S. Appl. No. 16/147,023, dated Mar. 27, 2020, 2 pages.
Notice of Allowance received for U.S. Appl. No. 16/164,561, dated Apr. 8, 2020, 5 pages.
Notice of Allowance received for U.S. Appl. No. 16/434,865, dated Apr. 7, 2020, 5 pages.
Office Action received for Australian Patent Application No. 2017284013, dated Mar. 19, 2020, 3 pages.
Office Action received for Korean Patent Application No. 10-2020-7002929, dated Mar. 22, 2020, 5 pages (2 pages of English Translation and 3 pages of Official Copy).
Applicant-Initiated Interview Summary received for U.S. Appl. No. 16/125,267, dated Feb. 8, 2021, 3 pages.
Office Action received for Australian Patent Application No. 2017324176, dated Jan. 14, 2021, 6 pages.
Summons to Attend Oral Proceedings received for European Patent Application No. 16201159.7, dated Feb. 4, 2021, 12 pages.
"Use NFC with Screen Off or in Lock Screen on Galaxy Nexus", Available online at https://www.xda-developers.com/use-nfc-with-screen-off-or-in-lock-screen-on-galaxy-nexus/, Jun. 14, 2012, 4 pages.
International Preliminary Report on Patentability received for PCT Patent Application No. PCT/US2019/035092, dated Dec. 17, 2020, 10 pages.
Office Action received for Korean Patent Application No. 10-2019-7006639, dated Dec. 21, 2020, 20 pages (10 pages of English Translation and 10 pages of Official Copy).
Applicant-Initiated Interview Summary received for U.S. Appl. No. 15/433,320, dated Nov. 25, 2020, 4 pages.
Notice of Allowance received for Japanese Patent Application No. 2019-053379, dated Nov. 16, 2020, 4 pages (1 page of English Translation and 3 pages of Official Copy).
Office Action received for Chinese Patent Application No. 201811460172.1, dated Oct. 14, 2020, 7 pages (4 pages of English Translation and 3 pages of Official Copy).
Office Action received for European Patent Application No. 19160348.9, dated Nov. 17, 2020, 6 pages.
Extended European Search Report received for European Patent Application No. 20198076.0, dated Jan. 13, 2021, 8 pages.
Notice of Allowance received for Chinese Patent Application No. 201811460172.1, dated Jan. 11, 2021, 2 pages (1 page of English Translation and 1 page of Official Copy).
Notice of Allowance received for U.S. Appl. No. 16/990,974, dated Jan. 22, 2021, 7 pages.

(56) References Cited

OTHER PUBLICATIONS

Office Action received for European Patent Application No. 17835789.3, dated Jan. 20, 2021, 14 pages.
Brief Communication Regarding Oral Proceedings received for European Patent Application No. 15727291.5, dated Jun. 9, 2020, 12 pages.
Brief Communication regarding Oral Proceedings received for European Patent Application No. 16201205.8, dated May 29, 2020, 29 pages.
Brief Communication regarding Oral Proceedings received for European Patent Application No. 19171661.2, dated May 28, 2020, 2 pages.
Minutes of the Oral Proceedings received for European Patent Application No. 15728352.4, dated May 27, 2020, 3 pages.
Notice of Allowance received for U.S. Appl. No. 16/147,023, dated Jun. 18, 2020, 2 pages.
Office Action received for Japanese Patent Application No. 2019-510416, dated May 15, 2020, 4 pages (2 pages of English Translation and 2 pages of Official Copy).
Summons to Attend Oral Proceedings received for European Patent Application No. 19171661.2, dated Jun. 2, 2020, 13 pages.
Notice of Allowance received for U.S. Appl. No. 16/147,023, dated Aug. 13, 2020, 2 pages.
Office Action received for Australian Patent Application No. 2020200685, dated Aug. 12, 2020, 3 pages.
Office Action received for European Patent Application No. 18830326.7, dated Aug. 13, 2020, 6 pages.
Advisory Action received for U.S. Appl. No. 16/164,561, dated Nov. 14, 2019, 2 pages.
Applicant Initiated Interview Summary received for U.S. Appl. No. 15/351,230, dated Nov. 22, 2019, 5 pages.
Applicant Initiated Interview Summary received for U.S. Appl. No. 16/147,023, dated Oct. 29, 2019, 3 pages.
Decision to Grant received for Danish Patent Application No. PA201770782, dated Oct. 25, 2019, 2 pages.
European Search Report received for European Patent Application No. 17865509.8, dated Oct. 2, 2019, 5 pages.
Extended European Search Report for European Application No. 17813737.8, dated Nov. 22, 2019, 9 pages.
Extended European Search Report received for European Patent Application No. 19186538.5, dated Oct. 9, 2019, 10 pages.
Final Office Action received for U.S. Appl. No. 15/351,230, dated Nov. 4, 2019, 6 pages.
"Giving Apple Pay a Try", The Consumer Credit Monthly, Kinzai Institute for Financial Affairs, Inc, vol. 33, No. 1, ISSN: 0288-8122, 2015, 7 pages (Official Copy only). {See Communication under 37 CFR § 1.98(a) (3)}.
Notice of Acceptance received for Australian Patent Application No. 2018202559, dated Oct. 21, 2019, 3 pages.
Notice of Acceptance received for Australian Patent Application No. 2018279788, dated Nov. 6, 2019, 3 pages.
Notice of Acceptance received for Australian Patent Application No. 2018312629, dated Nov. 7, 2019, 4 pages.
Notice of Acceptance received for Australian Patent Application No. 2019203473, dated Nov. 7, 2019, 3 pages.
Notice of Allowance received for Chinese Patent Application No. 201610069731.0, dated Sep. 6, 2019, 2 pages (1 page of English Translation and 1 page of Official Copy).
Notice of Allowance received for Chinese Patent Application No. 201710093861.2, dated Sep. 24, 2019, 4 pages (1 page of English Translation and 3 pages of Official Copy).
Notice of Allowance received for Japanese Patent Application No. 2019-096220, dated Nov. 25, 2019, 4 pages (1 page of English Translation and 3 pages of Official Copy).
Notice of Allowance received for Korean Patent Application No. 10-2016-7035555, dated September 23, 2019, 3 pages (1 page of English Translation and 2 pages of Official Copy).
Notice of Allowance received for Korean Patent Application No. 10-2017-7012145, dated Oct. 30, 2019, 3 pages (1 page of English Translation and 2 pages of Official Copy).
Notice of Allowance received for Korean Patent Application No. 10-2019-7003374, dated Oct. 4, 2019, 9 pages (2 pages of English Translation and 7 pages of Official Copy).
Notice of Allowance received for Korean Patent Application No. 10-2019-7003836, dated Oct. 4, 2019, 4 pages (1 page of English Translation and 3 pages of Official Copy).
Notice of Allowance received for Korean Patent Application No. 10-2019-7004734, dated Oct. 24, 2019, 6 pages (2 pages of English Translation and 4 pages of Official Copy).
Notice of Allowance received for Taiwanese Patent Application No. 104117508, dated Sep. 18, 2019, 5 pages (2 pages of English Translation and 3 pages of Official Copy).
Notice of Allowance received for U.S. Appl. No. 16/147,115, dated Oct. 30, 2019, 10 pages.
Office Action received for Australian Patent Application No. 2019203473, dated Oct. 25, 2019, 2 pages.
Office Action received for Chinese Patent Application No. 201510284896.5, dated Sep. 3, 2019, 9 pages (2 pages of English Translation and 7 pages of Official Copy).
Office Action received for Chinese Patent Application No. 201710094150.7, dated Jul. 31, 2019, 6 pages (2 pages of English Translation and 4 pages of Official Copy).
Office Action received for Chinese Patent Application No. 201810338826.7, dated Oct. 21, 2019, 19 pages (12 pages of English Translation and 7 pages of Official Copy).
Office Action received for Chinese Patent Application No. 201910109868.8, dated Sep. 19, 2019, 23 pages (11 pages of English Translation and 12 pages of Official Copy).
Office Action received for Chinese Patent Application No. 201910246439.5, dated Oct. 15, 2019, 17 pages (9 pages of English Translation and 8 pages of Official Copy).
Office Action received for Danish Patent Application No. PA201870855, dated Nov. 7, 2019, 4 pages.
Office Action received for European Patent Application No. 17865509.8, dated Oct. 10, 2019, 6 pages.
Office Action received for European Patent Application No. 18713408.5, dated Nov. 20, 2019, 4 pages.
Office Action received for European Patent Application No. 18830326.7, dated Nov. 22, 2019, 8 pages.
Office Action received for European Patent Application No. 18830326.7, dated Sep. 16, 2019, 6 pages.
Office Action received for Indian Patent Application No. 201617039493, dated Oct. 21, 2019, 6 pages.
Office Action received for Japanese Patent Application No. 2018-551159, dated Sep. 30, 2019, 6 pages (3 pages of English Translation and 3 pages of Official Copy).
Office Action received for Japanese Patent Application No. 2019-053379, dated Oct. 18, 2019, 11 pages (6 pages of English Translation and 5 pages of Official Copy).
Office Action received for Japanese Patent Application No. 2019-096220, dated Sep. 9, 2019, 8 pages (4 pages of English Translation and 4 pages of Official Copy).
Office Action received for Japanese Patent Application No. 2019-107235, dated Oct. 18, 2019, 8 pages (4 pages of English Translation and 4 pages of Official Copy).
Office Action received for Japanese Patent Application No. 2019-510416, dated Oct. 18, 2019, 4 pages (2 pages of English translation and 2 pages of Official copy).
Search Report and Opinion received for Danish Patent Application No. PA201970127, dated Oct. 4, 2019, 9 pages.
Summons to Attend Oral Proceedings received for European Patent Application No. 15728352.4, dated Nov. 18, 2019, 15 pages.
How To Smartphone, "Samsung Galaxy S7—screen rotation on / off", Available Online at <https://www.youtube.com/watch?v=np54sEEI11E >, see video from 1:10 to 1:30., Dec. 12, 2016, 3 pages.
Wikipedia, "QR code", Available online at https://en.wikipedia.org/w/index.php?title=OR_codeoldid =452939488, Sep. 28, 2011, pp. 1-9.
Applicant Initiated Interview Summary received for U.S. Appl. No. 15/433,320, dated Feb. 11, 2020, 5 pages.

(56) References Cited

OTHER PUBLICATIONS

Notice of Allowance received for Japanese Patent Application No. 2016-224506, dated Jan. 24, 2020, 4 pages (1 page of English Translation and 3 pages of Official Copy).
Notice of Allowance received for Korean Patent Application No. 10-2019-7005925, dated Jan. 21, 2020, 6 pages (2 pages of English Translation and 4 pages of Official Copy).
Notice of Allowance received for U.S. Appl. No. 16/147,023, dated Jan. 31, 2020, 7 pages.
Office Action received for Australian Patent Application No. 2020200685, dated Feb. 10, 2020, 4 pages.
Office Action received for Chinese Patent Application No. 201810338038.8, dated Jan. 21, 2020, 26 pages (13 pages of English Translation and 13 pages of Official Copy).
Office Action received for Chinese Patent Application No. 201810338826.7, dated Jan. 16, 2020, 16 Pages (10 pages of English Translation and 6 pages of Official Copy).
Summons to attend oral proceedings received for European Patent Application No. 15727291.5, dated Jan. 28, 2020, 13 pages.
Summons to attend oral proceedings received for European Patent Application No. 16201205.8, dated Jan. 28, 2020, 18 pages.
Office Action received for Chinese Patent Application No. 201910109868.8, dated Mar. 16, 2020, 19 pages (10 pages of English Translation and 9 pages of Official Copy).
Office Action received for Japanese Patent Application No. 2019-238894, dated Mar. 6, 2020, 7 pages (3 pages of English Translation and 4 pages of Official Copy).
Summons to attend oral proceedings received for European Patent Application No. 19171661.2, dated Apr. 16, 2020, 12 pages.
Non-Final Office Action received for U.S. Appl. No. 15/433,320, dated Jul. 31, 2020, 13 pages.
Non-Final Office Action received for U.S. Appl. No. 15/992,722, dated Aug. 6, 2020, 7 pages.
Office Action received for Chinese Patent Application No. 201910109868.8, dated Jun. 30, 2020, 15 pages (7 pages of English Translation and 8 pages of Official Copy).
Office Action received for European Patent Application No. 17865509.8, dated Jul. 28, 2020, 8 pages.
Bao et al., "Location-based and Preference-Aware Recommendation Using Sparse GeoSocial Networking Data", ACM SIGSPATIAL GIS '12, Redondo Beach, CA, USA, Online available at https://www.microsoft.com/en-us/research/wp-content/uploads/2016/02/LocationRecommendation.pdf, Nov. 6-9, 2012, 10 pages.
Final Office Action received for U.S. Appl. No. 15/274,910, dated Oct. 16, 2020, 34 pages.
Lu, Haiyun, "Recommendations Based on Purchase Patterns", International Journal of Machine Learning and Computing, vol. 4, No. 6, Online available at http://www.ijmlc.org/papers/462-C015.pdf, Dec. 2014, pp. 501-504.
Minutes of the Oral Proceedings received for European Patent Application No. 19171661.2, mailed on Oct. 15, 2020, 5 pages.
Non-Final Office Action received for U.S. Appl. No. 16/990,974, dated Oct. 15, 2020, 6 pages.
Notice of Allowance received for Japanese Patent Application No. 2019-238894, dated Oct. 5, 2020, 4 pages (1 page of English Translation and 3 pages of Official Copy).
Notice of Allowance received for Japanese Patent Application No. 2019-510416, dated Oct. 12, 2020, 4 pages (1 page of English Translation and 3 pages of Official Copy).
Notice of Allowance received for U.S. Appl. No. 15/992,722, dated Oct. 19, 2020, 5 pages.
Office Action received for European Patent Application No. 19186538.5, dated Oct. 12, 2020, 7 pages.
Office Action received for European Patent Application No. 19194828.0, dated Oct. 15, 2020, 7 pages.
Record of Oral Hearing received for U.S. Appl. No. 14/869,831, mailed on Oct. 6, 2020, 12 pages.
Corrected Notice of Allowance received for U.S. Appl. No. 16/434,865, dated Apr. 28, 2020, 2 pages.
Intention to Grant received for Danish Patent Application No. PA201970127, dated Apr. 21, 2020, 2 pages.
Notice of Allowance received for U.S. Appl. No. 16/147,023, dated May 5, 2020, 2 pages.
Office Action received for Australian Patent Application No. 2017324176, dated Apr. 21, 2020, 3 pages.
Office Action received for Australian Patent Application No. 2020200685, dated Apr. 20, 2020, 3 pages.
Office Action received for European Patent Application No. 18830326.7, dated Apr. 30, 2020, 5 pages.
Corrected Notice of Allowance received for U.S. Appl. No. 16/434,865, dated Jun. 4, 2020, 2 pages.
Decision to Refuse received for European Patent Application No. 15728352.4, dated May 28, 2020, 25 pages.
Notice of Allowance received for Japanese Patent Application No. 2019-107235, dated May 15, 2020, 4 pages (1 page of English Translation and 3 pages of Official Copy).
Notice of Allowance received for U.S. Appl. No. 16/147,023, dated Jun. 1, 2020, 2 pages.
Office Action received for Chinese Patent Application No. 201910246439.5, dated Apr. 23, 2020, 14 pages (7 pages of English Translation and 7 pages of Official Copy).
Office Action received for Danish Patent Application No. PA201870855, dated May 14, 2020, 4 pages.
Office Action received for European Patent Application No. 18713408.5, dated May 26, 2020, 5 pages.
Advisory Action received for U.S. Appl. No. 14/503,296, dated Oct. 2, 2015, 3 pages.
Advisory Action received for U.S. Appl. No. 15/137,944, dated May 11, 2017, 6 pages.
Advisory Action received for U.S. Appl. No. 15/274,910, dated Aug. 12, 2019, 3 pages.
Advisory Action received for U.S. Appl. No. 15/250,152, dated Mar. 25, 2019, 5 pages.
Certificate of Examination received for Australian Patent Application No. 2017101425, mailed on Jan. 17, 2018, 2 pages.
Certificate of Examination received for Australian Patent Application No. 2018101014, mailed on Mar. 20, 2019, 2 pages.
Certification of Examination received for Australian Patent Application No. 2017100553, mailed on January 17, 2018, 2 pages.
Corrected Notice of Allowance received for U.S. Appl. No. 15/137,944, dated Jan. 11, 2018, 2 pages.
Corrected Notice of Allowance received for U.S. Appl. No. 15/137,944, dated Jan. 19, 2018, 2 pages.
Corrected Notice of Allowance received for U.S. Appl. No. 15/269,801, dated Oct. 3, 2017, 4 pages.
Corrected Notice of Allowance received for U.S. Appl. No. 15/294,439, dated Mar. 13, 2019, 4 pages.
Corrected Notice of Allowance received for U.S. Appl. No. 15/845,794, dated Feb. 25, 2019, 2 pages.
Corrected Notice of Allowance received for U.S. Appl. No. 15/866,341, dated Aug. 21, 2019, 3 pages.
Corrected Notice of Allowance received for U.S. Appl. No. 15/866,341, dated Aug. 26, 2019, 3 pages.
Decision to Grant received for Danish Patent Application No. PA201670042, dated Mar. 19, 2018, 2 pages.
Decision to Grant received for Danish Patent Application No. PA201670628, dated Nov. 20, 2017, 2 pages.
Decision to Grant received for Danish Patent Application No. PA201770715, dated Feb. 15, 2019, 2 pages.
Decision to Grant received for Danish Patent Application No. PA201770804, dated Jun. 28, 2019, 2 pages.
Decision to Grant received for Danish Patent Application No. PA201870370, dated Mar. 29, 2019, 2 pages.
Decision to Grant received for Danish Patent Application No. PA201870371, dated March 29, 2019, 2 pages.
Decision to Grant received for European Patent Application No. 12773460.6, dated Jun. 27, 2019, 2 pages.
Decision to Grant received for Japanese Patent Application No. 2017-075031, dated Jul. 1, 2019, 3 pages.
Decision to Refuse received for European Patent Application No. 12770400.5, dated Nov. 8, 2018, 12 pages.

(56) References Cited

OTHER PUBLICATIONS

Decision to Refuse received for European Patent Application No. 16201195.1, dated Mar. 4, 2019, 23 pages.
Decision to Refuse received for European Patent Application No. 16703893.4, dated Jul. 24, 2019, 22 pages.
"Does Apple Pay Change Payment?", Mac Fan, Japan, Mynavi Publishing Corporation, vol. 22, No. 11 common No. 381, Nov. 1, 2014, 11 pages.
European Search Report received for European Patent Application No. 19171661.2, dated Jul. 17, 2019, 6 pages.
Examiner's Answer to Appeal Brief received for U.S. Appl. No. 14/869,831, dated Aug. 12, 2019, 16 pages.
Extended European Search Report received for European Patent Application No. 16201159.7, dated Mar. 27, 2017, 12 pages.
Extended European Search Report Received for European Patent Application No. 16201195.1, dated Feb. 7, 2017, 13 pages.
Extended European Search Report received for European Patent Application No. 16201205.8, dated Jan. 5, 2017, 12 pages.
Extended European Search Report received for European Patent Application No. 17799904.2, dated Jul. 30, 2018, 7 pages.
Extended European Search Report received for European Patent Application No. 17810682.9, dated March 26, 2019, 7 pages.
Extended European Search Report received for European Patent Application No. 18208881.5, dated Jan. 8, 2019, 7 pages.
Extended European Search Report received for European Patent Application No. 19150528.8, dated May 15, 2019, 9 pages.
Extended European Search Report received for European Patent Application No. 19160344.8, dated Jun. 14, 2019, 7 pages.
Extended European Search Report received for European Patent Application No. 19160348.9, dated Jul. 19, 2019, 6 pages.
Final Office Action received for U.S. Appl. No. 13/248,882, dated Dec. 4, 2013, 22 pages.
Final Office Action received for U.S. Appl. No. 14/285,378, dated Jul. 23, 2015, 19 pages.
Final Office Action received for U.S. Appl. No. 14/503,072, dated Mar. 2, 2017, 9 pages.
Final Office Action received for U.S. Appl. No. 14/503,072, dated Sep. 1, 2015, 16 pages.
Final Office Action received for U.S. Appl. No. 14/503,296, dated Apr. 24, 2019, 5 pages.
Final Office Action received for U.S. Appl. No. 14/503,296, dated Jul. 2, 2015, 7 pages.
Final Office Action received for U.S. Appl. No. 14/503,296, dated Jun. 4, 2018, 8 pages.
Final Office Action received for U.S. Appl. No. 14/869,831, dated Aug. 2, 2016, 14 pages.
Final Office Action received for U.S. Appl. No. 14/869,831, dated Jul. 30, 2018, 31 pages.
Final Office Action received for U.S. Appl. No. 14/869,831, dated May 19, 2017, 20 pages.
Final Office Action received for U.S. Appl. No. 15/137,944, dated Feb. 27, 2017, 10 pages.
Final Office Action received for U.S. Appl. No. 15/274,910, dated May 31, 2019, 31 pages.
Final Office Action received for U.S. Appl. No. 15/866,341, dated May 14, 2019, 10 pages.
Final Office Action received for U.S. Appl. No. 16/147,023, dated Jul. 23, 2019, 18 pages.
Final Office Action received for U.S. Appl. No. 16/147,115, dated Jun. 19, 2019, 14 pages.
Final Office Action received for U.S. Appl. No. 16/164,561, dated Sep. 5, 2019, 12 pages.
Final Office Action received for U.S. Appl. No. 15/250,152, dated Aug. 23, 2017, 24 pages.
Final Office Action received for U.S. Appl. No. 15/250,152, dated Nov. 16, 2018, 30 pages.
Final Office Action received for U.S. Appl. No. 14/870,694, dated Apr. 7, 2017, 16 pages.
Intention to Grant received for Danish patent Application No. PA201670042, dated Jan. 29, 2018, 2 pages.
Intention to Grant received for Danish Patent Application No. PA201670628, dated Aug. 28, 2017, 2 pages.
Intention to Grant received for Danish Patent Application No. PA201770714, dated Feb. 15, 2019, 2 pages.
Intention to Grant received for Danish Patent Application No. PA201770714, dated Nov. 2, 2018, 2 pages.
Intention to Grant received for Danish Patent Application No. PA201770715, dated Nov. 13, 2018, 2 pages.
Intention to Grant received for Danish Patent Application No. PA201770782, dated Aug. 8, 2019, 2 pages.
Intention to Grant received for Danish Patent Application No. PA201770804, dated Apr. 10, 2019, 2 pages.
Intention to Grant received for Danish Patent Application No. PA201870370, dated Jan. 2, 2019, 2 pages.
Intention to Grant received for Danish Patent Application No. PA201870371, dated Jan. 2, 2019, 2 pages.
Intention to Grant received for European Patent Application No. 12773460.6, dated Feb. 4, 2019, 8 pages.
Intention to Grant received for European Patent Application No. 12773460.6, dated Jun. 17, 2019, 4 pages.
International Preliminary Report on Patentability received for PCT Patent Application No. PCT/US2012/057319, dated Apr. 10, 2014, 6 pages.
International Preliminary Report on Patentability received for PCT Patent Application No. PCT/US2012/057656, dated Apr. 10, 2014, 6 pages.
International Preliminary Report on Patentability received for PCT Patent Application No. PCT/US2015/033326, dated Dec. 8, 2016, 11 pages.
International Preliminary Report on Patentability received for PCT Patent Application No. PCT/US2015/033380, dated Dec. 8, 2016, 10 pages.
International Preliminary Report on Patentability received for PCT Patent Application No. PCT/US2016/015316, dated Aug. 10, 2017, 10 pages.
International Preliminary Report on Patentability received for PCT Patent Application No. PCT/US2017/031086, dated Dec. 27, 2018, 12 pages.
International Preliminary Report on Patentability received for PCT Patent Application No. PCT/US2017/031748, dated Dec. 20, 2018, 10 pages.
International Preliminary Report on Patentability received for PCT Patent Application No. PCT/US2017/032240, dated Nov. 29, 2018, 29 pages.
International Preliminary Report on Patentability received for PCT Patent Application No. PCT/US2017/058368, dated Feb. 19, 2019, 5 pages.
International Preliminary Report on Patentability received for PCT Patent Application No. PCT/US2017/49500, dated Mar. 21, 2019, 14 pages.
International Search Report and Written Opinion received for PCT Application No. PCT/US2015/033326, dated Aug. 10, 2015, 13 pages.
International Search Report and Written Opinion received for PCT Patent Application No. PCT/US17/31086, dated Sep. 8, 2017, 15 pages.
International Search Report and Written Opinion received for PCT Patent Application No. PCT/US2012/057319, dated Feb. 25, 2013, 7 pages.
International Search Report and Written Opinion received for PCT Patent Application No. PCT/US2012/057656, dated Feb. 25, 2013, 7 pages.
International Search Report and Written Opinion received for PCT Patent Application No. PCT/US2015/033380, dated Aug. 10, 2015, 13 pages.
International Search Report and Written Opinion received for PCT Patent Application No. PCT/US2017/031748, dated Aug. 29, 2017, 14 pages.
International Search Report and Written Opinion received for PCT Patent Application No. PCT/US2017/032240, dated Sep. 21, 2017, 33 pages.

(56) References Cited

OTHER PUBLICATIONS

International Search Report and Written Opinion received for PCT Patent Application No. PCT/US2017/058368, dated Feb. 23, 2018, 12 pages.
International Search Report and Written Opinion received for PCT Patent Application No. PCT/US2017/49500, dated Jan. 18, 2018, 18 pages.
International Search Report and Written Opinion received for PCT Patent Application No. PCT/US2018/015603, dated Jun. 22, 2018, 13 pages.
International Search Report and Written Opinion received for PCT Patent Application No. PCT/US2018/049289, dated Feb. 19, 2019, 12 pages.
International Search Report and Written Opinion received for PCT Patent Application No. PCT/US2016/015316, dated Mar. 8, 2016, 13 pages.
Invitation to Pay Additional Fee received for PCT Patent Application No. PCT/US17/31086, dated Jul. 14, 2017, 2 pages.
Invitation to Pay Additional Fee received for PCT Patent Application No. PCT/US17/32240, dated Jul. 12, 2017, 2 pages.
Invitation to Pay Additional Fee received for PCT Patent Application No. PCT/US2017/031748, dated Jun. 21, 2017, 2 pages.
Invitation to Pay Additional Fee received for PCT Patent Application No. PCT/US2017/49500, dated Nov. 14, 2017, 3 pages.
Invitation to Pay Additional Fee received for PCT Patent Application No. PCT/US2017/058368, dated Dec. 14, 2017, 2 pages.
Minutes of Oral Proceeding received for European Patent Application No. 16703893.4, mailed on Jul. 22, 2019, 9 pages.
Minutes of the Oral Proceedings received for European Application No. 12770400.5, mailed on Nov. 6, 2018, 7 pages.
Non-Final Office Action received for U.S. Appl. No. 14/503,072, dated Jan. 26, 2015, 12 pages.
Non-Final Office Action received for U.S. Appl. No. 14/503,296, dated Jan. 30, 2015, 16 pages.
Non-Final Office Action received for U.S. Appl. No. 15/274,910, dated Oct. 18, 2018, 26 pages.
Non-Final Office Action received for U.S. Appl. No. 14/503,364, dated Feb. 3, 2016, 16 pages.
Non-Final Office Action received for U.S. Appl. No. 14/869,831, dated Jan. 29, 2016, 18 pages.
Non-Final Office Action received for U.S. Appl. No. 14/869,831, dated Nov. 22, 2017, 17 pages.
Non-Final Office Action received for U.S. Appl. No. 13/248,872, dated May 19, 2014, 6 pages.
Non-Final Office Action received for U.S. Appl. No. 13/248,882, dated Jul. 10, 2013, 14 pages.
Non-Final Office Action received for U.S. Appl. No. 14/285,378, dated Dec. 21, 2015, 18 pages.
Non-Final Office Action received for U.S. Appl. No. 14/285,378, dated Jan. 21, 2015, 19 pages.
Non-Final Office Action received for U.S. Appl. No. 14/503,072, dated Jun. 17, 2016, 19 pages.
Non-Final Office Action received for U.S. Appl. No. 14/503,296, dated Aug. 28, 2017, 14 pages.
Non-Final Office Action received for U.S. Appl. No. 14/503,296, dated Oct. 5, 2016, 11 pages.
Non-Final Office Action received for U.S. Appl. No. 14/503,296, dated Sep. 18, 2018, 20 pages.
Non-Final Office Action received for U.S. Appl. No. 14/503,381, dated May 13, 2015, 13 pages.
Non-Final Office Action received for U.S. Appl. No. 14/642,366, dated Aug. 24, 2015, 7 pages.
Non-Final Office Action received for U.S. Appl. No. 15/134,638, dated Sep. 20, 2016, 6 pages.
Non-Final Office Action received for U.S. Appl. No. 15/137,944, dated Jul. 27, 2017, 13 pages.
Non-Final Office Action received for U.S. Appl. No. 15/137,944, dated Oct. 18, 2016, 10 pages.
Non-Final Office Action received for U.S. Appl. No. 15/269,801, dated Dec. 30, 2016, 17 pages.
Non-Final Office Action received for U.S. Appl. No. 15/274,086, dated Jan. 11, 2017, 21 pages.
Non-Final Office Action received for U.S. Appl. No. 15/294,439, dated Jan. 26, 2018, 18 pages.
Non-Final Office Action received for U.S. Appl. No. 15/351,230, dated Apr. 18, 2019, 16 pages.
Non-Final Office Action received for U.S. Appl. No. 15/782,068, dated Jun. 3, 2019, 17 pages.
Non-Final Office Action received for U.S. Appl. No. 15/845,794, dated Oct. 15, 2018, 8 pages.
Non-Final Office Action received for U.S. Appl. No. 15/866,341, dated Nov. 13, 2018, 11 pages.
Non-Final Office Action received for U.S. Appl. No. 15/894,221, dated Jul. 25, 2018, 21 pages.
Non-Final Office Action received for U.S. Appl. No. 15/903,456, dated Sep. 6, 2018, 20 pages.
Non-Final Office Action received for U.S. Appl. No. 16/147,023, dated Dec. 26, 2018, 17 pages.
Non-Final Office Action received for U.S. Appl. No. 16/147,115, dated Dec. 13, 2018, 12 pages.
Non-Final Office Action received for U.S. Appl. No. 16/164,561, dated Jan. 4, 2019, 14 pages.
Non-Final Office Action received for U.S. Appl. No. 15/250,152, dated Apr. 6, 2018, 31 pages.
Non-Final Office Action received for U.S. Appl. No. 15/250,152, dated Mar. 2, 2017, 26 pages.
Non-Final Office Action received for U.S. Appl. No. 15/433,320, dated May 2, 2019, 27 pages.
Non-Final Office Action received for U.S. Appl. No. 15/945,610, dated Sep. 20, 2018, 9 pages.
Non-Final Office Action received for U.S. Appl. No. 14/870,694, dated Sep. 23, 2016, 13 pages.
Notice of Acceptance received for Australian Patent Application No. 2018200628, dated Jun. 13, 2019, 3 pages.
Notice of Acceptance received for Australian Patent Application No. 2015266650, dated Jan. 18, 2018, 3 pages.
Notice of Acceptance received for Australian Patent Application No. 2015266693, dated Jan. 19, 2018, 3 pages.
Notice of Acceptance received for Australian Patent Application No. 2016211504, dated Oct. 17, 2017, 3 pages.
Notice of Acceptance received for Australian Patent Application No. 2017201064, dated Feb. 20, 2018, 3 pages.
Notice of Acceptance received for Australian Patent Application No. 2017266867, dated Mar. 6, 2019, 3 pages.
Notice of Acceptance received for Australian Patent Application No. 2017317605, dated Aug. 28, 2019, 3 pages.
Notice of Acceptance received for Australian Patent Application No. 2019200360, dated Mar. 15, 2019, 3 pages.
Notice of Acceptance received for Australian Patent Application No. 2019201101, dated May 6, 2019, 3 pages.
Notice of Allowance received for Chinese Patent Application No. 201280047459.6, dated Jan. 31, 2018, 2 pages.
Notice of Allowance received for Chinese Patent Application No. 201520357381.9, dated Jul. 29, 2015, 4 pages.
Notice of Allowance received for Chinese Patent Application No. 201520358683.8, dated Mar. 10, 2016, 5 pages.
Notice of Allowance received for Chinese Patent Application No. 201620480708.6, dated Apr. 20, 2017, 3 pages.
Notice of Allowance received for Chinese Patent Application No. 201620480846.4, dated Apr. 20, 2017, 3 pages.
Notice of Allowance received for Chinese Patent Application No. 201780002398.4, dated Jun. 17, 2019, 2 pages.
Notice of Allowance received for Japanese Patent Application No. 2016-224507, dated Mar. 26, 2019, 3 pages.
Notice of Allowance received for Japanese Patent Application No. 2016-224508, dated Jun. 20, 2017, 3 pages.
Notice of Allowance received for Japanese Patent Application No. 2016-558332, dated Jan. 11, 2019, 4 pages.
Notice of Allowance received for Japanese Patent Application No. 2016-569665, dated Feb. 22, 2019, 4 pages.
Notice of Allowance received for Japanese Patent Application No. 2017-540616, dated Apr. 23, 2019, 4 pages.

(56) References Cited

OTHER PUBLICATIONS

Notice of Allowance received for Japanese Patent Application No. 2018-504997, dated Aug. 3, 2018, 4 pages.
Notice of Allowance received for Korean Patent Application No. 10-2017-0022365, dated Mar. 27, 2018, 4 pages.
Notice of Allowance received for Korean Patent Application No. 10-2017-0022546, dated Feb. 27, 2018, 4 pages.
Notice of Allowance received for Korean Patent Application No. 10-2017-7024513, dated Apr. 20, 2018, 5 pages.
Notice of Allowance received for Korean Patent Application No. 10-2018-7033301, dated Feb. 20, 2019, 5 pages.
Notice of Allowance received for Korean Patent Application No. 10-2014-7008348, dated Feb. 21, 2019, 5 pages.
Notice of Allowance received for the U.S. Appl. No. 14/503,381, dated Dec. 16, 2015, 8 pages.
Notice of Allowance received for U.S. Appl. No. 13/248,872, dated Dec. 4, 2014, 7 pages.
Notice of Allowance received for U.S. Appl. No. 13/248,882, dated Mar. 13, 2014, 16 pages.
Notice of Allowance received for U.S. Appl. No. 14/285,378, dated May 19, 2016, 10 pages.
Notice of Allowance received for U.S. Patent Application No. 14/503,072, dated Jun. 4, 2018, 6 pages.
Notice of Allowance received for U.S. Appl. No. 14/503,072, dated Mar. 26, 2018, 6 pages.
Notice of Allowance received for U.S. Appl. No. 14/503,296, dated Aug. 28, 2019, 12 pages.
Notice of Allowance received for U.S. Appl. No. 14/503,364, dated Jun. 16, 2016, 11 pages.
Notice of Allowance received for U.S. Appl. No. 14/642,366, dated Jan. 14, 2016, 8 pages.
Notice of Allowance received for U.S. Appl. No. 14/870,694, dated Dec. 11, 2018, 6 pages.
Notice of Allowance received for U.S. Appl. No. 14/870,694, dated Jul. 31, 2018, 7 pages.
Notice of Allowance received for U.S. Appl. No. 15/134,638, dated Apr. 10, 2018, 7 pages.
Notice of Allowance received for U.S. Appl. No. 15/134,638, dated Jul. 27, 2018, 7 pages.
Notice of Allowance received for U.S. Appl. No. 15/137,944, dated Dec. 21, 2017, 8 pages.
Notice of Allowance received for U.S. Appl. No. 15/250,152, dated May 1, 2019, 12 pages.
Notice of Allowance received for U.S. Appl. No. 15/269,801, dated May 3, 2017, 6 pages.
Notice of Allowance received for U.S. Appl. No. 15/269,801, dated Sep. 7, 2017, 5 pages.
Notice of Allowance received for U.S. Appl. No. 15/274,086, dated Jun. 7, 2017, 8 pages.
Notice of Allowance received for U.S. Appl. No. 15/274,086, dated Oct. 19, 2017, 9 pages.
Notice of Allowance received for U.S. Appl. No. 15/294,439, dated Jan. 8, 2019, 8 pages.
Notice of Allowance received for U.S. Appl. No. 15/294,439, dated Sep. 10, 2018, 9 pages.
Notice of Allowance received for U.S. Appl. No. 15/782,068, dated Sep. 24, 2019, 7 pages.
Notice of Allowance received for U.S. Appl. No. 15/845,794, dated Feb. 14, 2019, 6 pages.
Notice of Allowance received for U.S. Appl. No. 15/866,341, dated Jul. 26, 2019, 8 pages.
Notice of Allowance received for U.S. Appl. No. 15/894,221, dated Apr. 11, 2019, 5 pages.
Notice of Allowance received for U.S. Appl. No. 15/894,221, dated Aug. 13, 2019, 2 pages.
Notice of Allowance received for U.S. Appl. No. 15/894,221, dated Feb. 1, 2019, 5 pages.
Notice of Allowance received for U.S. Appl. No. 15/894,221, dated Mar. 4, 2019, 2 pages.
Notice of Allowance received for U.S. Appl. No. 15/903,456, dated May 1, 2019, 6 pages.
Notice of Allowance received for U.S. Appl. No. 15/945,610, dated May 20, 2019, 7 pages.
Notice of Allowance received for U.S. Appl. No. 16/131,767, dated Sep. 6, 2019, 7 pages.
Office Action received for Australian Patent Application No. 2017100558, dated Feb. 27, 2018, 3 pages.
Office Action received for European Patent Application No. 15728352.4, dated Jan. 25, 2018, 10 pages.
Office Action received for Japanese Patent Application No. 2016-224507, dated Dec. 1, 2017, 14 pages.
Office Action received for Australian Patent Application No. 2015100708, dated Sep. 8, 2015, 4 pages.
Office Action received for Australian Patent Application No. 2015100709, dated Sep. 9, 2015 (Examination Report 1), 4 pages.
Office Action received for Australian Patent Application No. 2015100709, dated Sep. 9, 2015 (Examination Report 2), 4 pages.
Office Action received for Australian Patent Application No. 2015266650, dated Apr. 10, 2017, 4 pages.
Office Action received for Australian Patent Application No. 2015266693, dated Apr. 10, 2017, 4 pages.
Office Action received for Australian Patent Application No. 2016100090, dated Apr. 13, 2016, 7 pages.
Office Action received for Australian Patent Application No. 2016100090, dated Oct. 7, 2016, 3 pages.
Office Action received for Australian Patent Application No. 2016100367, dated May 25, 2016, 3 pages.
Office Action received for Australian Patent Application No. 2016100367, dated Oct. 26, 2016, 3 pages.
Office Action received for Australian Patent Application No. 2016100383, dated Jun. 9, 2016, 2 pages.
Office Action received for Australian Patent Application No. 2016100383, dated Nov. 11, 2016, 3 pages.
Office Action received for Australian Patent Application No. 2016102031, dated Feb. 28, 2017, 4 pages.
Office Action received for Australian Patent Application No. 2017100070, dated Mar. 16, 2017, 6 pages.
Office Action received for Australian Patent Application No. 2017100553, dated Aug. 4, 2017, 5 pages.
Office Action received for Australian Patent Application No. 2017100558, dated Sep. 1, 2017, 5 pages.
Office Action received for Australian Patent Application No. 2017101563, dated Jan. 22, 2018, 2 pages.
Office Action received for Australian Patent Application No. 2017101563, dated Jun. 26, 2018, 3 pages.
Office Action received for Australian Patent Application No. 2017201064, dated Mar. 9, 2017, 2 pages.
Office Action received for Australian Patent Application No. 2017201068, dated Jan. 17, 2018, 5 pages.
Office Action received for Australian Patent Application No. 2017201068, dated Mar. 10, 2017, 2 pages.
Office Action received for Australian Patent Application No. 2017266867, dated Dec. 6, 2018, 3 pages.
Office Action received for Australian Patent Application No. 2017317605, dated Apr. 11, 2019, 4 pages.
Office Action received for Australian Patent Application No. 2017317605, dated Feb. 22, 2019, 4 pages.
Office Action received for Australian Patent Application No. 2018101014, dated Jan. 18, 2019, 5 pages.
Office Action received for Australian Patent Application No. 2018101014, dated Sep. 19, 2018, 4 pages.
Office Action received for Australian Patent Application No. 2018200628, dated Jan. 24, 2019, 3 pages.
Office Action received for Australian Patent Application No. 2018202559, dated Apr. 8, 2019, 4 pages.
Office Action Received for Australian Patent Application No. 2018202559, dated Jan. 16, 2019, 6 pages.
Office Action received for Australian Patent Application No. 2018202559, dated Jul. 19, 2019, 5 pages.
Office Action received for Australian Patent Application No. 2018279788, dated Feb. 8, 2019, 4 pages.

(56) References Cited

OTHER PUBLICATIONS

Office Action received for Australian Patent Application No. 2018312629, dated Feb. 25, 2019, 4 pages.
Office Action received for Australian Patent Application No. 2019201101, dated Feb. 28, 2019, 3 pages.
Office Action received for Chinese Patent Application No. 201510284715.9, dated Dec. 21, 2018, 22 pages.
Office Action received for Chinese Patent Application No. 201510284715.9, dated Jun. 19, 2019, 26 pages.
Office Action received for Chinese Patent Application No. 201510284896.5, dated Jun. 28, 2018, 15 pages.
Office Action received for Chinese Patent Application No. 201510284896.5, dated Mar. 6, 2019, 13 pages.
Office Action received for Chinese Patent Application No. 201520358683.8, dated Sep. 2, 2015, 4 pages.
Office Action received for Chinese Patent Application No. 201610069731.0, dated Mar. 5, 2019, 10 pages.
Office Action received for Chinese Patent Application No. 201620101636.X, dated May 25, 2016, 3 pages.
Office Action received for Chinese Patent Application No. 201620101636.X, dated Oct. 13, 2016, 3 pages.
Office Action received for Chinese Patent Application No. 201620480708.6, dated Jan. 9, 2017, 3 pages.
Office Action received for Chinese Patent Application No. 201620480708.6, dated Sep. 14, 2016, 3 pages.
Office Action received for Chinese Patent Application No. 201620480846.4, dated Jan. 9, 2017, 3 pages.
Office Action received for Chinese Patent Application No. 201620480846.4, dated Sep. 14, 2016, 3 pages.
Office Action received for Chinese Patent Application No. 201710093861.2, dated Mar. 5, 2019, 6 pages.
Office Action received for Chinese Patent Application No. 201710093861.2, dated Sep. 14, 2018, 15 pages.
Office Action received for Chinese Patent Application No. 201710094150.7, dated Dec. 19, 2018, 12 pages.
Office Action received for Chinese Patent Application No. 201780002398.4, dated Feb. 27, 2019, 6 pages.
Office Action received for Chinese Patent Application No. 201780002398.4, dated Sep. 12, 2018, 17 pages.
Office Action received for Chinese Patent Application No. 201780002648.4, dated Dec. 5, 2018, 13 pages.
Office Action received for Chinese Patent Application No. 201780002648.4, dated Jun. 12, 2019, 11 pages.
Office Action received for Chinese Patent Application No. 201810094316.X, dated Apr. 28, 2019, 9 pages.
Office Action received for Chinese Patent Application No. 201810094316.X, dated Aug. 5, 2019, 9 pages.
Office Action received for Chinese Patent Application No. 201810094316.X, dated Oct. 29, 2018, 12 pages.
Office Action received for Chinese Patent Application No. 201810338038.8, dated May 14, 2019, 26 pages.
Office Action received for Chinese Patent Application No. 201810338826.7, dated Apr. 3, 2019, 21 pages.
Office Action received for Danish Patent Application No. PA201670042, dated Feb. 15, 2017, 3 pages.
Office Action received for Danish Patent Application No. PA201670042, dated Jun. 23, 2016, 5 pages.
Office Action received for Danish Patent Application No. PA201670042, dated Mar. 31, 2016, 10 pages.
Office Action received for Danish Patent Application No. PA201670042, dated Sep. 25, 2017, 2 pages.
Office Action Received for Danish Patent Application No. PA201670622, dated Aug. 17, 2018, 4 pages.
Office Action Received for Danish Patent Application No. PA201670622, dated May 30, 2017, 4 pages.
Office Action received for Danish Patent Application No. PA201670622, dated Nov. 1, 2017, 5 pages.
Office Action Received for Danish Patent Application No. PA201670622, dated Oct. 31, 2016, 11 pages.
Office Action received for Danish Patent Application No. PA201670628, dated Jun. 6, 2017, 3 pages.
Office Action received for Danish Patent Application No. PA201670628, dated Oct. 26, 2016, 7 pages.
Office Action received for Danish Patent Application No. PA201770292, dated Apr. 24, 2018, 3 pages.
Office Action received for Danish Patent Application No. PA201770292, dated Jun. 6, 2017, 7 pages.
Office Action received for Danish Patent Application No. PA201770292, dated Nov. 9, 2018, 3 pages.
Office Action received for Danish Patent Application No. PA201770292, dated Sep. 6, 2017, 4 pages.
Office Action received for Danish Patent Application No. PA201770712, dated Jul. 20, 2018, 4 pages.
Office Action received for Danish Patent Application No. PA201770712, dated Mar. 1, 2019, 3 pages.
Office Action received for Danish Patent Application No. PA201770713, dated Apr. 18, 2018, 4 pages.
Office Action received for Danish Patent Application No. PA201770713, dated Jun. 7, 2019, 4 pages.
Office Action received for Danish Patent Application No. PA201770713, dated Nov. 13, 2018, 3 pages.
Office Action received for Danish Patent Application No. PA201770714, dated Aug. 17, 2018, 6 pages.
Office Action received for Danish Patent Application No. PA201770714, dated Feb. 21, 2018, 3 pages.
Office Action received for Danish Patent Application No. PA201770714, dated Oct. 13, 2017, 9 pages.
Office Action received for Danish Patent Application No. PA201770715, dated Mar. 8, 2018, 4 pages.
Office Action received for Danish Patent Application No. PA201770715, dated Oct. 29, 2018, 4 pages.
Office Action received for Danish Patent Application No. PA201770782, dated Jan. 26, 2018, 8 pages.
Office Action received for Danish Patent Application No. PA201770782, dated Nov. 22, 2018, 3 pages.
Office Action received for Danish Patent Application No. PA201770804, dated Feb. 1, 2018, 9 pages.
Office Action received for Danish Patent Application No. PA201770804, dated May 31, 2018, 6 pages.
Office Action received for Danish Patent Application No. PA201770804, dated Nov. 6, 2018, 4 pages.
Office Action received for Danish Patent Application No. PA201870370, dated Nov. 9, 2018, 4 pages.
Office Action received for Danish Patent Application No. PA201870371, dated Nov. 20, 2018, 3 pages.
Office Action received for European Patent Application No. 12770400.5, dated March 10, 2015, 5 pages.
Office Action received for European Patent Application No. 12773460.6, dated Feb. 19, 2018, 6 pages.
Office Action received for European Patent Application No. 15727291.5, dated Jan. 15, 2018, 8 pages.
Office Action received for European Patent Application No. 16201159.7, dated Jun. 12, 2019, 10 pages.
Office Action Received for European Patent Application No. 16201195.1, dated Feb. 14, 2018, 12 pages.
Office Action received for European Patent Application No. 16201205.8, dated Feb. 16, 2018, 12 pages.
Office Action received for European Patent Application No. 16703893.4, dated Sep. 17, 2018, 7 pages.
Office Action received for European Patent Application No. 18208881.5, dated Jun. 11, 2019, 5 pages.
Office Action received for European Patent Application No. 18713408.5, dated May 20, 2019, 5 pages.
Office Action received for European Patent Application No. 18830326.7, dated Aug. 27, 2019, 6 pages.
Office Action received for European Patent Application No. 19171661.2, dated Aug. 7, 2019, 7 pages.
Office Action received for German Patent Application No. 202015004267.8, dated Nov. 4, 2015, 4 pages.
Office Action received for German Patent Application No. 202017005507.4, dated Feb. 5, 2018, 2 pages.

(56) References Cited

OTHER PUBLICATIONS

Office Action received for Japanese Patent Application No. 2016-224506, dated May 14, 2019, 22 pages.
Office Action received for Japanese Patent Application No. 2016-224507, dated Jun. 16, 2017, 16 pages.
Office Action received for Japanese Patent Application No. 2016-558332, dated Dec. 8, 2017, 12 pages.
Office Action received for Japanese Patent Application No. 2016-558332, dated Jul. 27, 2018, 9 pages.
Office Action received for Japanese Patent Application No. 2016-569665, dated Aug. 20, 2018, 9 pages.
Office Action received for Japanese Patent Application No. 2016-569665, dated Jan. 19, 2018, 10 pages.
Office Action received for Japanese Patent Application No. 2017-075031, dated Jul. 30, 2018, 16 pages.
Office Action received for Japanese Patent Application No. 2017-540616, dated Jan. 12, 2018, 24 pages.
Office Action received for Japanese Patent Application No. 2017-540616, dated Jul. 27, 2018, 20 pages.
Office Action received for Japanese Patent Application No. 2018-560107, dated Jun. 14, 2019, 26 pages.
Office Action received for Korean Patent Application No. 10-2014-7008348, dated Jan. 22, 2019, 16 pages.
Office Action received for Korean Patent Application No. 10-2016-0152210, dated Jan. 29, 2019, 7 pages.
Office Action received for Korean Patent Application No. 10-2016-0152210, dated May 14, 2018, 13 pages.
Office Action received for Korean Patent Application No. 10-2016-0152210, dated May 30, 2019, 8 pages.
Office Action received for Korean Patent Application No. 10-2016-7035555, dated Dec. 26, 2017, 5 pages.
Office Action received for Korean Patent Application No. 10-2016-7035555, dated Jul. 18, 2019, 9 pages.
Office Action received for Korean Patent Application No. 10-2016-7035555, dated Sep. 18, 2018, 9 pages.
Office Action received for Korean Patent Application No. 10-2017-0022365, dated Jun. 26, 2017, 10 pages.
Office Action received for Korean Patent Application No. 10-2017-0022546, dated Jun. 21, 2017, 12 pages.
Office Action received for Korean Patent Application No. 10-2017-0022582, dated Jul. 31, 2019, 5 pages.
Office Action received for Korean Patent Application No. 10-2017-0022582, dated Sep. 19, 2018, 6 pages.
Office Action received for Korean Patent Application No. 10-2017-7012145, dated Jul. 18, 2019, 5 pages.
Office Action received for Korean Patent Application No. 10-2017-7012145, dated Sep. 13, 2018, 6 pages.
Office Action received for Korean Patent Application No. 10-2018-7019643, dated Jul. 2, 2019, 12 pages.
Office Action received for Korean Patent Application No. 10-2018-7033301, dated Dec. 14, 2018, 6 pages.
Office Action received for Korean Patent Application No. 10-2019-7003374, dated Jun. 10, 2019, 7 pages.
Office Action received for Korean Patent Application No. 10-2019-7003836, dated Jun. 14, 2019, 7 pages.
Office Action received for Korean Patent Application No. 10-2019-7004734, dated Jul. 4, 2019, 7 pages.
Office Action received for Korean Patent Application No. 10-2019-7005925, dated Jul. 4, 2019, 24 pages.
Office Action received for Korean Patent Application No. 10-2019-7014494, dated Jun. 14, 2019, 11 pages.
Office Action received for Taiwanese Patent Application No. 104117508, dated Jul. 14, 2017, 9 pages.
Office Action received for Taiwanese Patent Application No. 104117508, dated Jul. 20, 2016, 19 pages.
Office Action received for Taiwanese Patent Application No. 104117508, dated Mar. 20, 2017, 22 pages.
Office Action received for Taiwanese Patent Application No. 104117508, dated Jan. 25, 2019, 24 pages.
Office Action received for Taiwanese Patent Application No. 104117508, dated May 22, 2019, 7 pages.
Pre-Brief Appeal Conference decision received for U.S. Appl. No. 14/869,831, mailed on Jan. 18, 2019, 3 pages.
"Real Solution of two-step-authentication Password Management for Authentication Enhancement", Fukuda Takao, Nikkei PC, JPN, Nikkei Business Publications, Inc, No. 694, Mar. 24, 2014, 11 pages.
Result of Consultation received for European Patent Application No. 16703893.4, dated Jun. 7, 2019, 3 pages.
Search Report and Opinion received for Danish Patent Application No. PA201770712, dated Oct. 25, 2017, 10 pages.
Search Report and Opinion received for Danish Patent Application No. PA201770713, dated Oct. 31, 2017, 9 pages.
Search Report and Opinion received for Danish Patent Application No. PA201770715, dated Nov. 9, 2017, 10 pages.
Search Report and Opinion received for Danish Patent Application No. PA201870370, dated Sep. 7, 2018, 11 pages.
Search Report and Opinion received for Danish Patent Application No. PA201870371, dated Sep. 14, 2018, 14 pages.
Search Report and Opinion received for Danish Patent Application No. PA201870855, dated Apr. 3, 2019, 12 pages.
Search Report received for Germany Patent Application No. 202017005507.4, dated Jan. 2, 2019, 6 pages.
Summons to Attend Oral Proceedings received for European Patent Application No. 12770400.5, dated Mar. 19, 2018, 10 pages.
Summons to Attend Oral Proceedings received for European Patent Application No. 16201195.1, dated Sep. 4, 2018, 21 pages.
Summons to Attend Oral Proceedings received for European Patent Application No. 16703893.4, dated Mar. 26, 2019, 14 pages.
Supplemental Notice of Allowance received for U.S. Appl. No. 14/870,694, dated Jan. 17, 2019, 3 pages.
Adrianisen, "Samsung Galaxy S8 Face Recognition—Register Your Face Review!", Retrieved from <https://www.youtube.com/watch?v=04KVPaCJq94>, Apr. 27, 2017, 1 page.
Cv, Meerkat, "Extracting Face Orientation in Real-time", Available online at <https://www.youtube.com/watch?v=Ugwfnjx6UYw>, Jul. 22, 2016, 3 pages.
Drareni, Jamil, "Face Tracking and Head Pose Estimation with Open CV", Available online at: <https://www.youtube.com/watch?v=Etj_aktbnwM>, Jun. 9, 2013, 3 pages.
Kawai, Yasuhiro, "Resolving anxieties regarding card payment abuse by authentication—overcoming cumbersomeness by cooperation with mobile phones", Nikkei Internet Solutions No. 78, Japan, Nikkei BP, No. 78, Dec. 22, 2003, pp. 28-31.
Komachi, Aneem, "Time Attendance—Face Recognition—Biometrics", Available at <https://www.youtube.com/watch?v=asclTiiiSbc>, Feb. 9, 2010, 1 page.
Naver Blog, "How to Use Smart Wallet and Registered Card", Online Available at <http://feena74.blog.me/140185758401>, Mar. 29, 2013, 20 pages.
NHDANH—Protocol Corp, "How To Enroll Face Enbioaccess T9 Nitgen Korea—Đăng Ký Khuôn Măt Enbioaccess T9 Nitgen", Available online at <https://www.youtube.com/watch?v=mFn03PD4NIE>, Mar. 30, 2017, 1 page.
Okazolab, "Kinect Based 3D Head Tracking in Behavioural Research", Available online at: <https://www.youtube.com/watch?v=nigRvT9beQw>, Aug. 8, 2012, 3 pages.
ONEFACEIN, "[How It Works] Securing Your Smartphone with OneFaceIn", Biometric Password Manager, Available at <https://www.youtube.com/watch?v=h-JG5SPxBQ0>, Dec. 2, 2016, 1 page.
Phonebuff, "How To Use Face Unlock On Android 4.0 ICS", Retrieved from Khttps://www.youtube.com/watch?v=0ASf6jkpFKE>, Dec. 15, 2011, 1 page.
PSP Security Ltd., "AccuFACE features", Available online at <https://www.youtube.com/watch?v=p3jvGoEbioY>, Oct. 14, 2009, 1 page.
PSP Security Ltd., "PSP Security—AccuFACE Step By Step Enrollment Process", Available online at <https://www.youtube.com/watch?v=0IIF5OOdya0>, Oct. 14, 2009, 1 page.
Schofield, Tim, "Face Unlock Demonstration on the HTC EVO 4G LTE", Retrieved from <https://www.youtube.com/watch?v=TNL9Or_9SWg>, May 31, 2012, 1 page.

(56) References Cited

OTHER PUBLICATIONS

Sensory Trulysecure, "AppLock Face/Voice Recognition", Available at <https://www.youtube.com/watch?v=odax5O51aT0>, May 27, 2015, 1 page.
Thanakulmas, Thanit, "MasterCard Identity Check Facial Recognition Biometrics", Available at <https://www.youtube.com/watch?v=g4sMbrkt1gI>, Oct. 10, 2016, 1 page.
Non-Final Office Action received for U.S. Appl. No. 16/987,003, dated May 10, 2021, 20 pages.
Notice of Allowance received for Korean Patent Application No. 10-2020-0097418, dated Apr. 27, 2021, 5 pages (2 pages of English Translation and 3 pages of Official Copy).
Office Action received for Australian Patent Application No. 2020203899, dated May 5, 2021, 10 pages.
Office Action received for European Patent Application No. 18208881.5, dated May 7, 2021, 6 pages.
Office Action received for European Patent Application No. 19194828.0, dated May 10, 2021, 6 pages.
Notice of Allowance received for Korean Patent Application No. 10-2019-7038021, dated May 2, 2020, 5 pages (1 page of English Translation and 4 pages of Official Copy).
Notice of Allowance received for Korean Patent Application No. 10-2020-0048600, dated Apr. 30, 2020, 5 pages (2 pages of English Translation and 3 pages of Official Copy).
Notice of Allowance received for U.S. Appl. No. 16/147,023, dated May 20, 2020, 7 pages.
Notice of Allowance received for U.S. Appl. No. 16/542,084, dated May 20, 2020, 7 pages.
Notice of Allowance received for U.S. Appl. No. 16/667,271, dated May 12, 2020, 11 pages.
Office Action received for Chinese Patent Application No. 201510284715.9, dated Apr. 14, 2020, 19 pages (7 pages of English Translation and 12 pages of Official Copy).
Office Action received for European Patent Application No. 19160348.9, dated May 14, 2020, 4 pages.
Summons to Attend Oral Proceedings received for European Patent Application No. 15728352.4, dated May 12, 2020, 25 pages.
Decision to Grant received for Danish Patent Application No. PA201970127, dated Aug. 20, 2020, 2 pages.
Notice of Acceptance received for Australian Patent Application No. 2017284013, dated Aug. 26, 2020, 3 pages.
Notice of Allowance received for Korean Patent Application No. 10-2020-7011172, dated Aug. 25, 2020, 7 pages (2 pages of English Translation and 5 pages of Official Copy).
Office Action received for Australian Patent Application No. 2017324176, dated Aug. 17, 2020, 5 pages.
Office Action received for Chinese Patent Application No. 201711292804.3, dated Aug. 5, 2020, 26 pages (16 pages of English Translation and 10 pages of Official Copy).
Office Action received for Korean Patent Application No. 10-2020-0097418, dated Aug. 28, 2020, 6 pages (2 pages of English Translation and 4 pages of Official Copy).
Office Action received for Korean Patent Application No. 10-2020-7010007, dated Aug. 26, 2020, 12 pages (5 pages of English Translation and 7 pages of Official Copy).
Notice of Acceptance received for Australian Patent Application No. 2020200795, dated Feb. 28, 2020, 3 pages.
Notice of Allowance received for Korean Patent Application No. 10-2017-0022582, dated Feb. 27, 2020, 5 pages (2 pages of English Translation and 3 pages of Official Copy).
Office Action received for Australian Patent Application No. 2017324176, dated Feb. 27, 2020, 3 pages.
Office Action received for Chinese Patent Application No. 201910354714.5, dated Feb. 3, 2020, 12 pages (7 pages of English Translation and 5 pages of Official Copy).
Office Action received for Danish Patent Application No. PA201970127, dated Feb. 24, 2020, 2 pages.
Office Action received for Japanese Patent Application No. 2018-551159, dated Jan. 27, 2020, 8 pages (4 pages of English Translation and 4 pages of Official Copy).

Applicant-Initiated Interview Summary received for U.S. Appl. No. 16/670,949, dated Apr. 6, 2021, 2 pages.
Non-Final Office Action received for U.S. Appl. No. 16/125,267, dated Mar. 26, 2021, 20 pages.
Notice of Allowance received for Korean Patent Application No. 10-2021-7005691, dated Mar. 29, 2021, 3 pages (1 page of English Translation and 2 pages of Official Copy).
Notice of Allowance received for U.S. Appl. No. 15/433,320, dated Apr. 1, 2021, 19 pages.
Notice of Allowance received for U.S. Appl. No. 15/823,269, dated Mar. 31, 2021, 9 pages.
Office Action received for European Patent Application No. 17810682.9, dated Mar. 26, 2021, 8 pages.
Office Action received for European Patent Application No. 19160344.8, dated Mar. 26, 2021, 7 pages.
Office Action received for Korean Patent Application No. 10-2020-7010007, dated Mar. 15, 2021, 7 pages (3 pages of English Translation and 4 pages of Official Copy).
Decision on Appeal received for U.S. Appl. No. 14/869,831, dated Nov. 2, 2020, 8 pages.
Decision to Grant received for Danish Patent Application No. PA201870855, dated Oct. 20, 2020, 2 pages.
Decision to Refuse received for European Patent Application No. 19171661.2, dated Oct. 22, 2020, 7 pages.
Notice of Allowance received for Chinese Patent Application No. 201910354714.5, dated Oct. 14, 2020, 2 pages (1 page of English Translation and 1 page of Official Copy).
Office Action received for Australian Patent Application No. 2020239783, dated Oct. 13, 2020, 4 pages.
Office Action received for European Patent Application No. 17799904.2, dated Oct. 21, 2020, 6 pages.
Applicant-Initiated Interview Summary received for U.S. Appl. No. 15/823,269, dated Sep. 17, 2020, 3 pages.
Applicant-Initiated Interview Summary received for U.S. Appl. No. 16/125,267, dated Sep. 14, 2020, 5 pages.
Brief Communication Regarding Oral Proceedings received for European Patent Application No. 19171661.2, dated Sep. 3, 2020, 2 pages.
Notice of Allowance received for Japanese Patent Application No. 2018-158482, dated Sep. 7, 2020, 4 pages (1 page of English Translation and 3 pages of Official Copy).
Office Action received for Australian Patent Application No. 2019250143, dated Sep. 15, 2020, 5 pages.
Office Action received for Chinese Patent Application No. 201910070375.8, dated Sep. 3, 2020, 8 pages (4 pages of English Translation and 4 pages of Official Copy).
Decision on Request for Rehearing received for U.S. Appl. No. 14/869,831, dated Mar. 8, 2021, 9 pages.
Notice of Acceptance received for Australian Patent Application No. 2020239783, dated Mar. 2, 2021, 3 pages.
Notice of Allowance received for Chinese Patent Application No. 201910498825.3, dated Mar. 8, 2021, 2 pages (1 page of English Translation and 1 page of Official Copy).
Office Action received for Chinese Patent Application No. 201711292804.3, dated Feb. 23, 2021, 17 pages (8 pages of English Translation and 9 pages of Official Copy).
Invitation to Pay Additional Fees received for PCT Patent Application No. PCT/US2019/035092, dated Nov. 20, 2019, 6 pages.
Non-Final Office Action received for U.S. Appl. No. 16/667,271, dated Dec. 13, 2019, 8 pages.
Notice of Allowance received for Japanese Patent Application No. 2018-560107, dated Dec. 6, 2019, 4 pages (1 pages of English Translation and 3 pages of Official Copy).
Notice of Allowance received for U.S. Appl. No. 15/351,230, dated Dec. 11, 2019, 11 pages.
Applicant-Initiated Interview Summary received for U.S. Appl. No. 15/274,910, dated Jul. 9, 2020, 3 pages.
Decision on Appeal received for Korean Patent Application No. 10-2016-0152210, dated Jun. 23, 2020, 20 pages (2 pages of English Translation and 18 pages of Official Copy).
Decision to Refuse received for European Patent Application No. 15727291.5, dated Jun. 30, 2020, 21 pages.

(56) References Cited

OTHER PUBLICATIONS

Decision to Refuse received for European Patent Application No. 16201205.8, dated Jun. 30, 2020, 29 pages.
Minutes of the Oral Proceedings received for European Patent Application No. 15727291.5, dated Jun. 29, 2020, 8 pages.
Minutes of the Oral Proceedings received for European Patent Application No. 16201205.8, dated Jun. 29, 2020, 6 pages.
Non-Final Office Action received for U.S. Appl. No. 16/125,267, dated Jul. 2, 2020, 20 pages.
Notice of Allowance received for Chinese Patent Application No. 201810338038.8, dated Jun. 30, 2020, 2 pages (1 page of English Translation and 1 page of Official Copy).
Notice of Allowance received for U.S. Appl. No. 16/147,023, dated Jul. 2, 2020, 2 pages.
Office Action received for European Patent Application No. 19150528.8, dated Jul. 1, 2020, 6 pages.
Decision on Appeal received for Korean Patent Application No. 10-2018-7019643, dated Jun. 9, 2020, 27 pages (3 pages of English Translation and 24 pages of Official Copy).
Extended European Search Report received for European Patent Application No. 17835789.3, dated Jun. 23, 2020, 12 pages.
Non-Final Office Action received for U.S. Appl. No. 15/823,269, dated Jun. 23, 2020, 14 pages.
Notice of Allowance received for Japanese Patent Application No. 2018-551159, dated Jun. 15, 2020, 4 pages (1 page of English Translation and 3 pages of Official Copy).
Notice of Allowance received for U.S. Appl. No. 16/585,178, dated Jan. 29, 2020, 9 pages.
Office Action received for Chinese Patent Application No. 201910498825.3, dated May 21, 2020, 16 pages (9 pages of English Translation and 7 pages of Official Copy).
Office Action received for Japanese Patent Application No. 2019-053379, dated May 29, 2020, 11 pages (6 pages of English Translation and 5 pages of Official Copy).
Notice of Allowance received for Korean Patent Application No. 10-2020-7027862, dated Jun. 29, 2021, 5 pages (1 page of English Translation and 4 pages of Official Copy).
Office Action received for Australian Patent Application No. 2020273355, dated Jul. 6, 2021, 3 pages.
Office Action received for European Patent Application No. 21150992.2, dated Jul. 6, 2021, 6 pages.
Summons to Attend Oral Proceedings received for European Patent Application No. 17865509.8, dated Jul. 14, 2021, 8 pages.
Notice of Allowance received for U.S. Appl. No. 16/987,003, dated Aug. 18, 2021, 9 pages.
Office Action received for Korean Patent Application No. 10-2020-7022596, dated Jul. 28, 2021, 26 pages (13 pages of English Translation and 13 pages of Official Copy).
Decision to Grant received for European Patent Application No. 18830326.7, dated Nov. 11, 2021, 3 pages.
Non-Final Office Action received for U.S. Appl. No. 16/125,267, dated Nov. 23, 2021, 21 pages.
Notice of allowance received for Japanese Patent Application No. 2020-159979, dated Nov. 8, 2021, 4 pages (1 page of English Translation and 3 pages of Official Copy).
Notice of Allowance received for Korean Patent Application No. 10-2021-0099243, dated Oct. 30, 2021, 4 pages (1 page of English Translation and 3 pages of Official Copy).
Notice of Allowance received for U.S. Appl. No. 17/015,429, dated Nov. 24, 2021, 2 pages.
Office Action received for Chinese Patent Application No. 201810338040.5, dated Oct. 25, 2021, 22 pages (13 pages of English Translation and 9 pages of Official Copy).
Office Action received for Indian Patent Application No. 201918003782, dated Nov. 18, 2021, 8 pages.
Office Action received for Indian Patent Application No. 202018014786, dated Nov. 9, 2021, 7 pages.

"13 questions and answers about using Apple Pay online", Online available at http://www.it528.com/apple/1356.html, Feb. 18, 2016, 5 pages (Official Copy Only). {See Communication under 37 CFR § 1.98(a) (3)}.
Brief Communication Regarding Oral Proceedings received for European Patent Application No. 18713408.5, dated Sep. 28, 2021, 2 pages.
Decision to Refuse received for European Patent Application No. 16201159.7, dated Sep. 27, 2021, 22 pages.
Minutes of the Oral Proceedings received for European Patent Application No. 16201159.7, dated Sep. 23, 2021, 6 pages.
Office Action received for Chinese Patent Application No. 201711292804.3, dated Sep. 10, 2021, 19 pages (8 pages of English Translation and 11 pages of Official Copy).
Office Action received for Chinese Patent Application No. 201780033622.6, dated Sep. 3, 2021, 11 pages (5 pages of English Translation and 6 pages of Official Copy).
Office Action received for Chinese Patent Application No. 201780033899.9, dated Sep. 3, 2021, 12 pages (6 pages of English Translation and 6 pages of Official Copy).
Office Action received for Chinese Patent Application No. 201911199010.1, dated Sep. 3, 2021, 12 pages (7 pages of English Translation and 5 pages of Official Copy).
Office Action received for European Patent Application No. 20198076.0, dated Sep. 22, 2021, 6 pages.
Office Action received for Korean Patent Application No. 10-2019-7006639, dated Sep. 16, 2021, 20 pages (10 pages of English Translation and 10 pages of Official Copy).
Applicant-Initiated Interview Summary received for U.S. Appl. No. 16/369,355, dated Jul. 28, 2021, 2 pages.
Non-Final Office Action received for U.S. Appl. No. 16/789,132, dated Aug. 5, 2021, 25 pages.
Notice of Allowance received for Korean Patent Application No. 10-2021-7020549, dated Jul. 13, 2021, 3 pages (1 page of English Translation and 2 pages of Official Copy).
Office Action received for European Patent Application No. 20186286.9, dated Jul. 29, 2021, 8 pages.
Ex Parte Quayle Action received for U.S. Appl. No. 14/869,831, mailed on May 28, 2021, 16 pages.
Notice of Allowance received for Chinese Patent Application No. 201910744886.3, dated Jun. 3, 2021, 2 pages (1 page of English Translation and 1 page of Official Copy).
Notice of Allowance received for U.S. Appl. No. 15/823,269, dated Jun. 3, 2021, 6 pages.
Notice of Allowance received for U.S. Appl. No. 16/670,949, dated May 27, 2021, 7 pages.
Office Action received for Japanese Patent Application No. 2020-159979, dated May 10, 2021, 9 pages (5 pages of English Translation and 4 pages of Official Copy).
Adractas et al., "The road to mobile payments services", McKinsey on Payments, Sep. 2011, pp. 45-52.
Corrected Notice of Allowance received for U.S. Appl. No. 16/987,003, dated Sep. 1, 2021, 3 pages.
Final Office Action received for U.S. Appl. No. 16/125,267, dated Aug. 26, 2021, 22 pages.
Notice of Allowance received for Japanese Patent Application No. 2020-126751, dated Aug. 16, 2021, 4 pages (1 page of English Translation and 3 pages of Official Copy).
Notice of Allowance received for U.S. Appl. No. 16/369,355, dated Sep. 1, 2021, 10 pages.
Office Action received for Australian Patent Application No. 2020289822, dated Aug. 24, 2021, 7 pages.
Office Action received for Korean Patent Application No. 10-2020-7034180, dated Aug. 17, 2021, 15 pages (6 pages of English Translation and 9 pages of Official Copy).
Result of Consultation received for European Patent Application No. 18713408.5, dated Aug. 30, 2021, 5 pages.
Supplemental Notice of Allowance received for U.S. Appl. No. 14/869,831, dated Aug. 20, 2021, 2 pages.
Board Decision received for Chinese Patent Application No. 201810094316.X, dated Dec. 3, 2021, 18 pages (1 page of English Translation and 17 pages of Official Copy).

(56) References Cited

OTHER PUBLICATIONS

Non-Final Office Action received for U.S. Appl. No. 15/274,910, dated Dec. 24, 2021, 35 pages.
Notice of Allowance received for Korean Patent Application No. 10-2021-7030343, dated Dec. 9, 2021, 6 pages (2 pages of English Translation and 4 pages of Official Copy).
Notice of Allowance received for U.S. Appl. No. 17/015,429, dated Dec. 24, 2021, 2 pages.
Summons to Attend Oral Proceedings received for European Patent Application No. 17799904.2, dated Dec. 20, 2021, 8 pages.
Applicant-Initiated Interview Summary received for U.S. Appl. No. 16/125,267, dated Oct. 25, 2021, 4 pages.
Board Opinion received for Chinese Patent Application No. 201810094316.X, dated Sep. 30, 2021, 11 pages (3 pages of English Translation and 8 pages of Official Copy).
Notice of Acceptance received for Australian Patent Application No. 2020204256, dated Oct. 9, 2021, 3 pages.
Notice of Allowance received for U.S. Appl. No. 17/015,429, dated Oct. 8, 2021, 5 pages.
Notice of Allowance received for U.S. Appl. No. 17/015,429, dated Oct. 22, 2021, 2 pages.
Office Action received for European Patent Application No. 19160344.8, dated Oct. 7, 2021, 8 pages.
Office Action received for European Patent Application No. 19186538.5, dated Oct. 22, 2021, 7 pages.
Corrected Notice of Allowance received for U.S. Appl. No. 16/670,949, dated Sep. 8, 2021, 2 pages.
Intention to Grant received for European Patent Application No. 18830326.7, dated Sep. 15, 2021, 11 pages.
Notice of Allowance received for U.S. Appl. No. 16/670,949, dated Sep. 14, 2021, 7 pages.
Notice of Allowance received for U.S. Appl. No. 17/015,429, dated Sep. 22, 2021, 6 pages.
Brief Communication Regarding Oral Proceedings received for European Patent Application No. 17865509.8, dated Nov. 1, 2021, 2 pages.
Intention to Grant received for European Patent Application No. 18713408.5, dated Oct. 28, 2021, 10 pages.
Notice of Allowance received for Japanese Patent Application No. 2020-103213, dated Oct. 25, 2021, 4 pages (1 page of English Translation and 3 pages of Official Copy).
Office Action received for Chinese Patent Application No. 201810339290.0, dated Oct. 18, 2021, 20 pages (11 pages of English Translation and 9 pages of Official Copy).
Office Action received for Indian Patent Application No. 201817036875, dated Oct. 29, 2021, 8 pages.
Result of Consultation received for European Patent Application No. 17865509.8, dated Nov. 2, 2021, 3 pages.
Pu Fang, "Research on Location-aware Service in Pervasive Computing", Issue No. 7, Information Technology Series, China Doctoral Dissertations, Jul. 15, 2008, 140 pages See Communication under 37 CFR § 1.98(a) (3).
Applicant-Initiated Interview Summary received for U.S. Appl. No. 16/125,267, dated Jun. 25, 2021, 5 pages.
Brief Communication Regarding Oral Proceedings received for European Patent Application No. 16201159.7, dated Jun. 29, 2021, 13 pages.
Brief Communication Regarding Oral Proceedings received for European Patent Application No. 18830326.7, dated Jun. 30, 2021, 2 pages.
European Search Report received for European Patent Application No. 21150992.2, dated Jun. 23, 2021, 6 pages.
Notice of Allowance received for U.S. Appl. No. 14/869,831, dated Jul. 2, 2021, 9 pages.
Notice of Allowance received for U.S. Appl. No. 17/015,429, dated Jun. 17, 2021, 10 pages.
Office Action received for Auslialian Patent Application No. 2020204256, dated Jun. 21, 2021, 2 pages.
Office Action received for Chinese Patent Application No. 201780069966.2, dated Jun. 1, 2021, 23 pages (12 pages of English Translation and 11 pages of Official Copy).
Office Action received for Chinese Patent Application No. 201810338040.5, dated Jun. 3, 2021, 25 pages (15 pages of English Translation and 10 pages of Official Copy).
Office Action received for Chinese Patent Application No. 201810339290.0, dated Jun. 4, 2021, 20 pages (11 pages of English Translation and 9 pages of Official Copy).
Office Action received for Korean Patent Application No. 10-2019-7006639, dated Jun. 15, 2021, 8 pages (4 pages of English Translation and 4 pages of Official Copy).
Office Action received for Korean Patent Application No. 10-2020-7010007, dated Jun. 21, 2021, 7 pages (3 pages of English Translation and 4 pages of Official Copy).
Result of Consultation received for European Patent Application No. 18830326.7, dated Jun. 21, 2021, 5 pages.
Applicant-Initiated Interview Summary received for U.S. Appl. No. 16/789,132, dated Nov. 29, 2021, 5 pages.
International Preliminary Reporton Patentability received for PCT Patent Application No. PCT/US2020/035464, dated Dec. 16, 2021, 7 pages.
Invitation to Pay Search Fees received for European Patent Application No. 19731554.2, dated Dec. 16, 2021, 3 pages.
Non-Final Office Action received for U.S. Appl. No. 16/915,572, dated Dec. 8, 2021, 20 pages.
Notice of Allowance received for U.S. Appl. No. 17/015,429, dated Dec. 13, 2021, 2 pages.
Office Action received for Australian Patent Application No. 2019281965, dated Nov. 30, 2021, 3 pages.
Office Action received for Australian Patent Application No. 2020203899, dated Nov. 26, 2021, 4 pages.
Office Action received for Australian Patent Application No. 2020273355, dated Nov. 23, 2021, 6 pages.
Office Action received for Indian Patent Application No. 202018041558, dated Dec. 3, 2021, 7 pages.
Board Decision received for Chinese Patent Application No. 201510284896.5, dated Nov. 19, 2021, 14 pages (1 page of English Translation and 13 pages of Official Copy).
Decision to Refuse received for European Patent Application No. 17865509.8, dated Jan. 4, 2022, 13 pages.
International Search Report and Written Opinion received for PCT Patent Application No. PCT/US2021/036410, dated Sep. 15, 2021, 13 pages.
International Search Report and Written Opinion received for PCT Patent Application No. PCT/US2021/037949, dated Nov. 12, 2021, 19 pages.
Invitation to Pay Additional Fees and Partial International Search Report received for PCT Patent Application No. PCT/US2021/037949, dated Sep. 22, 2021, 13 pages.
Minutes of the Oral Proceedings received for European Patent Application No. 17865509.8, dated Jan. 4, 2022, 8 pages.
Non-Final Office Action received for U.S. Appl. No. 17/104,750, dated Dec. 17, 2021, 25 pages.
Notice of Acceptance received for Australian Patent Application No. 2020289822, dated Dec. 22, 2021, 3 pages.
Office Action received for Chinese Patent Application No. 201710094150.7, dated Jan. 10, 2022, 6 pages (3 pages of English Translation and 3 pages of Official Copy).
Office Action received for Indian Patent Application No. 201917024374, dated Dec. 30, 2021, 10 pages.
Office Action received for Korean Patent Application No. 10-2020-7034405, dated Dec. 4, 2021, 15 pages (7 pages of English Translation and 8 pages of Official Copy).
Summons to Attend Oral Proceedings received for European Patent Application No. 17813737.8, dated Jan. 4, 2022, 12 pages.
Applicant-Initiated Interview Summary received for U.S. Appl. No. 16/125,267, dated Jan. 25, 2022, 5 pages.
Non-Final Office Action received for U.S. Appl. No. 15/274,910, dated Feb. 1, 2022, 34 pages.
Notice of Acceptance received for Australian Patent Application No. 2020273355, dated Jan. 17, 2022, 3 pages.

(56) References Cited

OTHER PUBLICATIONS

Office Action received for European Patent Application No. 20186286.9, dated Jan. 25, 2022, 8 pages.
Office Action received for Indian Patent Application No. 201918027146, dated Jan. 4, 2022, 7 pages.
Notice of Allowance received for Chinese Patent Application No. 201780069966.2, dated Feb. 23, 2022, 4 pages (1 page of English Translation and 3 pages of Official Copy).
Extended European Search Report received for European Patent Application No. 22159861.8, dated Jul. 8, 2022, 10 pages.
Applicant-Initiated Interview Summary received for U.S. Appl. No. 16/915,572, dated Apr. 13, 2022, 2 pages.
Applicant-Initiated Interview Summary received for U.S. Appl. No. 17/104,750, dated Feb. 11, 2022, 4 pages.
Office Action received for Australian Patent Application No. 2021202959, dated Apr. 22, 2022, 6 pages.
Thirumavalavan Viruthagiri, "A Spamless Internet", Available at: https://www.dombox.org/dombox.pdf, Feb. 2019, 299 pages.
Thirumavalavan Viruthagiri, "Dombox-The Zero Spam Mail System", Available Online at https://web.archive.org/web/20190217071649/https://medium.com/@Viruthagiri/dombox-the-zero-spam-mail-system-2b08ff7 432cd, Feb. 17, 2019, 32 pages.
Notice of Allowance received for U.S. Appl. No. 16/915,572, dated Jul. 21, 2022, 6 pages.
Final Office Action received for U.S. Appl. No. 17/104,750, dated Jun. 9, 2022, 31 pages.
Notice of Acceptance received for Australian Patent Application No. 2021202959, dated Jun. 8, 2022, 3 pages.

* cited by examiner

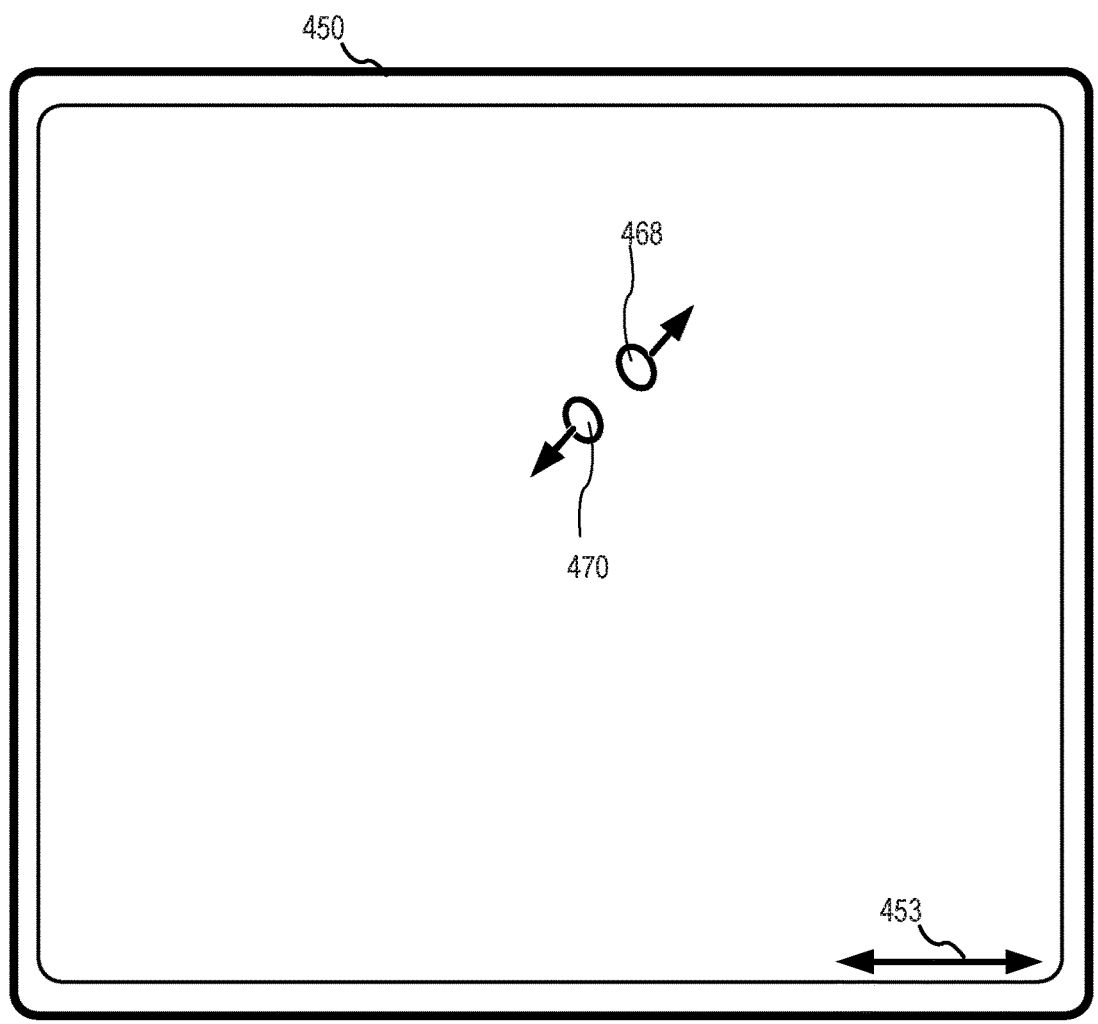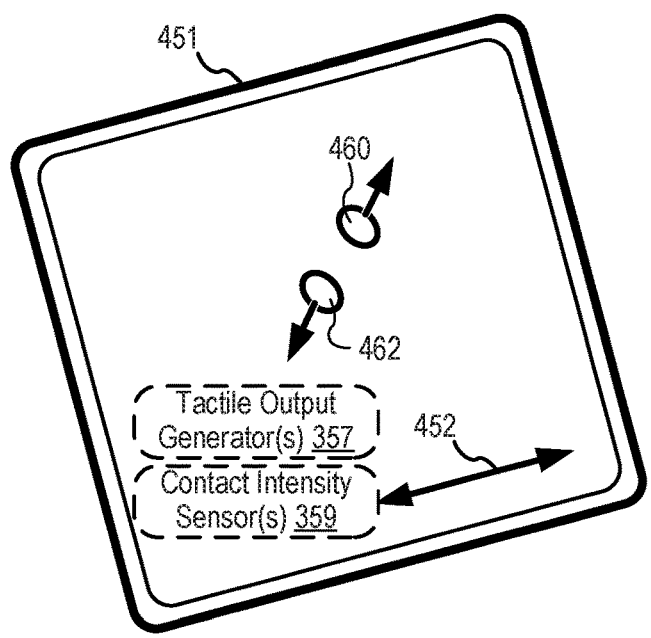
*FIG. 4B*

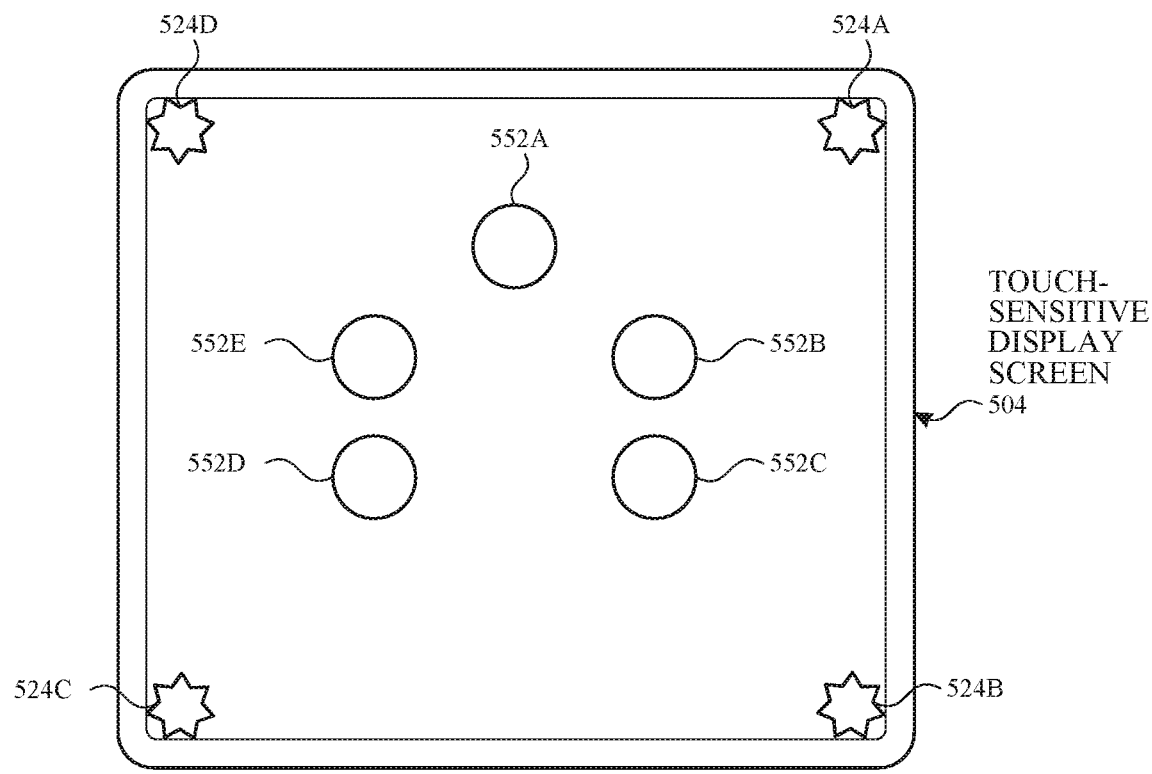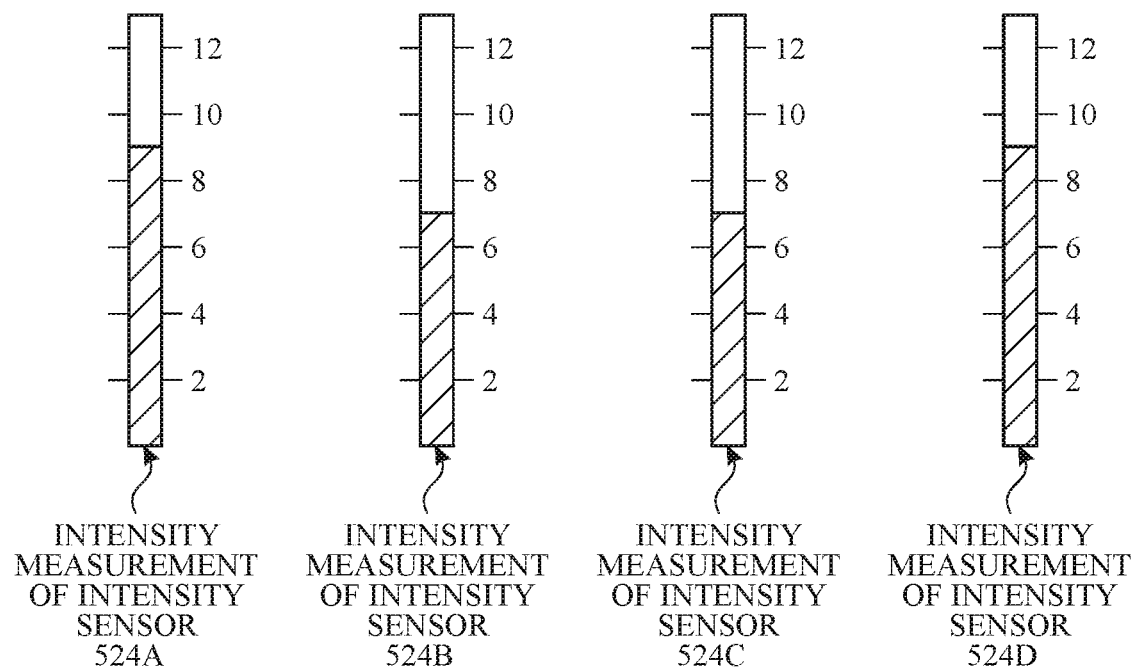
FIG. 5C

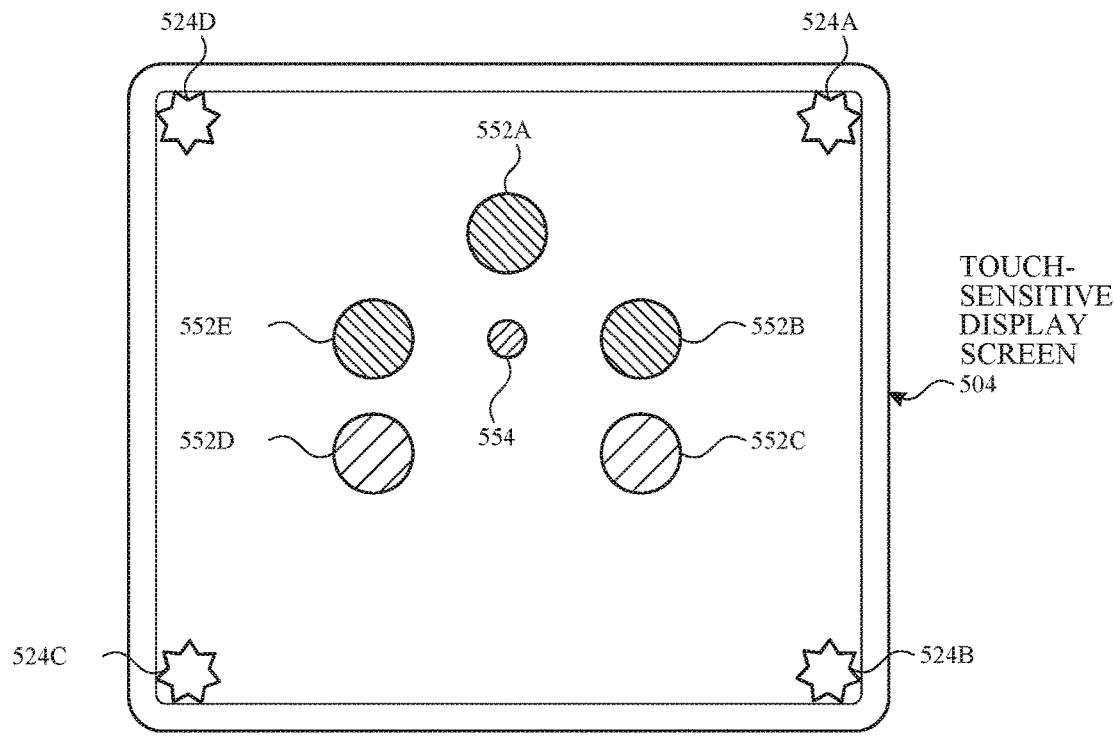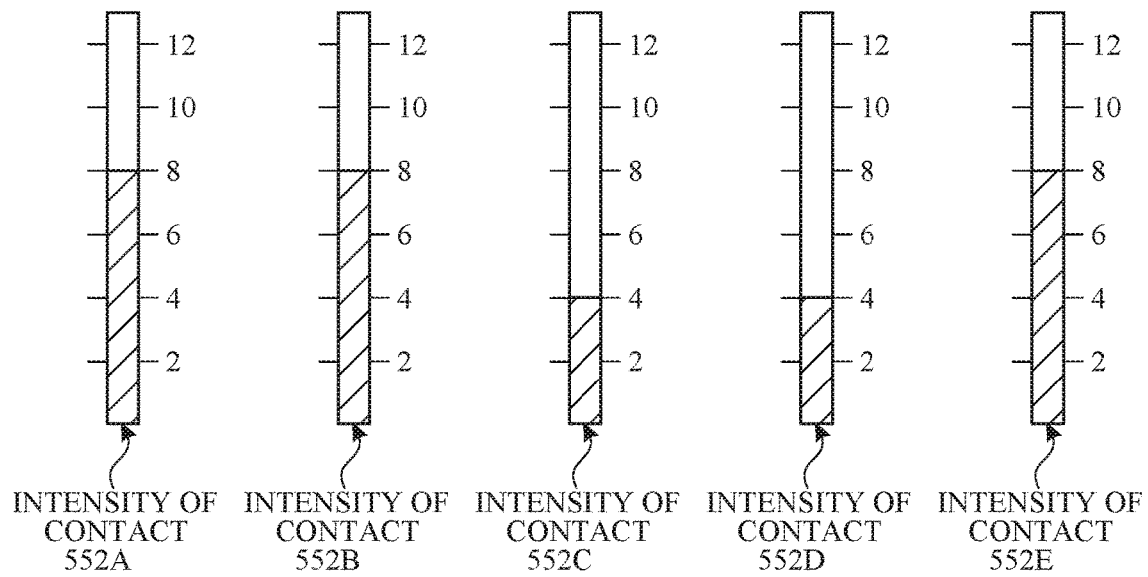
FIG. 5D

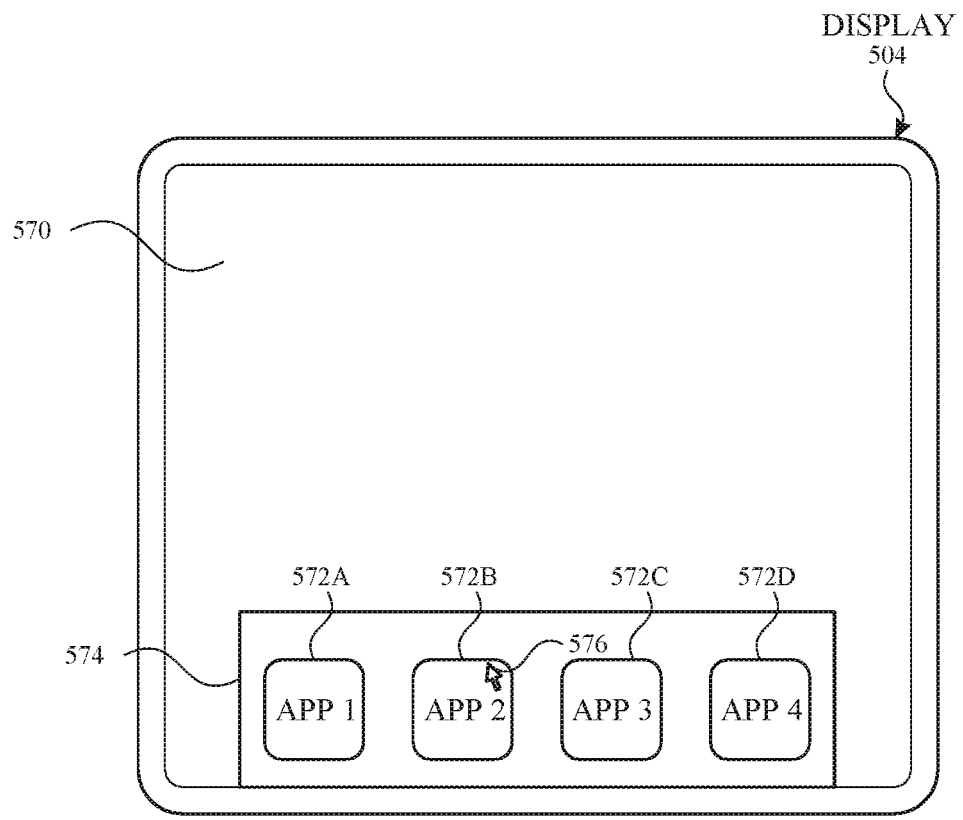
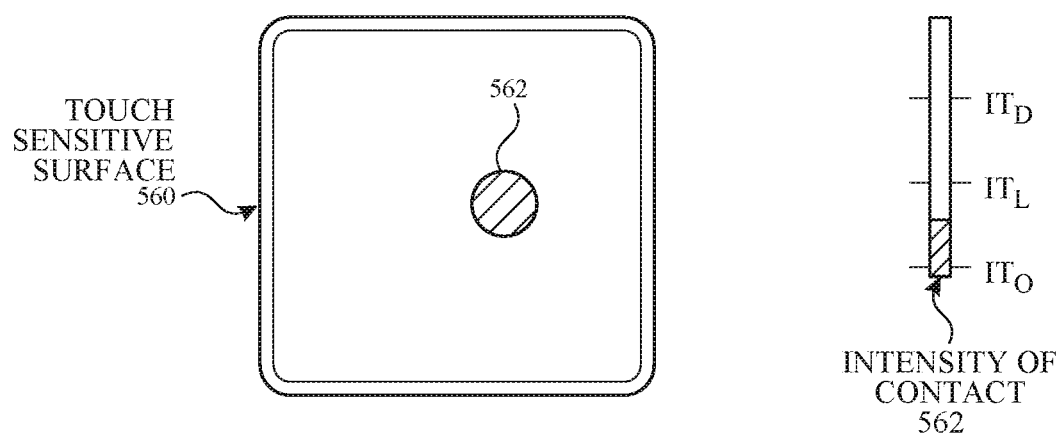
*FIG. 5E*

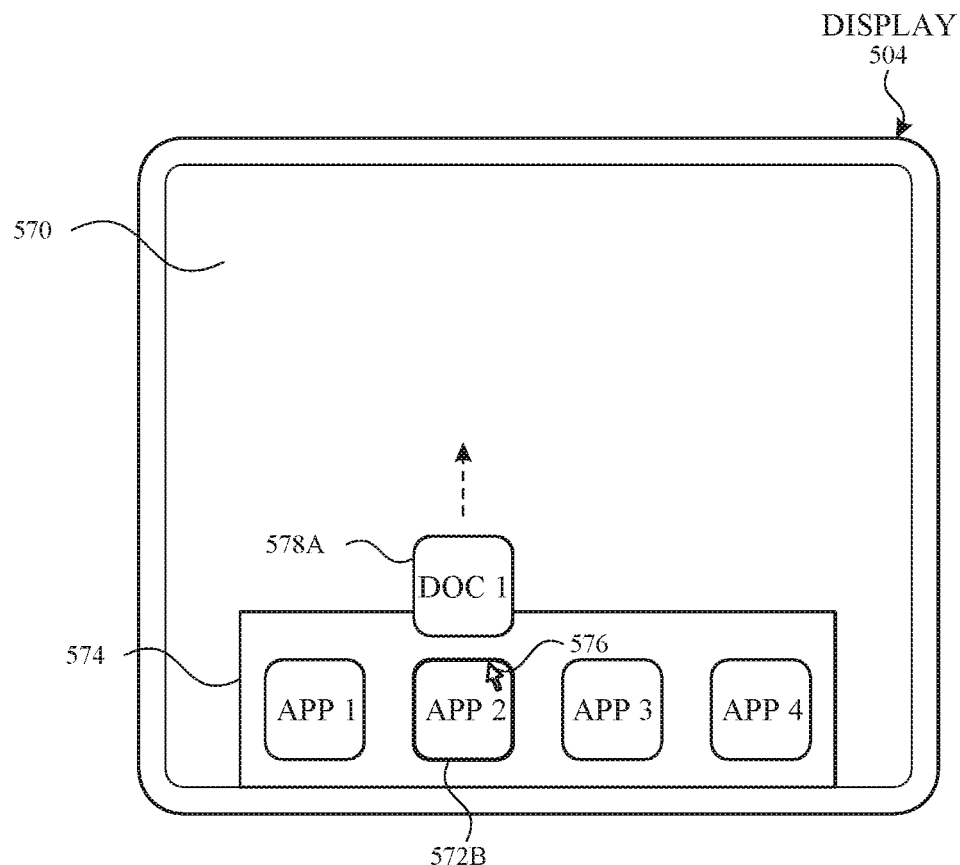
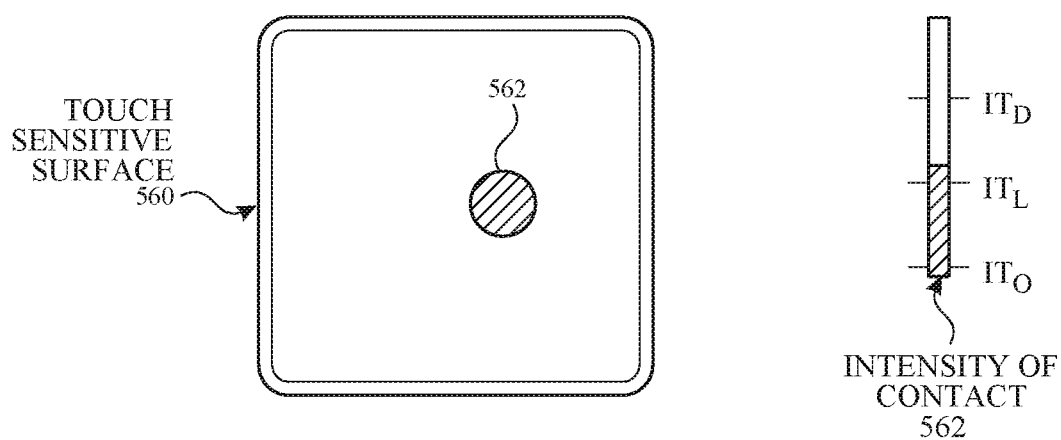
FIG. 5F

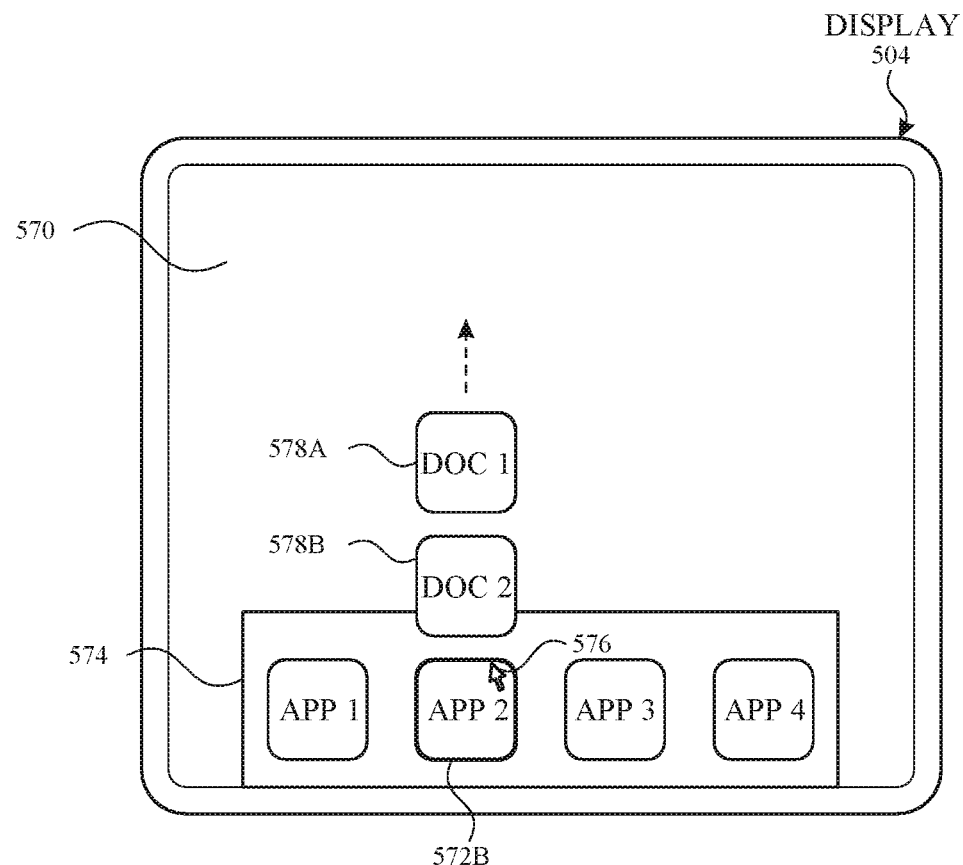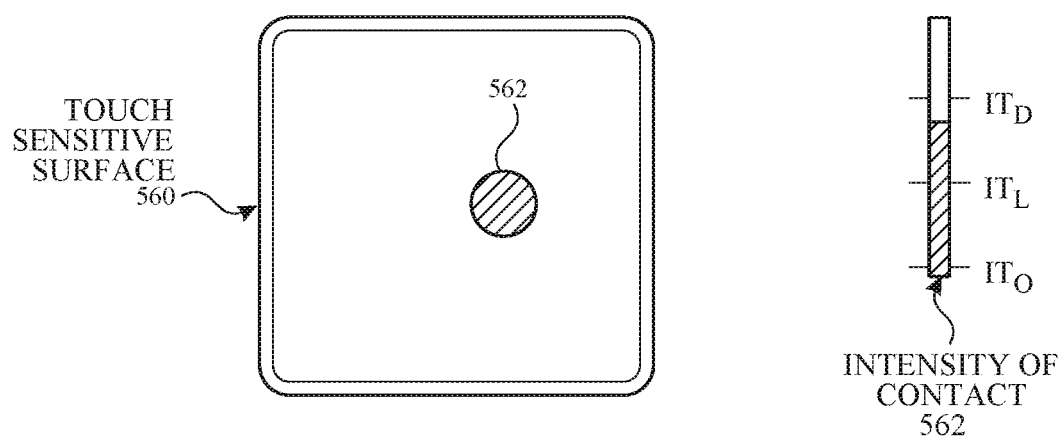
FIG. 5G

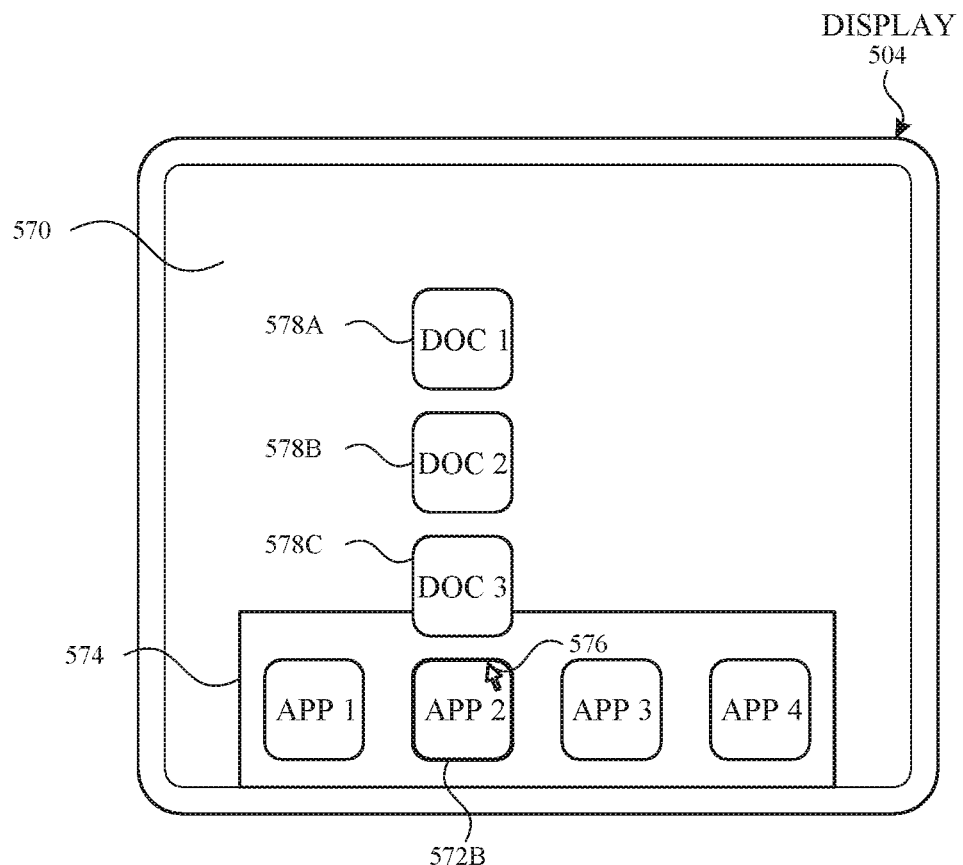
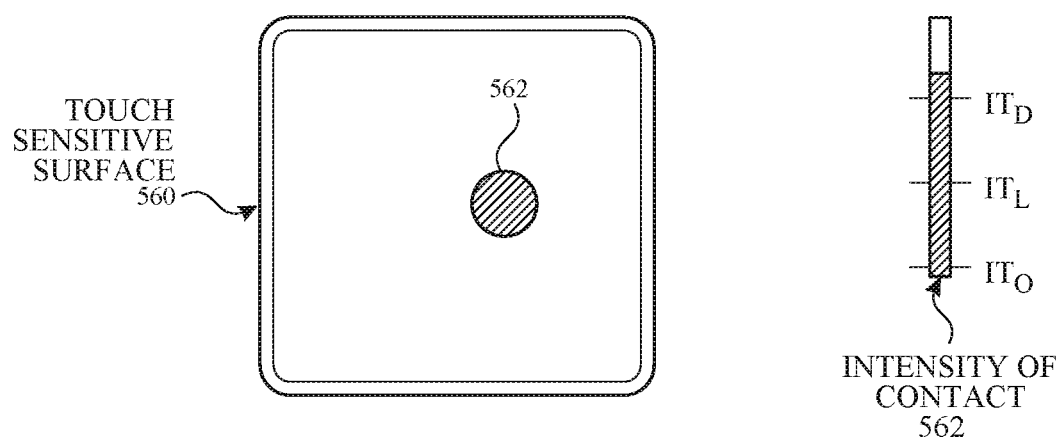
FIG. 5H

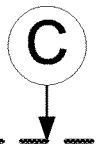

1016
In accordance with a determination that a fourth set or one or more criteria is met, the fourth set of one or more criteria including a storing-credentials criterion that is met when the secure element has stored credentials, cause display, on a display, of a parameters interface corresponding to the request for credentials that identifies one or more devices different from the electronic device for use in responding to the request for credentials.

1018-1
The fourth set of one or more criteria includes an authorized-account criterion that is met when an account actively logged into the electronic device is enabled to authorize the secure element to release credentials.

1018-2
The fourth set of one or more criteria includes an input-not-enabled-mode criterion that is met when the input device of the electronic device is not enabled for user input.

1018-3
The fourth set of one or more criteria includes a proximity-device criterion that is met when the electronic device is in communication with a second electronic device that is in proximity to the electronic device and that is enabled to respond to the request for credentials.

*FIG. 10C*

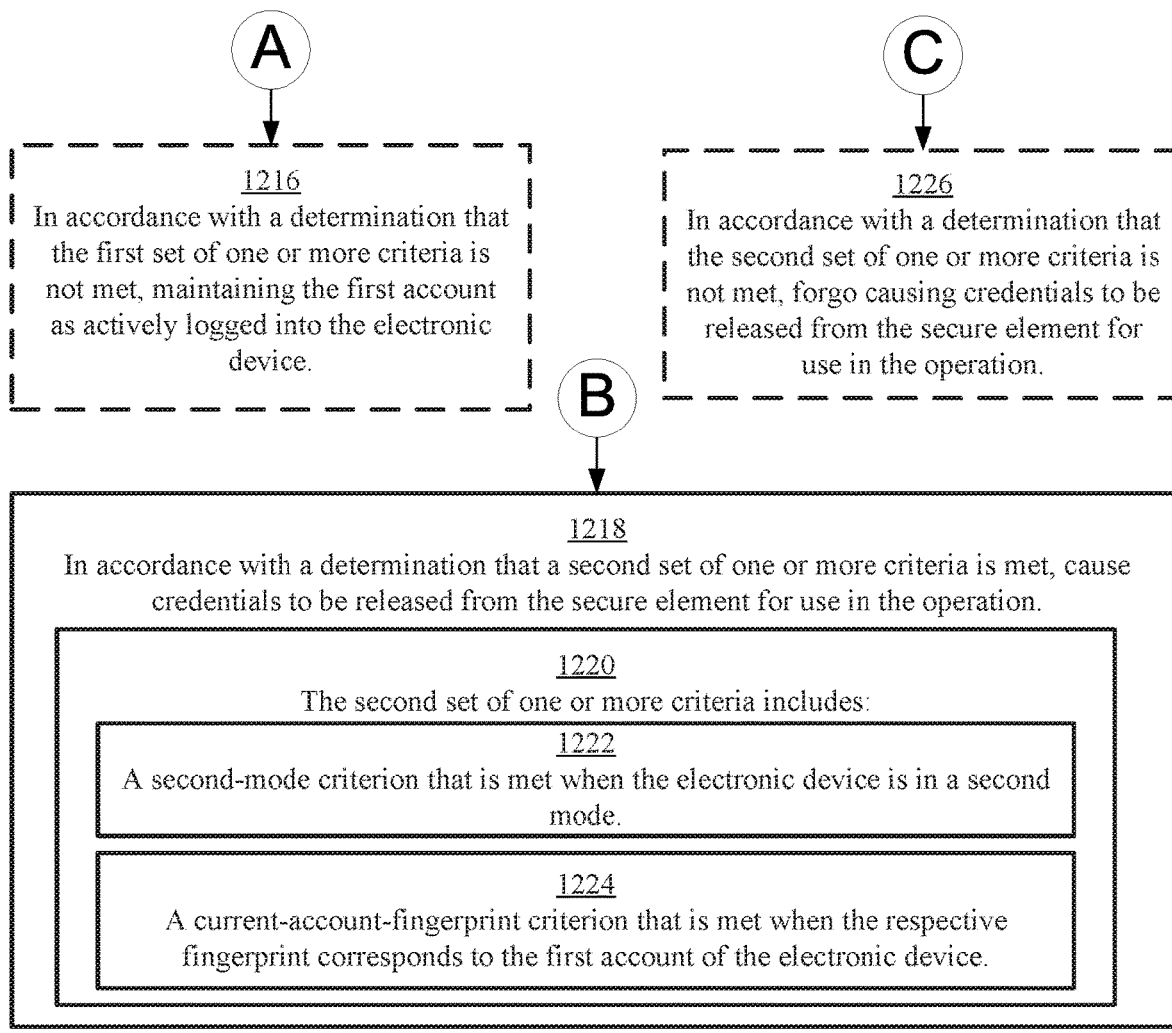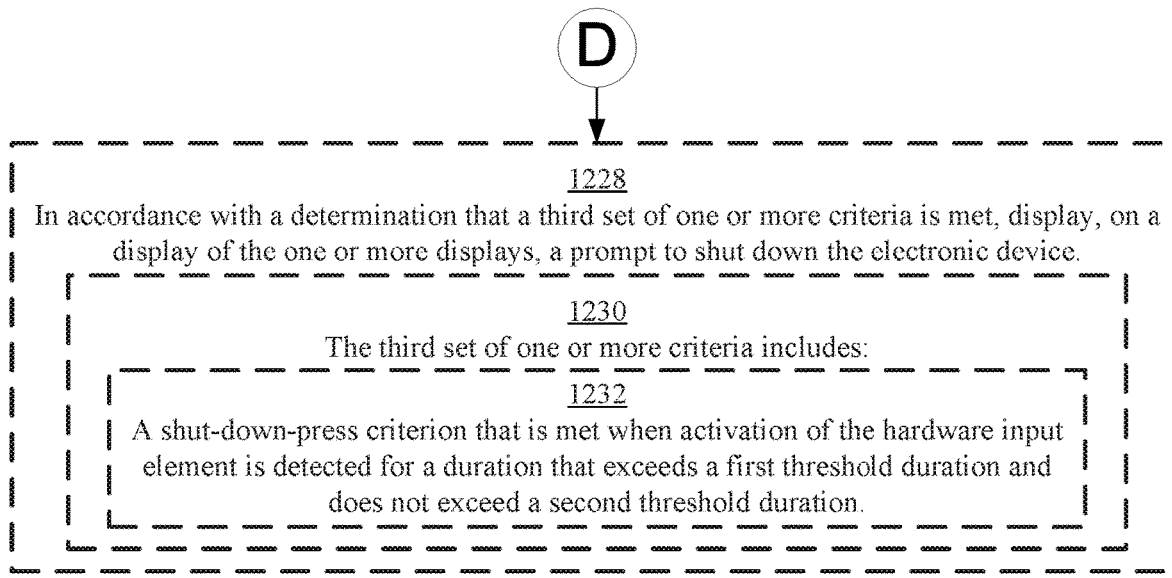
FIG. 12B

USER INTERFACE FOR MANAGING ACCESS TO CREDENTIALS FOR USE IN AN OPERATION

CROSS-REFERENCE TO RELATED APPLICATIONS

This application is a continuation of U.S. application Ser. No. 15/782,068, entitled "USER INTERFACE FOR MANAGING ACCESS TO CREDENTIALS FOR USE IN AN OPERATION," filed Oct. 12, 2017, which in turn claims priority to U.S. Provisional Application Ser. No. 62/412,819, entitled "USER INTERFACE FOR MANAGING ACCESS TO CREDENTIALS FOR USE IN AN OPERATION," filed Oct. 25, 2016, and to U.S. Provisional Application Ser. No. 62/413,300, entitled "USER INTERFACE FOR MANAGING ACCESS TO CREDENTIALS FOR USE IN AN OPERATION," filed Oct. 26, 2016. The contents of each of these applications are hereby incorporated by reference in their entireties.

This application also relates to U.S. patent application Ser. No. 15/256,959, titled "DATA VERIFICATION VIA INDEPENDENT PROCESSORS OF A DEVICE," filed Sep. 6, 2016, the contents of which are hereby incorporated by reference in their entirety and are also included in their entirety as Appendix A. This application also relates to U.S. Provisional Patent No. 62/368,988, titled "SYSTEMS, DEVICES, AND METHODS FOR DYNAMICALLY PROVIDING USER INTERFACE CONTROLS AT A TOUCH-SENSITIVE SECONDARY DISPLAY," filed Jul. 29, 2016, the contents of which are hereby incorporated in its entirety, and of which FIGS. 1A-2D, 17A-17G and paragraphs [00233]-[00252], [00454]-[00455] are included as Appendix B. This application also relates to U.S. Provisional Patent No. 62/338,994, titled "REMOTE AUTHORIZATION TO PROCEED WITH AN ACTION," filed May 19, 2016, U.S. Provisional Patent No. 62/347,852, titled "REMOTE AUTHORIZATION TO PROCEED WITH AN ACTION," filed Jun. 9, 2016, and U.S. patent application Ser. No. 15/269,801, titled "USER INTERFACE FOR A DEVICE REQUESTING REMOTE AUTHORIZATION," filed Sep. 19, 2016, portions of which are included as Appendix C, the contents of each of which are hereby incorporated by reference in their entirety.

FIELD

The present disclosure relates generally to computer user interfaces, and more specifically to techniques for managing access to credentials for use in an operation for which authorization is required.

BACKGROUND

The use of electronic devices for storing and accessing credentials has increased significantly in recent years. Typically, a user provides authorization for accessing the stored credentials by entering a password at a keyboard of the device. Although the user entering the password expects that the input device (e.g., the keyboard) and software receiving the password are not misappropriating the password, the user cannot be sure. For example, a pop-up window of an unscrupulous website may mimic a respected website to trick the user into entering password information or other sensitive information that the user does not intend to share with the unscrupulous website.

BRIEF SUMMARY

Some techniques for managing access to credentials for use in an operation using electronic devices, however, are generally cumbersome and inefficient. For example, some existing techniques use a complex and time-consuming user interface, which may include multiple key presses or keystrokes. Existing techniques may be less secure than desired and often require more time than necessary, wasting user time and device energy. This latter consideration is particularly important in battery-operated devices.

Accordingly, the present techniques and electronic devices provide faster, more secure, and more efficient methods and interfaces for managing access to credentials for use in operations for which authorization is required. Such methods and interfaces optionally complement or replace other methods for managing access to credentials for use in an operation for which authorization is required. Such methods and interfaces reduce the cognitive burden on a user and produce a more efficient human-machine interface. For battery-operated computing devices, such methods and interfaces conserve power and increase the time between battery charges. In addition, such methods and interfaces reduce the number of inputs required at an electronic device, such a laptop computer, authorizing the release of credentials for use in an operation for which authorization is required. Further, such methods and interfaces provide enhanced security for operations performed at an electronic device that involve the use of user credentials, such as personal data, account data, and/or other private information.

In accordance with some embodiments, a method performed at an electronic device with a first display, a second display, one or more input devices, and a secure element is described. The method comprises: receiving a request for credentials for an operation for which authorization is required; in response to receiving the request for credentials: displaying, on the first display, a parameters interface for the operation for which authorization is required; while displaying the parameters interface, displaying, on the second display, a visual indication of one or more steps to be taken to authorize the operation; receiving, using the one or more input devices, input that corresponds to the visual indication of the one or more steps; and in response to receiving the input, in accordance with a determination that the input is consistent with authorization criteria, causing credentials to be released from the secure element for use in the operation.

In accordance with some embodiments, a non-transitory computer-readable storage medium is described. The non-transitory computer-readable storage medium stores one or more programs configured to be executed by one or more processors of an electronic device with a first display, a second display, one or more input devices, and a secure element, the one or more programs including instructions for: receiving a request for credentials for an operation for which authorization is required; in response to receiving the request for credentials: displaying, on the first display, a parameters interface for the operation for which authorization is required; while displaying the parameters interface, displaying, on the second display, a visual indication of one or more steps to be taken to authorize the operation; receiving, using the one or more input devices, input that corresponds to the visual indication of the one or more steps; and in response to receiving the input, in accordance with a determination that the input is consistent with authorization criteria, causing credentials to be released from the secure element for use in the operation.

In accordance with some embodiments, a transitory computer-readable storage medium is described. The transitory computer-readable storage medium stores one or more programs configured to be executed by one or more processors of an electronic device with a first display, a second display, one or more input devices, and a secure element, the one or more programs including instructions for: receiving a request for credentials for an operation for which authorization is required; in response to receiving the request for credentials: displaying, on the first display, a parameters interface for the operation for which authorization is required; while displaying the parameters interface, displaying, on the second display, a visual indication of one or more steps to be taken to authorize the operation; receiving, using the one or more input devices, input that corresponds to the visual indication of the one or more steps; and in response to receiving the input, in accordance with a determination that the input is consistent with authorization criteria, causing credentials to be released from the secure element for use in the operation.

In accordance with some embodiments, an electronic device is described. The electronic device comprises: a first display; a second display; one or more input devices; a secure element; one or more processors; and a memory storing one or more programs configured to be executed by the one or more processors, the one or more programs including instructions for: receiving a request for credentials for an operation for which authorization is required; in response to receiving the request for credentials: displaying, on the first display, a parameters interface for the operation for which authorization is required; while displaying the parameters interface, displaying, on the second display, a visual indication of one or more steps to be taken to authorize the operation; receiving, using the one or more input devices, input that corresponds to the visual indication of the one or more steps; and in response to receiving the input, in accordance with a determination that the input is consistent with authorization criteria, causing credentials to be released from the secure element for use in the operation.

In accordance with some embodiments, an electronic device is described. The electronic device comprises: a first display; a second display; one or more input devices; a secure element; means for receiving a request for credentials for an operation for which authorization is required; means, in response to receiving the request for credentials, for: displaying, on the first display, a parameters interface for the operation for which authorization is required; while displaying the parameters interface, displaying, on the second display, a visual indication of one or more steps to be taken to authorize the operation; means for receiving, using the one or more input devices, input that corresponds to the visual indication of the one or more steps; and means, in response to receiving the input, in accordance with a determination that the input is consistent with authorization criteria, for causing credentials to be released from the secure element for use in the operation.

In accordance with some embodiments, a method performed at an electronic device with an input device for authorizing access to credentials is described. The method comprises: causing display of a user interface generated by the device on a display; while causing display of the user interface generated by the device on the display, receiving a request for credentials; and in response to receiving the request for credentials: in accordance with a determination that a first set of one or more criteria is met, the first set of one or more criteria including an input-disabled criterion that is met when the input device is not enabled for user input, causing display, on the display, of a visual indication of one or more steps to be taken to enable the input device for user input.

In accordance with some embodiments, a non-transitory computer-readable storage medium is described. The non-transitory computer-readable storage medium stores one or more programs configured to be executed by one or more processors of an electronic device with an input device for authorizing access to credentials, the one or more programs including instructions for: causing display of a user interface generated by the device on a display; while causing display of the user interface generated by the device on the display, receiving a request for credentials; and in response to receiving the request for credentials: in accordance with a determination that a first set of one or more criteria is met, the first set of one or more criteria including an input-disabled criterion that is met when the input device is not enabled for user input, causing display, on the display, of a visual indication of one or more steps to be taken to enable the input device for user input.

In accordance with some embodiments, a transitory computer-readable storage medium is described. The transitory computer-readable storage medium stores one or more programs configured to be executed by one or more processors of an electronic device with an input device for authorizing access to credentials, the one or more programs including instructions for: causing display of a user interface generated by the device on a display; while causing display of the user interface generated by the device on the display, receiving a request for credentials; and in response to receiving the request for credentials: in accordance with a determination that a first set of one or more criteria is met, the first set of one or more criteria including an input-disabled criterion that is met when the input device is not enabled for user input, causing display, on the display, of a visual indication of one or more steps to be taken to enable the input device for user input.

In accordance with some embodiments, an electronic device is described. The electronic device comprises: an input device for authorizing access to credentials; one or more processors; and a memory storing one or more programs configured to be executed by the one or more processors, the one or more programs including instructions for: causing display of a user interface generated by the device on a display; while causing display of the user interface generated by the device on the display, receiving a request for credentials; and in response to receiving the request for credentials: in accordance with a determination that a first set of one or more criteria is met, the first set of one or more criteria including an input-disabled criterion that is met when the input device is not enabled for user input, causing display, on the display, of a visual indication of one or more steps to be taken to enable the input device for user input.

In accordance with some embodiments, an electronic device is described. The electronic device comprises: an input device for authorizing access to credentials; means for causing display of a user interface generated by the device on a display; means, while causing display of the user interface generated by the device on the display, for receiving a request for credentials; and means, in response to receiving the request for credentials, for: in accordance with a determination that a first set of one or more criteria is met, the first set of one or more criteria including an input-disabled criterion that is met when the input device is not enabled for user input, causing display, on the display, of a visual indication of one or more steps to be taken to enable the input device for user input.

In accordance with some embodiments, a method performed at an electronic device with an integrated fingerprint sensor and a secure element is described. The method comprises: while a first account is actively logged into the electronic device: detecting, using the fingerprint sensor, a respective fingerprint; in accordance with a determination that a first set of one or more criteria is met, transitioning the electronic device such that the first account is no longer actively logged into the electronic device and such that a second account is actively logged into the electronic device; wherein the first set of one or more criteria includes: a first-mode criterion that is met when the electronic device is in a first mode, and a different-account-fingerprint criterion that is met when the respective fingerprint corresponds to the second account of the electronic device; in accordance with a determination that a second set of one or more criteria is met, causing credentials to be released from the secure element for use in the operation; and wherein the second set of one or more criteria includes: a second-mode criterion that is met when the electronic device is in a second mode, and a current-account-fingerprint criterion that is met when the respective fingerprint corresponds to the first account of the electronic device.

In accordance with some embodiments, a non-transitory computer-readable storage medium is described. The non-transitory computer-readable storage medium stores one or more programs configured to be executed by one or more processors of an electronic device with an integrated fingerprint sensor and a secure element, the one or more programs including instructions for: while a first account is actively logged into the electronic device: detecting, using the fingerprint sensor, a respective fingerprint; in accordance with a determination that a first set of one or more criteria is met, transitioning the electronic device such that the first account is no longer actively logged into the electronic device and such that a second account is actively logged into the electronic device; wherein the first set of one or more criteria includes: a first-mode criterion that is met when the electronic device is in a first mode, and a different-account-fingerprint criterion that is met when the respective fingerprint corresponds to the second account of the electronic device; in accordance with a determination that a second set of one or more criteria is met, causing credentials to be released from the secure element for use in the operation; and wherein the second set of one or more criteria includes: a second-mode criterion that is met when the electronic device is in a second mode, and a current-account-fingerprint criterion that is met when the respective fingerprint corresponds to the first account of the electronic device.

In accordance with some embodiments, a transitory computer-readable storage medium is described. The transitory computer-readable storage medium stores one or more programs configured to be executed by one or more processors of an electronic device with an integrated fingerprint sensor and a secure element, the one or more programs including instructions for: while a first account is actively logged into the electronic device: detecting, using the fingerprint sensor, a respective fingerprint; in accordance with a determination that a first set of one or more criteria is met, transitioning the electronic device such that the first account is no longer actively logged into the electronic device and such that a second account is actively logged into the electronic device; wherein the first set of one or more criteria includes: a first-mode criterion that is met when the electronic device is in a first mode, and a different-account-fingerprint criterion that is met when the respective fingerprint corresponds to the second account of the electronic device; in accordance with a determination that a second set of one or more criteria is met, causing credentials to be released from the secure element for use in the operation; and wherein the second set of one or more criteria includes: a second-mode criterion that is met when the electronic device is in a second mode, and a current-account-fingerprint criterion that is met when the respective fingerprint corresponds to the first account of the electronic device.

In accordance with some embodiments, an electronic device is described. The electronic device comprises: an integrated fingerprint sensor; a secure element; one or more processors; and a memory storing one or more programs configured to be executed by the one or more processors, the one or more programs including instructions for: while a first account is actively logged into the electronic device: detecting, using the fingerprint sensor, a respective fingerprint; in accordance with a determination that a first set of one or more criteria is met, transitioning the electronic device such that the first account is no longer actively logged into the electronic device and such that a second account is actively logged into the electronic device; wherein the first set of one or more criteria includes: a first-mode criterion that is met when the electronic device is in a first mode, and a different-account-fingerprint criterion that is met when the respective fingerprint corresponds to the second account of the electronic device; in accordance with a determination that a second set of one or more criteria is met, causing credentials to be released from the secure element for use in the operation; and wherein the second set of one or more criteria includes: a second-mode criterion that is met when the electronic device is in a second mode, and a current-account-fingerprint criterion that is met when the respective fingerprint corresponds to the first account of the electronic device.

In accordance with some embodiments, an electronic device is described. The electronic device comprises: an integrated fingerprint sensor; a secure element; means, while a first account is actively logged into the electronic device, for: detecting, using the fingerprint sensor, a respective fingerprint; means, in accordance with a determination that a first set of one or more criteria is met, for transitioning the electronic device such that the first account is no longer actively logged into the electronic device and such that a second account is actively logged into the electronic device; wherein the first set of one or more criteria includes: a first-mode criterion that is met when the electronic device is in a first mode, and a different-account-fingerprint criterion that is met when the respective fingerprint corresponds to the second account of the electronic device; means, in accordance with a determination that a second set of one or more criteria is met, for causing credentials to be released from the secure element for use in the operation; and wherein the second set of one or more criteria includes: a second-mode criterion that is met when the electronic device is in a second mode, and a current-account-fingerprint criterion that is met when the respective fingerprint corresponds to the first account of the electronic device.

In accordance with some embodiments, an electronic device is described. The electronic device comprises: a first display unit; a second display unit; one or more input device units; a secure element unit; and a processing unit coupled to the first display unit, the second display unit, the one or more input device units, and the secure element unit, the processing unit configured to: receive, a request for credentials for an operation for which authorization is required; in response to receiving the request for credentials: enable display, on the first display unit, of a parameters interface for the operation for which authorization is required; while displaying the parameters interface, enable display, on the second display unit, of a visual indication of one or more steps to be taken to authorize the operation; receive, using the one or more input device units, input that corresponds to the visual indication of the one or more steps; and in response to receiving the input, in accordance with a determination that the input is consistent with authorization criteria, cause credentials to be released from the secure element unit for use in the operation.

In accordance with some embodiments, an electronic device is described. The electronic device comprises: an input device unit for authorizing access to credentials; and a processing unit coupled to the input device unit, the processing unit configured to: cause display of a user interface generated by the device on a display unit; while causing display of the user interface generated by the device on the display unit, receive a request for credentials; and in response to receiving the request for credentials: in accordance with a determination that a first set of one or more criteria is met, the first set of one or more criteria including an input-disabled criterion that is met when the input device unit is not enabled for user input, cause display, on the display unit, of a visual indication of one or more steps to be taken to enable the input device unit for user input.

In accordance with some embodiments, an electronic device is described. The electronic device comprises: an integrated fingerprint sensor unit; a secure element unit; and a processing unit coupled to the integrated fingerprint sensor unit and the secure element unit, the processing unit configured to: while a first account is actively logged into the electronic device: detect, using the fingerprint sensor unit, a respective fingerprint; in accordance with a determination that a first set of one or more criteria is met, transition the electronic device such that the first account is no longer actively logged into the electronic device and such that a second account is actively logged into the electronic device; wherein the first set of one or more criteria includes: a first-mode criterion that is met when the electronic device is in a first mode, and a different-account-fingerprint criterion that is met when the respective fingerprint corresponds to the second account of the electronic device; in accordance with a determination that a second set of one or more criteria is met, cause credentials to be released from the secure element unit for use in the operation; and wherein the second set of one or more criteria includes: a second-mode criterion that is met when the electronic device is in a second mode, and a current-account-fingerprint criterion that is met when the respective fingerprint corresponds to the first account of the electronic device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient and secure methods and interfaces for managing access to credentials for use in operations, thereby increasing the effectiveness, efficiency, and user satisfaction with such devices. Such methods and interfaces may complement or replace other methods for managing access to credentials.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 10A-10D are a flow diagram illustrating methods for causing display of one or more steps to be taken to enable an input device for user input, using an electronic device, in accordance with some embodiments.

FIGS. 11A to 11M-4 illustrate exemplary devices and user interfaces for disambiguating between commands to change the account that is actively logged-in on the device and commands to cause credentials to be released from the secure element, in accordance with some embodiments.

FIGS. 12A-12B are a flow diagram illustrating methods for disambiguating between commands to change the account that is actively logged-in on the device and commands to cause credentials to be released from the secure element, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing access to credentials for use in an operation. For example, there is a need for efficient methods and interfaces for securely accessing credentials for use in an operation for which authorization is required. For another example, there is a need for efficient methods and interfaces for securely authenticating and enabling the release of credentials for an operation for which authorization is required. For another example, there is a need for efficient methods and interfaces for communicating with an external device to securely authorize the release of credentials when an input device for detecting authentication is not available. For another example, there is a need for efficient methods and interfaces for securely transitioning an actively logged-in account to a different account. Such techniques can reduce the cognitive burden on a user who requires access to credentials for use in an operation for which authorization is required, thereby enhancing productivity. Further, such techniques can reduce processor usage and battery power otherwise wasted on redundant user inputs.

Figure 6:
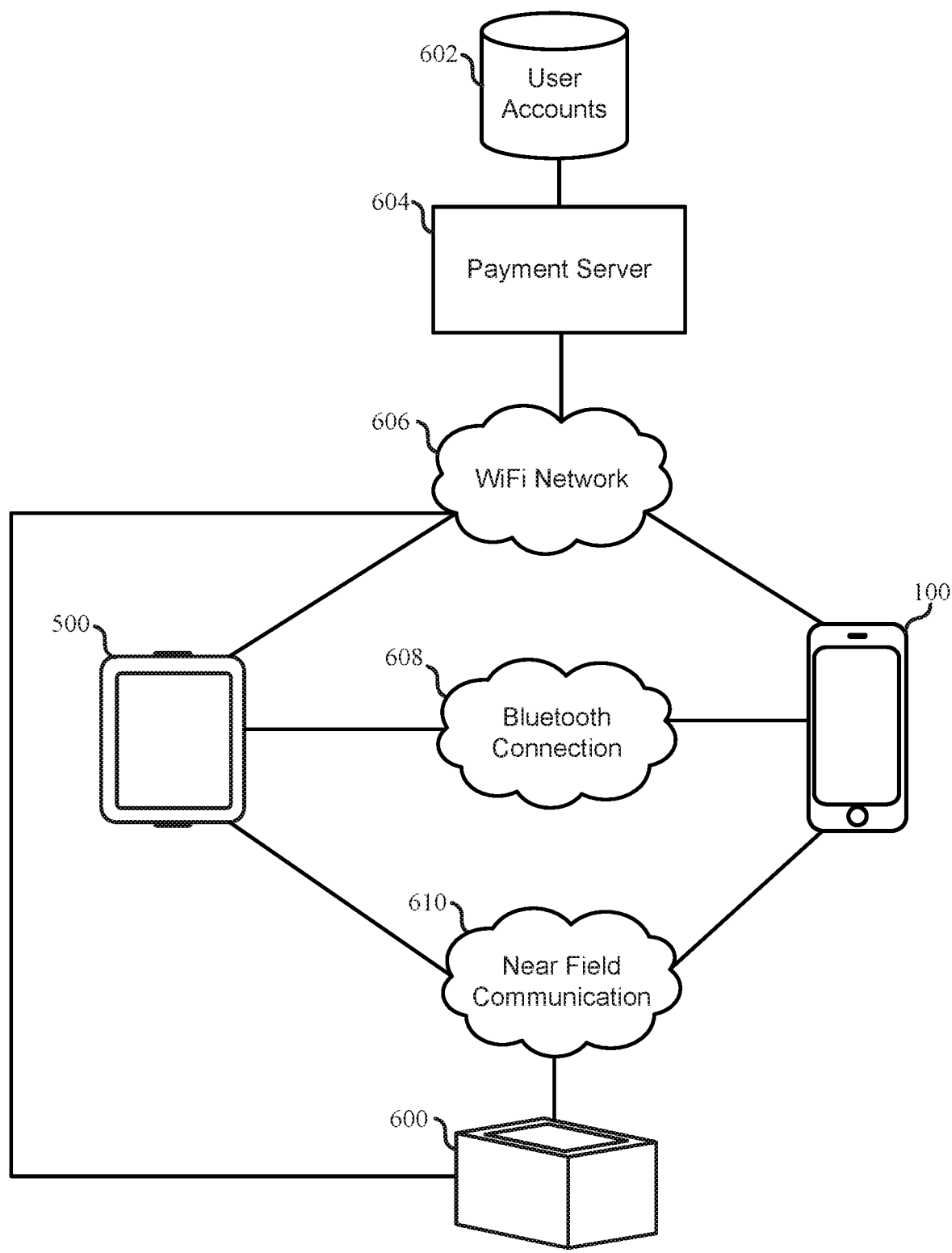
FIG. 6 illustrates exemplary devices connected via one or more communication channels, in accordance with some embodiments.
Figure 7A:
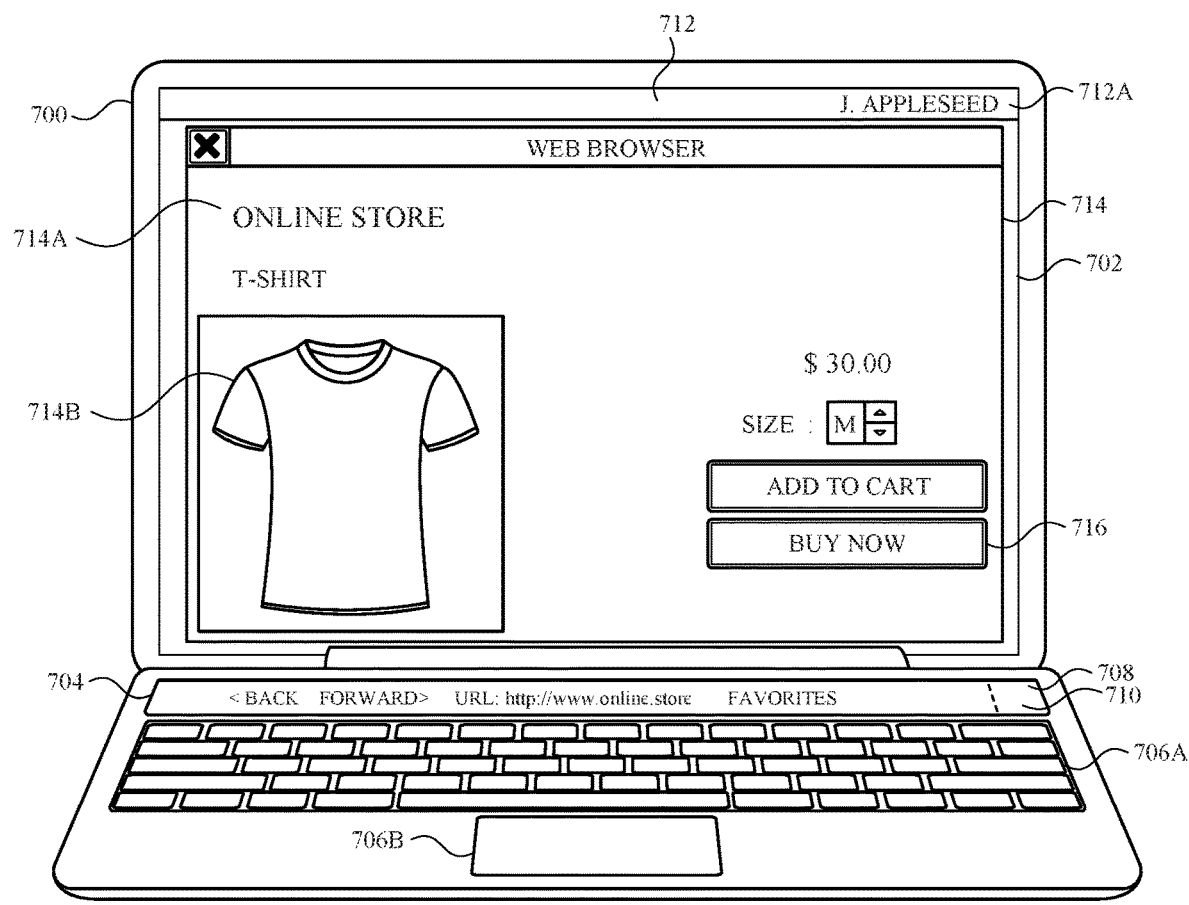
FIGS. 7A to 7D-10 illustrate exemplary devices and user interfaces for authorizing release of credentials for use in an operation for which authorization is required using an electronic device, in accordance with some embodiments.
Figure 7B:
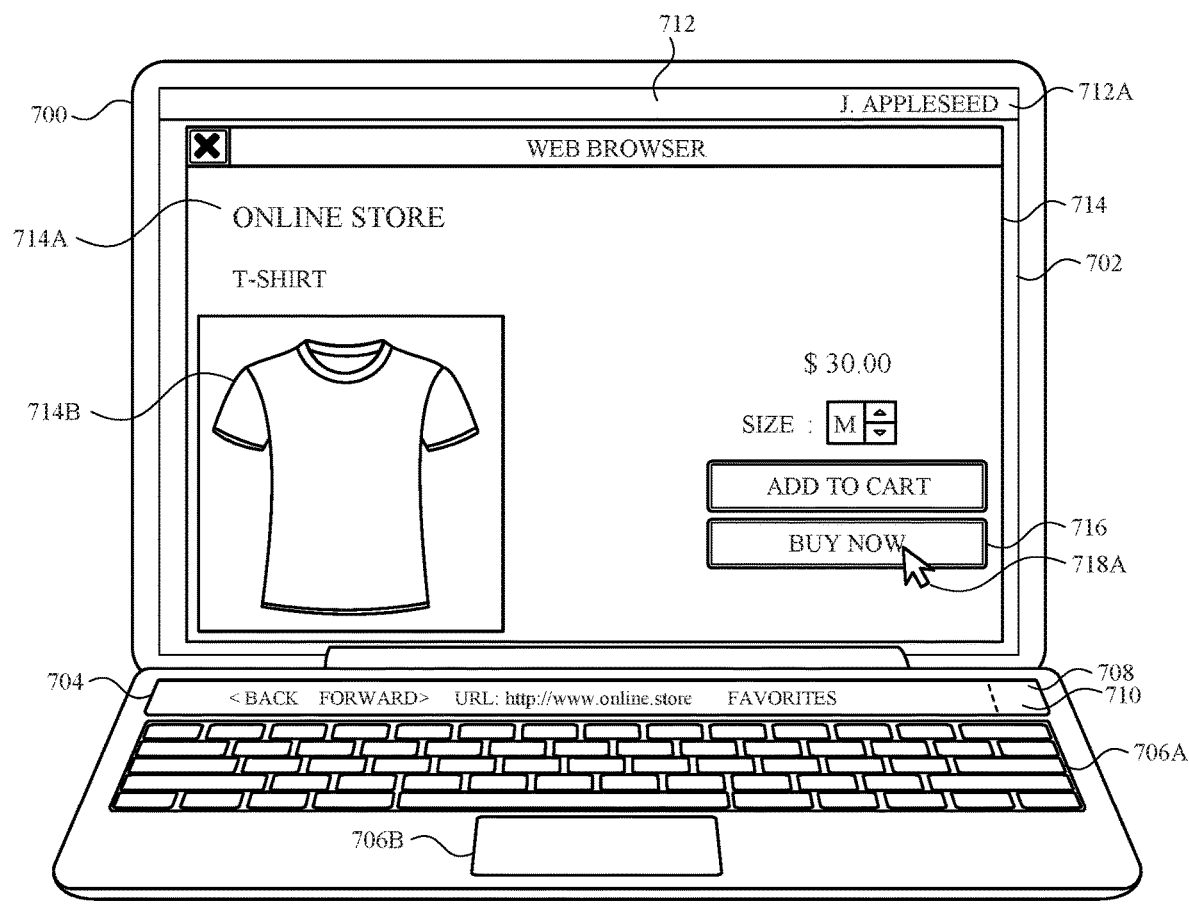

Below, FIGS. 1A-1B, 2, 3, 4A-4B, and 5A-5M provide a description of exemplary devices for performing the techniques for managing access to credentials for use in an operation. FIG. 6 illustrates exemplary devices connected via one or more communication channels, in accordance with some embodiments. FIGS. 7A to 7D-10 illustrate exemplary devices and user interfaces for authorizing release of credentials for use in an operation for which authorization is required. FIGS. 8A-8B are a flow diagram illustrating methods of authorizing release of credentials for use in an operation for which authorization is required. The user interfaces in FIGS. 7A to 7D-10 are used to illustrate the processes described below, including the processes in FIGS. 8A-8B. FIGS. 9A-1 to 9E-4 illustrate exemplary devices and user interfaces for causing display of one or more steps to be taken to enable an input device for user input. FIGS. 10A-10D are a flow diagram illustrating methods of causing display of one or more steps to be taken to enable an input device for user input, in accordance with some embodiments. The user interfaces in FIGS. 9A-1 to 9E-4 are used to illustrate the processes described below, including the processes in FIGS. 10A to 10D. FIGS. 11A to 11M-4 illustrate exemplary user interfaces for disambiguating between commands to change the account that is actively logged-in on the device and commands to cause credentials to be released from the secure element. FIGS. 12A-12B are a flow diagram illustrating methods of disambiguating between commands to change the account that is actively logged-in on the device and commands to cause credentials to be released from the secure element. The user interfaces in FIGS. 11A to 11M-4 are used to illustrate the processes described below, including the processes in FIGS. 12A-12B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
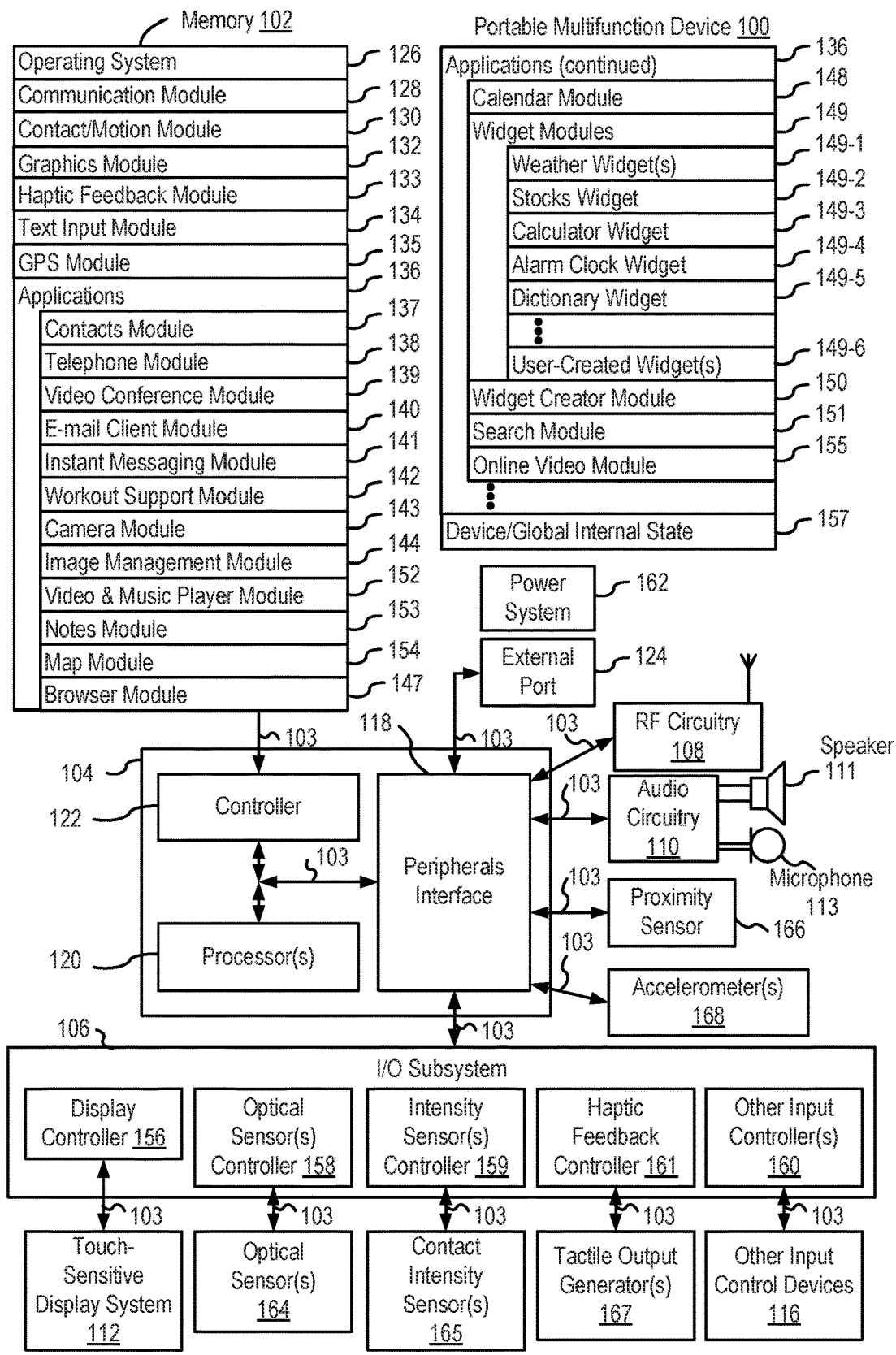
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
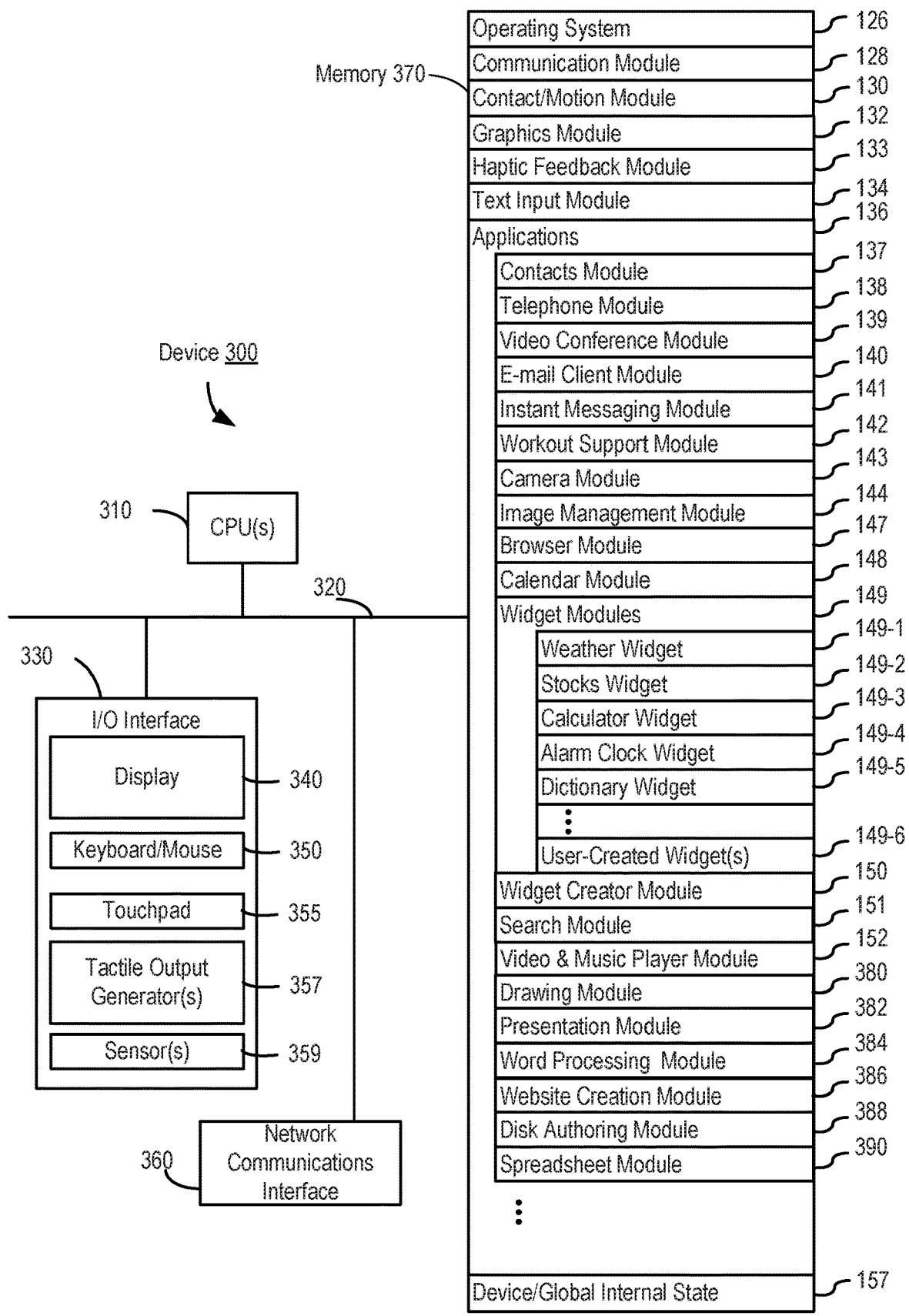
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
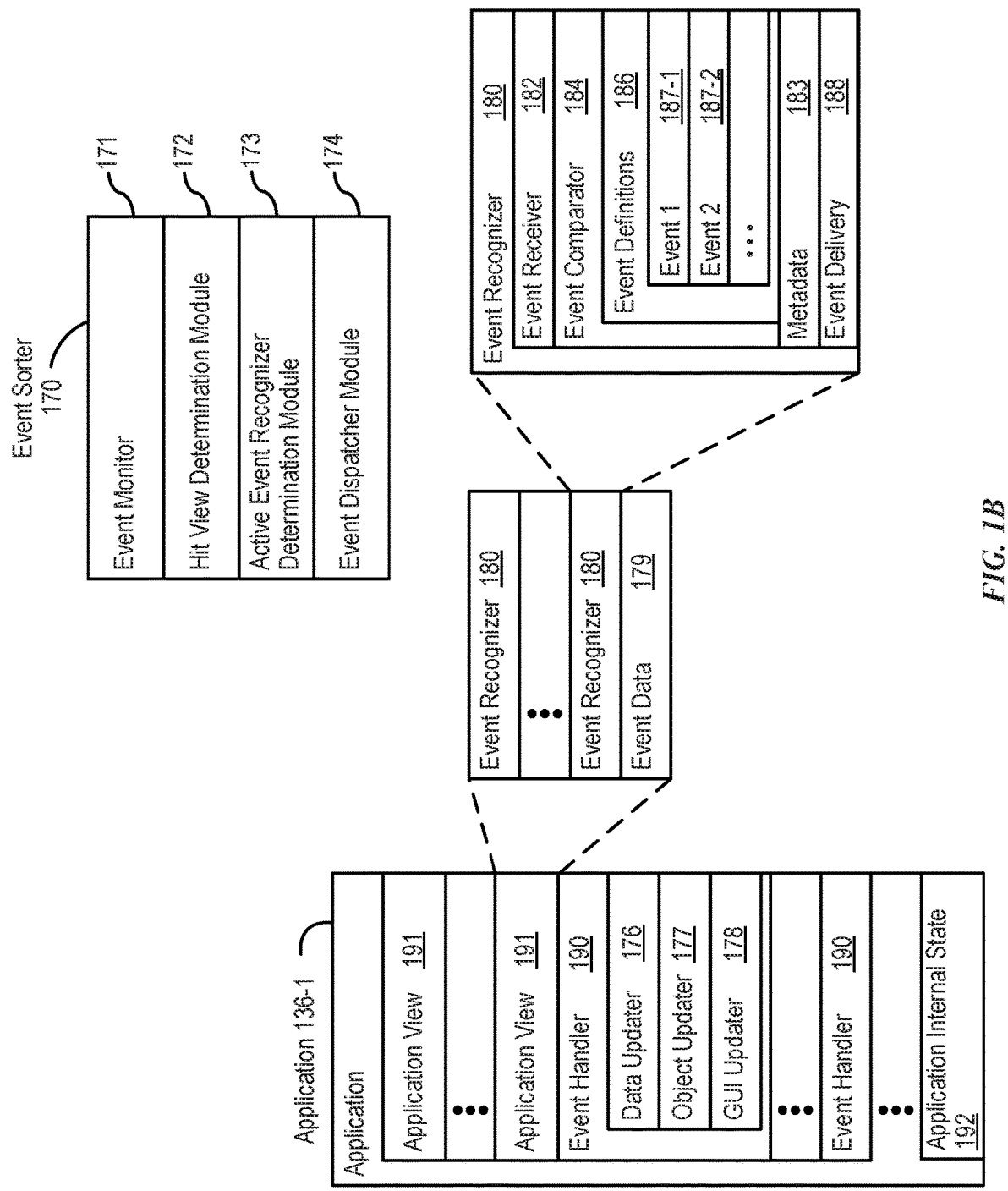
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
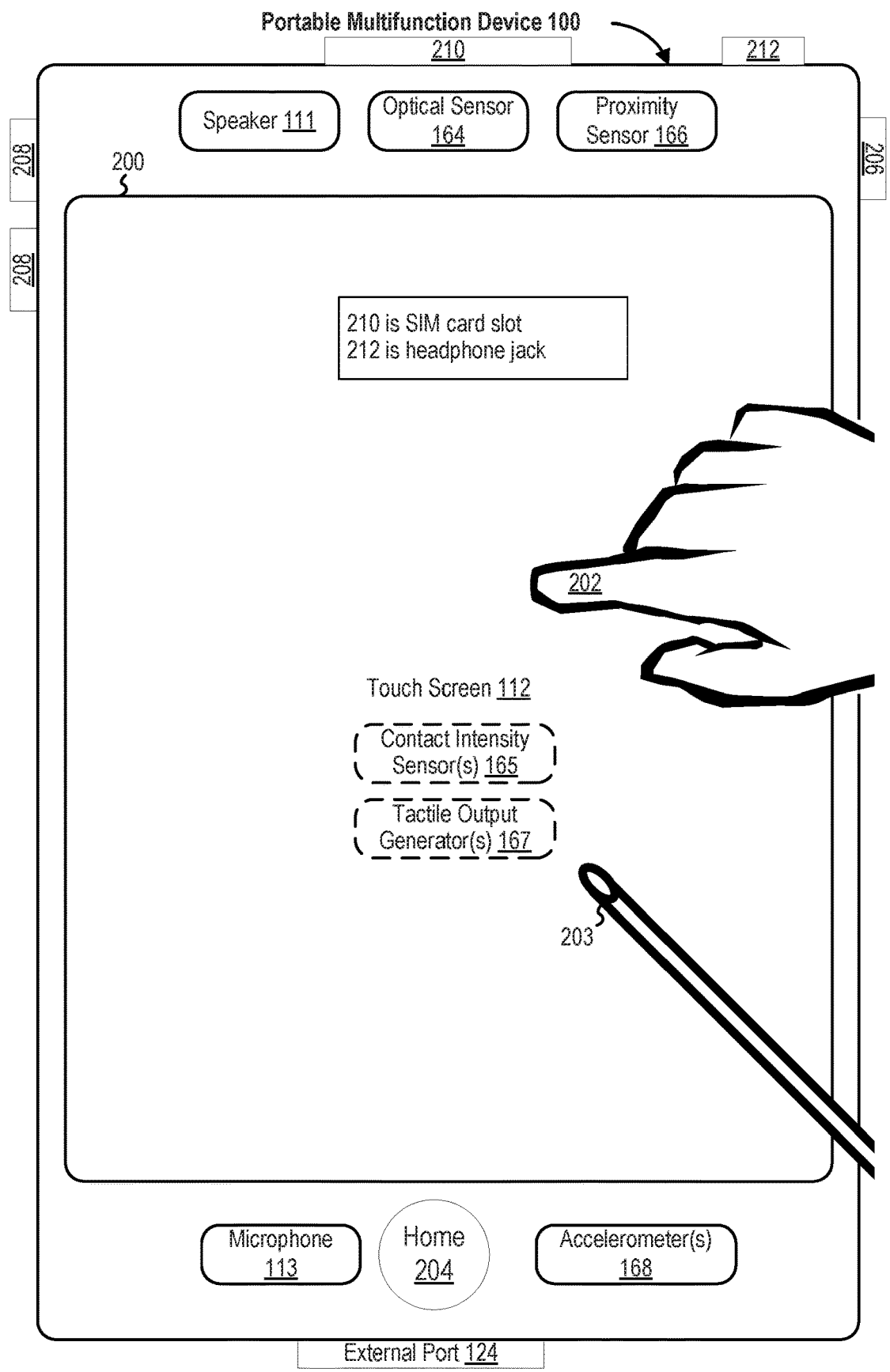
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the ure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
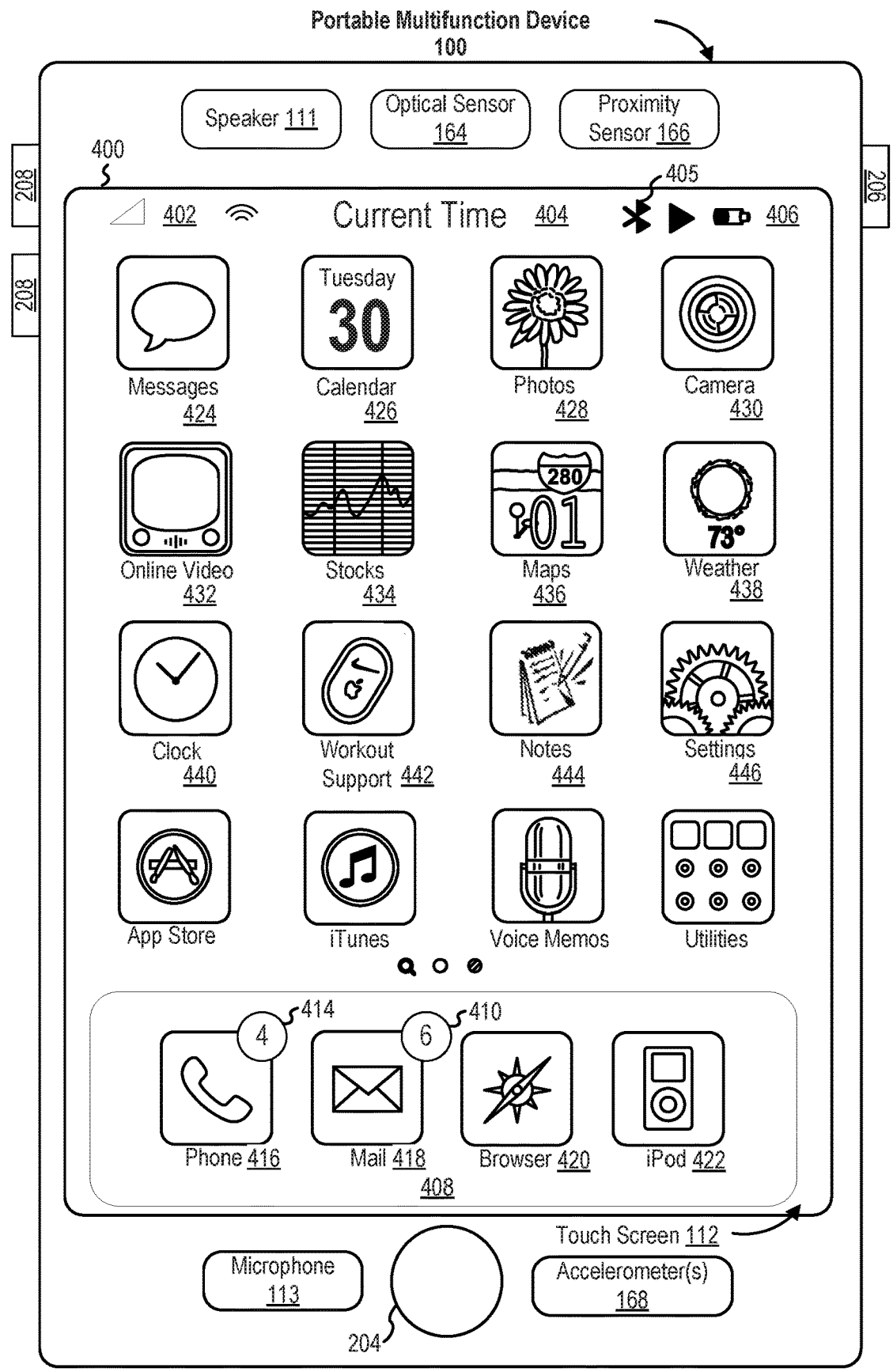
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
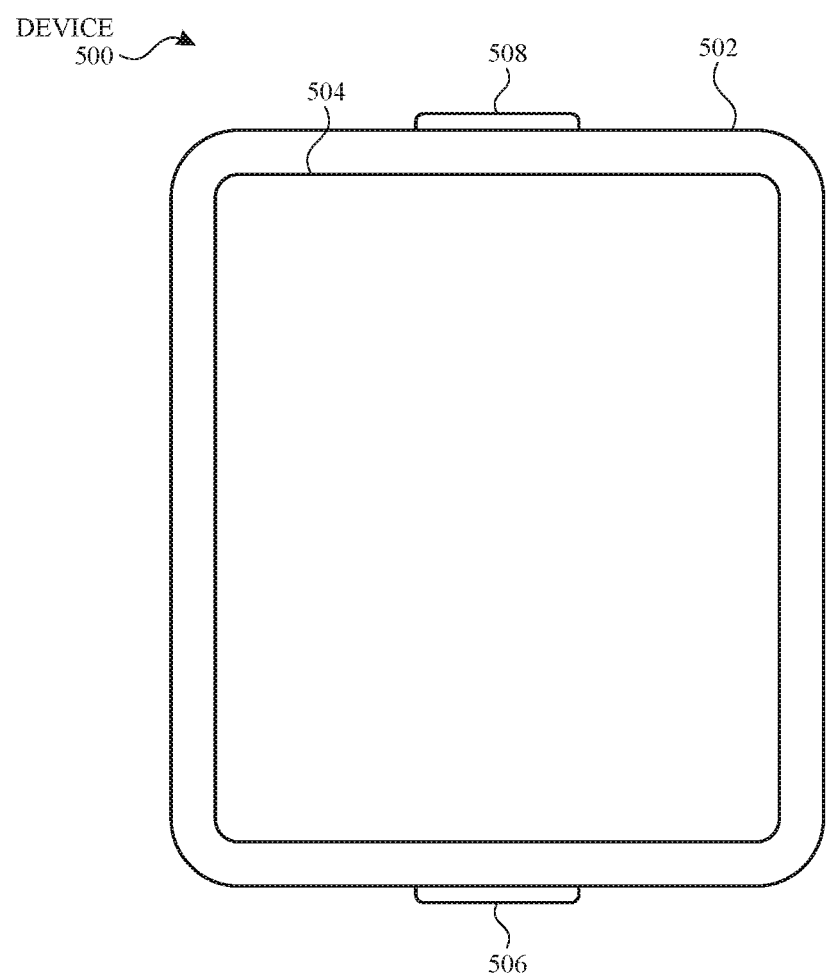
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
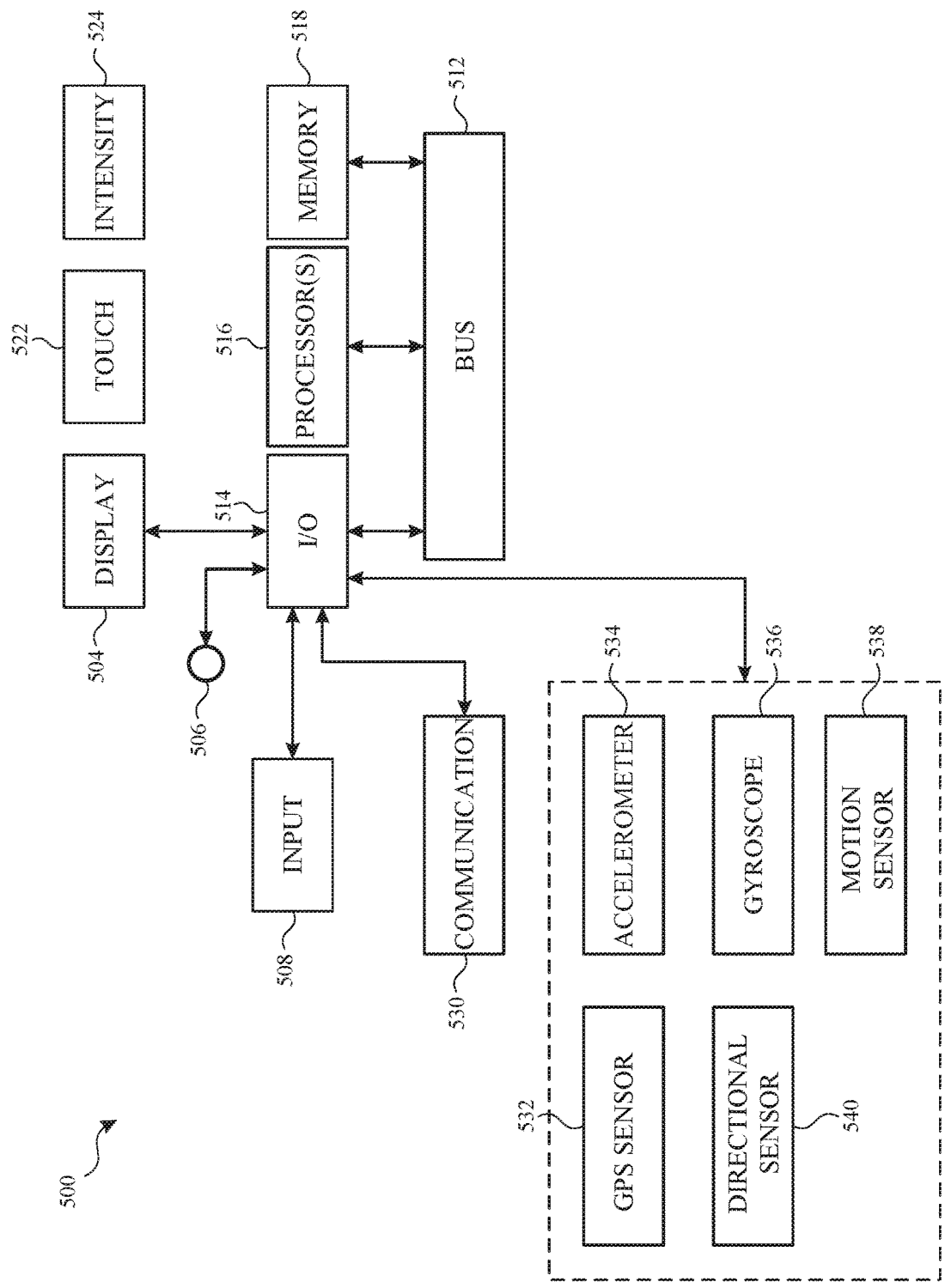
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 800 (FIGS. 8A-8B), 1000 (FIGS. 10A-10D), and 1200 (FIGS. 12A-12B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

Figures 1, 7C:
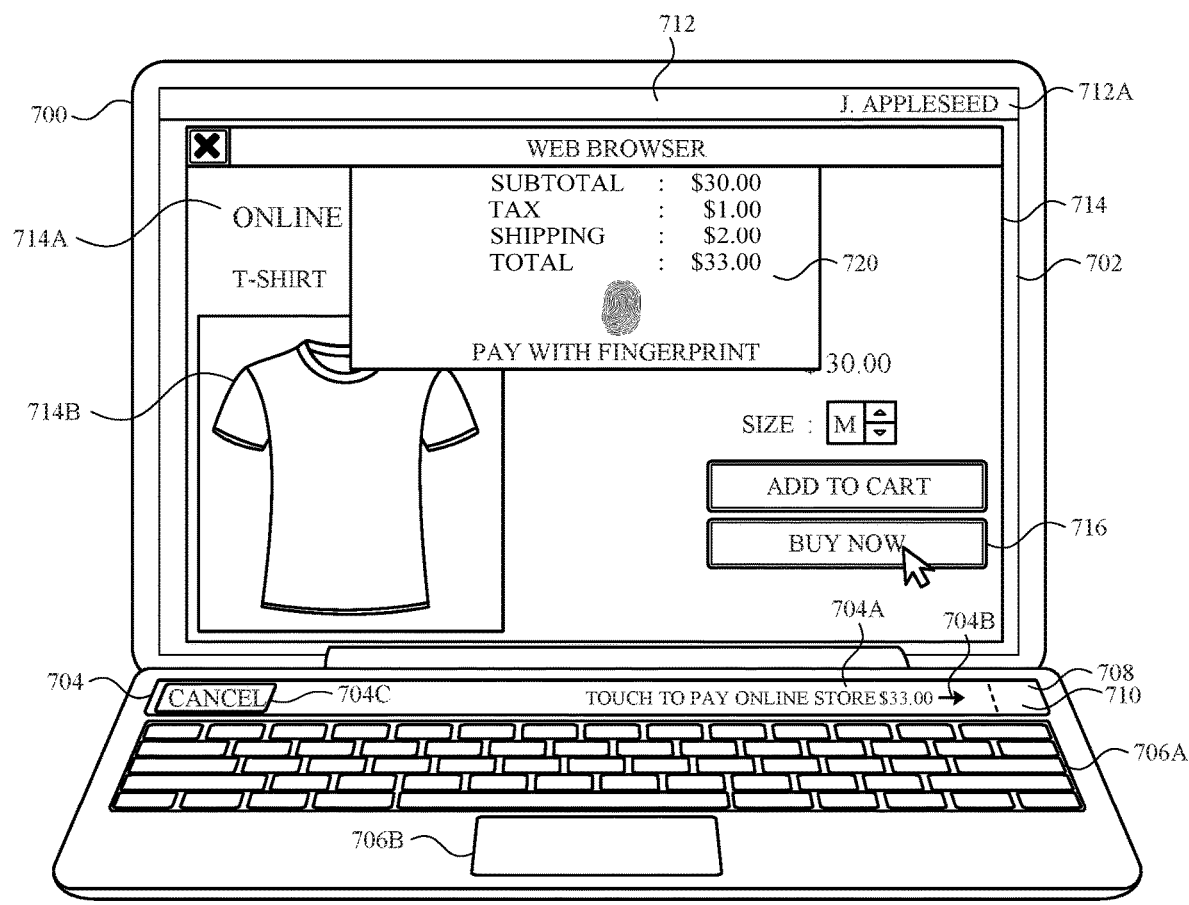
FIGS. 9A-1 to 9E-4 illustrate exemplary devices and user interfaces for causing display of one or more steps to be taken to enable an input device for user input, using an electronic device, in accordance with some embodiments.
Figures 2, 7C:
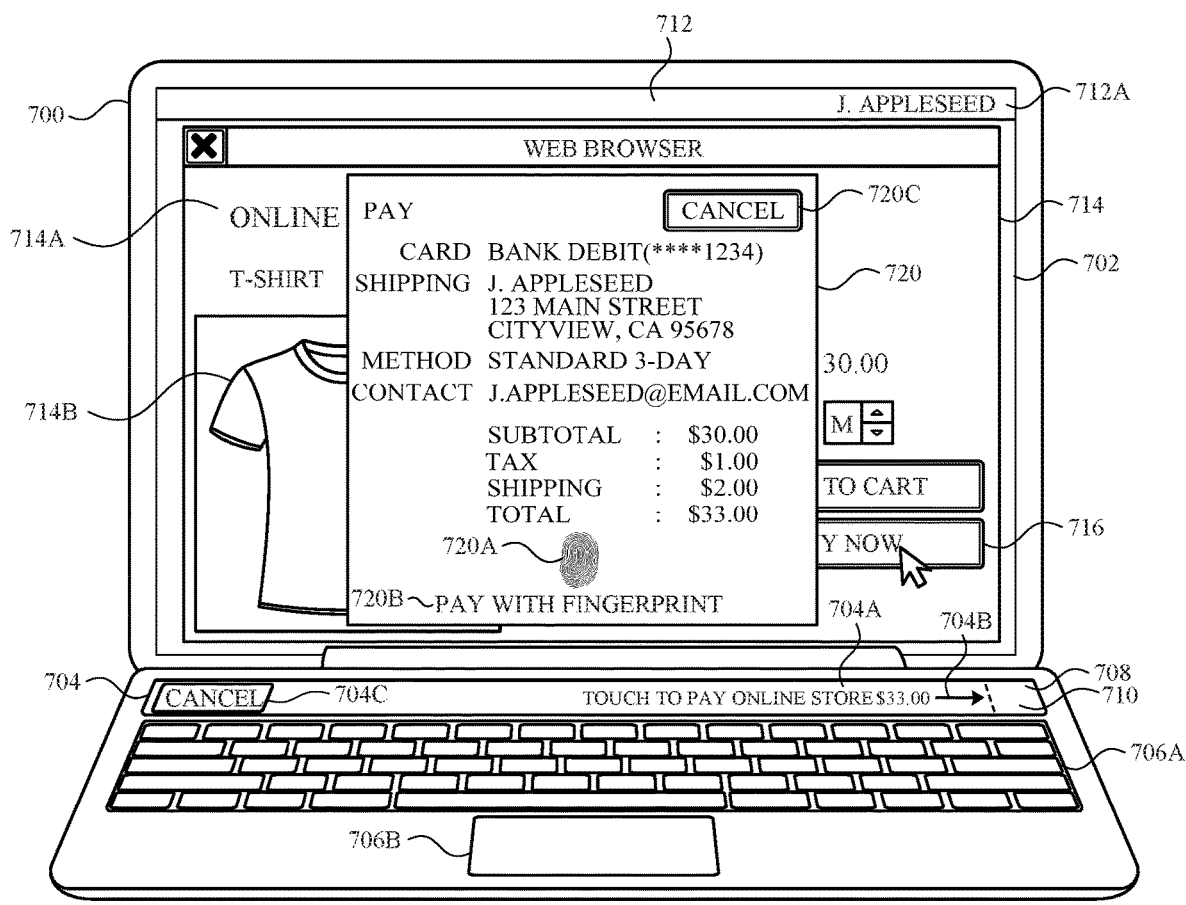
Figures 3, 7C:
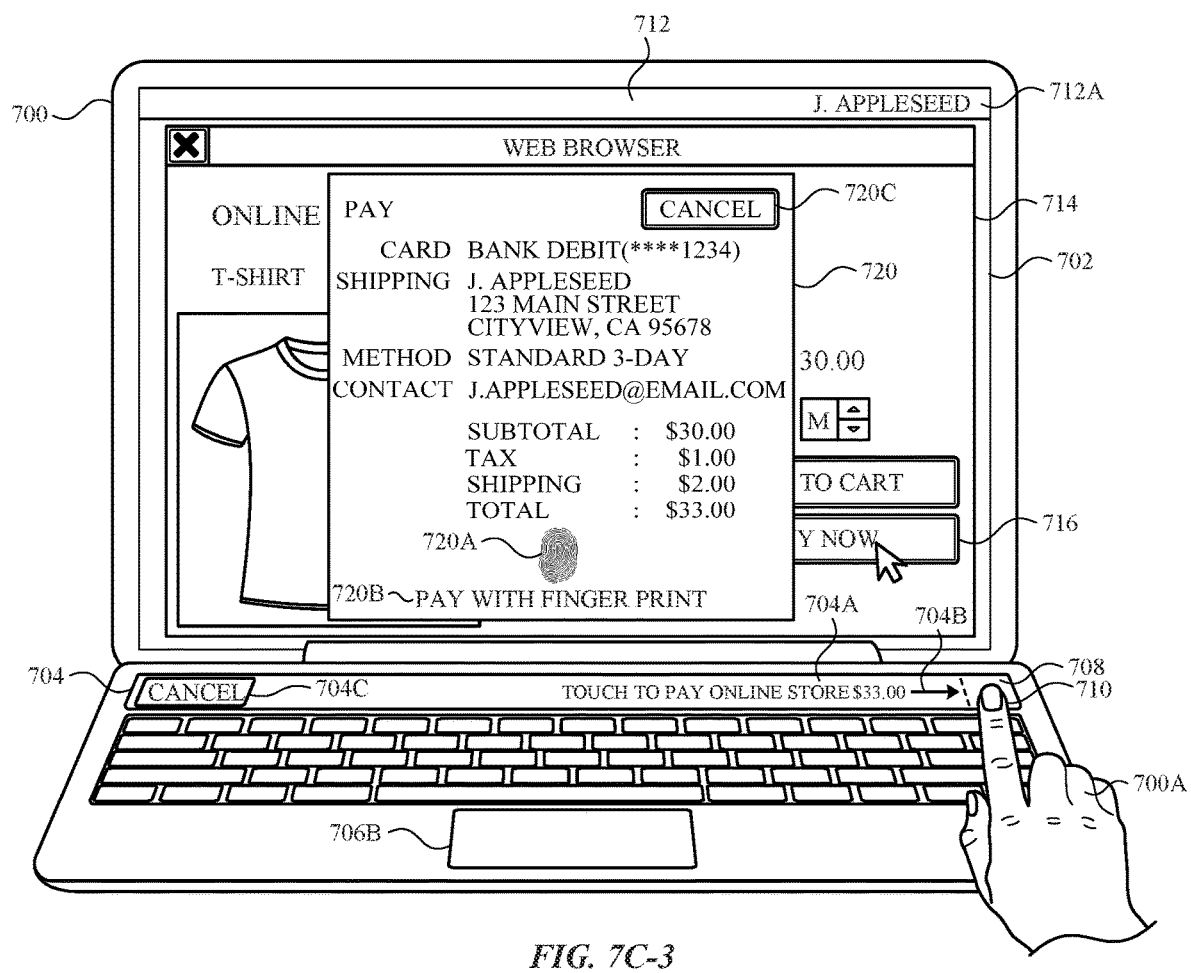
Figures 4, 7C:
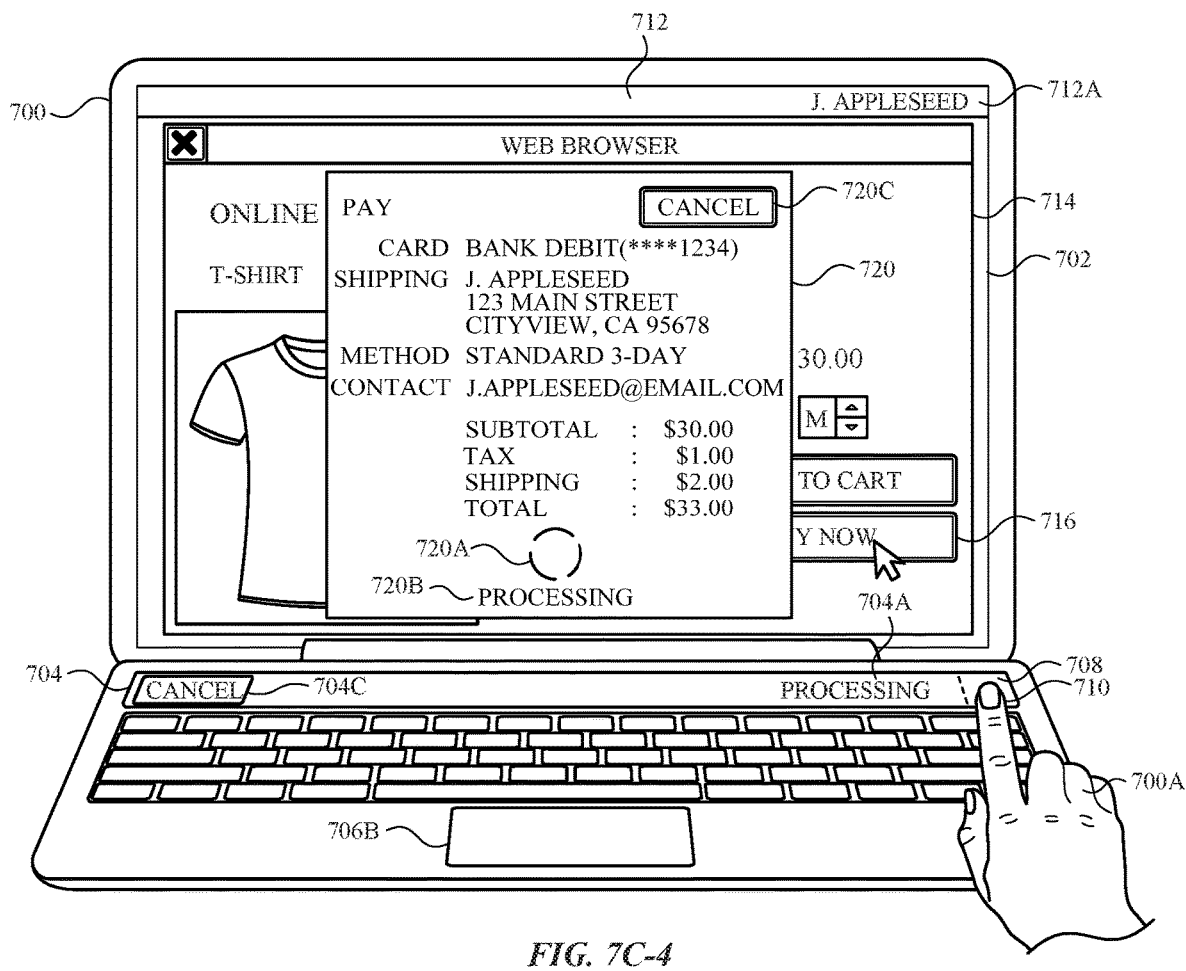
Figures 5, 7C:
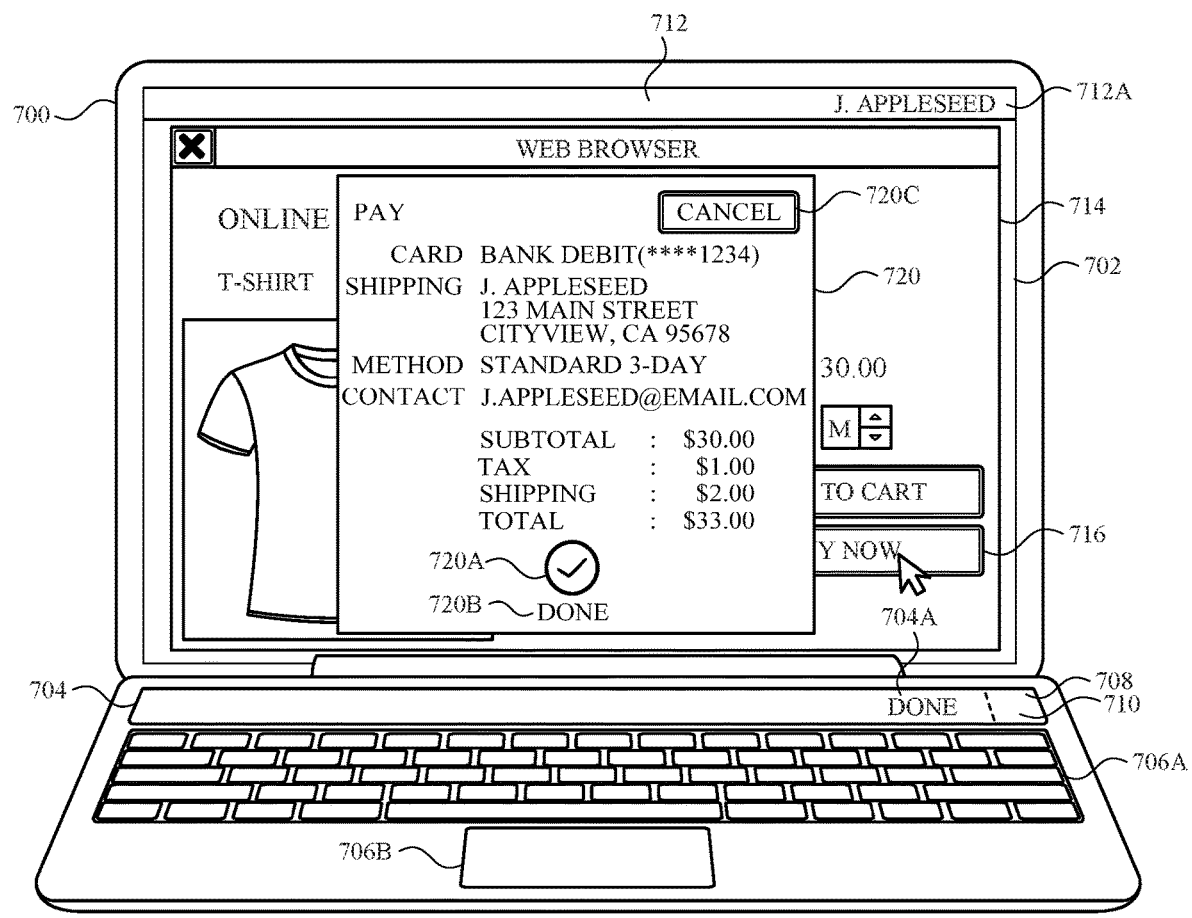
Figures 6, 7C:
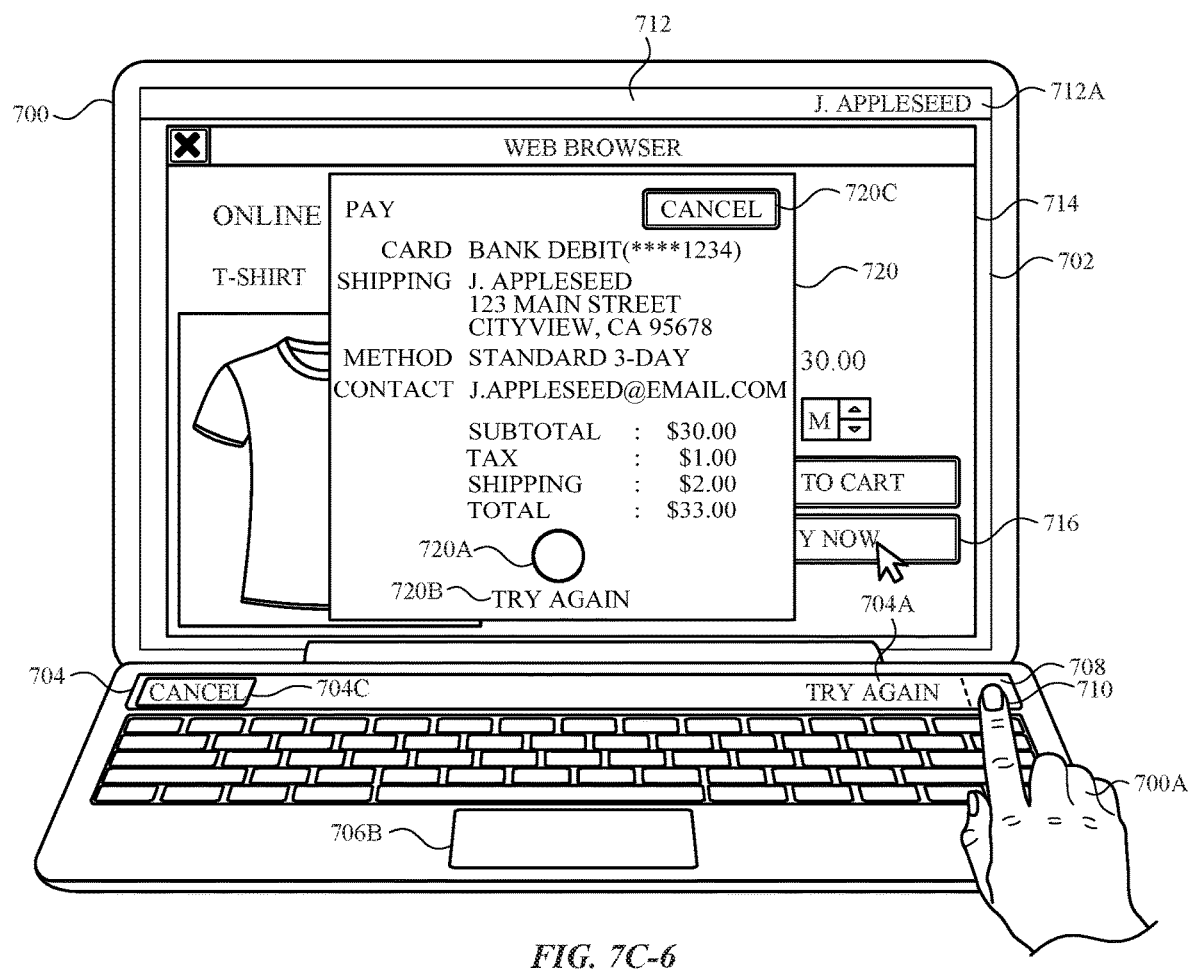
Figure 8A:
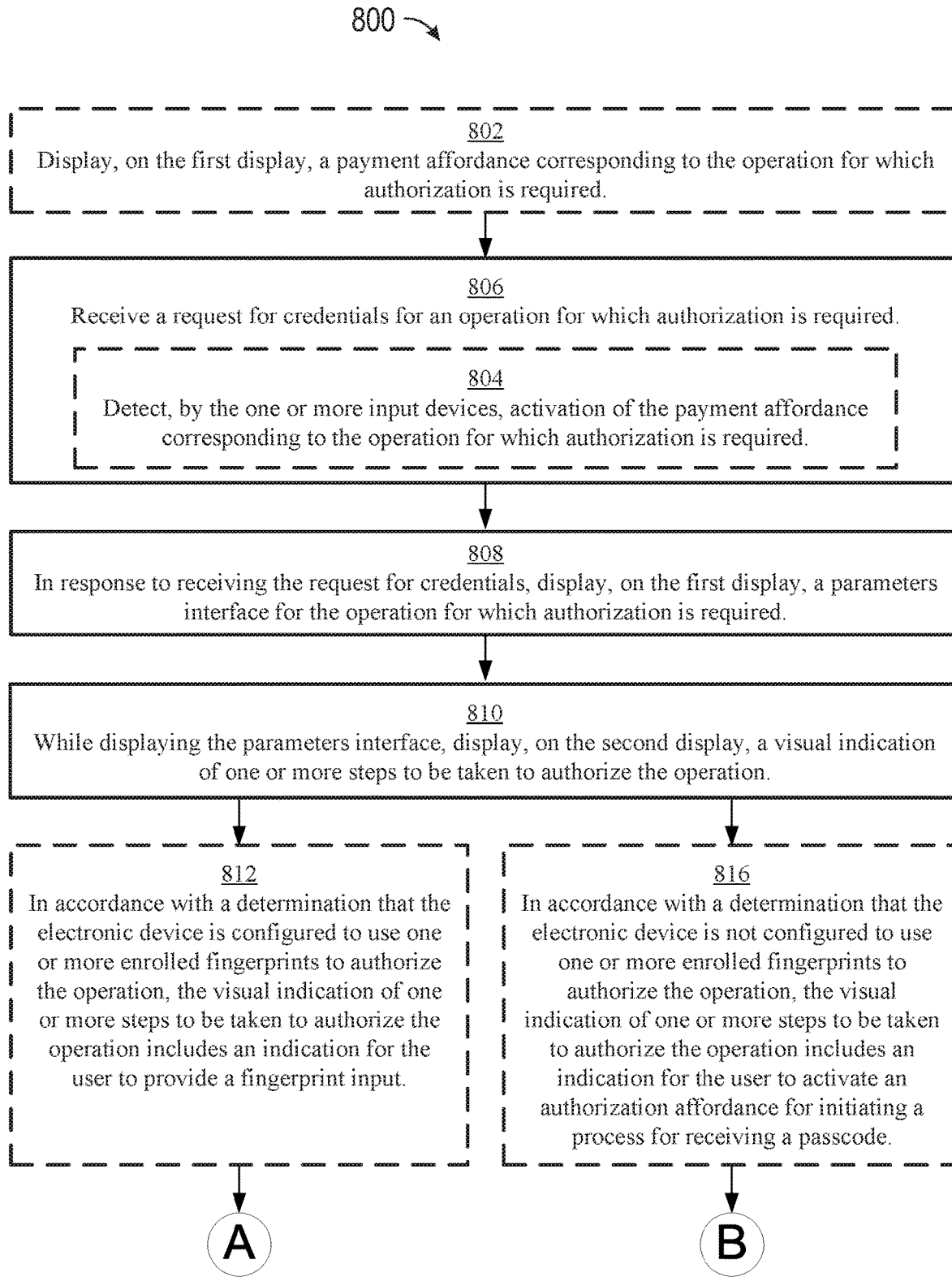
FIGS. 8A-8B are a flow diagram illustrating methods for authorizing release of credentials for use in an operation for which authorization is required using an electronic device, in accordance with some embodiments
Figure 8B:
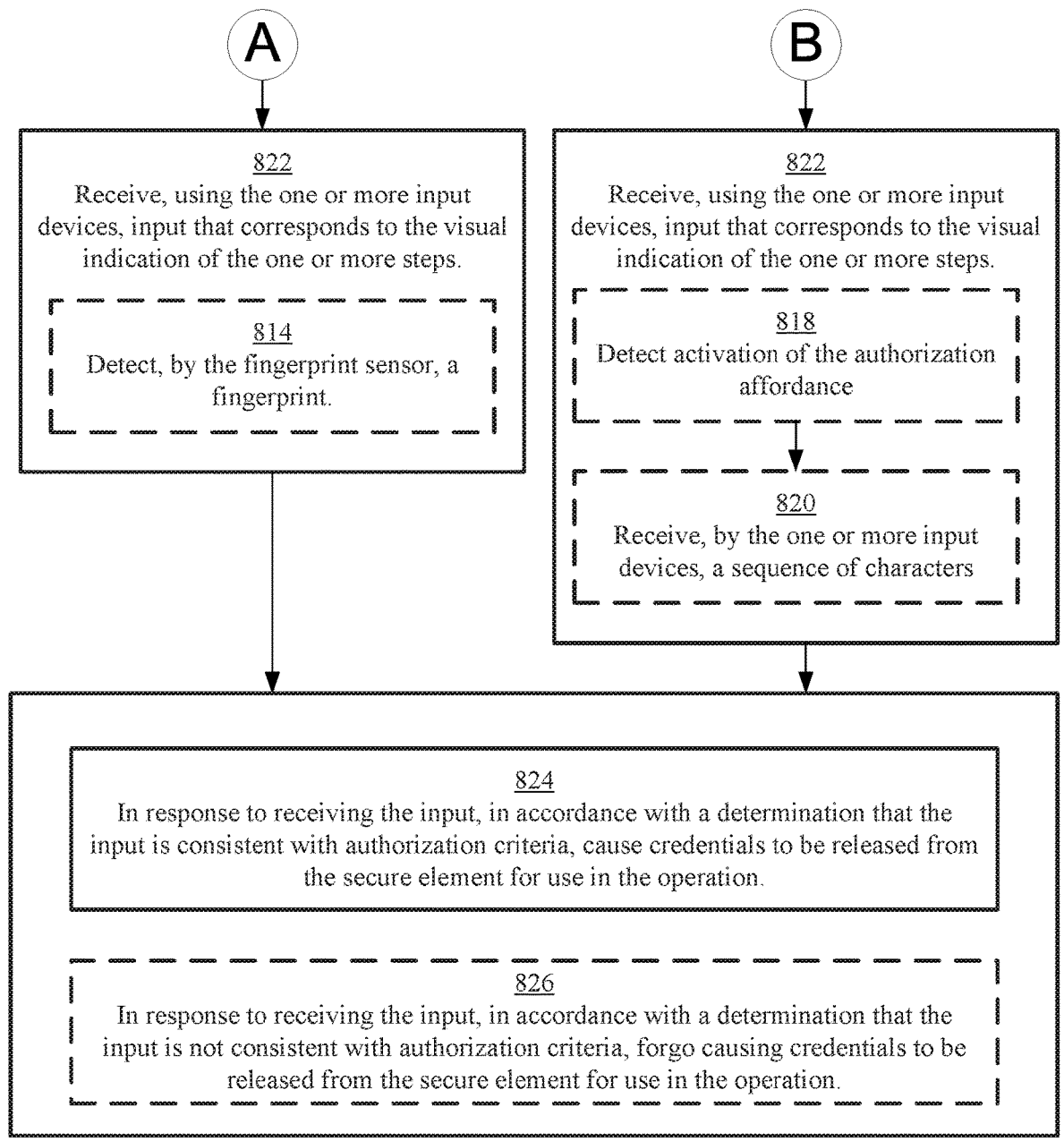

As used here, the term "affordance" refers to a user-interactive graphical user interface object that is, optionally, displayed on the display screen of devices 100, 300, and/or 500 (FIGS. 1, 3, and 5). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j / \Sigma D_i)$, where $D_j$ is the distance of the respective contact j to the center of force, and $\Sigma D_i$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

FIGS. 5I-5N illustrate exemplary user interfaces for displaying application-specific affordances on a dynamically updated touch screen display in accordance with some embodiments. These embodiments of user interfaces ("UIs") and associated processes may be implemented by a portable computing system (e.g., portable computing system 100 illustrated in FIGS. 1A-1B of cross-referenced U.S. Provisional Patent Application Ser. No. 62/368,988, portions of which are included in Appendix B) or a desktop computing system (e.g., desktop computing system 200 illustrated in FIGS. 2A-2D of cross-referenced U.S. Provisional Patent Application Ser. No. 62/368,988, portions of which are included in Appendix B). One of ordinary skill in the art will appreciate that the following user interfaces are merely examples. Moreover, one of ordinary skill in the art will appreciate that additional affordances and/or user interface elements, or that fewer affordances and/or user interface elements may be used in practice.

Figure 5I:
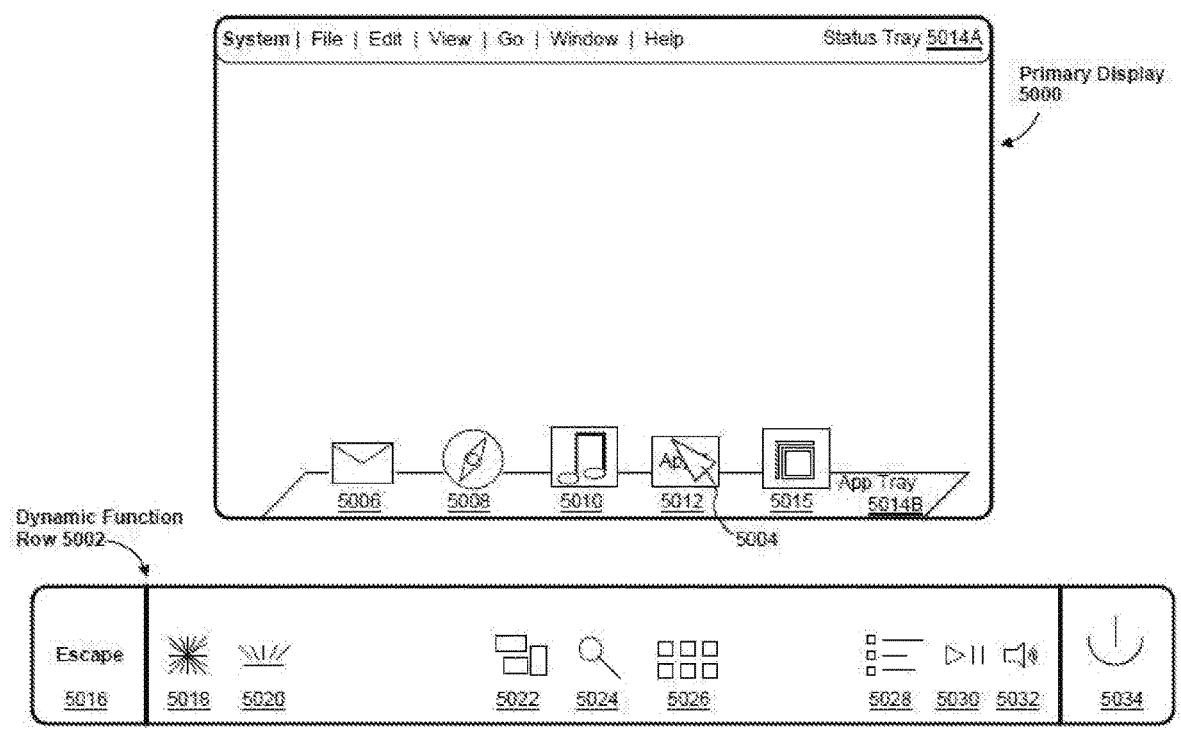
FIGS. 5I-5N illustrate exemplary user interfaces for updating a dynamic input and output device, in accordance with some embodiments.

FIG. 5I illustrates primary display 5000 displaying a status tray 5014A indicating that the system (i.e., the operating system) is currently in focus, and an application (app) tray 5014B with a plurality of executable/selectable application icons including: a mail application icon 5006, a web browser application icon 5008, a media player application icon 5010, an application icon 5012, and a photo application icon 5015. In some embodiments, status tray 5014A indicates an application that is currently running in the foreground and also includes a plurality of menus (e.g., the file, edit, view, go, window, and help menus in FIG. 5I) each including a set of corresponding controls for the application. FIG. 5I also illustrates primary display 5000 displaying cursor 5004 at a location correspon30ding to application icon 5012.

FIG. 5I further illustrates dynamic function row 5002 (e.g., a touch-sensitive display) displaying a plurality of affordances based on the current focus of primary display 5000 (i.e., the operating system because no application windows are open). For example, in FIG. 5I, the system/operating system is currently in focus on primary display 5000. In FIG. 5I, dynamic function row 5002 includes persistent controls implemented as physical and/or soft keys, including: escape affordance 5016, which, when activated (e.g., via a tap contact), invokes a corresponding function (e.g., exiting an application which is currently in focus on primary display 5000 or pausing a game); and power control 5034, which, when activated (e.g., via a tap contact), causes display of a modal alert on dynamic function row 5002 and/or primary display 5000 for logging out, restarting, or powering-off the system.

In FIG. 5I, dynamic function row 5002 also includes a plurality of system-level affordances, including: brightness affordance 5018 for adjusting the brightness of primary display 5000; brightness affordance 5020 for adjusting the brightness of a set of physical keys 106 (when applicable) and/or the brightness of dynamic function row 5002; exposé affordance 5022, which, when activated (e.g., via a tap contact), causes display of preview windows for active applications on primary display 5000; search affordance 5024 for performing a local search (e.g., for an electronic document) and/or an Internet search; launchpad affordance 5026, which, when activated (e.g., via a tap contact), causes display of default or user-selected widgets and tools on primary display 5000; notifications affordance 5028, which, when activated (e.g., via a tap contact), causes display of a notification center on primary display 5000, including recent messages, notifications, calendar events, and/or the like; play/pause affordance 5030 for initiating playback or pausing playback of media items (e.g., songs, podcasts, videos, and the like); and volume control affordance 5032 for adjusting the volume of a media item being played. For example, when a tap is detected on brightness affordance 5020, dynamic function row 5002 displays a brightness slider for adjusting the brightness of a set of physical keys and/or the brightness of dynamic function row 5002. In some embodiments, the plurality of system-level affordances also include a settings affordance (not shown) for accessing adjusting settings associated with the dynamic function row 5002 such as symbol/icon size, touch detection sensitivity, haptic feedback, audible feedback, animations for change in focus, power modes, and the like.

Figure 5J:
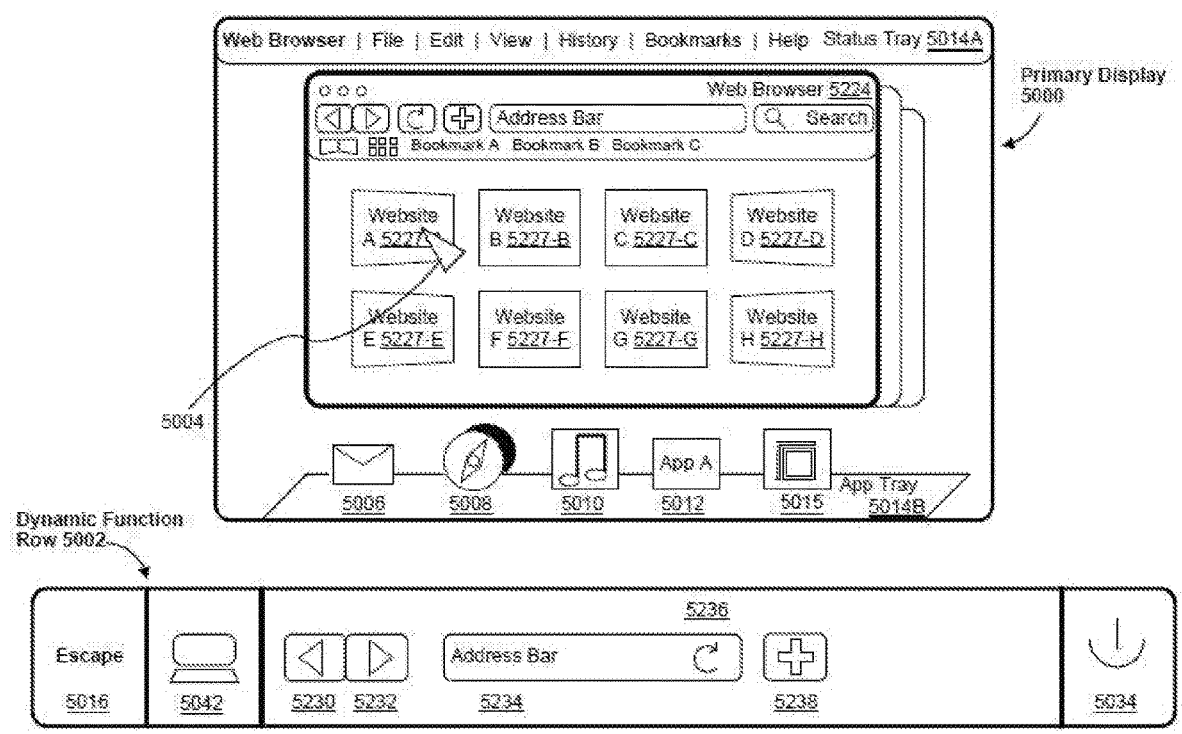

FIG. 5J illustrates primary display 5000 displaying a window 5224 for a web browser application in response to detecting selection of web browser application icon 5008 with cursor 5004. In FIG. 5J, window 5224 includes controls for the web browser application including browsing controls (e.g., last web page, next web page, refresh, and add to favorites), an address bar, a search bar, a show-all bookmarks affordance (e.g., resembling an open book), a show-all open tabs affordance (e.g., a grid of six squares), and affordances for particular bookmarks A, B, and C. In FIG. 5J, window 5224 shows a home interface for the web browser application including a plurality of affordances 5227 linking to favorite websites or most frequently visited websites A-H. In FIG. 5J, window 5224 for application A is in focus on primary display 5000. In FIG. 5J, status tray 5014A indicates that the web browser application is running in the foreground, and app tray 5014B also indicates that the web browser application is running in the foreground based on the shadow behind the web browser application icon 5008.

Figure 5K:
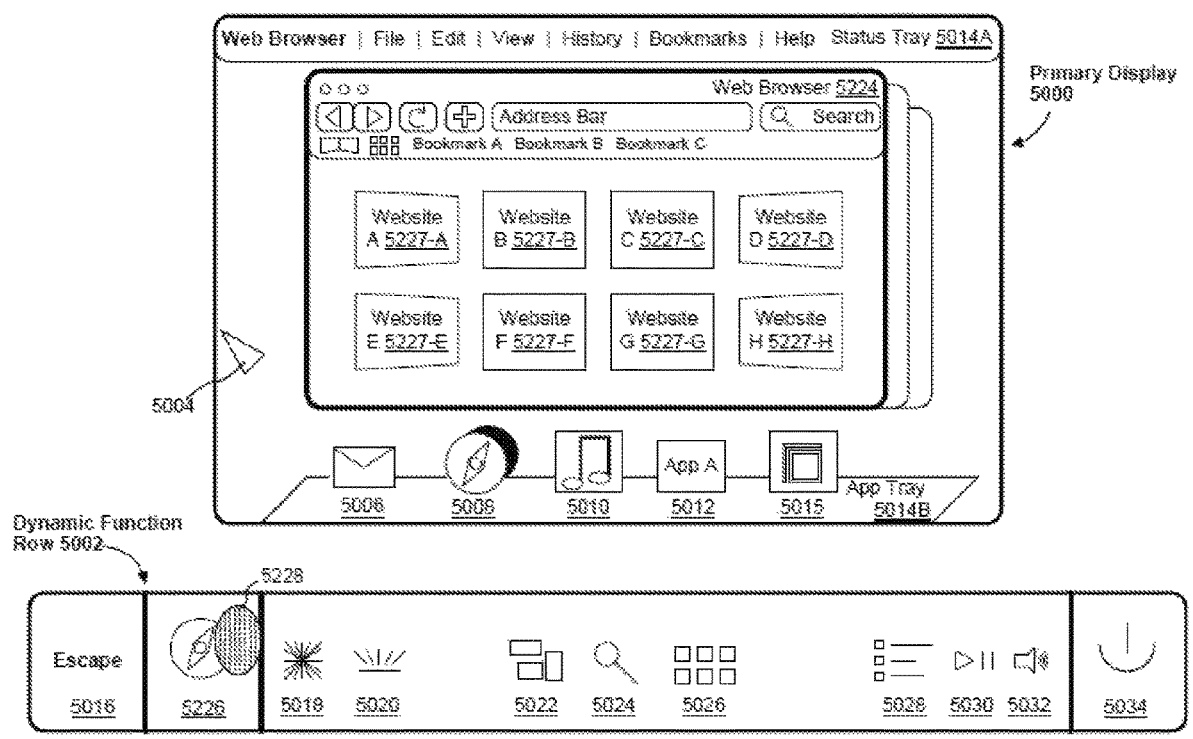

FIG. 5J also illustrates dynamic function row 5002 displaying affordance 5226 in addition to the persistent controls (i.e., affordances 5016 and 5034) and the plurality of system-level affordances (i.e., affordances 5018, 5020, 5022, 5024, 5026, 5028, 5030, and 5032) in response to detecting selection of web browser application icon 5008 with cursor 5004 in FIG. 5I When activated (e.g., via a tap contact), affordance 5226 causes dynamic function row 5002 to display a set of controls for the web browser application (e.g., affordances 5230, 5232, and 5238, and address bar 5234 as shown in FIG. 5K). FIG. 5J further illustrates dynamic function row 5002 receiving and detecting contact 5228 (e.g., a tap contact) at a location corresponding to affordance 5226.

FIG. 5K illustrates dynamic function row 5002 displaying a set of controls for the web browser application in response to detecting selection of affordance 5226 in FIG. 5J. In FIG. 5K, the set of controls for the web browser application includes: affordance 5230 for displaying a web page visited before the one currently displayed by the web browser application within window 5224; affordance 5232 for displaying a web page visited after the one currently displayed by the web browser application within window 5224; affordance 5238 for adding the web page currently displayed by the web browser application to a favorites list or a bookmarks folder; and address bar 5234 for displaying the URL of the web page currently displayed by the web browser application. In FIG. 5K, address bar 5234 also includes a refresh affordance 5236 for refreshing the web page currently displayed by the web browser application. FIG. 5K also illustrates primary display 5000 displaying cursor 5004 at a location corresponding to affordance 5227-A, which links to website A.

Figure 5L:
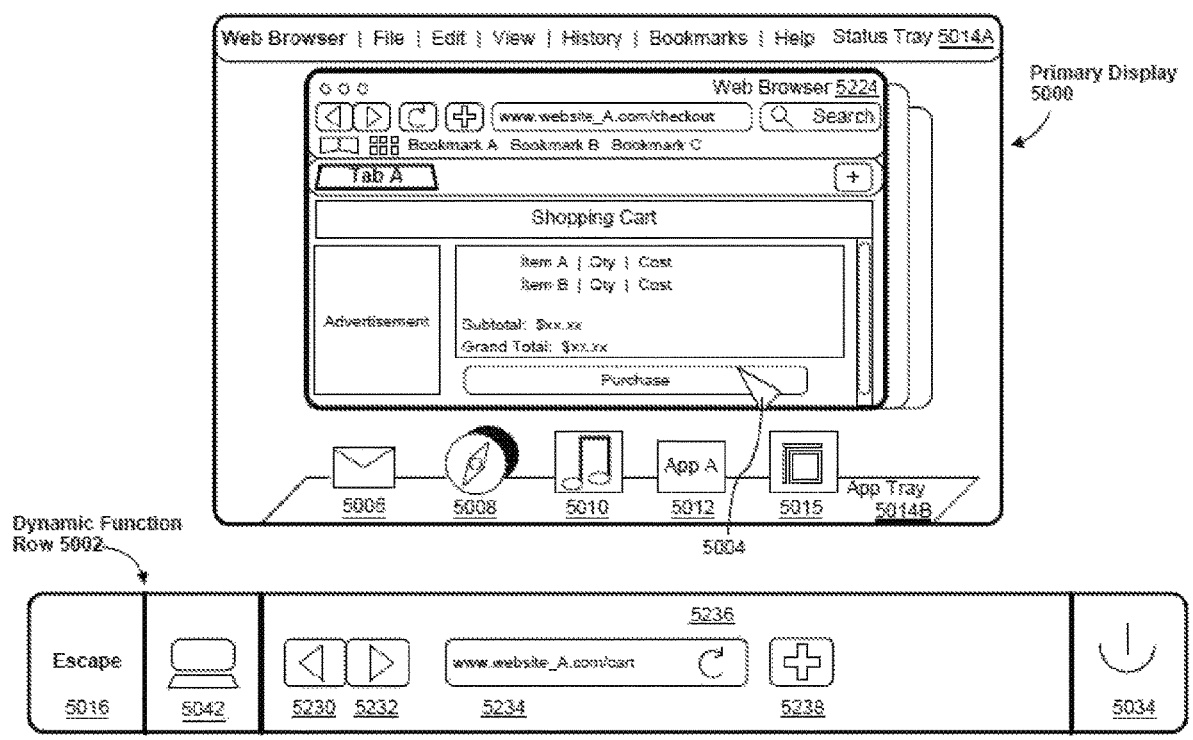

FIG. 5L illustrates primary display 5000 displaying an interface for tab A within window 5224 after detecting selection of affordance 5227-A corresponding to website A with cursor 5004 in FIG. 5K. In FIG. 5L, the interface for tab A is in focus on primary display 5000 as indicated by the thick lines surrounding tab A and the bold text for tab A. In FIG. 5L, the interface for tab A shows a checkout web page of website A (e.g., associated with the URL: www.website_A.com/checkout). The checkout web page corresponds to the user's virtual shopping cart, which includes Items A and B for purchase. FIG. 5L also illustrates primary display 5000 displaying cursor 5004 at a location corresponding to a purchase affordance within window 5224. FIG. 5K further illustrates dynamic function row 5002 displaying the URL (e.g., www.website_A.com/checkout) for the checkout web page of website A in address bar 5234.

Figure 5M:
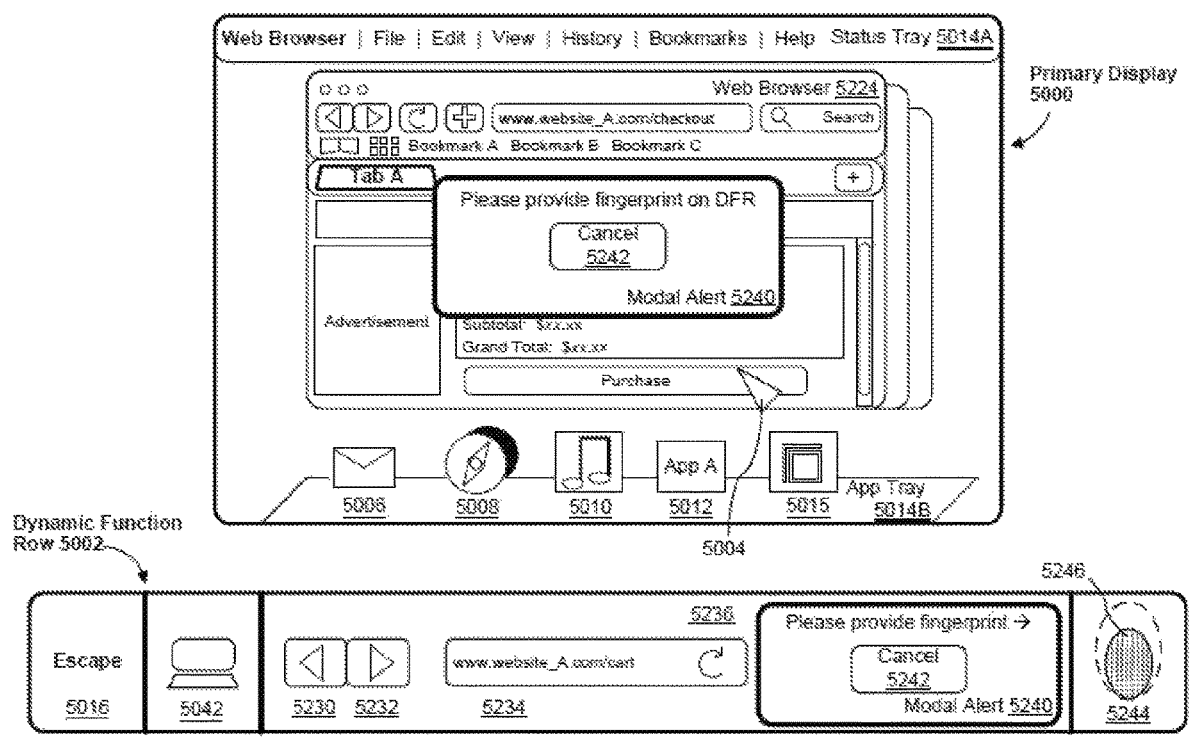

FIG. 5M illustrates primary display 5000 displaying modal alert 5240 overlaid on window 5224 in response to detecting selection of the purchase affordance with cursor 5004 in FIG. 5L. In FIG. 5M, modal alert 5240 displayed on primary display 5000 prompts the user to provide their fingerprint on dynamic function row 5002 and also includes cancel affordance 5242, which, when activated (e.g., via selection by cursor 5004) causes cancelation of the purchase. For example, modal alert 5240 is displayed in accordance with security settings (e.g., default or user-specified) that requires a fingerprint to validate purchases initiated by the system. For example, in some embodiments, primary display 5000 and/or dynamic function row 5002 displays the modal alert prompting the user to provide their fingerprint on dynamic function row 5002 upon logging into the system, when entering a password to access an application or website, when entering a password to decrypt the data stored by the system, when deleting folders and/or data from the system, when taking other destructive actions, and/or the like.

FIG. 5M also illustrates dynamic function row 5002 displaying modal alert 5240 in response to detecting selection of the purchase affordance with cursor 5004 in FIG. 5L. In FIG. 5M, modal alert 5240 displayed on dynamic function row 5002 prompts the user to provide their fingerprint in fingerprint region 5244 of dynamic function row 5002 and also includes cancel affordance 5242, which, when activated (e.g., via a tap contact) causes cancelation of the purchase. In some embodiments, dynamic function row 5002 is configured to detect a fingerprint within fingerprint region 5244 of dynamic function row 5002, which also corresponds to power control 5034. In some embodiments, dynamic function row 5002 is configured to detect a fingerprint at any location within its touch-sensitive area. FIG. 5M further illustrates dynamic function row 5002 receiving and detecting contact 5246 (e.g., a press and hold gesture) within fingerprint region 5244.

Figure 5N:
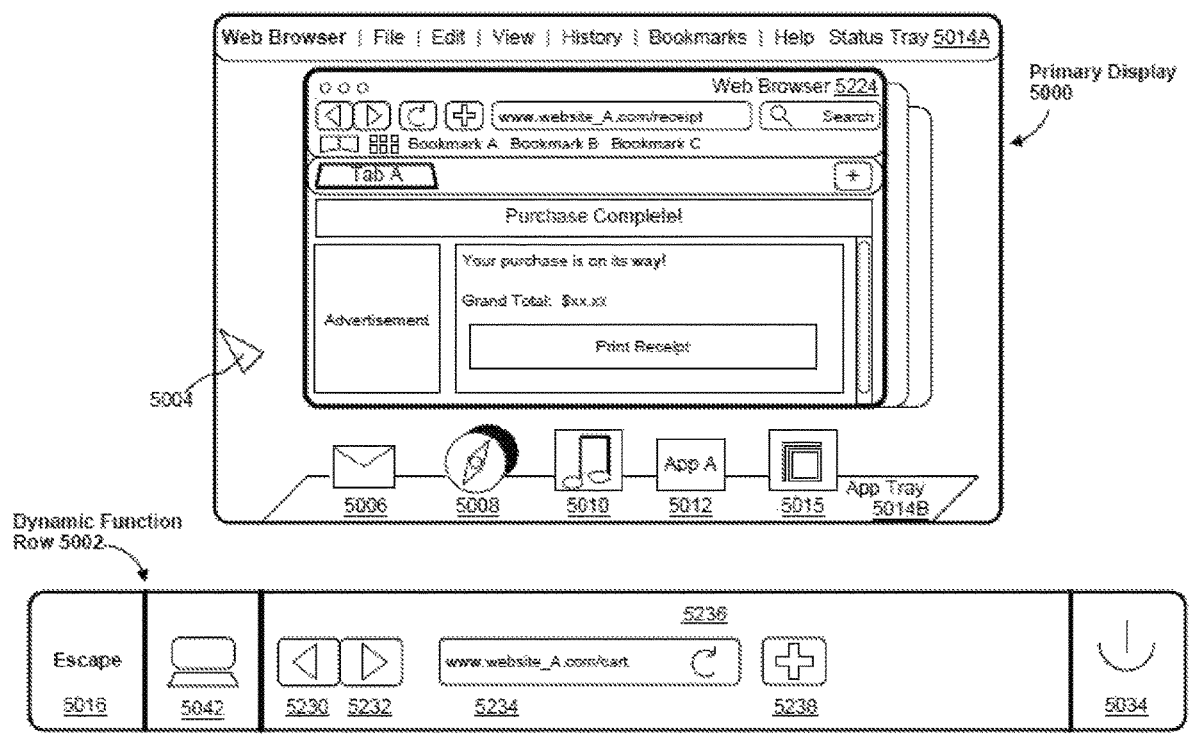

FIG. 5N illustrates primary display 5000 displaying an interface for tab A within window 5224 after detecting contact 5246 within fingerprint region 5244 in FIG. 5M. In FIG. 5N, the interface for tab A shows a receipt web page of website A (e.g., associated with the URL: www.website_A-.com/receipt) indicating that the purchase was completed after validation of the fingerprint provided by the user.

In some examples, the techniques and characteristics described above with reference to FIGS. 5I-5N are incorporated into the techniques described below with reference to FIGS. 7A to 7D-10, 9A-1 to 9E-4, and 11A to 11M-4. In some examples, the primary display (e.g., 5000) described above corresponds to the first display (e.g., 702, 902, 1102) described below. In some examples, the dynamic function row (e.g., 5002) described above corresponds to the second display (e.g., 704, 904, 1104) described below. In some examples, the fingerprint region (e.g., 5244) of the dynamic function row (e.g., 5002) corresponds to the fingerprint sensor (e.g., 710, 910, 1120) described below.

FIG. 6 illustrates exemplary devices connected via one or more communication channels to participate in a transaction in accordance with some embodiments. One or more exemplary electronic devices (e.g., devices 100, 300, and 500) are configured to optionally detect input (e.g., a particular user input, an NFC field) and optionally transmit payment information (e.g., using NFC). The one or more electronic devices optionally include NFC hardware and are configured to be NFC-enabled.

The electronic devices (e.g., devices 100, 300, and 500) are optionally configured to store payment account information associated with each of one or more payment accounts. Payment account information includes, for example, one or more of: a person's or company's name, a billing address, a login, a password, an account number, an expiration date, a security code, a telephone number, a bank associated with the payment account (e.g., an issuing bank), and a card network identifier. In some examples, payment account information includes include an image, such as a picture of a payment card (e.g., taken by the device and/or received at the device). In some examples, the electronic devices receive user input including at least some payment account information (e.g., receiving user-entered credit, debit, account, or gift card number and expiration date). In some examples, the electronic devices detect at least some payment account information from an image (e.g., of a payment card captured by a camera sensor of the device). In some examples, the electronic devices receive at least some payment account information from another device (e.g., another user device or a server). In some examples, the electronic device receives payment account information from a server associated with another service for which an account for a user or user device previously made a purchase or identified payment account data (e.g., an app for renting or selling audio and/or video files).

In some embodiments, a payment account is added to an electronic device (e.g., device 100, 300, and 500), such that payment account information is securely stored on the electronic device. In some examples, after a user initiates such process, the electronic device transmits information for the payment account to a transaction-coordination server, which then communicates with a server operated by a payment network for the account (e.g., a payment server) to ensure a validity of the information. The electronic device is optionally configured to receive a script from the server that allows the electronic device to program payment information for the account onto the secure element.

In some embodiments, communication among electronic devices 100, 300, and 500 facilitates transactions (e.g., generally or specific transactions). For example, a first electronic device (e.g., 100) can serve as a provisioning or managing device, and can send notifications of new or updated payment account data (e.g., information for a new account, updated information for an existing account, and/or an alert pertaining to an existing account) to a second electronic device (e.g., 500). In another example, a first electronic device (e.g., 100) can send data to a second election device, wherein the data reflects information about payment transactions facilitated at the first electronic device. The information optionally includes one or more of: a payment amount, an account used, a time of purchase, and whether a default account was changed. The second device (e.g., 500) optionally uses such information to update a default payment account (e.g., based on a learning algorithm or explicit user input).

Electronic devices (e.g., 100, 300, 500) are configured to communicate with each other over any of a variety of networks. For example, the devices communicate using a Bluetooth connection 608 (e.g., which includes a traditional Bluetooth connection or a Bluetooth Low Energy connection) or using a WiFi network 606. Communications among user devices are, optionally, conditioned to reduce the possibility of inappropriately sharing information across devices. For example, communications relating to payment information requires that the communicating devices be paired (e.g., be associated with each other via an explicit user interaction) or be associated with a same user account.

In some embodiments, an electronic device (e.g., 100, 300, 500) is used to communicate with a point-of-sale (POS) payment terminal 600, which is optionally NFC-enabled. The communication optionally occurs using a variety of communication channels and/or technologies. In some examples, electronic device (e.g., 100, 300, 500) communicates with payment terminal 600 using an NFC channel 610. In some examples, payment terminal 600 communicates with an electronic device (e.g., 100, 300, 500) using a peer-to-peer NFC mode. Electronic device (e.g., 100, 300, 500) is optionally configured transmit a signal to payment terminal 600 that includes payment information for a payment account (e.g., a default account or an account selected for the particular transaction).

In some embodiments, proceeding with a transaction includes transmitting a signal that includes payment information for an account, such as a payment account. In some embodiments, proceeding with the transaction includes reconfiguring the electronic device (e.g., 100, 300, 500) to respond as a contactless payment card, such as an NFC-enabled contactless payment card, and then transmitting credentials of the account via NFC, such as to payment terminal 600. In some embodiments, subsequent to transmitting credentials of the account via NFC, the electronic device reconfigures to not respond as a contactless payment card (e.g., requiring authorization before again reconfigured to respond as a contactless payment card via NFC).

In some embodiments, generation of and/or transmission of the signal is controlled by a secure element in the electronic device (e.g., 100, 300, 500). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, and or detection of a gesture or movement (e.g., rotation or acceleration). In some examples, if a communication channel (e.g., an NFC communication channel) with another device (e.g., payment terminal 600) is established within a defined time period from detection of the input, the secure element releases payment information to be transmitted to the other device (e.g., payment terminal 600). In some examples, the secure element is a hardware component that controls release of secure information. In some examples, the secure element is a software component that controls release of secure information.

In some embodiments, protocols related to transaction participation depend on, for example, device types. For example, a condition for generating and/or transmitting payment information can be different for a wearable device (e.g., device 500) and a phone (e.g., device 100). For example, a generation and/or transmission condition for a wearable device includes detecting that a button has been pressed (e.g., after a security verification), while a corresponding condition for a phone does not require button-depression and instead requires detection of particular interaction with an application. In some examples, a condition for transmitting and/or releasing payment information includes receiving particular input on each of multiple devices. For example, release of payment information optionally requires detection of a fingerprint and/or passcode at the device (e.g., device 100) and detection of a mechanical input (e.g., button press) on another device (e.g., device 500).

Payment terminal 600 optionally uses the payment information to generate a signal to transmit to a payment server 604 to determine whether the payment is authorized. Payment server 604 optionally includes any device or system configured to receive payment information associated with a payment account and to determine whether a proposed purchase is authorized. In some examples, payment server 604 includes a server of an issuing bank. Payment terminal 600 communicates with payment server 604 directly or indirectly via one or more other devices or systems (e.g., a server of an acquiring bank and/or a server of a card network).

Payment server 604 optionally uses at least some of the payment information to identify a user account from among a database of user accounts (e.g., 602). For example, each user account includes payment information. An account is, optionally, located by locating an account with particular payment information matching that from the POS communication. In some examples, a payment is denied when provided payment information is not consistent (e.g., an expiration date does not correspond to a credit, debit or gift card number) or when no account includes payment information matching that from the POS communication.

In some embodiments, data for the user account further identifies one or more restrictions (e.g., credit limits); current or previous balances; previous transaction dates, locations and/or amounts; account status (e.g., active or frozen), and/or authorization instructions. In some examples, the payment server (e.g., 604) uses such data to determine whether to authorize a payment. For example, a payment server denies a payment when a purchase amount added to a current balance would result in exceeding an account limit, when an account is frozen, when a previous transaction amount exceeds a threshold, or when a previous transaction count or frequency exceeds a threshold.

In some embodiments, payment server 604 responds to POS payment terminal 600 with an indication as to whether a proposed purchase is authorized or denied. In some examples, POS payment terminal 600 transmits a signal to the electronic device (e.g., 100, 300, 500) to identify the result. For example, POS payment terminal 600 sends a receipt to the electronic device (e.g., 100, 300, 500) when a purchase is authorized (e.g., via a transaction-coordination server that manages a transaction app on the user device). In some instances, POS payment terminal 600 presents an output (e.g., a visual or audio output) indicative of the result. Payment can be sent to a merchant as part of the authorization process or can be subsequently sent.

In some embodiments, the electronic device (e.g., 100, 300, 500) participates in a transaction that is completed without involvement of POS payment terminal 600. For example, upon detecting that a mechanical input has been received, a secure element in the electronic device (e.g., 100, 300, 500) releases payment information to allow an application on the electronic device to access the information (e.g., and to transmit the information to a server associated with the application).

In some embodiments, the electronic device (e.g., 100, 300, 500) is in a locked state or an unlocked state. In the locked state, the electronic device is powered on and operational but is prevented from performing a predefined set of operations in response to the user input. The predefined set of operations may include navigation between user interfaces, activation or deactivation of a predefined set of functions, and activation or deactivation of certain applications. The locked state may be used to prevent unintentional or unauthorized use of some functionality of the electronic device or activation or deactivation of some functions on the electronic device. In the unlocked state, the electronic device 100 is power on and operational and is not prevented from performing at least a portion of the predefined set of operations that cannot be performed while in the locked state.

When the device is in the locked state, the device is said to be locked. In some embodiments, the device in the locked state may respond to a limited set of user inputs, including input that corresponds to an attempt to transition the device to the unlocked state or input that corresponds to powering the device off.

In some examples, a secure element is a hardware component (e.g., a secure microcontroller chip) configured to securely store data or an algorithm. In some examples, the secure element provides (or releases) payment information (e.g., an account number and/or a transaction-specific dynamic security code). In some examples, the secure element provides (or releases) the payment information in response to the device receiving authorization, such as a user authentication (e.g., fingerprint authentication; passcode authentication; detecting double-press of a hardware button when the device is in an unlocked state, and optionally, while the device has been continuously on a user's wrist since the device was unlocked by providing authentication credentials to the device, where the continuous presence of the device on the user's wrist is determined by periodically checking that the device is in contact with the user's skin). For example, the device detects a fingerprint at a fingerprint sensor (e.g., a fingerprint sensor integrated into a button) of the device. The device determines whether the fingerprint is consistent with a registered fingerprint. In accordance with a determination that the fingerprint is consistent with the registered fingerprint, the secure element provides (or releases) payment information. In accordance with a determination that the fingerprint is not consistent with the registered fingerprint, the secure element forgoes providing (or releasing) payment information.

Attention is now directed towards embodiments of user interfaces ("UI") and associated processes that are implemented on an electronic device, such as portable multifunction device 100, device 300, or device 500, or portable computing system 100 illustrated in FIGS. 1A-1B of cross-referenced U.S. Provisional Patent Application Ser. No. 62/368,988, portions of which are included in Appendix B, or desktop computing system 200 illustrated in FIGS. 2A-2D of cross-referenced U.S. Provisional Patent Application Ser. No. 62/368,988, portions of which are included in Appendix B.

FIGS. 7A to 7D-10 illustrate exemplary user interfaces for managing access to credentials for use in an operation using an electronic device 700. In some embodiments, the electronic device 700 is the portable multifunction device 100, device 300, device 500, or the portable computing system 100 illustrated in FIGS. 1A-1B of cross-referenced U.S. Provisional Patent Application Ser. No. 62/368,988, portions of which are included in Appendix B, (e.g., a laptop computer) described above. In some embodiments, the electronic device 700 is the desktop computing system 200 illustrated in FIGS. 2A-2D of cross-referenced U.S. Provisional Patent Application Ser. No. 62/368,988, portions of which are included in Appendix B, described above. The electronic device 700 has a first display 702, a second display 704 (that is different from the first display), one or more input devices (e.g., a touch-sensitive surface), and a secure element (e.g., for securely storing credentials, such as transaction credentials). The exemplary user interfaces depicted in these figures are used to illustrate the processes described below, including the processes in FIGS. 8A-8B.

In some embodiments, the first display 702 of the electronic device 700 is a primary display of the device. The second display 704 of the electronic device 700 is a dynamic function row, such as the dynamic function row 5002 described with reference to FIGS. 5I-5N. In some embodiments, the second display 704 (e.g., the dynamic function row) of the electronic device 700 is separate from a physical keyboard 706A of the device (e.g., the second display 704 is included as part of a peripheral input mechanism). In some embodiments, the second display 704 is integrated with another input device, such as a touchpad 706B.

The electronic device 700 includes a secure element that stores credentials (e.g., transaction credentials) for an associated account (e.g., a user account of a user of the device) registered on the device, where the account is enabled to authorize the secure element to store and release credentials. In some examples, the credentials comprise payment information (e.g., credit card information, such as a credit card number and/or expiration date) that is stored in the secure element of the electronic device 700. In some examples, authorization information (e.g., an enrolled fingerprint) is used to cause the secure element to release the credentials.

In some embodiments, the second display 704 (e.g., the dynamic function row) is paired with the secure element, and thus the second display 704 is capable of and/or is authorized to cause the secure element to release credentials stored in the secure element. For example, the secure element and the second display 704 are paired during the manufacturing process of the electronic device 700. When the second display 704 is paired with the secure element, replacement of either the second display 704 or the secure element from the electronic device 700 requires that the components be re-paired to again enable the secure element to store and to release credentials (e.g., transaction credentials). In some embodiments, the second display 704 is paired with the secure element and the first display 702 is not paired with the secure element, and thus the second display 704 is capable of and/or is authorized to cause the secure element to release credentials stored in the secure element while the first display 702 is not capable of and is not authorized to release credentials stored in the secure element.

The electronic device 700 includes a fingerprint sensor 710. In some embodiments, the fingerprint sensor 710 is located adjacent to the second display 704, as depicted in FIG. 7A. In some embodiments, the fingerprint sensor 710 is a capacitive fingerprint reader. In some embodiments, the fingerprint sensor 710 is integrated into a hardware input element 708. In some embodiments, the hardware input element 708 is an input element that functions as both a power button (e.g., to power on and power off the electronic device 700) and a fingerprint sensor (as described below with respect to FIGS. 11A to 11M-4 and 12A to 12B). In some examples, the hardware input element 708 is an input element that is sensitive to changes in input intensity and that activates when pressed. In some examples, the hardware input element 708 is an intensity-sensitive button with integrated intensity sensors that activates when an intensity (e.g., a characteristic intensity) of an input on the intensity-sensitive button exceeds an activation threshold. In some embodiments, the hardware input element 708 forms a continuous touch-sensitive region with the second display 704.

FIGS. 7A-7B illustrate a user interface 712 of the electronic device 700 as a user is seeking to perform an operation (e.g., a payment transaction) for which authorization is required. In FIG. 7A, the electronic device 700 is displaying, on the foreground of the user interface 712 displayed on the first display 702, a browser application 714. In some examples, the user interface 712 includes an indication 712A of an account (e.g., the name of a user associated with the account, which, in this example, is "J. Appleseed") that is actively logged into the electronic device 700. For example, the user (e.g., "J. Appleseed") is browsing the Internet using the browser application 714 in order to purchase an item 714B (a t-shirt) from an online store 714A. In this example, the actively logged-in account (e.g., the account of "J. Appleseed") is an account that is enabled to authorize the secure element to release credentials.

The electronic device 700 displays a payment affordance 716 in the browser application 714 that is being used to perform the operation (e.g., perform the payment transaction). For example, as illustrated in FIG. 7A, the electronic device 700 displays, on the browser application 714, a payment affordance 716 (e.g., a "Buy Now" affordance) corresponding to the operation (e.g., the payment transaction). The electronic device 700 proceeds with the operation (e.g., proceeds with the payment transaction involving the purchase of the item 714B) when it detects selection of the payment affordance 716. In some embodiments, the payment affordance 716 is a part of, and controlled by, the application being used to perform the operation (in this example, the browser application). In some embodiments, the payment affordance 716 is controlled by the operating system of the electronic device 700, separately from the application being used to perform the operation.

FIG. 7B illustrates the electronic device 700 as the user selects the payment affordance 716 to proceed with the operation (e.g., to proceed with the online purchase of the item 714B). As a result, the electronic device 700 receives a request for credentials (e.g., transaction credentials), which requires user authorization. In some examples, receiving the request for credentials includes detecting, by the one or more input devices (e.g., a computer mouse, touch input), activation (e.g., using mouse cursor 718A) of the payment affordance 716 corresponding to the operation. In some examples, the electronic device 700 receives the request for credentials from a remote server. In some examples, the electronic device 700 receives the request from a locally executing application on the electronic device 700.

In some embodiments, in response to receiving the request for credentials (e.g., transaction credentials), the electronic device 700 determines whether credentials are stored in the secure element. If the electronic device 700 determines that no credentials are stored in the secure element, the electronic device instructs the user to register credentials on the electronic device (e.g., provision the electronic device 700 with a payment account, such as a credit card account), as described below with reference to FIGS. 9E-1 to 9E-4. In response to determining that credentials are stored in the secure element, the electronic device 700 determines whether the account that is actively logged into the electronic device (e.g., the account of "J. Appleseed," as indicated by the indication 712A) is enabled to authorize operations for which authorization is required (e.g., payment transactions), such as by using fingerprint authorization or a different type of authorization (e.g., passcode authorization, facial recognition authorization).

FIGS. 7C-1 to 7C-6 illustrate an exemplary embodiment for authorizing an operation if the account is configured for fingerprint authorization. Alternatively (or in addition), FIGS. 7D-1 to 7D-10 illustrate an exemplary embodiment for authorizing the operation if the account is not configured for fingerprint authorization.

FIGS. 7C-1 to 7C-6 illustrate an exemplary embodiment for authorizing an operation (e.g., a payment transaction) if the account (e.g., the actively logged in account, such as the account of the "J. Appleseed") is configured for fingerprint authorization. In response to receiving the request for credentials, the electronic device 700 determines whether the electronic device is configured to use one or more enrolled fingerprints to authorize the operation. In some embodiments, in accordance with a determination that the electronic device 700 is configured to use the one or more enrolled fingerprints to authorize the operation, the electronic device requests a fingerprint input to authorize the operation for which authorization is required. In some examples, the electronic device 700 displays, on the second display 704, a visual indication 704A of one or more steps to be taken to authorize the operation. For example, the visual indication 704A includes an indication (e.g., textual and/or graphical, pictorial, and/or symbolic instructions) (e.g., "Touch To Pay Online Store") for the user to provide a fingerprint input, as illustrated in FIG. 7C-1. In some examples, visual indication 704A replaces content, such as content specific to the running application (e.g., the browser application). For example, visual indication 704 A replaces the "back", "forward", URL, and "favorites" affordances displayed on the second display.

In some embodiments, as illustrated in FIGS. 7C-1 to 7C-2, in response to receiving the request for credentials (e.g., transaction credentials), the electronic device 700 displays, on the first display 702, a parameters interface 720 (e.g., a payment sheet) for authorizing the operation (e.g., the payment transaction). In some embodiments, the parameters interface 720 prompts the user to provide a fingerprint input to authorize the operation. In some examples, as illustrated by the transition of the parameters interface 720 from FIG. 7C-1 to FIG. 7C-2, the parameters interface 720 slides into view on the first display 702 (e.g., from an edge of the first display) in response to receiving the request for credentials (e.g., transaction credentials). In some examples, the parameters interface 720 at least partially obscures the webpage (e.g., the online store 714A) displayed on the browser application 714 that includes the payment affordance 716. In some examples, the parameters interface 720 at least partially obscures the application where the request for credentials originated.

FIG. 7C-2 illustrates the parameters interface 720 (e.g., a payment sheet) fully visible on the first display 702. While (and/or in conjunction with) displaying the parameters interface 720 on the first display 702, the electronic device 700 displays (e.g., concurrently with displaying the parameters interface 720 on the first display 702), on the second display 704, the visual indication 704A of one or more steps to be taken to authorize the operation (e.g., to authorize the payment transaction).

In some examples, the parameters interface 720 (e.g., a payment sheet) is a user interface element controlled by the operating system of the electronic device 700, and not an element controlled by the application (e.g., the browser application 714) associated with the operation (e.g., payment transaction). In some examples, the parameters interface 720 is part of a first-party application provided by a provider of the operating system of the requesting device or of the provider/manufacturer of the electronic device 700, where the first-party application is different from the application associated with the operation (e.g., the browser application 714). In some examples, the parameters interface 720 includes user-selectable options for modifying aspects of the operation (e.g., modifying features of the payment transaction), such as a payment account option, a shipping address option, a shipping method option, and/or contact information options.

In some embodiments, as illustrated in FIG. 7C-2, the parameters interface 720 includes a first cancel affordance 720C. In response to detecting activation of the first cancel affordance 720C, the electronic device 700 ceases to display, on the second display 704, the visual indication 704A of the one or more steps to be taken to authorize the operation and ceases to display the textual indication of the one or more steps to be taken 720B (e.g., without causing credentials to be released from the secure element for use in the operation). As also illustrated in FIG. 7C-2, in some examples, in response to receiving the request for credentials (e.g., transaction credentials), the electronic device 700 displays (e.g., concurrently with the first cancel affordance 720C), on the second display 704, a second cancel affordance 704C. In some examples, in response to detecting activation of the second cancel affordance 704C, the electronic device 700 ceases to display, on the second display 704, the visual indication 704A of the one or more steps to be taken to authorize the operation and ceases to display the textual indication of the one or more steps to be taken 720B (e.g., without causing credentials to be released from the secure element for use in the operation).

In some embodiments, while (and/or in conjunction with) displaying the parameters interface 720, the electronic device 700 forgoes performing any task in response to receiving, at a touch-sensitive surface corresponding to the second display 704, a touch input at one or more locations of the touch-sensitive surface corresponding to the second display 704 that do not correspond to the second cancel affordance 704C or the fingerprint sensor 710. In some examples (e.g., when fingerprint authorization is enabled), the electronic device 700 disables touch input at the one or more locations that do not correspond to the second cancel affordance 704C by forgoing performance of any task in response to detecting touch input at locations that do not correspond to the second cancel affordance 704C.

In some embodiments, while (and/or in conjunction with) displaying the parameters interface 720, the electronic device 700 forgoes performing any tasks when activation (e.g., a press, a press exceeding an intensity threshold) of the hardware input element 708 is detected. For example, the electronic device 700 maintains the account (e.g., the account of "J. Appleseed") as the account actively logged in to the electronic device 700, and forgoes transitioning the active account state of the electronic device 700 to a second account (different from the first account) as the account that is actively logged in to the electronic device 700 when detecting activation (e.g., a press) of the hardware input element, regardless of whether or not authorization (e.g., fingerprint authorization) has been received, as described in detail with respect to FIGS. 11A-11M-4 and 12A-12B. In some examples, activation (e.g., a press) (or mere activation) of the hardware input element 708 does not cause any change in the content displayed by the user interface 712 on the first display 702 or on the second display 704. In some examples, activation (e.g., a press) of the hardware input element 708 does not shut down or power down the electronic device 700, regardless of the duration for which the hardware input element 708 is activated (e.g., pressed).

In some examples, the visual indication 704A on the second display 704 includes a textual instruction that instructs the user to provide an authorized fingerprint by using the fingerprint sensor 710 (e.g., the visual indication 704A reads "Touch To Pay Online Store," as illustrated in FIGS. 7C-1 to 7C-2). In some examples, the textual instruction identifies the merchant (e.g., "Online Store") involved in the transaction. In some examples, the visual indication 704A includes an animation 704B that indicates a location of the fingerprint sensor 710 on the electronic device 700. For example, the animation 704B moves towards the fingerprint sensor 710 on the electronic device 700, such as an arrow that points in the direction of the fingerprint sensor 710 and dynamically moves or extends linearly on an axis that corresponds to the alignment of the arrow towards the location of the fingerprint sensor 710, as illustrated in the transition from FIG. 7C-1 to FIG. 7C-2. In some examples, the parameters interface 720 (e.g., a payment sheet) on the first display 702 also provides a graphical non-textual indication 720A (e.g., a graphical depiction of a fingerprint) and a textual indication 720B (e.g., "Pay With Fingerprint") of the one or more steps to be taken to authorize the operation (e.g., the payment transaction).

In some embodiments, the visual indication 704A displayed on the second display 704 is displayed at a secure location on the second display 704 at which a first application (e.g., the browser application, the application requesting the credentials) cannot affect the displayed content, and at which a second application (e.g., an operating system of the electronic device) can cause displays. In some examples, the first application (e.g., the browser application, the application requesting the credentials) can cause displays at one or more locations other than the secure location on the second display 704. In some examples, content that can be displayed at the secure location on the second display 704 is controlled by one or more processes of an operating system of the electronic device 700. In some examples, third-party applications (e.g., applications not provided by the manufacturer of the electronic device 700) cannot cause content to be displayed at the secure location on the second display 704. In some examples, the secure location on the second display 704 is secure, whereas one or more (or all) other locations on the second display 704 is not secure. In some examples, the secure location is adjacent to the fingerprint sensor 710, without any non-secure intervening display location.

FIG. 7C-3 illustrates the user 700A (e.g., "J. Appleseed") associated with the account that is actively logged into the electronic device 700. In this example, the account of the J. Appleseed user is enabled to authorize release of credentials from the secure element by providing an input that corresponds to the visual indication 704A of the one or more steps to be taken to authorize the operation (e.g., the payment transaction). In some embodiments, as illustrated in FIG. 7C-3, receiving the input (e.g., the fingerprint input) that corresponds to the visual indication 704A includes detecting, by the fingerprint sensor 710, a fingerprint of the user.

In response to receiving the fingerprint input from the user 700A, the electronic device 700 determines whether the detected fingerprint input is consistent with authorization criteria. In accordance with a determination that the detected fingerprint input is consistent with authorization criteria, the electronic device 700 causes credentials to be released from the secure element for use in the operation (e.g., payment information for use in a payment transaction). In some embodiments, the authorization criteria includes a criterion that is met when the detected fingerprint is consistent with an enrolled fingerprint stored in the secure element that is authorized to release the credentials from the secure element.

In some examples, as illustrated in FIG. 7C-4, prior to causing the credentials to be released from the secure element for use in the operation (e.g., the payment transaction), the electronic device 700 displays, on the second displays 704, a visual indication 704A (e.g., "Processing") informing the user 700A that the authorization is being processed (e.g., the electronic device is determining whether the detected fingerprint is consistent with the enrolled fingerprint). In some examples, the parameters interface 720 (e.g., the payment sheet) displayed on the first display 702 also provides a graphical indication 720A and a textual indication 720B (e.g., "Processing") informing the user 700A that the authorization is being processed (e.g., the electronic device 700 is determining whether the detected fingerprint is consistent with the enrolled fingerprint).

In accordance with a determination that the detected fingerprint input from the user 700A is consistent with the authorization criteria, the electronic device 700 causes credentials to be released from the secure element for use in the operation and, optionally, transmits the credentials to a remote server for use in the operation. In some examples, in response to determining that the authorization (or operation) is complete, the electronic device 700 informs the user that the authorization is complete by, as illustrated in FIG. 7C-5, displaying a visual indication 704A (e.g., "Done," "Complete") on the second display 704. In some examples, the electronic device 700 also displays (e.g., concurrently), on the first display 702, a graphical indication 702A and a textual indication 702B (e.g., "Done," "Complete") to inform the user 700A that the authorization is complete.

In some embodiments, as illustrated in FIG. 7C-6, in accordance with a determination that the detected fingerprint is not consistent with the enrolled fingerprint (e.g., that the detected input is not consistent with the authorization criteria), the electronic device 700 forgoes causing the credentials to be released from the secure element for use in the operation (e.g., forgoes completing the payment transaction, forgoes transmitting payment information for use in the operation). In some examples, the electronic device 700 also displays, on the second display 704, a visual indication 704A (e.g., "Try Again") requesting that the user 700A again provide the input (e.g., the fingerprint input, as depicted in FIGS. 7C-1 to 7C-4). In some examples, the parameters interface 720 (e.g., the payment sheet) also provides a graphical indication 720A and a textual indication 720B (e.g., "Try Again") (e.g., concurrently) requesting that the user 700A try again. In some examples, the indications 720A and 720B are not the same or identical. In some examples, if the new attempt is successful, the electronic device 700 displays, on the second display 704, a visual indication 704A (e.g., "Done," "Complete") informing the user that the authorization is complete, as illustrated and described with reference to FIG. 7C-5.

Figures 1, 7D:
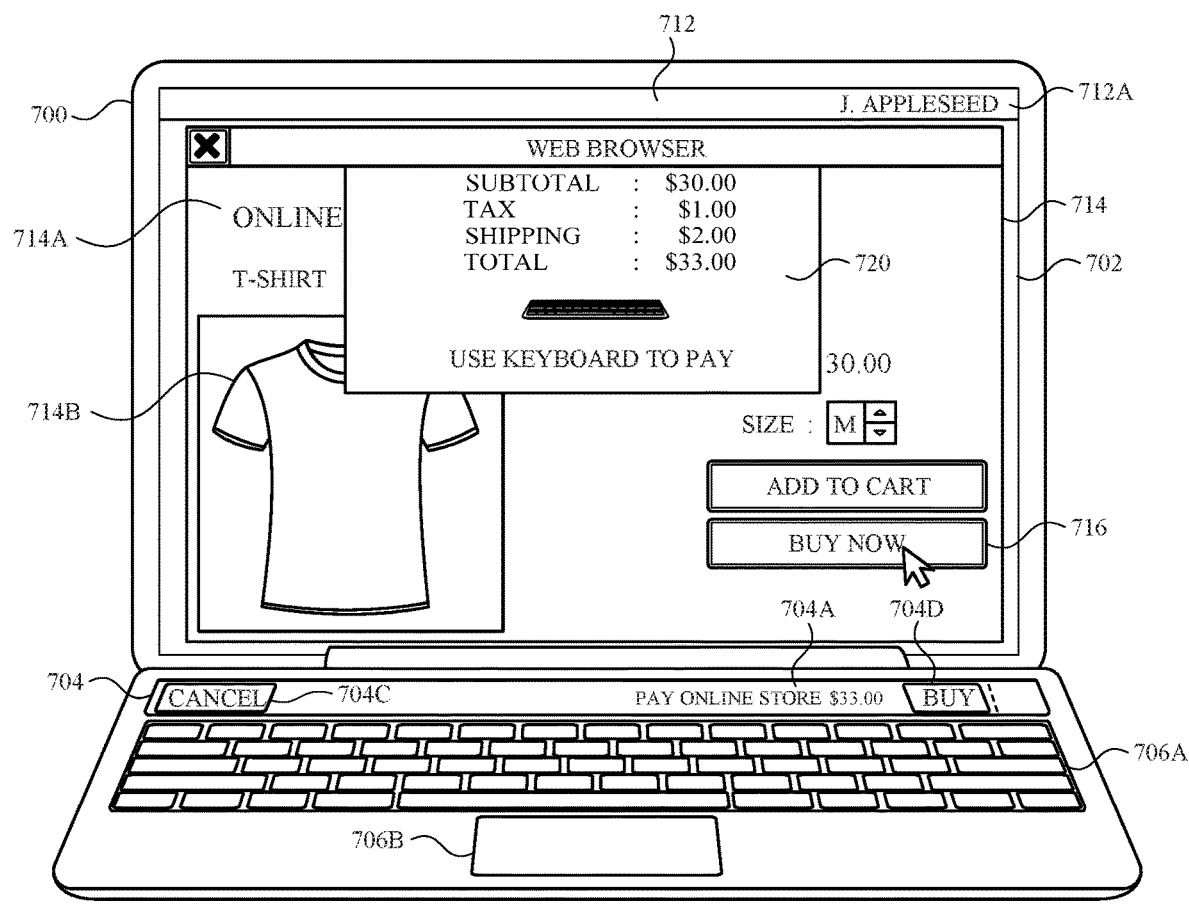
Figures 2, 7D:
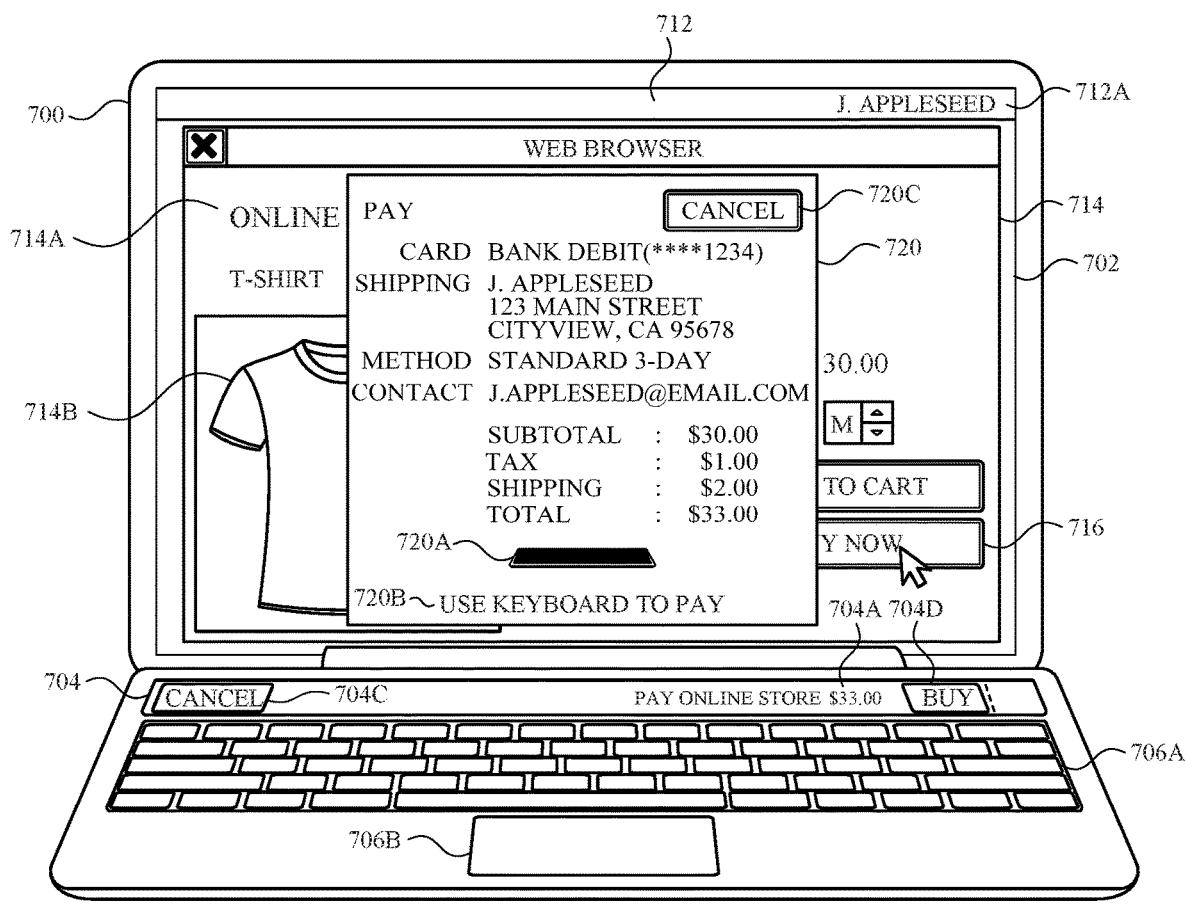
Figures 3, 7D:
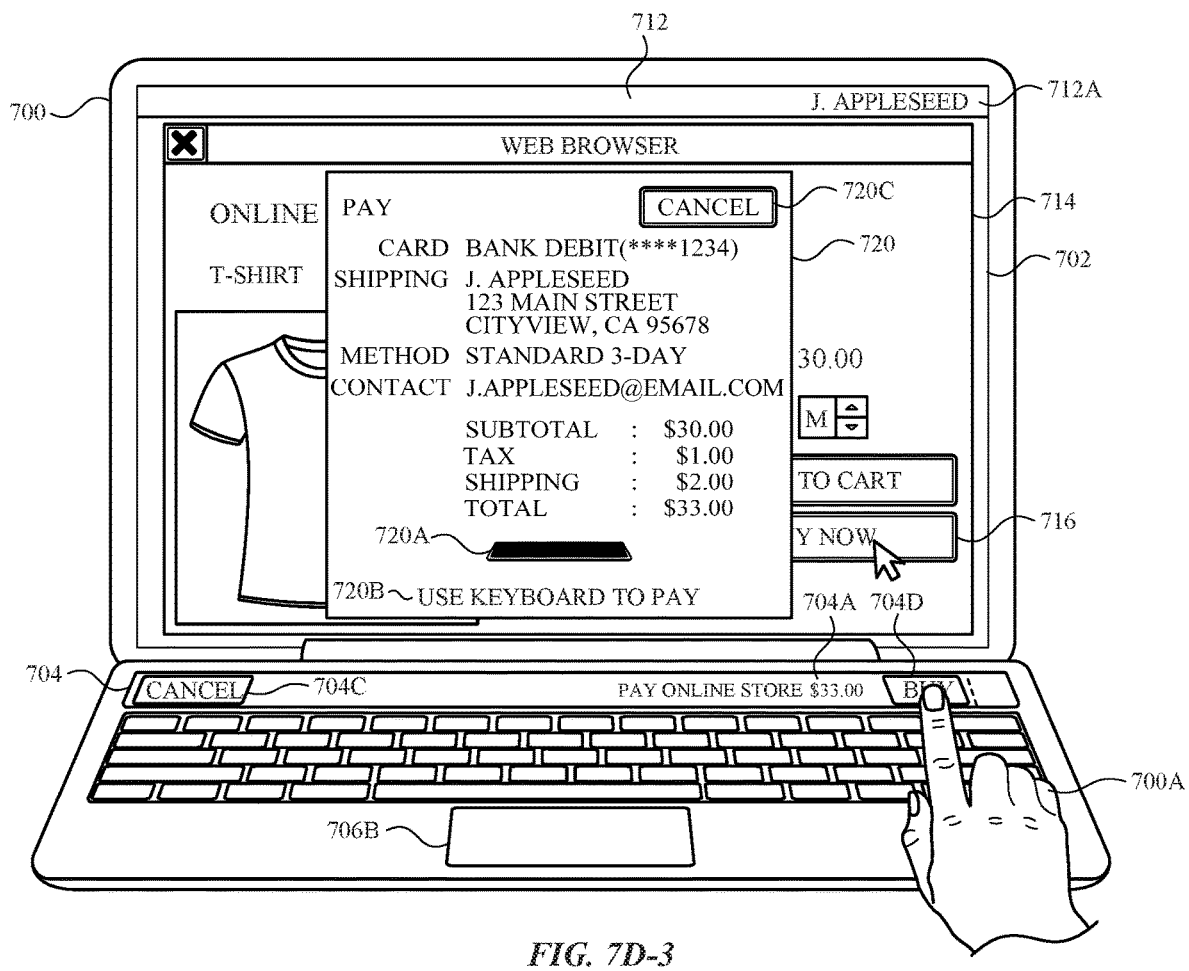
Figures 4, 7D:
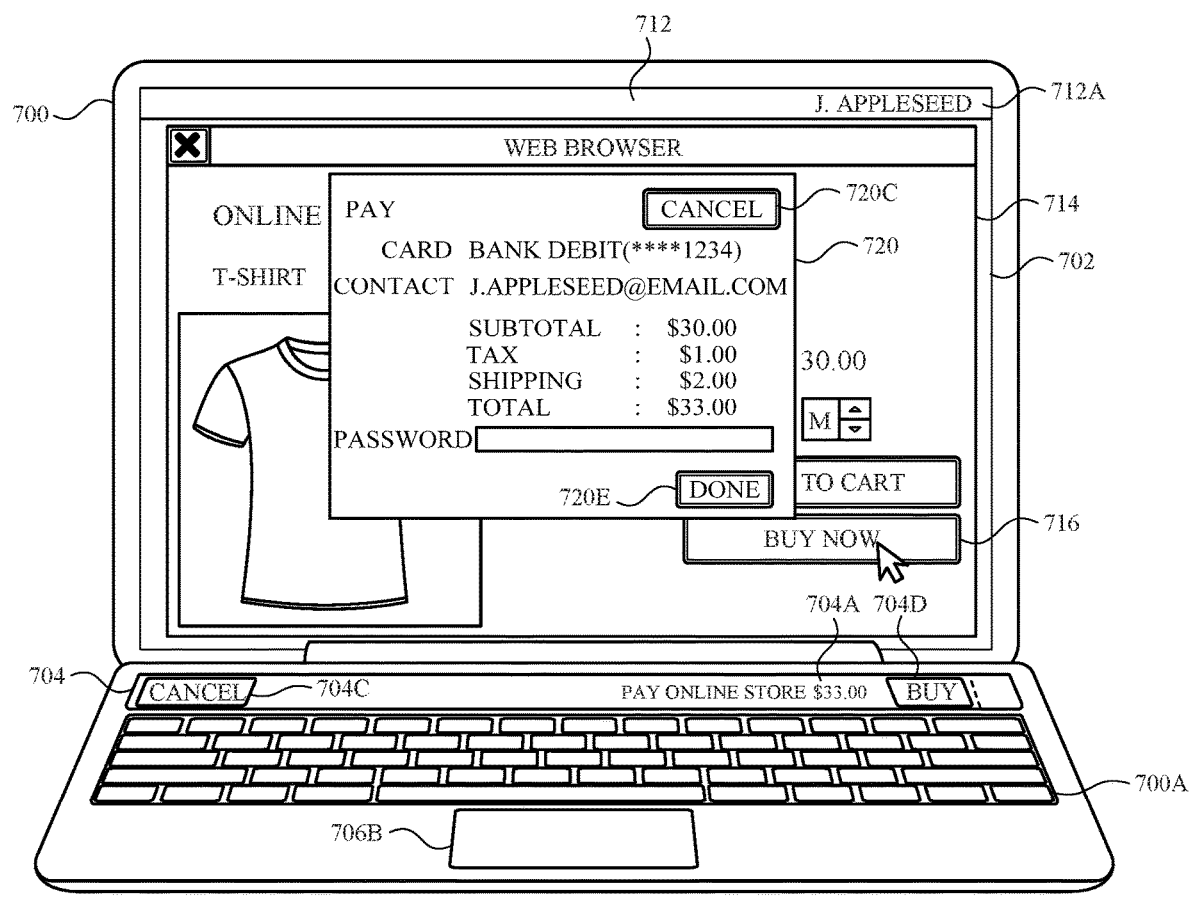
Figures 5, 7D:
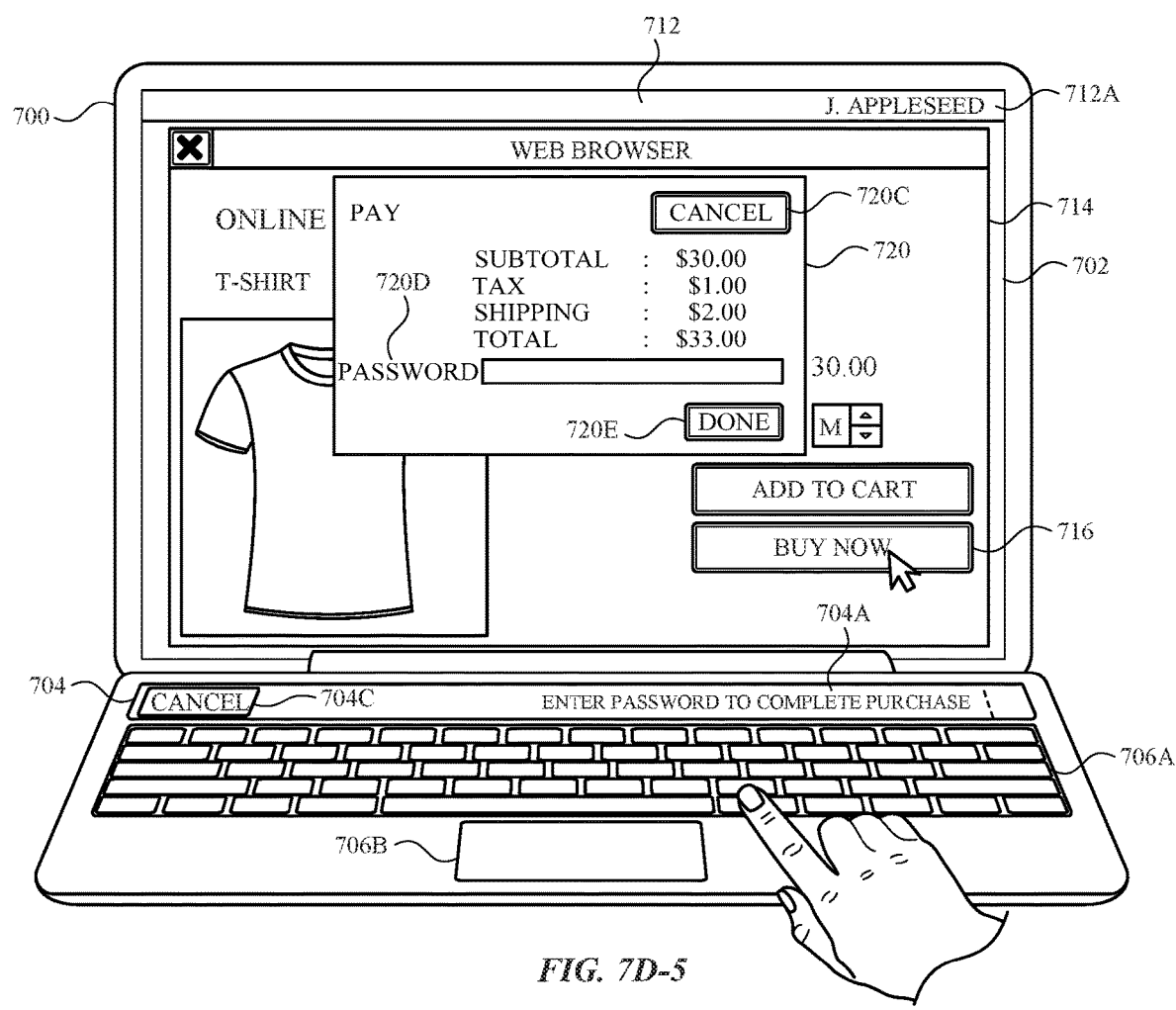
Figures 6, 7D:
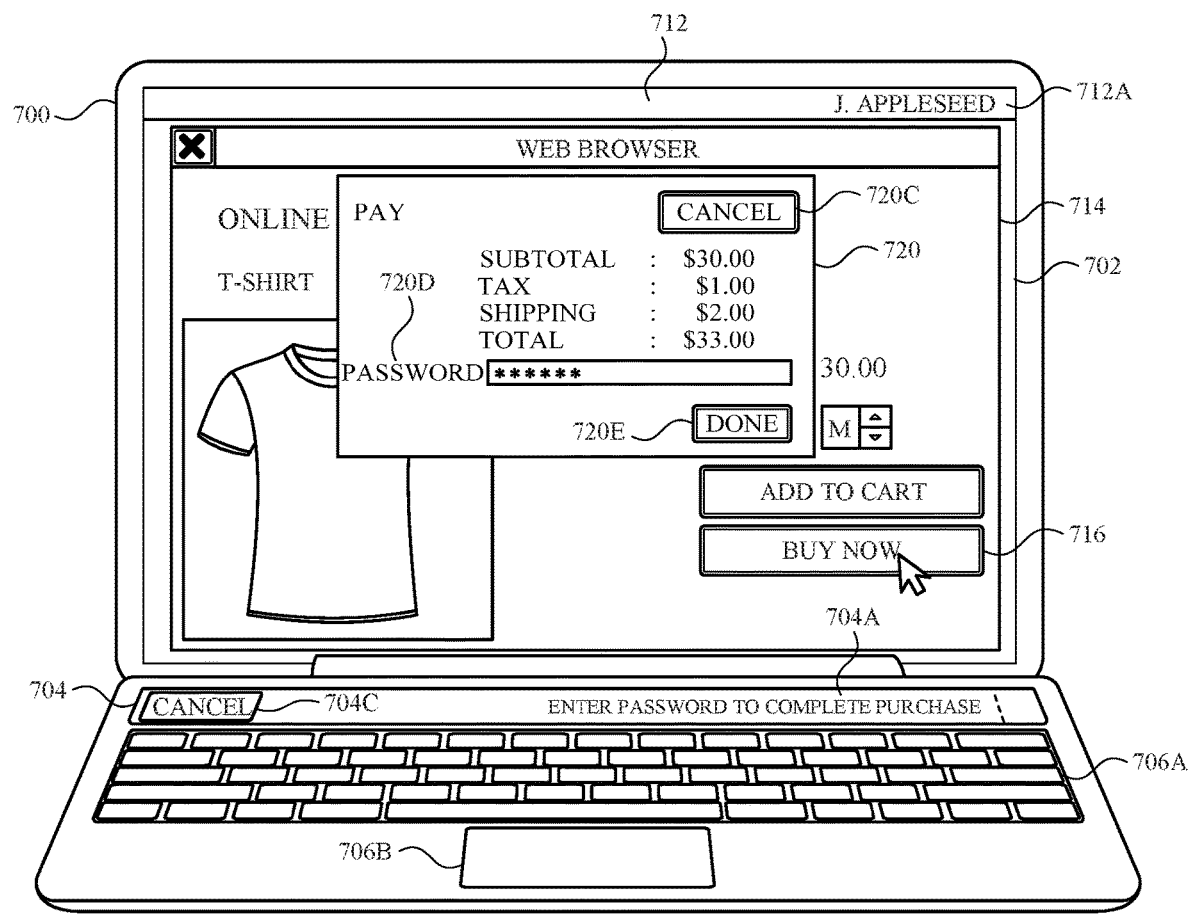

FIGS. 7D-1 to 7D-10 illustrate an exemplary embodiment for authorizing an operation for which authorization is required (e.g., a payment transaction) if the account (e.g., the actively logged in account) is not configured for fingerprint authorization. In response to receiving the request for credentials, the electronic device 700 determines whether the electronic device is configured to use one or more enrolled fingerprints to authorize the operation (e.g., whether the device is configured for fingerprint authorization). In some embodiments, in accordance with a determination that the electronic device 700 is not configured for fingerprint authorization, the electronic device requests a passcode input to authorize the operation (e.g., the device is in passcode authorization mode). Thus, in some examples, the electronic device 700 displays, on the second display 704, a visual indication 704A that includes an indication (e.g., textual and/or graphical/pictorial/symbolic instructions) prompting the user to activate an authorization affordance 704D displayed on the second display 704, as illustrated in FIG. 7D-1. In some examples, the electronic device displays a corresponding indication on the first display. In some examples, the indication on the first display is not the same as or identical to the indication 704A on the second display.

In the passcode authorization mode, the authorization criteria includes a criterion that is met when activation of the authorization affordance 704D (e.g., at a secure location on the second display 704) is detected and a criterion that is met when a received sequence of one or more characters (e.g., the passcode entered by the user) is consistent with an enrolled passcode (e.g., a passcode stored at the electronic device) that is authorized to release the credentials from the secure element of the electronic device 700. In some examples, the authorization criteria include an additional criterion that is met when activation of the authorization affordance 704D is detected prior to receiving the sequence of characters. For example, the authorization criteria is met when activation of the authorization affordance 704D is detected prior to receiving the sequence of characters because a fingerprint has not been enrolled at the electronic device 700, or because the authorization of transactions using fingerprint input has been disabled by the user of the device. In some examples, the electronic device displays an indication or arrow (e.g., with animation) pointing to the authorization affordance.

In some embodiments, the one or more input devices of the electronic device 700 include a keyboard that is not paired with the secure element (e.g., the keyboard is an external keyboard connected to the device, such as by USB, and thus is not capable of and is not authorized to release credentials stored in the secure element). In some examples, the received sequence of characters (e.g., the passcode input) is passed from a first processor associated with the keyboard 706A to a second processor associated with the secure element and the second display 704. Additional details relating to this technique are described throughout cross-referenced U.S. patent application Ser. No. 15/256,959, in particular at FIG. 3 and paragraphs [0047]-[0048], [0080], and [0094], which are included in Appendix A.

In some embodiments, as illustrated in FIGS. 7D-1 to 7D-2, in response to receiving the request for credentials (e.g., transaction credentials), the electronic device 700 displays, on the first display 702, a parameters interface 720 (e.g., a payment sheet) for completing the operation (e.g., the payment transaction) that prompts the user to provide a passcode input to authorize the operation. In some embodiments, as illustrated by the transition of the parameters interface 720 from FIG. 7D-1 to FIG. 7D-2, the parameters interface 720 slides into view on the first display 702 (e.g., from an edge of the first display) in response to receiving the request for credentials (e.g., transaction credentials). In some examples, the parameters interface 720 at least partially obscures the webpage (e.g., the online store 714A) displayed on the browser application 714 that includes the payment affordance 720.

FIG. 7D-2 illustrates the parameters interface 720 (e.g., a payment sheet) fully visible on the first display 702. While (and/or in conjunction with) displaying the parameters interface 720 on the first display 702, the electronic device 700 displays, on the second display 704, a visual indication 704A of one or more steps to be taken to authorize the operation (e.g., the payment transaction).

In some embodiments, the parameters interface 720 (e.g., a payment sheet) is a user interface element controlled by the operating system, and not an element of the application (e.g., the browser application 714) associated with the operation (e.g., payment transaction). In some examples, the parameters interface 720 is part of a first-party application provided by a provider of the operating system of the requesting device (e.g., a provider of the electronic device 700), where the first-party application is different from the application associated with the operation (e.g., the browser application 714). In some examples, the parameters interface 720 includes user-selectable options for modifying aspects of the operation (e.g., modifying features of the payment transaction), such as a payment account option, a shipping address option, a shipping method option, and/or contact information options.

In some embodiments, as illustrated in FIG. 7D-2, the parameters interface 720 includes a first cancel affordance 720C, which, when activated, causes the electronic device 700 to cease displaying, on the second display 704, the visual indication 704A of the one or more steps to be taken to authorize the operation (e.g., without causing credentials to be released from the secure element for use in the operation). Thus, if the electronic device 700 detects, via the one or more input devices, activation of the first cancel affordance 720C, the electronic device ceases to display, on the second display 704, the visual indication 704A of the one or more steps to be taken to authorize the operation (e.g., without causing credentials to be released from the secure element for use in the operation).

As also illustrated in FIG. 7D-2, in some examples, in response to receiving the request for credentials (e.g., transaction credentials), the electronic device 700 displays (e.g., concurrently with the first cancel affordance 720C), on the second display 704, a second cancel affordance 704C. In some examples, activation of the second cancel affordance 704C causes the electronic device 700 to cease displaying, on the second display 704, the visual indication 704A of the one or more steps to be taken to authorize the operation (e.g., without causing credentials to be released from the secure element for use in the operation). Thus, if the electronic device 700 detects, via the one or more input devices, activation of the second cancel affordance 704C, the electronic device ceases to display the visual indication 704A of the one or more steps to be taken to authorize the operation (e.g., without causing credentials to be released from the secure element for use in the operation). In some examples, in response to detecting activation of either the first cancel affordance 720C or the second cancel affordance 704C, the electronic device ceases to display indication 720B on the first display and the visual indication 704A on the second display.

In some embodiments, while (and/or in conjunction with) displaying the parameters interface 720, the electronic device 700 forgoes performing any task in response to receiving, at a touch-sensitive surface corresponding to the second display 704, a touch input at one or more locations of the touch-sensitive surface corresponding to the second display 704 that do not correspond to the second cancel affordance 704C or the fingerprint sensor 710. In some examples, the electronic device 700 disables touch input at the one or more locations that do not correspond to the second cancel affordance 704C by forgoing performance of any task in response to detecting touch input at locations that do not correspond to the second cancel affordance 704C. In some examples (e.g., when fingerprint authorization is not enabled), disabling touch input at the one or more locations not corresponding to the second cancel affordance 704C includes forgoing performance of any task in response to detecting touch input at locations that do not correspond to the second cancel affordance 704C and an authorization affordance 704D that is displayed at a secure location on the second display 704. In some examples (e.g., when fingerprint authorization is not enabled), the electronic device 700 disables processing of touch input for locations that do not correspond to the second cancel affordance 704C or the authorization affordance 704D.

In some examples, the visual indication 704A includes a textual instruction that prompts the user to activate the authorization affordance 704D to proceed with the operation. In some examples, the visual indication 704A includes an animation that indicates a location of the authorization affordance 704D on the electronic device 700. For example, the animation moves towards the authorization affordance 704D on the electronic device 700, such as an arrow that points in the direction of the authorization affordance 704D and dynamically moves linearly on an axis that corresponds to the alignment of the arrow towards the location of the authorization affordance 704D. In some examples, the parameters interface 720 (e.g., the payment sheet) on the first display 702 also provides a graphical indication 720A and a textual indication 720B of the one or more steps to be taken to authorize the operation (e.g., the payment transaction).

In some embodiments, the visual indication 704A is displayed at a secure location on the second display 704 at which a first application (e.g., the application requesting the credentials) cannot cause displays, but at which a second application (e.g., an operating system of the electronic device 700) can cause displays. In some examples, the first application (e.g., the application requesting the credentials) can cause displays at one or more locations other than the secure location on the second display 704. In some examples, content that can be displayed at the secure location on the second display 704 is controlled by one or more processes of an operating system of the electronic device 700. In some examples, third-party applications (e.g., applications not provided by the manufacturer of the electronic device 700) cannot cause content to be displayed at the secure location on the second display 704. In some examples, the secure location on the second display 704 is secure, whereas one or more (or all) other locations on the second display 704 is not secure.

FIG. 7D-2 illustrates the parameters interface 720 (e.g., a payment sheet) fully visible on the first display 702. While (and/or in conjunction with) displaying the parameters interface 720, the electronic device 700 displays (e.g., at the same time as the display of the parameters interface 720 on the first display), on the second display 704, a visual indication 704A of one or more steps to be taken to authorize the operation (e.g., the payment transaction).

FIG. 7D-3 illustrates user 700A (e.g., "J. Appleseed") providing input that corresponds to the visual indication 704A of the one or more steps (e.g., activating authorization affordance 704D). In some embodiments, as illustrated in FIG. 7D-3, receiving the input that corresponds to the visual indication 704A of the one or more steps to be taken to authorize the operation (e.g., the payment transaction) includes detecting activation of the authorization affordance 704D by the user 700A. In some examples, as illustrated in FIGS. 7D-4 to 7D-5, subsequent to detecting activation of the authorization affordance 704D by the user 700A, the parameters interface 720 shrinks to display less information and displays a prompt 720D requesting that the user provide the passcode. In some examples, after detecting activation of the authorization affordance, the electronic device forgoes providing options to change the operation details (such as payment account to use, shipping address, shipping method, etc.). In some examples, subsequent to detecting activation of the authorization affordance 704D by the user 700A, the visual indication 704A requests that the user provide the passcode (e.g., the visual indication 704A reads "Enter Password to Complete Purchase"). In some examples, the visual indication 704A to provide the passcode is displayed on the second display 704 at the secure location.

As illustrated in FIG. 7D-6, receiving the input that corresponds to the visual indication 704A includes receiving, by the one or more input devices (e.g., the keyboard 706A or an external keyboard connected to the electronic device), a sequence of characters representing the passcode. For example, the sequence of characters is a sequence of alphanumeric and/or symbol characters that represent the passcode. In some examples, the sequence of characters is received via a typing input on the keyboard 706A of the electronic device 700. In some examples, the keyboard is a hardware keyboard (e.g., a mechanical keyboard) that is separate from the first display 702 and the second display 704. In some examples, the keyboard is a soft keyboard that is displayed on a portion of the first display 702 or a portion of the second display 704.

Figures 7, 7D:
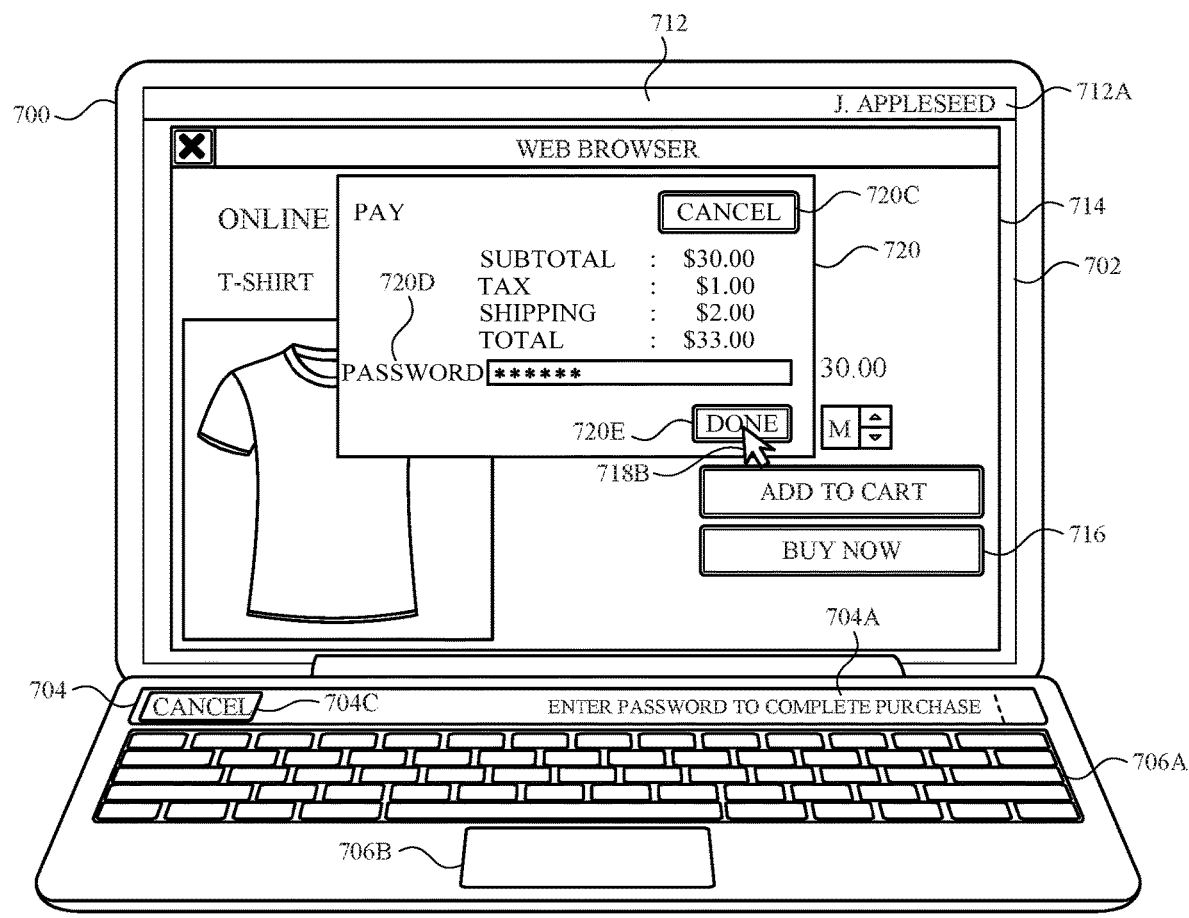

In some examples, the parameters interface 720 includes a completion affordance 720E. As illustrated in FIG. 7D-7, the electronic device 700 detects activation 718B of the completion affordance 720E by the user once the user is finished with entering the sequence of characters (e.g., the passcode) on the one or more input devices (e.g., a keyboard) of the electronic device. In response to detecting activation of the completion affordance 720E from the user 700A to authorize the operation (e.g., the payment transaction), the electronic device 700 determines whether the detected sequence of characters (e.g., the entered passcode) is consistent with authorization criteria. In accordance with a determination that the detected sequence of characters (e.g., the entered passcode) is consistent with the authorization criteria, the electronic device 700 causes credentials to be released from the secure element for use in the operation (e.g., payment information for use in a payment transaction). In some embodiments, the authorization criteria include a criterion that is met when the detected sequence of characters (e.g., the entered passcode) is consistent with an enrolled sequence of characters (e.g., an enrolled passcode) stored in the secure element that is authorized to release the credentials from the secure element.

Figures 7, 7D, 8:
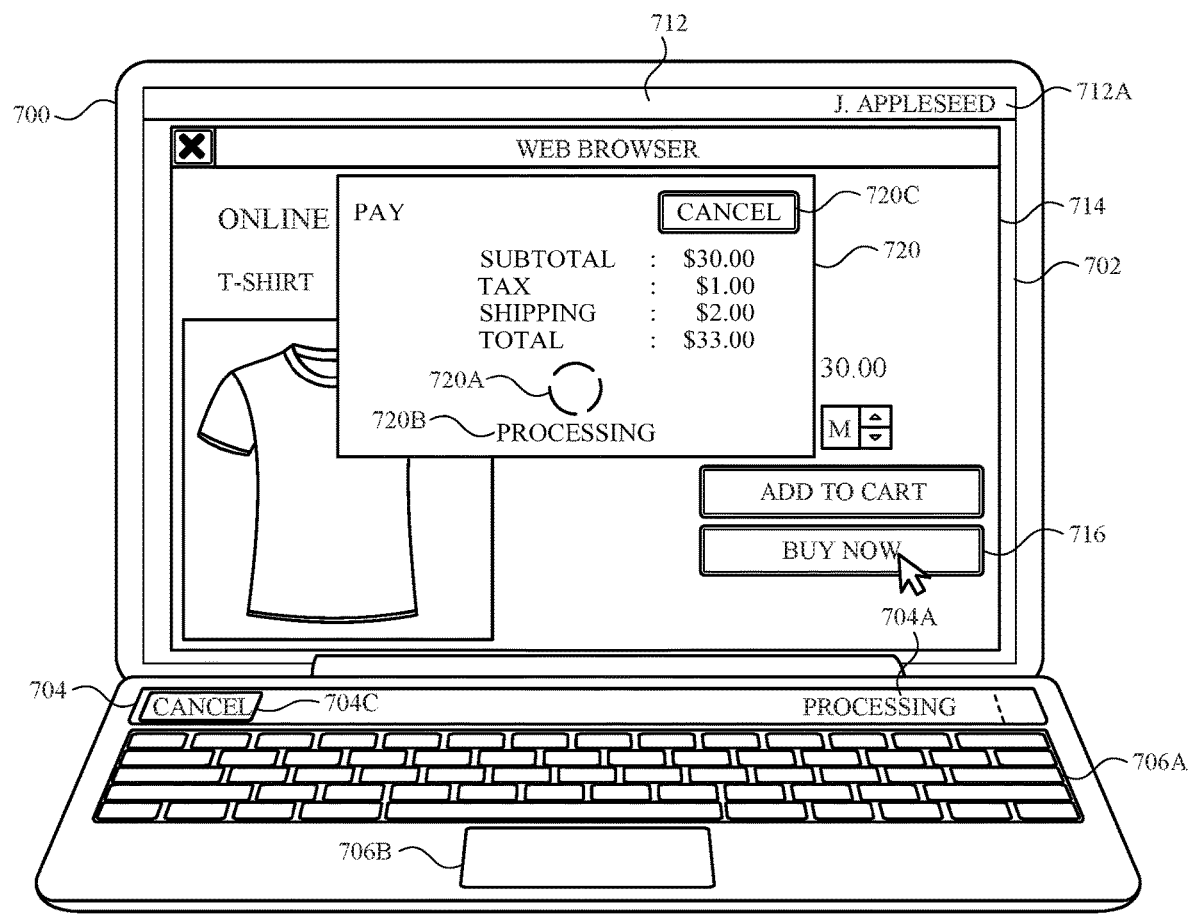
Figures 7, 7D, 8, 9:
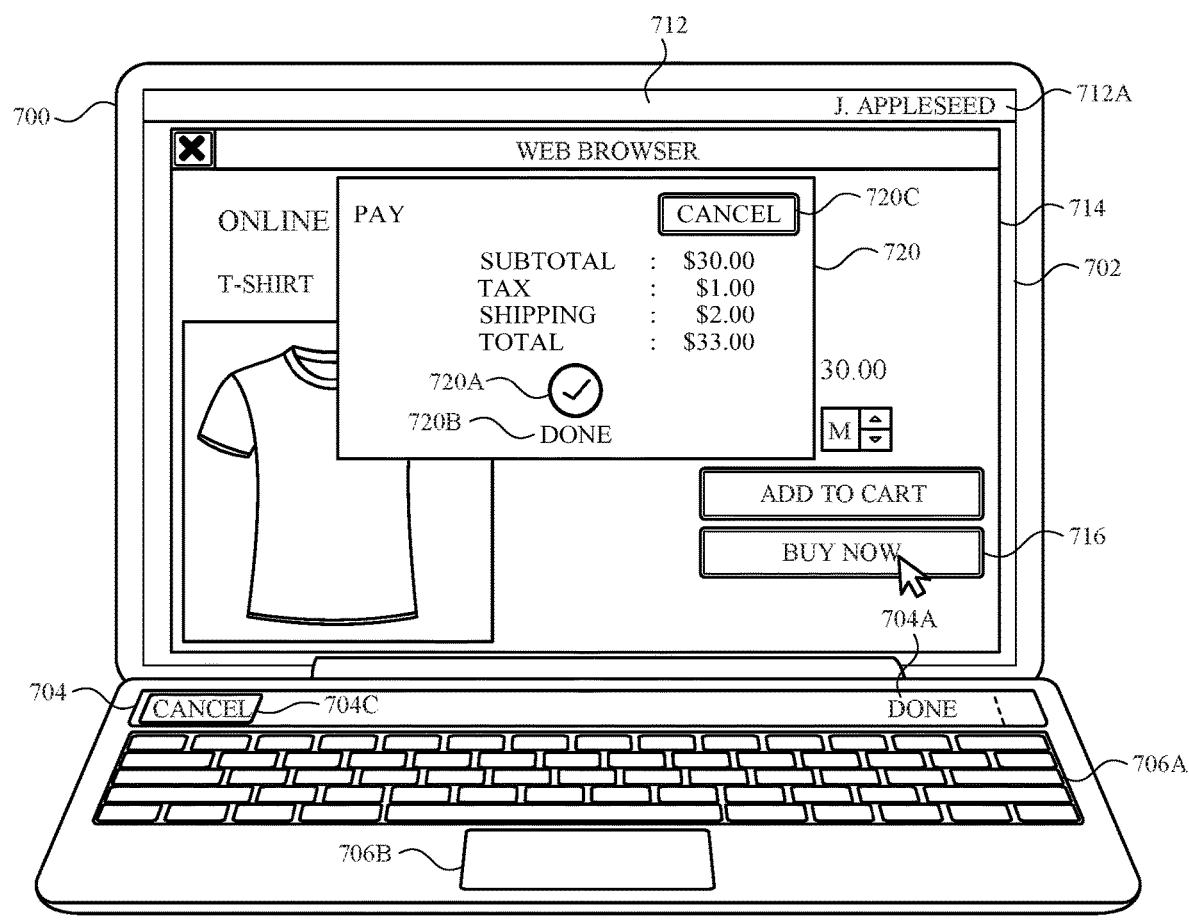
Figures 7, 7D, 8, 9, 10:
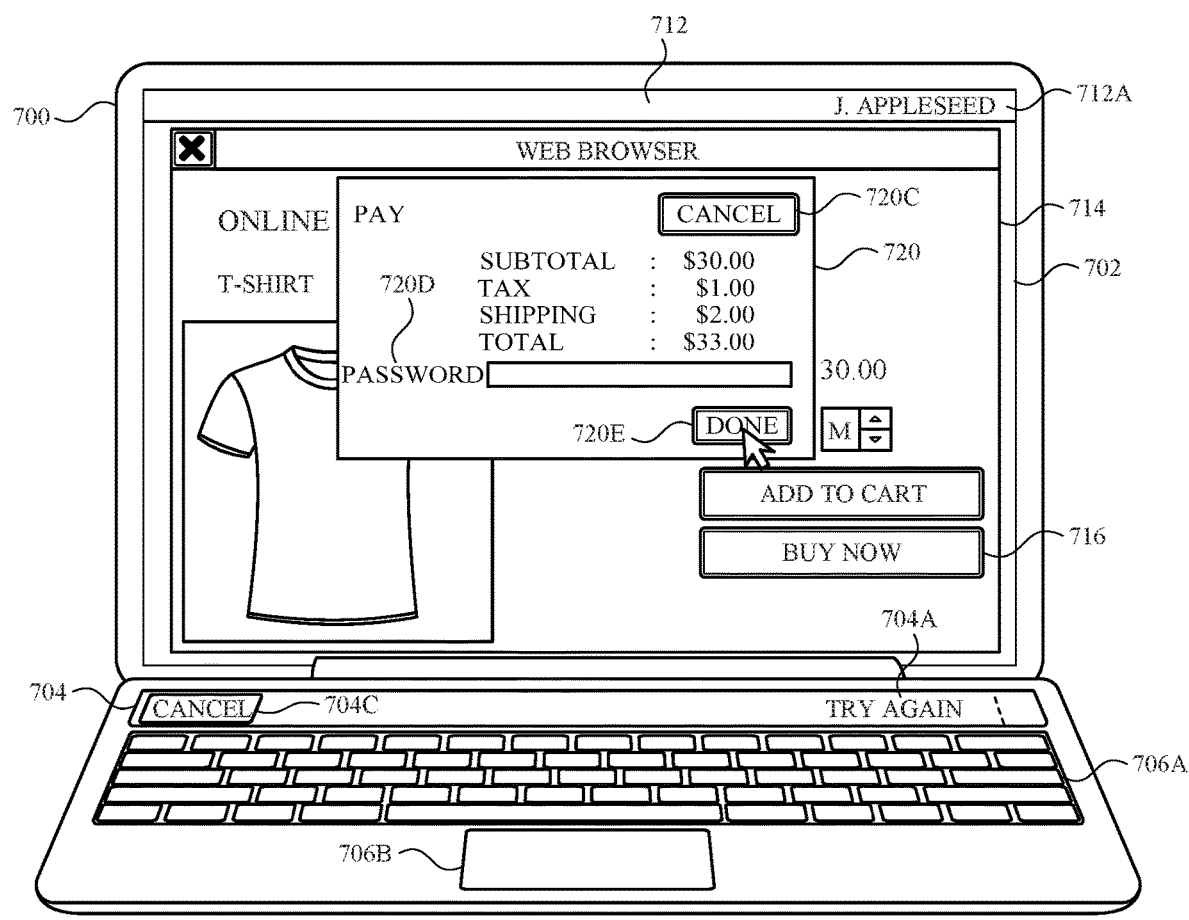

In some examples, as illustrated in FIG. 7D-8, prior to causing the credentials to be released from the secure element for use in the operation (e.g., the payment transaction), the electronic device 700 displays, on the second display 704, a visual indication 704A (e.g., "Processing") informing the user 700A that the authorization is being processed (e.g., the electronic device is determining, through the secure element, whether the entered passcode is consistent with the enrolled passcode). In some examples, the parameters interface 720 (e.g., the payment sheet) displayed on the first display 702 also provides a graphical non-textual indication 720A and a textual indication 720B (e.g., "Processing") informing the user 700A that the authorization is being processed (e.g., the electronic device is determining whether the entered passcode is consistent with the enrolled passcode).

The authorization is complete if the electronic device 700 determines that the sequence of characters (e.g., the entered passcode) entered by the user 700A is consistent with the authorization criteria (e.g., the enrolled passcode). In some examples, as illustrated in FIG. 7D-9, in response to determining that the authorization is complete, the electronic device 700 displays, on the second display 704, a visual indication 704A (e.g., "Done," "Complete") informing the user that the authorization is complete. In some examples, the electronic device 700 also displays, on the first display 702, a graphical indication 720A and a textual indication 720B (e.g., "Done," "Complete") informing the user 700A that the authorization is complete. In accordance with a determination that the detected sequence of characters (e.g., the detected passcode) is consistent with the authorization criteria (e.g., the enrolled passcode), the electronic device 700 causes credentials to be released from the secure element for use in the operation (e.g., the payment transaction).

In some embodiments, as illustrated in FIG. 7D-10, in accordance with a determination that the entered sequence of characters (e.g., the passcode provided by the user 700A, as depicted in FIGS. 7D-4 to 7D-7) is not consistent with the enrolled passcode, the electronic device 700 forgoes causing the credentials to be released from the secure element for use in the operation (e.g., forgoes completing the payment transaction). In some examples, the electronic device 700 also displays, on the second display 704, a visual indication 704A (e.g., "Try Again") informing the user 700A that authorization was unsuccessful, and thus to enter the sequence of characters (e.g., the passcode) again. In some examples, the parameters interface 720 (e.g., the payment sheet) provides a cleared password field, indicating to the user 700A to enter the sequence of characters (e.g., the passcode) again. In some examples, if, after the repeat attempt, the electronic device 700 determines that the entered sequence of characters (e.g., the detected passcode) is consistent with the enrolled sequence of characters (e.g., the enrolled passcode), the electronic device displays, on the second display 704, the visual indication 704A (e.g., "Done," "Complete") informing the user that the authorization is complete, as illustrated in FIG. 7D-9.

In some embodiments, the one or more input devices of the electronic device 700 include one or more cameras. In some embodiments, the one or more cameras include one or more cameras with depth sensing capabilities. In some embodiments, the one or more cameras include one or more cameras sensors. In some embodiments, the one or more cameras include multiple cameras capable of generating a depth map using a parallax effect.

In some embodiments, after receiving the request for credentials (e.g., as illustrated in FIG. 7B), the electronic device 700 requests biometric identification to authorize the operation for which authorization is required. In some embodiments, after receiving the request for credentials, (e.g., as illustrated in FIG. 7B), and in accordance with a determination that the electronic device 700 is not configured to use one or more enrolled fingerprints to authorize an operation (e.g., a payment transaction), the electronic device 700 requests biometric identification to authorize the operation. In some embodiments, after receiving the request for credentials, (e.g., as illustrated in FIG. 7B), and in accordance with a determination that the electronic device 700 is configured to use one or more enrolled fingerprints to authorize an operation (e.g., a payment transaction), the electronic device 700 requests, in addition to or alternatively to requesting a fingerprint input, biometric identification to authorize the operation. In some embodiments, the electronic device 700 is configured to use biometric identification to authorize an operation (e.g., a payment transaction) as the primary authorization method. In some examples, the biometric identification is a facial identification or an eye-based identification (such as iris recognition or retinal scan) detected using one or more sensors or cameras of the electronic device 700.

In some embodiments, if the electronic device 700 requests biometric identification to authorize the operation, the visual indication of the one or more steps to be taken to authorize the operation comprises an indication that a biometric identification (e.g., a facial identification and/or an eye-based identification such as an iris recognition or a retinal scan) is requested. The electronic device 700 receives the biometric identification that corresponds to the visual indication of the one or more steps by detecting, using the one or more cameras, the biometric identification (e.g., of the user). In some examples, the biometric identification is one or more images captured using the one or more cameras (e.g., camera sensors). In some examples, the electronic device 700 uses the one or more captured images to generate a depth map (or multiple depth maps) corresponding to one or more of the user's physical features, such as the user's facial features.

In some embodiments, if the electronic device 700 requests biometric identification to authorize the operation (e.g., the payment transaction), the authorization criteria includes a criterion that is met when the detected biometric identification (e.g., of the user) is consistent with enrolled biometric identification that is authorized to release the credentials from the secure element. In some examples, the authorization criteria includes a criterion that is met when the generated depth map corresponding to one or more of the user's physical features (e.g., facial structure or other characteristics) is consistent with enrolled biometric depth map information (e.g., enrolled depth map corresponding to a registered user) that is authorized to release the credentials from the secure element.

FIGS. 8A-8B are a flow diagram illustrating a method for authorizing release of credentials for use in an operation for which authorization is required, using an electronic device (e.g., device 700) in accordance with some embodiments. In some embodiments, method 800 is performed at a device (e.g., 100, 300, 500, portable computing system 100 of cross-referenced U.S. Provisional Patent Application Ser. No. 62/368,988, portions of which are included in Appendix B, desktop computing system 200 of cross-referenced U.S. Provisional Patent Application Ser. No. 62/368,988, portions of which are included in Appendix B) with a first display, a second display (that is different from the first display), a secure element, and one or more input devices, which optionally includes a touch-sensitive surface, a fingerprint sensor, a keyboard, and/or one or more cameras. Some operations in method 800 are, optionally, combined, the order of some operations is, optionally, changed, and some operations are, optionally, omitted.

As described below, method 800 provides an intuitive way for authorizing release of credentials for use in an operation for which authorization is required. The method reduces the cognitive burden on a user for managing access to credentials for use in an operation for which authorization is required, thereby creating a more efficient human-machine interface. For battery-operated computing devices, enabling a user to manage access to credentials for use in an operation faster and more efficiently conserves power and increases the time between battery charges.

In some embodiments, method 800 is performed on a device having a second display (e.g., display 704) that is paired with a secure element. For example, the secure element and the second display (e.g., 704) have been paired during the manufacturing process so that replacement of either the secure element or the second display (e.g., 704) requires that the remaining and replaced component(s) be re-paired for a criterion of the authorization criteria to be met. In some embodiments, a first display (e.g., 702) of the electronic device is not paired with the secure element, and thus is not capable of and is not authorized to release credentials stored in the secure element.

In some embodiments, prior to receiving a request for credentials, the electronic device (e.g., 700) displays (802), on the first display (e.g., 702), a payment affordance (e.g., 716) (e.g., a "buy now" affordance) corresponding to the operation for which authorization is required. In some examples, the payment affordance (e.g., 716) is displayed by a first application (e.g., a browser application).

The electronic device (e.g., 700) receives (806) a request for credentials (e.g., transaction credentials) for an operation for which authorization is required. In some examples, the request is received from a remote server. In some examples, the request is received from a locally executing application. In some embodiments, receiving the request for credentials includes detecting (804), by the one or more input devices (e.g., a computer mouse, touch input), activation of the payment affordance (e.g., 716) corresponding to the operation for which authorization is required.

In some embodiments, the credentials include payment information that is stored in the secure element. In some examples, the credentials include authorization information (e.g., an authorized fingerprint is used for causing the secure element to release the credentials from the secure element of the electronic device (e.g., 700)).

In response to receiving the request for credentials (e.g., transaction credentials): the electronic device (e.g., 700) displays (808), on the first display (e.g., 702), a parameters interface (e.g., 720) for the operation for which authorization is required. In some examples, the parameters interface (e.g., 720) is a payment sheet. In some examples, the payment sheet is a user interface of the operating system, rather than the first application. In some examples, the payment sheet is part of a first-party application provided by a provider of the operating system of the requesting device, wherein the first-party application is different from the first application. In some examples, the payment sheet includes user-selectable options for the payment transaction, such as a payment account option, shipping address option, a shipping method option, and contact information options. In some examples, the payment sheet slides into display (e.g., into view on the one or more displays) in response to activation of the payment affordance (e.g., 716). In some examples, the payment sheet at least partially obscures a webpage that includes the payment affordance. Thus, the electronic device, by displaying the parameters interface, prompts the user to take action to approve the operation.

In some embodiments, the parameters interface (e.g., 720) for the operation for which authorization is required includes a first cancel affordance (e.g., 720C), which when activated, causes the electronic device (e.g., 700) to cease displaying, on the second display (e.g., 704), the visual indication (e.g., 704A) of the one or more steps to be taken to authorize the operation (e.g., without causing credentials to be released from the secure element for use in the operation). In some examples, in accordance with detecting, via the one or more input devices, activation of the first cancel affordance (e.g., 720C), the electronic device (e.g., 700) ceases to display the visual indication (e.g., 704A) of the one or more steps to be taken to authorize the operation (e.g., without causing credentials to be released from the secure element for use in the operation).

In some embodiments, in response to receiving the request for credentials (e.g., transaction credentials), the electronic device displays (e.g., concurrently with the first cancel affordance (e.g., 720C)), on the second display (e.g., 704), a second cancel affordance (e.g., 704C), which when activated, causes the electronic device (e.g., 700) to cease displaying, on the second display (e.g., 704), the visual indication (e.g., 704A) of the one or more steps to be taken to authorize the operation (e.g., without causing credentials to be released from the secure element for use in the operation). In some examples, in accordance with detecting, via the one or more input devices, activation of the second cancel affordance (e.g., 704C), the electronic device (e.g., 700) ceases to display the visual indication (e.g., 704A) of the one or more steps to be taken to authorize the operation (e.g., without causing credentials to be released from the secure element for use in the operation).

In some embodiments, the second display (e.g., 704) and the touch-sensitive surface form a touch-sensitive display, and while (and/or in conjunction with) displaying the parameters interface (e.g., 720) for the operation for which authorization is required, the electronic device (e.g., 700) forgoes performing any function in response to receiving, at a touch-sensitive surface corresponding to the second display (e.g., 704), touch input at one or more locations of the touch-sensitive surface corresponding to the second display (e.g., 704) that do not correspond to the second cancel affordance (e.g., 704C). By reducing the locations at which received input is acted on, the electronic device reduces the likelihood of receiving inadvertent and unintentional inputs, thereby reducing the potential for the electronic device to perform unwanted operations, and thus improves the man-machine interface. In some examples (e.g., when fingerprint authorization is enabled), the electronic device (e.g., 700) disables touch inputs at one or more locations not corresponding to the second cancel affordance (e.g., 704C of FIG. 7C-2) by forgoing performance of any function in response to detecting touch input at locations that do not correspond to the second cancel affordance (e.g., 704C of FIG. 7C-2). In some examples (e.g., when fingerprint authorization is not enabled), the electronic device (e.g., 700) disabling touch inputs at one or more locations not corresponding to the second cancel affordance (e.g., 704C of FIG. 7D-2) includes forgoing performance of any function in response to detecting touch input at locations that do not correspond to the second cancel affordance (e.g., 704C of FIG. 7D-2) and the authorization affordance (e.g., 704D of FIG. 7D-2). In some examples, the electronic device (e.g., 700) disables processing of touch inputs for locations that do not correspond to the second cancel affordance (e.g., 704C) and the authorization affordance. By reducing the locations at which received input is acted on, the electronic device reduces the likelihood of receiving inadvertent and unintentional inputs, thereby reducing the potential for the electronic device to perform unwanted operations, and thus improves the man-machine interface.

While (and/or in conjunction with) displaying the parameters interface (e.g., 720), the electronic device (e.g., 700) displays (810) (e.g., at the same time as the display of the parameters interface (e.g., 720) on the first display (e.g., 702)), on the second display (e.g., 704), a visual indication (e.g., 704A) of one or more steps to be taken to authorize the operation. By seeing the visual indication concurrently displayed on the second display with the parameters interface displayed on the first display, the user gains additional confidence that parameters interface is authentic (e.g., is in response to a request for credentials) and that the parameters interface is therefore secure (e.g., securely displayed by the operating system of the device, rather than a rogue process), thereby improving the machine-man interface. In some examples, the visual indication (e.g., 704A of FIG. 7C-2) of the one or more steps instructs the user to provide an authorized fingerprint by using the fingerprint sensor (e.g., 710). In some examples, the visual indication is animated (e.g., 704B). In some examples, the visual indication points (e.g., 704B) in the direction of the fingerprint sensor (e.g., 710). Thus, the electronic device, by displaying the visual indication of the one or more steps, indicates to the user the state of the device and the input (e.g., type of input) required to proceed with the operation.

In some embodiments, the visual indication (e.g., 704A) of one or more steps to be taken to authorize the operation displayed on the second display (e.g., 704) is displayed at a secure location on the second display (e.g., 704) at which a first application (e.g., the application requesting the credentials) cannot cause displays and at which a second application (e.g., an operating system of the (e.g., electronic device 700)) can cause displays. By displaying the visual indication at a secure location on the second display, the user gains additional confidence that cause of the display is a genuine request for credentials (e.g., is in response to a genuine request for credentials) and that the corresponding parameters interface is therefore secure (e.g., securely displayed by the operating system of the device, rather than a rogue process), thereby improving the machine-man interface. In some examples, the first application (e.g., the application requesting the credentials) can cause displays at one or more locations other than the secure location on the second display (e.g., 704). In some examples, the secure location at which only the second application can cause displays and for which content display is controlled by one or more processes of an operating system of the electronic device (e.g., 700). In some examples, third-party applications (e.g., applications not provided by the manufacturer of the electronic device 700) cannot cause content to be displayed at the secure location on the second display (e.g., 704). In some examples, the secure location on the second display (e.g., 704) is secure, whereas one or more (or all) other locations of the second display (e.g., 704) are not secure.

In some embodiments, the electronic device determines whether the electronic device (e.g., 700) is configured to use one or more enrolled fingerprints to authorize the operation.

In some embodiments, in accordance with a determination (812) that the electronic device (e.g., 700) is configured to use one or more enrolled fingerprints to authorize the operation, the visual indication (e.g., 704A of FIG. 7C-2) of one or more steps to be taken to authorize the operation includes an indication (e.g., textual and/or graphical/pictorial/symbolic instructions) for the user to provide a fingerprint input. Thus, the electronic device, by checking the current confirmation and displaying an indication of fingerprint input, informs the user of the device's current configuration and prompts the user to provide the appropriate input.

In some embodiments, in accordance with a determination (816) that the electronic device (e.g., 700) is not configured to use one or more enrolled fingerprints (and/or biometric information) to authorize the operation, the visual indication (e.g., 704A of FIG. 7D-2) of one or more steps to be taken to authorize the operation includes an indication for the user to activate an authorization affordance (e.g., 704D of FIG. 7D-2) for initiating a process for receiving a passcode. Thus, the electronic device, by checking the current confirmation and displaying an indication of passcode input, informs the user of the device's current configuration and prompts the user to provide the appropriate input.

In some embodiments, the one or more input devices includes a fingerprint sensor (e.g., 710, a capacitive fingerprint reader, a button that functions as both a power button and a fingerprint sensor, as described with reference to FIGS. 11A to 11M-4), and the visual indication (e.g., 704A of FIG. 7C-2) comprises an indication that a fingerprint input is requested. In some embodiments, the electronic device (e.g., 700) receives the input that corresponds to the visual indication (e.g., 704A of FIG. 7C-2) of the one or more steps includes, detecting (814), by the fingerprint sensor (e.g., 710), a fingerprint, and the authorization criteria includes a criterion that is met when the detected fingerprint is consistent with an enrolled fingerprint that is authorized to release the credentials from the secure element. By including a criterion that is met when the detected fingerprint is consistent with an enrolled fingerprint, the electronic device provides additional secure that helps to prevent unauthorized users from authorizing operations, thereby making the system more secure.

In some embodiments, the visual indication (e.g., 704A of FIG. 7C-2) comprises an animation (e.g., 704B of FIG. 7C-2) that indicates a location of the fingerprint sensor (e.g., 710) on the electronic device 700. For example, the visual indication is an animation (e.g., 704B of FIG. 7C-2) that moves toward the fingerprint sensor (e.g., 710) on the device, such as an arrow (e.g., 704B of FIG. 7C-2) that points in the direction of the fingerprint sensor (e.g., 710) and that moves linearly on an axis that corresponds to the alignment of the arrow (e.g., 704B of FIG. 7C-2). Thus, by displaying an animation that indicates the location of the device configured to receive input, the electronic device prompts the user to provide input using a particular input device (e.g., the fingerprint sensor), even if the device includes multiple input devices.

In some embodiments, the authorization criteria includes a criterion that is met when activation of an authorization affordance (e.g., 704D of FIG. 7D-2) displayed on the second display (e.g., 704, at a secure location on the second display) is detected and a criterion that is met when a received sequence of one or more characters is consistent with a passcode (e.g., a passcode stored at the device) that is authorized to release the credentials from the secure element. By displaying the authorization affordance on the second display, the user gains additional confidence that cause of the display of the affordance is a genuine request for credentials (e.g., is in response to a genuine request for credentials) and that the corresponding parameters interface is therefore secure (e.g., securely displayed by the operating system of the device, rather than a rogue process), thereby improving the machine-man interface. Further, when the display of the authorization affordance on the second display is at a secure location, an additional level of security is achieved which provides the user with additional confidence that the request for credentials is genuine. In some examples, authorization criteria includes an additional criterion that is met when activation of the authorization affordance (e.g., 704D of FIG. 7D-2) is detected prior to receiving the sequence of characters (e.g., because a fingerprint has not been enrolled at the device or because the authorization of transactions using fingerprints has been disabled by the user).

In some embodiments, the electronic device (e.g., 700) displays (e.g., concurrently with the visual indication (e.g., 704A of FIG. 7D-2) of the one or more steps), on the second display (e.g., 704), the authorization affordance (e.g., 704D of FIG. 7D-2). Concurrent display of the one or more steps and the authorization affordance allows the user to quickly appreciate both the required steps and the location at which the required steps should be performed, thereby improving the machine-man interface. For example, the authorization affordance (e.g., 704D of FIG. 7D-2) is displayed at a location on the display that is secure, as described below. In some embodiments, the visual indication (e.g., 704A of FIG. 7D-2) of the one or more steps comprises an indication that activation of the authorization affordance (e.g., 704D of FIG. 7D-2) displayed on the second display (e.g., 704) is requested.

The electronic device (e.g., 700) receives (822), using the one or more input devices, input that corresponds to the visual indication (e.g., 704A) of the one or more steps.

In some embodiments, the electronic device (e.g., 700) receiving the input that corresponds to the visual indication (e.g., 704A of FIG. 7D-2) of the one or more steps includes detecting (818) activation of the authorization affordance (e.g., 704D of FIG. 7D-2). In some examples, subsequent to detecting activation of the authorization affordance (e.g., 704D of FIG. 7D-2) displayed on the second display (e.g., 704), the electronic device (e.g., 700) prompts the user to provide a passcode. In some examples, the prompt to provide the passcode is concurrently displayed on the first display (e.g., 702) and the second display (e.g., 704). In some examples, the prompt to provide the passcode is displayed on the second display (e.g., 704) at the secure location. Thus, by displaying the prompt at the secure location, the electronic device confirms to the user that the request is authentic and that the proposed operation is secure.

In some embodiments, the electronic device (e.g., 700) receiving the input that corresponds to the visual indication (e.g., 704A) of the one or more steps also includes receiving (820) (e.g., subsequent to detecting activation of the authorization affordance (e.g., 704D), subsequent to prompting the user to provide a passcode), by the one or more input devices (e.g., a keyboard), a sequence of characters (e.g., a sequence of alphanumeric and/or symbol characters). By first detecting activation of the authorization affordance prior to prompting (and receiving) the sequence of characters (e.g., a password), the electronic device reduces the risk that the user will provide the sequence of characters in situations where the prompt for the sequence of characters is performed by an unscrupulous process, such as a process intended to steal user passwords. In some examples, the electronic device (e.g., 700) includes a keyboard (e.g., 706A) and the sequence of characters is received via a typing input on the keyboard (e.g., 706A) of the device. In some examples, the keyboard (e.g., 706A) is a hardware keyboard that is separate from the first display (e.g., 702) and the second display (e.g., 704). In some examples, the keyboard is a soft keyboard that is displayed on a portion of the first display (e.g., 702) or a portion of the second display (e.g., 704).

In some embodiments, the one or more input devices includes a keyboard (e.g., 706A) that is not paired with the secure element (e.g., the keyboard is an external keyboard that is attached to the device, and thus is not capable of and is not authorized to release credentials stored in the secure element), and the received sequence of characters is passed from a first processor associated with the keyboard to a second processor associated with the secure element and the second display (e.g., 704). Additional details relating to this technique are described throughout cross-referenced U.S. patent application Ser. No. 15/256,959, included as Appendix A, in particular at FIG. 3 and paragraphs [0047]-[0048], [0080], and [0094].

In some embodiments, the fingerprint sensor (e.g., 710) is integrated into a hardware input element (e.g., 708) of the electronic device (e.g., 700). In some examples, the input element is sensitive to changes in intensity and activates when depressed. In some examples, the input element is an intensity-sensitive button with integrated intensity sensors that is interpreted as having been activated when an intensity of an input on the intensity-sensitive button reaches an activation threshold. In some examples, the hardware input element (e.g., 708) corresponds with the second display (e.g., 704), such as by forming a touch-sensitive display, and the hardware input element (e.g., 708) is a secure location on the second display (e.g., 704). In some embodiments, while the parameters interface (e.g., 720) for the operation for which authorization is required is displayed, the electronic device (e.g., 700) forgoes performing any function in response to detecting activation of the hardware input element (e.g., 708). In some examples, the electronic device (e.g., 700) maintains a first account as the account actively logged into the device, and forgoes transitioning the state of the device such that a second account (different from the first account) is actively logged into the device when detecting activation (e.g., press) of the hardware input element (e.g.,

708), regardless of authorization (e.g., fingerprint authorization). In some examples, activating the hardware input element (e.g., 708) does not cause the electronic device (e.g., 700) to perform a task, activating the hardware input element (e.g., 708) does not cause any change in displayed content on the first display (e.g., 702) or the second display (e.g., 704), and/or activating the hardware input element (e.g., 708, regardless of how long the hardware input element is pressed) does not shut down or power down the electronic device (e.g., 700). By not performing a task when activation of the hardware input element is detected while the parameters interface is displayed, the electronic device avoids changing the actively logged in user at the electronic device during an ongoing operation, such as a payment transaction, thereby creating a better and more efficient machine-man interface.

In response to receiving the input, in accordance with a determination that the input is consistent with authorization criteria (and/or the authorization criteria being met), causing (824) credentials to be released from the secure element for use in the operation (e.g., payment information for use in a payment transaction).

In some embodiments, in accordance with a determination that the input is not consistent with authorization criteria, the electronic device (e.g., 700) forgoes (826) causing credentials to be released from the secure element for use in the operation (e.g., the payment transaction). In some embodiments, subsequent to receiving the sequence of characters, and in accordance with a determination that the received sequence of characters is not consistent with the enrolled passcode, the electronic device (e.g., 700) forgoes causing credentials to be released from the secure element for use in the operation (e.g., the payment transaction). In some examples, subsequent to a determination that the received sequence of characters is not consistent with the enrolled passcode, the electronic device (e.g., 700) concurrently displays, on the first display (e.g., 702) and/or on the second display (e.g., 704), a prompt instructing the user to re-enter a passcode. In some examples, the enrolled passcode is a user login passcode of the electronic device (e.g., of the account that is actively logged in on the device).

In some embodiments, the one or more input devices of the electronic device (e.g., 700) includes one or more cameras (e.g., a camera with depth sensing capabilities, multiple cameras for use in generating a depth map using parallax effect, one or more camera sensors). In some embodiments, the visual indication (e.g., 704A) comprises an indication that a biometric identification (e.g., a facial identification, an eye-based identification such as iris recognition or a retinal scan) is requested. By providing a display that the request is based on a biometric identification, the electronic device informs the user of the state of the device (requiring biometric authentication) and prompts the user to provide the required input, thereby improving the machine-man interface. In some embodiments, the electronic device (e.g., 700) receiving the input that corresponds to the visual indication (e.g., 704A) of the one or more steps includes detecting, by the one or more cameras, biometric identification (e.g., of a user). In some examples, the biometric identification is one or more images captured using the one or more cameras (e.g., camera sensors). In some examples, the electronic device (e.g., 700) uses the one or more captured images to generate a depth map (or multiple depth maps) corresponding to one or more (or multiple physical features) of the user's physical features, such as the user's facial features. In some examples, the authorization criteria include a criterion that is met when the detected biometric identification is consistent with enrolled biometric identification that is authorized to release the credentials from the secure element. In some examples, the authorization criteria includes a criterion that is met when the generated depth map corresponding to one or more of the user's physical features is consistent with enrolled biometric depth map information (e.g., enrolled depth map corresponding to a registered user) that is authorized to release the credentials from the secure element.

Note that details of the processes described above with respect to method 800 (e.g., FIGS. 8A-8B) are also applicable in an analogous manner to the methods described below. For example, methods 1000 and 1200 optionally include one or more of the characteristics of the various methods described above with reference to method 800. In some examples, the electronic devices 700, 900, and 1100 are the same electronic device. In some examples, the first display and second display described with reference to methods 800, 1000, and 1200 are analogous. For brevity, these details are not repeated below.

FIGS. 9A-1 to 9E-4 illustrate exemplary devices and user interfaces for causing display of one or more steps to be taken to enable an input device for user input using an electronic device 900 (e.g., a laptop computer) with an input device (e.g., a fingerprint sensor and/or a touch-sensitive display that is associated with a secure element), in accordance with some embodiments. The exemplary user interfaces depicted in these figures are used to illustrate the processes described below, including the processes in FIGS. 10A-10D.

Figures 1, 9A:
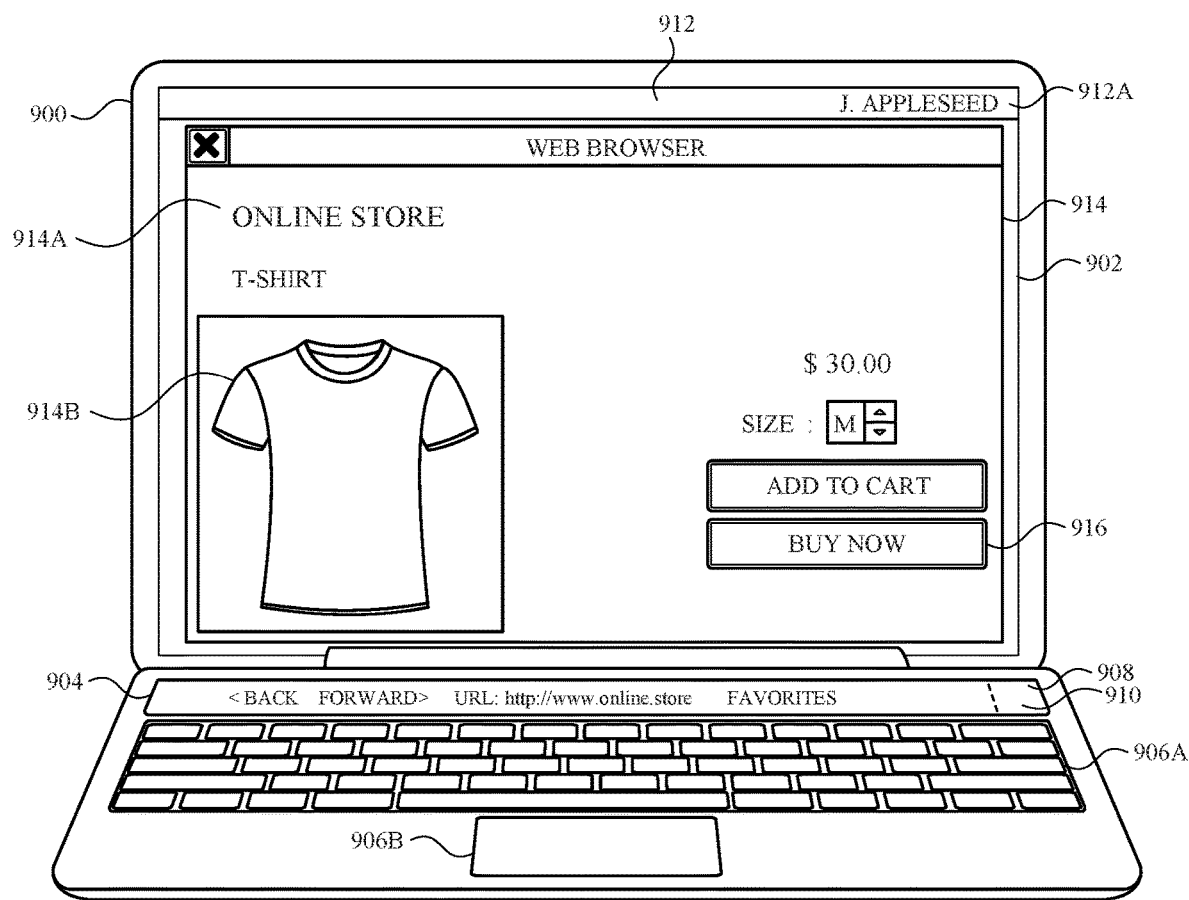
Figures 2, 9A:
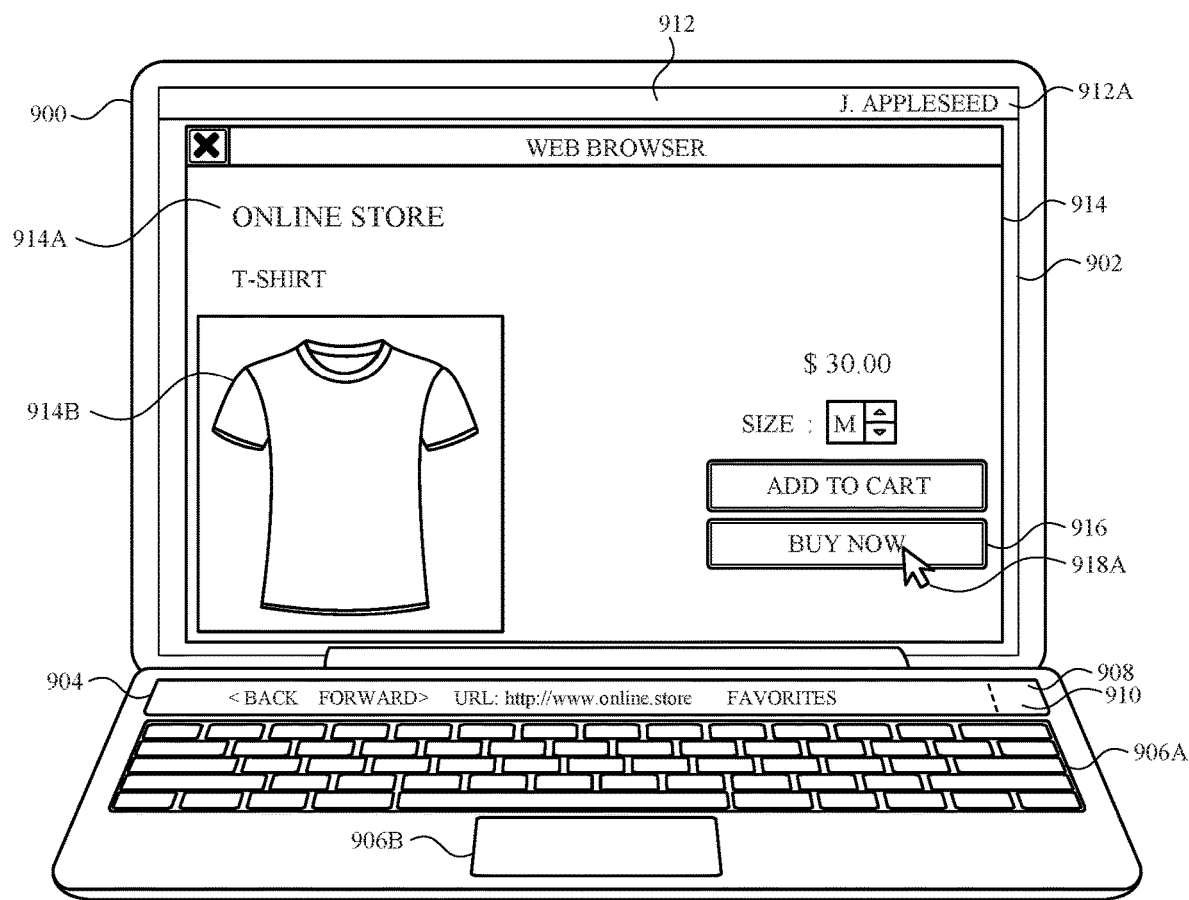
Figures 3, 9A:
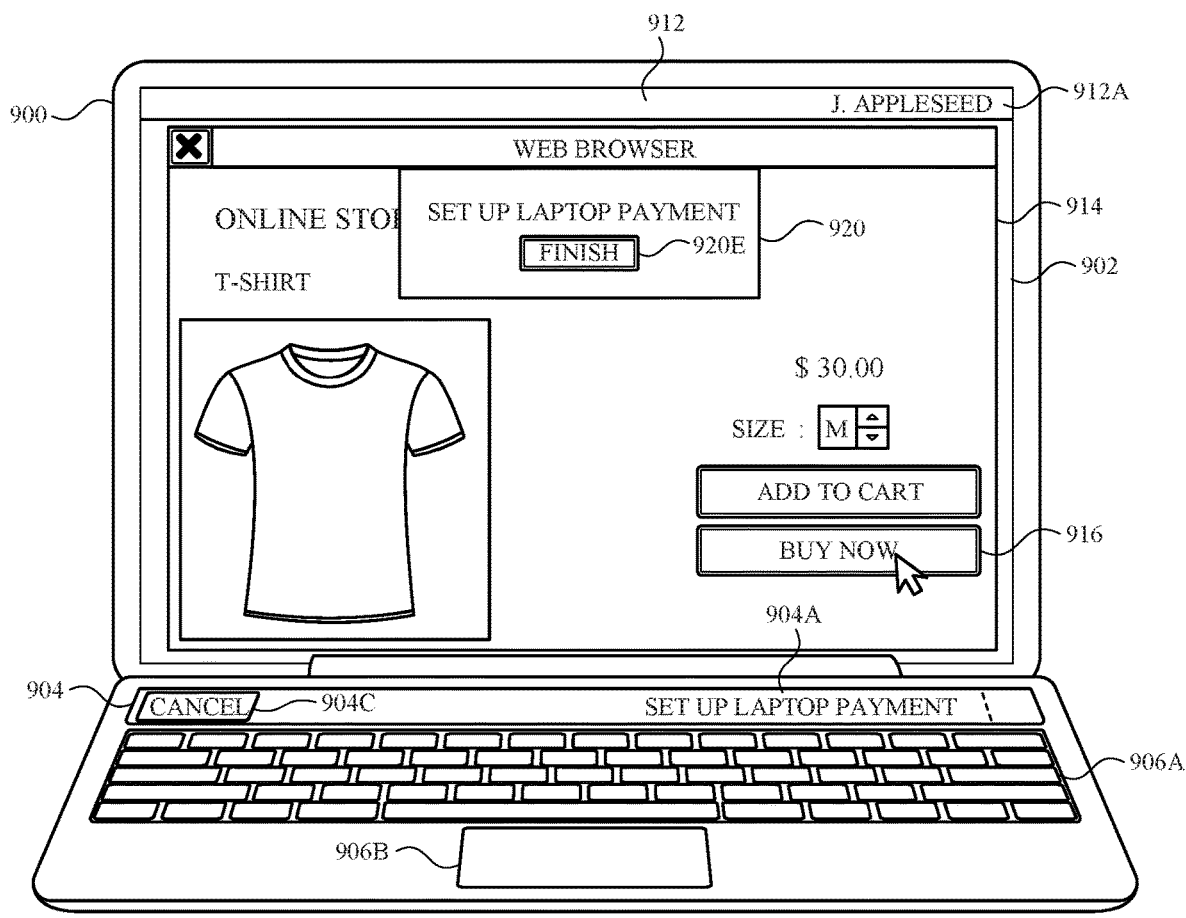
Figures 4, 9A:
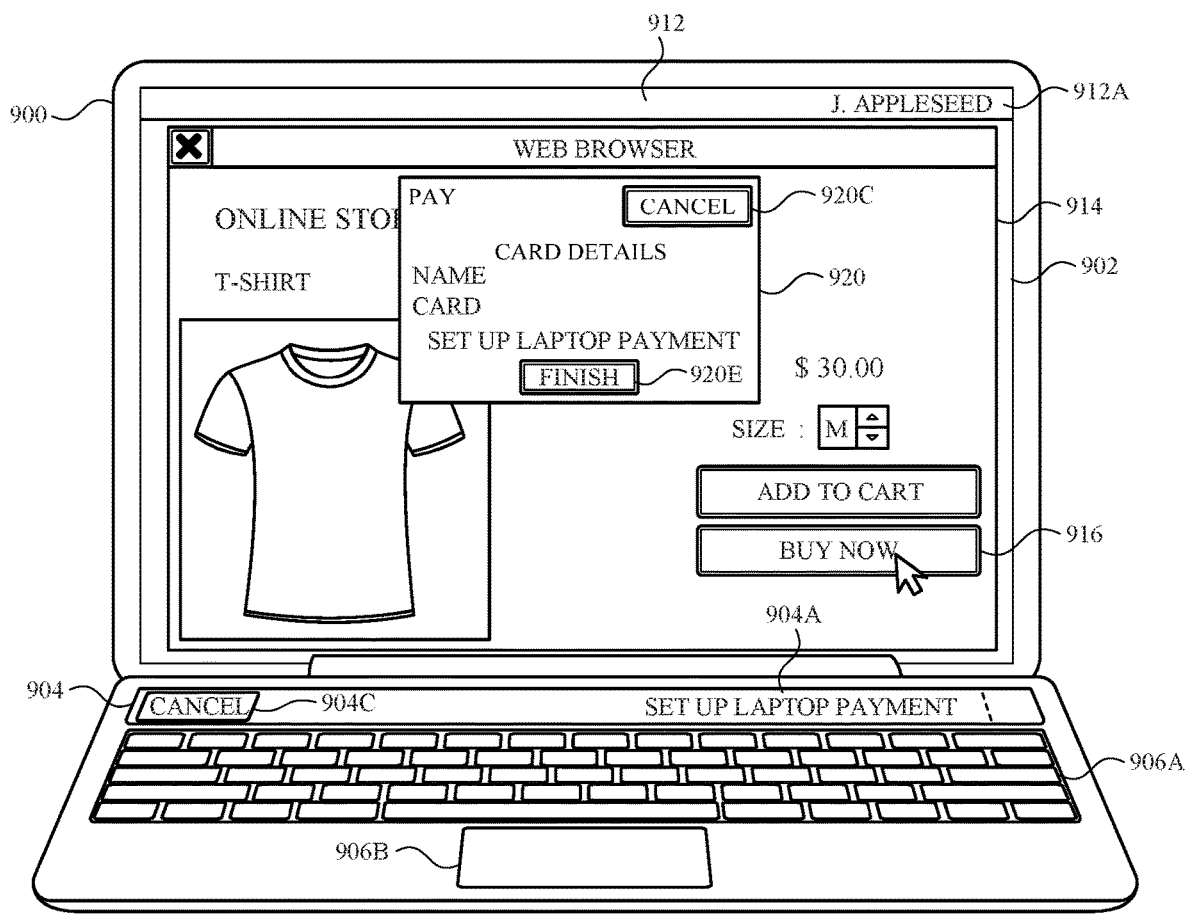
Figures 5, 9A:
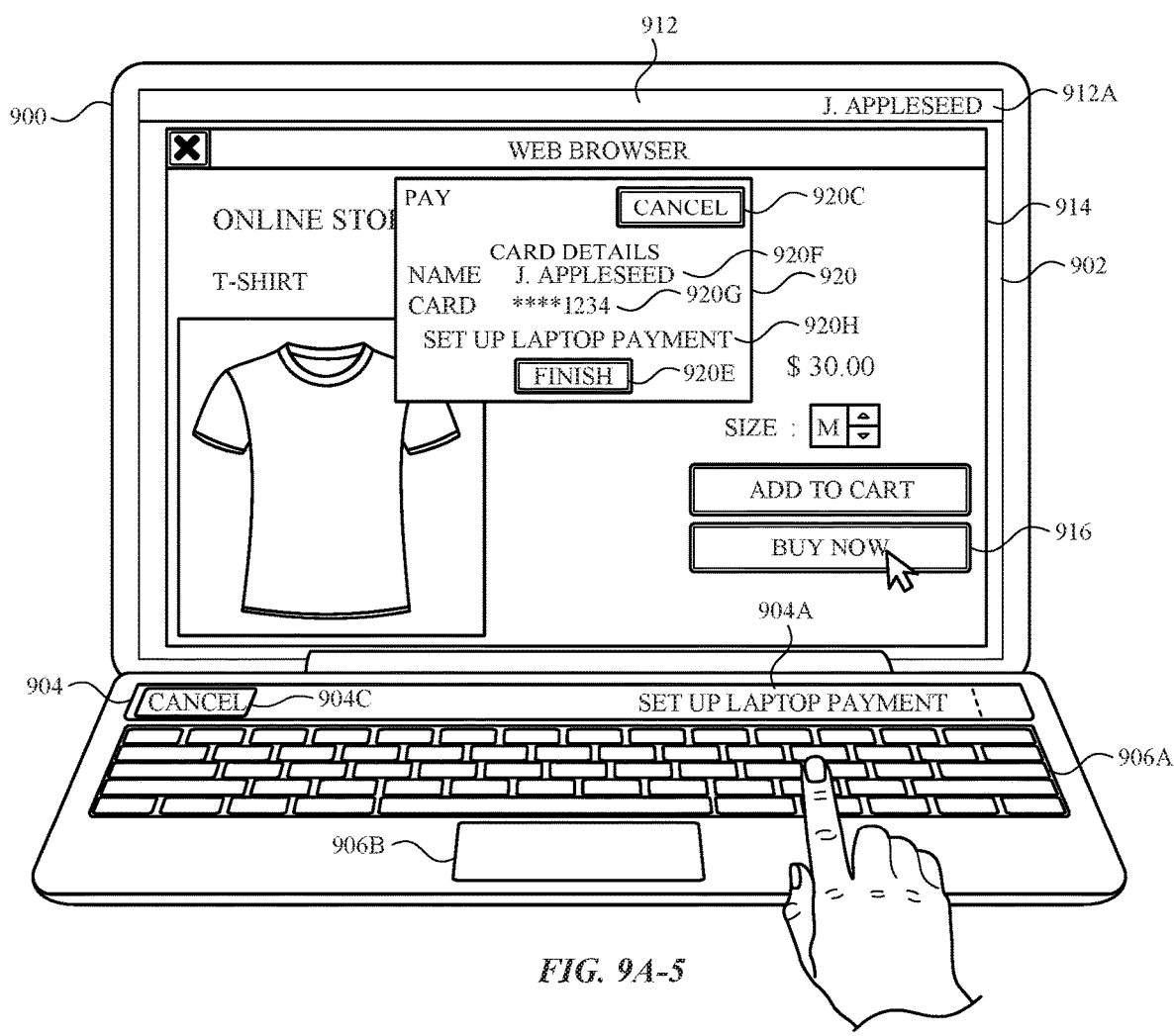
Figures 6, 9A:
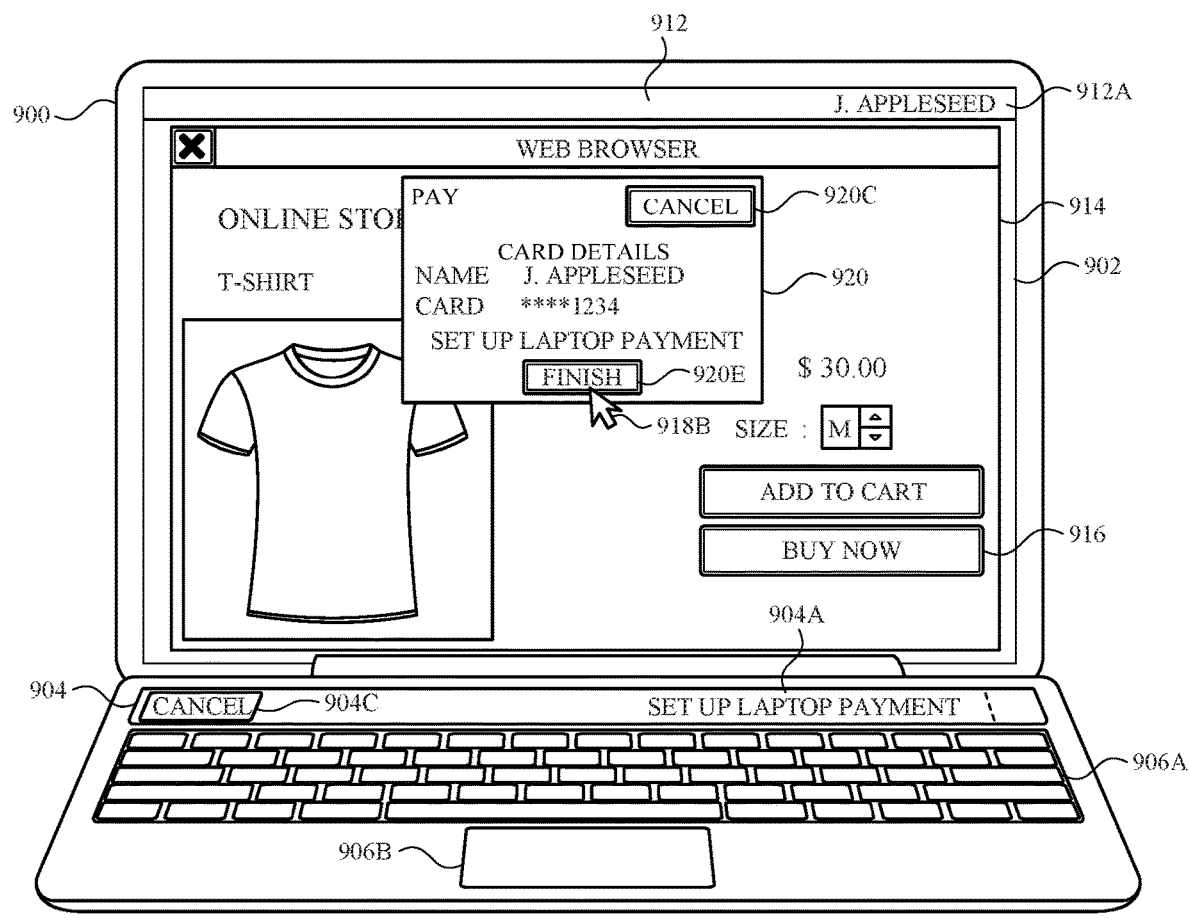

FIG. 9A-1 illustrates, in accordance with some embodiments, an electronic device 900. In some examples, electronic device 900 is the same as electronic device 700. The electronic device 900 has an input device for authorizing access to credentials. For example, the electronic device 900 has a fingerprint sensor 910 and/or a touch-sensitive display 904 that is associated with a secure element (e.g., for securely storing credentials, such as transaction credentials). In some embodiments, the electronic device 900 has a primary display 902 (e.g., a first display). In some embodiments, the electronic device 900 causes display of a user interface 912 at an external display 950. The exemplary user interfaces depicted in these figures are used to illustrate the processes described below, including the processes in FIGS. 10A-10D.

In some embodiments, in response to receiving a request for credentials, the electronic device determines whether various sets of criteria are met. Based on these determinations, the electronic device performs various functions. For example, the table below summarizes various sets of criterion and the resulting function performed. Each row in the table corresponds to a set of one or more criteria and the resulting function. The "Result" column indicates the function performed if the set of one or more criteria in that row are met. For example, "Yes" indicates that a criterion of the set of one or more criteria is met when the title condition of the corresponding column is true, "No" indicates that a criterion of the set of one or more criteria is met when the title condition of the corresponding column is not true, and "NA" indicates that the set of one or more conditions of the corresponding row is independent of (or does not include) the condition of the corresponding column. As described below, the sets of criteria (corresponding to rows) optionally include various criterions (corresponding to columns). In some examples, one or more criterions may be excluded from the corresponding sets of criteria, even if they are identified with a "Yes" or "No" in the table below.

| Storing-credentials | Authorized-account | Input-disabled | Proximity-device | Result |
|---|---|---|---|---|
| Yes | Yes | Yes | No | Instruct user to enable the input device for user input |
| No | NA | NA | NA | Instruct user to store credentials |
| Yes | No | NA | Yes | Instruct user to provide authorization at the second electronic device |
| Yes | Yes | Yes | Yes | Instruct user to provide authorization at the second electronic device |
| Yes | Yes | No | NA | Instruct user to provide authorization at the electronic device |

In some embodiments, the second display 904 of the electronic device 900 is a dynamic function row, such as the dynamic function row 5002 described with reference to FIGS. 5I-5N. In some embodiments, the second display 904 (e.g., the dynamic function row) of the electronic device 900 is separate from a physical keyboard 906A of the device (e.g., the second display 904 is included as part of a peripheral input mechanism). In some embodiments, the second display 904 is integrated with another input device, such as a touchpad 906B.

The electronic device 900 includes a secure element that stores credentials (e.g., transaction credentials) of an associated account (e.g., of a user of the electronic device) registered on the electronic device, where the account is enabled to authorize the secure element to store and release credentials. In some examples, the credentials comprise payment information that is stored in the secure element of the electronic device 900. In some examples, the credentials comprise authorization information (e.g., an enrolled fingerprint used for user authorization (to cause the secure element to release the credentials from the secure element)) that can be released from the secure element for use in an operation (e.g., a payment transaction).

In some embodiments, the second display 904 (e.g., the dynamic function row) is paired with the secure element, and thus the second display 904 is capable of and/or is authorized to release credentials stored in the secure element. For example, the secure element and the second display 904 are paired during the manufacturing process of the electronic device 900. When the second display 904 is paired with the secure element are paired, replacement of either the second display 904 or the secure element from the electronic device 900 requires that the components be re-paired to again enable the secure element to store and to release credentials (e.g., transaction credentials). In some embodiments, the second display 904 is paired with the secure element and the first display 902 is not paired with the secure element, and thus the second display 904 is capable of and/or is authorized to release credentials stored in the secure element while the first display 902 is not capable of and is not authorized to release credentials stored in the secure element.

The electronic device 900 includes a fingerprint sensor 910. In some embodiments, the fingerprint sensor 910 is located adjacent to the second display 904. In some embodiments, the fingerprint sensor 910 is a capacitive fingerprint reader. In some embodiments, the fingerprint sensor 910 is integrated into a hardware input element 908. In some embodiments, the hardware input element 908 is an input element that functions as both a power button (e.g., to power on and power off the electronic device 900) and a fingerprint sensor (as described below with respect to FIGS. 11A to 11M-4 and 12A to 12B). In some examples, the hardware input element 908 is an input element that is sensitive to changes in input intensity. In some examples, the hardware input element 908 is an intensity-sensitive button with integrated intensity sensors that activates when an intensity (e.g., a characteristic intensity) of an input on the intensity-sensitive button exceeds an activation threshold. In some embodiments, the hardware input element 908 forms a continuous touch-sensitive region with the second display 904.

FIGS. 9A-1 to 9A-6 illustrates exemplary devices and user interfaces for instructing the user to store credentials at the electronic device. FIG. 9A-1 illustrates a user interface 912 of the electronic device 900 as a user seeks to perform an operation (e.g., a payment transaction) for which authorization is required. The electronic device 900 displays, on a display (e.g., the first display 902), the user interface 912 generated by the device showing, on the foreground of the user interface 912, a browser application 914. In some examples, the user interface 912 includes an indication 912A of an account (e.g., the name of a user associated with the account, which, in this example, is "J. Appleseed") that is actively logged into the electronic device 900. For example, a user (e.g., "J. Appleseed") is browsing the internet using the browser application 914 in order to purchase an item 914B from an online store 914A. In this example, the actively logged-in account (e.g., indicated by 912A, the account of "J. Appleseed") is an account that is enabled to authorize the secure element to release credentials.

The electronic device 900 displays, on the application that is being used to perform the operation (e.g., perform the payment transaction) for which authorization is required, a payment affordance 916. For example, as illustrated in FIG. 9A-1, the online store 914A displayed on the browser application 914 includes a payment affordance 916 (e.g., a "Buy Now" affordance) corresponding to the operation.

FIG. 9A-2 illustrates the electronic device 900 receiving a request for credentials (e.g., transaction credentials) to authorize the operation for which authorization is required. In some examples, receiving the request for credentials includes detecting, by the one or more input devices (e.g., a computer mouse, touch input), activation (e.g., using mouse cursor 918A) of the payment affordance 916 corresponding to the operation. In some embodiments, the payment affordance 916 is a part of and controlled by the application being used to perform the operation (e.g., the browser application). In some embodiments, the payment affordance 916 is controlled by the operating system of the electronic device, separately from the application being used to perform the operation. In some examples, the electronic device 900 receives the request for credentials from a remote server. In some examples, the electronic device 900 receives the request from a locally executing application on the electronic device.

In some embodiments, in response to receiving the request for credentials and in accordance with a determination that a second set of one or more criteria is met, the second set of one or more criteria including a not-storing-credentials criterion that is met when the secure element does not have stored credentials (e.g., payment credentials), the electronic device causes display, on a display, (e.g., on the display of the electronic device or on an external display different from the display of the electronic device and different from the touch-sensitive display) of a visual indication of one or more steps to be taken to store credentials using the secure element (e.g., steps to provision the electronic device with a payment account, such as a credit card account). In some examples, the not-storing-credentials criterion is met when it is determined that the secure element is not storing payment credentials available for use in a payment transaction. In some examples, the electronic device provides a request to provision the electronic device with a payment account that is stored at a remote server. In some example, the electronic device displays a request for user input of payment account information, such as a credit card number and expiration date. In some examples, visual indication 904A replaces content, such as content specific to the running application (e.g., the browser application). For example, visual indication 904 A replaces the "back", "forward", URL, and "favorites" affordances displayed on the second display.

For example, as illustrated in FIGS. 9A-3 to 9A-4, in response to determining that the storing-credentials criterion is not met, the electronic device 900 displays, on a display (e.g., the first display 902), a parameters interface 920 with an indication 920H (e.g., "Set Up Laptop Payment") of the one or more steps to be taken to store credentials using the secure element, and also displays, on a different display (e.g., the second display 904), a visual indication 904A (e.g., "Set Up Laptop Payment") of the one or more steps to be taken to store credentials using the secure element. In some examples, the parameters interface 920 also includes a completion affordance 920E which, when activated, causes the electronic device 900 to store the entered credentials in the secure element. In some examples, as illustrated by the transition from FIG. 9A-3 to FIG. 9A-4, the electronic device 900 causes the parameters interface 920 to appear into view (e.g., by sliding down from an edge of the display).

In some examples, the parameters interface 920 is a payment sheet. In some examples, the payment sheet is a user interface of the operating system, rather than the first application. In some examples, the payment sheet is part of a first-party application provided by a provider of the operating system of the requesting device, wherein the first-party application is different from the first application. In some examples, the payment sheet includes user-selectable options for the payment transaction, such as a payment account option, shipping address option, a shipping method option, contact information options. In some examples, the payment sheet slides into display (e.g., into view on the one or more displays) in response to activation of the payment affordance. In some examples, the payment sheet at least partially obscures a webpage that includes the payment affordance. In some examples, subsequent to displaying the parameters interface that identifies one or more devices different from the electronic device, the electronic device receives information indicating whether authorization for responding to the request for credentials was provided at a device of the one or more devices, and in response, the electronic device provides an indication of whether authorization for responding to the request for credentials was provided at the device of the one or more devices.

In some examples, as illustrated in FIG. 9A-5, the parameters interface 920 receives information relevant to the credentials to be stored in the secure element of the electronic device 900. In some examples, the user enters this information using a keyboard, a camera sensor, or other input device. In some examples, the relevant information includes the name 920F of the user (e.g., "J. Appleseed") that is enabled to authorize operations (e.g., payment transactions) on the electronic device, an account number 920G (e.g., a credit card number) for operations (e.g., payment transactions) on the electronic device, a billing address and shipping address associated with the user (e.g., "J. Appleseed"), and/or contact information (e.g., phone number, email address) associated with the user (e.g., "J. Appleseed").

FIG. 9A-6 illustrates the electronic device 900 detecting activation 918B of the completion affordance 920E. For example, the user activates (e.g., by selecting the completion affordance 920E using a mouse, trackpad, or touch input) the completion affordance 920E when the user fully enters all information requested by the parameters interface 920 to complete registering credentials of the user on the secure element of the electronic device 900. In response to detecting activation of the completion affordance 920E (and, in response to determining that there are no errors associated with entries provided by the user), the electronic device 900 displays, on the first display 902, a parameters interface 920 for proceeding with the operation (e.g., the payment transaction), for example as described with reference to FIGS. 7A to 7D-10.

In some examples, the electronic device provides the user with the ability to use a second electronic device to authorize the operation, regardless of whether the storing-credentials criterion is met or not. For example, if the electronic device determines that a proximity-device criterion (e.g., that is met when the electronic device is in communication with a second electronic device that is in proximity to the electronic device and that is enabled to respond to the request for credentials) is met, the electronic device provides the user with the ability to use the second electronic device to authorize the operation. Additional details relating to this technique are described throughout cross-referenced U.S. patent application Ser. No. 15/269,801, portions of which are included as Appendix C.

Figures 1, 9B:
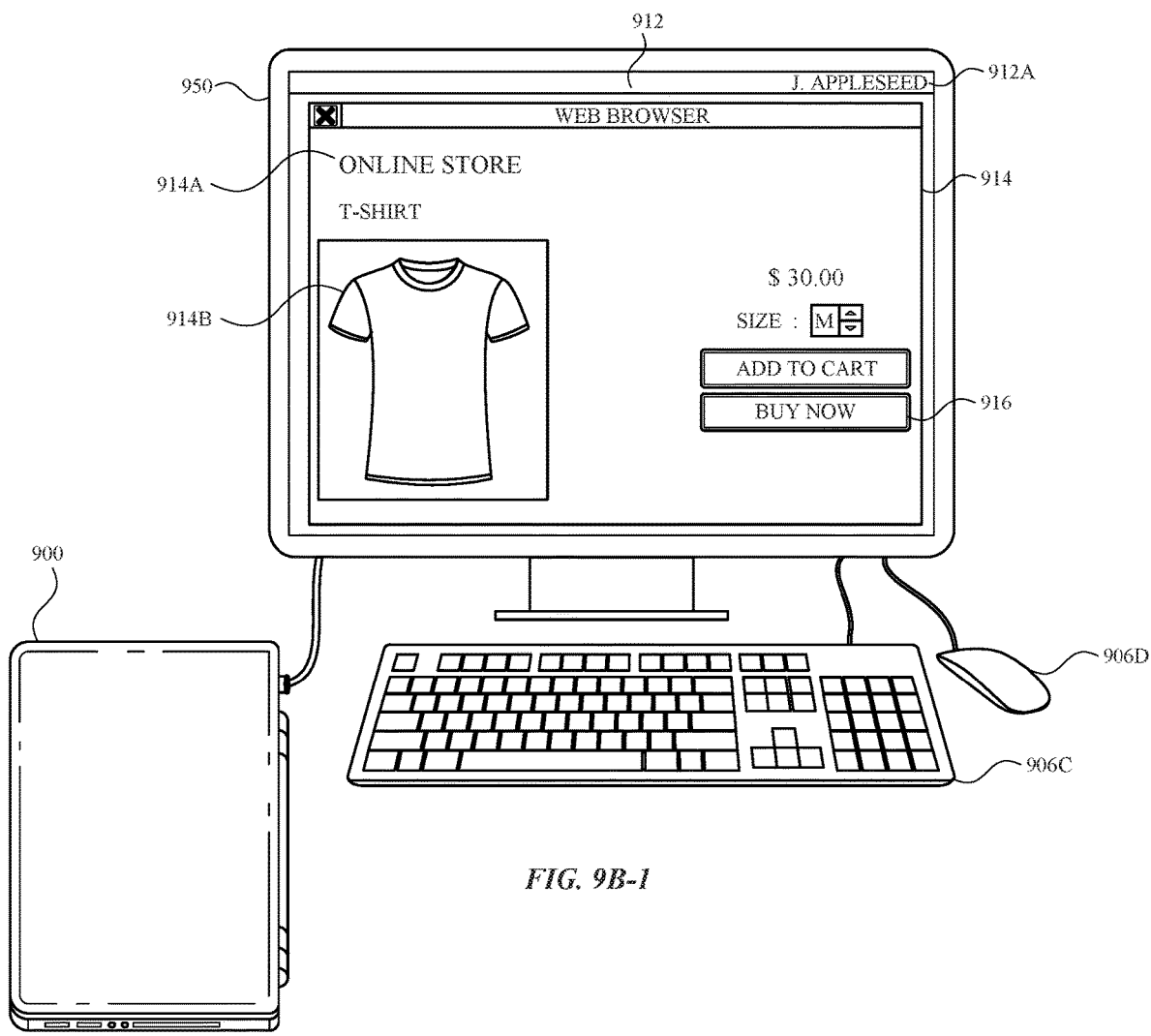
Figures 2, 9B:
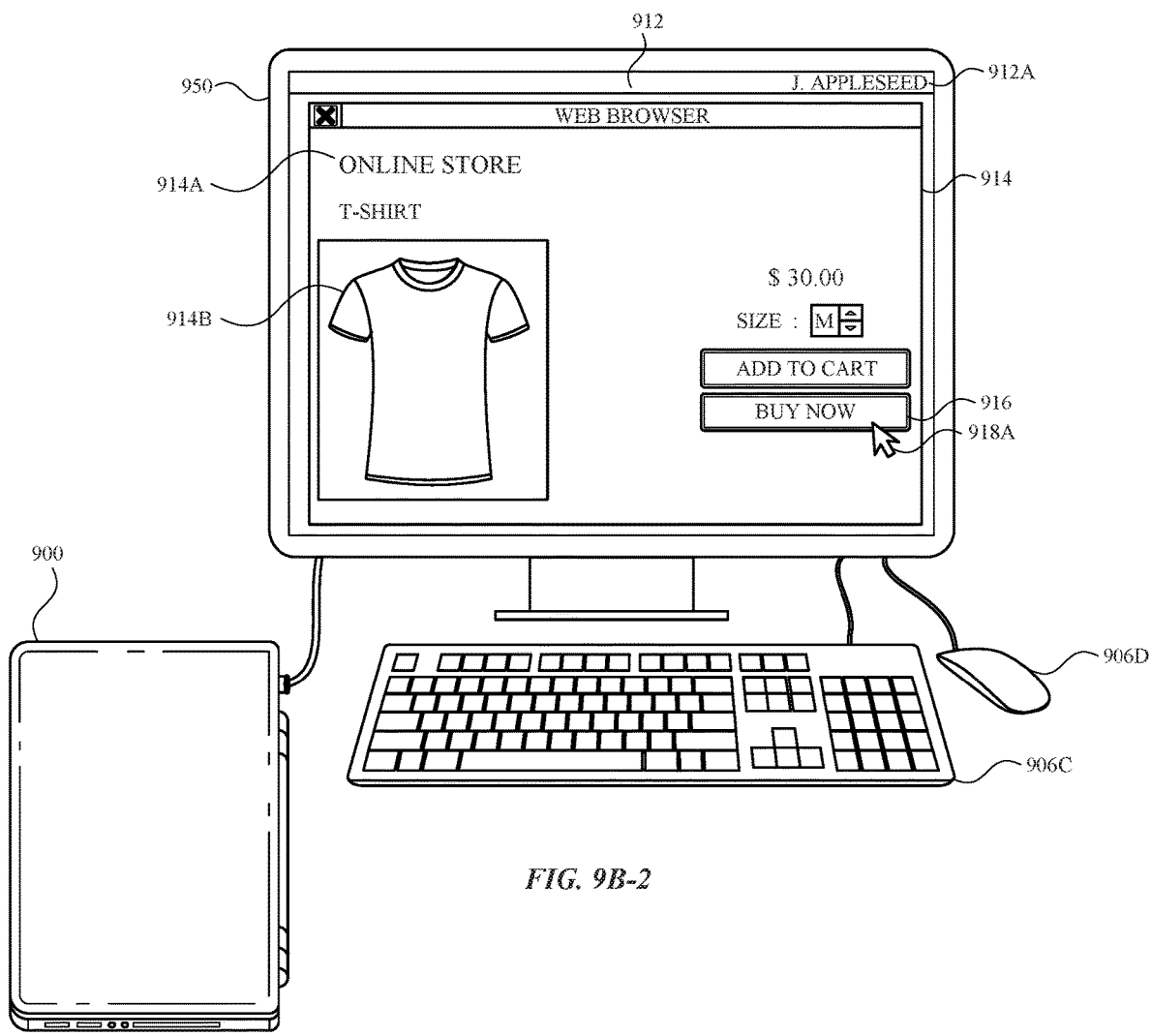
Figures 3, 9B:
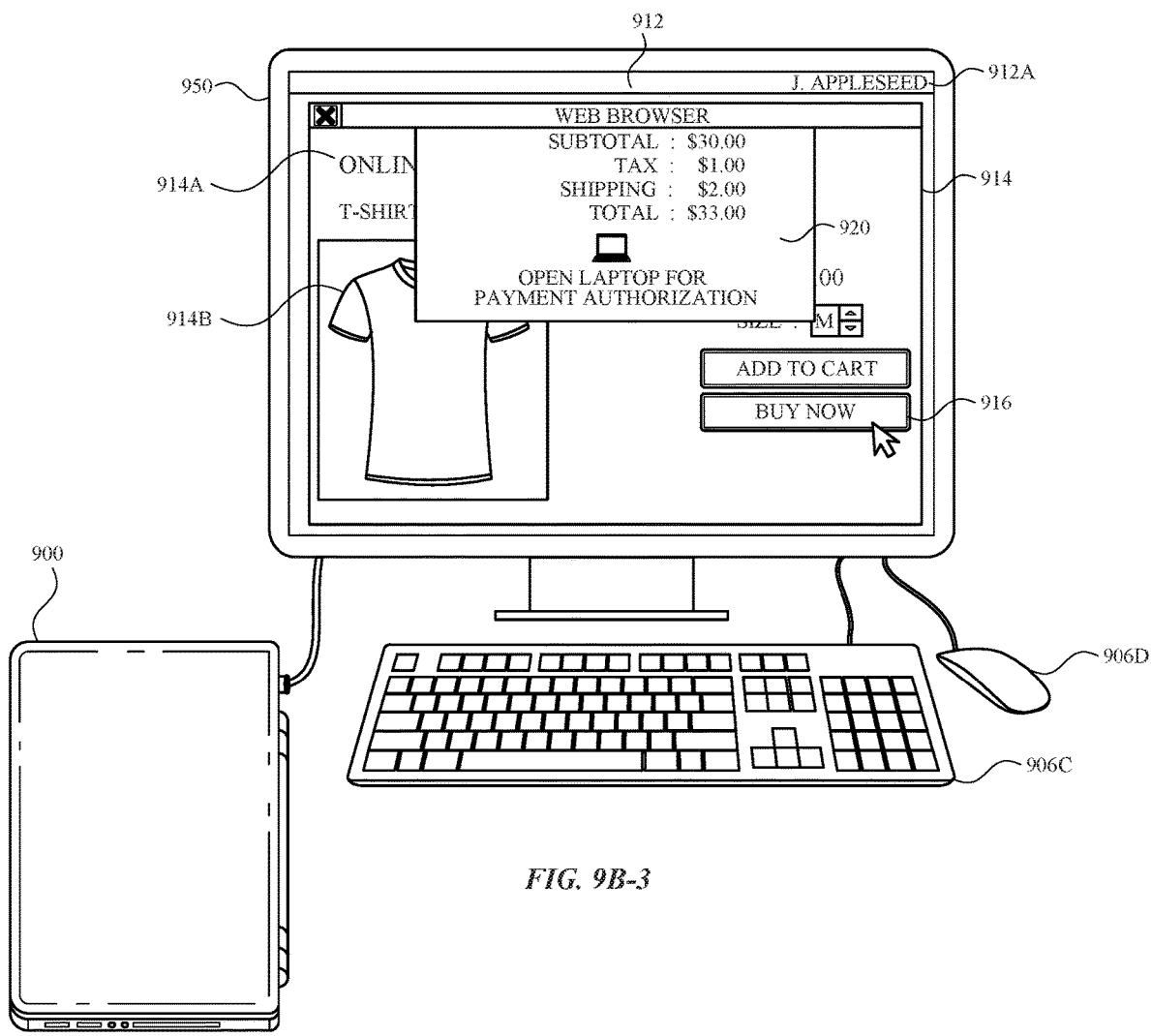
Figures 4, 9B:
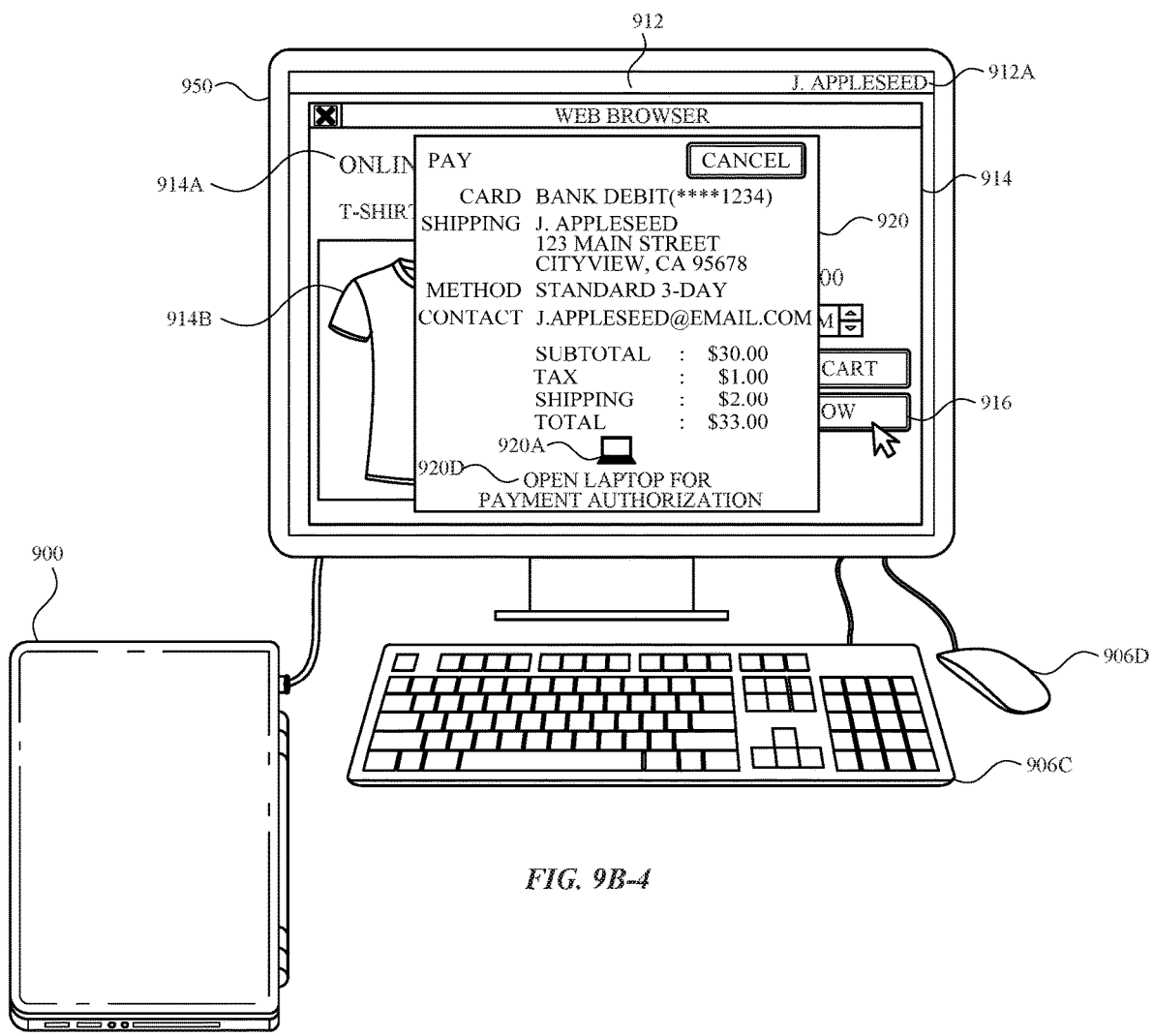
Figures 5, 9B:
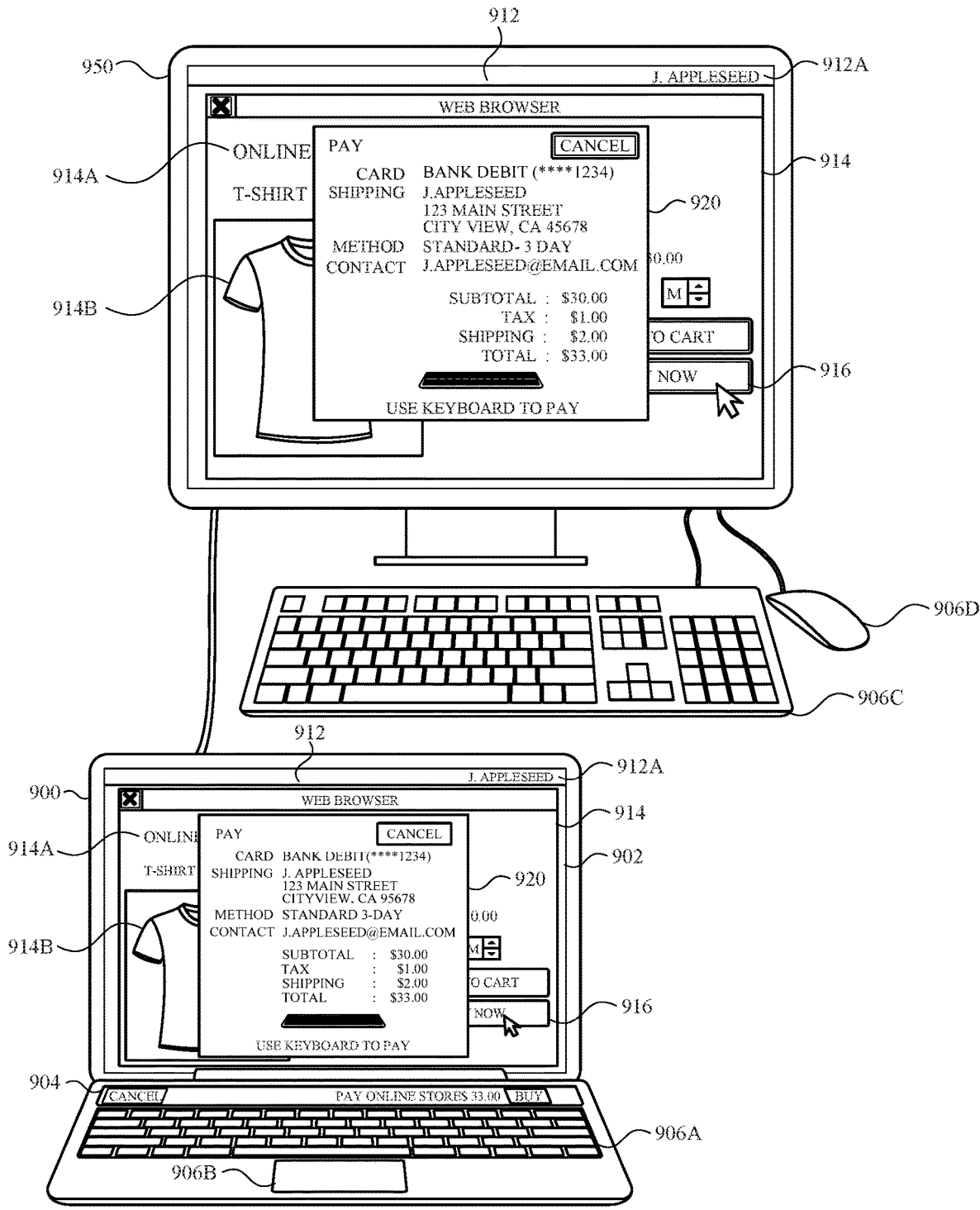
FIGS. 5C-5D illustrate exemplary components of a personal electronic device having a touch-sensitive display and intensity sensors in accordance with some embodiments.
FIGS. 5E-5H illustrate exemplary components and user interfaces of a personal electronic device in accordance with some embodiments.

FIGS. 9B-1 to 9B-5 illustrates exemplary devices and user interfaces for instructing the user to enable the input device of the electronic device. As illustrated in FIG. 9B-1, the electronic device 900 is in clamshell mode. In some examples, in clamshell mode, the electronic device 900 is connected to an external display 950 (e.g., via Thunderbolt, HDMI, DVI, VGA, etc.), and the electronic device 900 causes display of a user interface 912 on the external display 950. The integrated display (e.g., the primary display, the first display 902 of the electronic device) optionally does not display the user interface. For example, the electronic device 900 is a laptop computer and the laptop computer is in clamshell mode when the integrated display of the laptop computer is closed, making the touch-sensitive display (e.g., the second display 904) and/or a fingerprint sensor of the electronic device 900 inaccessible. The laptop computer is connected to an external display, which causes the input device (e.g., the touch-sensitive display and/or fingerprint sensor) of the electronic device 900 to be disabled for user input. In some examples, in clamshell mode, the electronic device 900 is also connected to an external keyboard 906C that is connected to the electronic device 900 via cable, and is separate from the integrated keyboard 906A of the electronic device. In some examples, in clamshell mode, the electronic device 900 is also connected to an external mouse 906D (or an external touchpad) that is separate from the integrated touchpad 906B of the electronic device.

FIGS. 9B-1 to 9B-2 illustrate a user interface 912 of the electronic device 900, displayed on an external display 950, as a user is attempting to perform an operation (e.g., a payment transaction) for which authorization is required. FIG. 9B-1 illustrates the electronic device 900 causing display, on the external display 950, of the user interface 912 showing, on the foreground of the interface, a browser application 914. In some examples, the user interface includes an indication 912A of an account (e.g., the name of a user associated with the account, which, in this example, is "J. Appleseed") that is actively logged into the electronic device 900. For example, the user (e.g., "J. Appleseed") is browsing the Internet using the browser application 914 in order to purchase an item 914B from an online store 914A.

The application that is being used to perform the operation (e.g., perform the payment transaction) for which authorization is required includes a payment affordance 916. For example, as illustrated in FIG. 9B-1, the website of the online store 914A displayed on the browser application 914 includes a payment affordance 916 (e.g., a "Buy Now" affordance) corresponding to the operation. Activating the payment affordance 916 allows the user to proceed with performing the operation (e.g., to proceed with purchasing the item 914B). In some embodiments, the payment affordance 916 is a part of and controlled by the application being used to perform the operation (e.g., the browser application). In some embodiments, the payment affordance 916 is controlled by the operating system of the electronic device, separately from the application being used to perform the operation.

FIG. 9B-2 illustrates the electronic device 900 receiving a request for credentials (e.g., transaction credentials) to authorize the operation for which authorization is required when the user selects the payment affordance 916 to proceed with the operation (e.g., to proceed with the online purchase of the item 914B). In some examples, receiving the request for credentials includes detecting, by the one or more input devices (e.g., a computer mouse, touch input), activation 918A of the payment affordance 916 corresponding to the operation. As such, while causing display of the user interface generated by the electronic device 900 on the external display 950, the electronic device receives a request for credentials (e.g., payment credentials). In some examples, the request for credentials is received from a remote server. In some examples, the request is received from a locally executing application.

In some embodiments, as illustrated in FIG. 9B-2, a user is browsing the Internet using a browser application 914, displayed on the external display 950, to purchase an item 914B from an online store 914A. The online store 914A displayed on the browser application contains a payment affordance 916 (e.g., a "Buy Now" affordance) corresponding to the operation for which authorization is required. For example, activating the payment affordance 916 allows the user to proceed with purchasing the item 914B. In some examples, the payment affordance 916 is displayed by a first application (e.g., the browser application). In some examples, the operation for which authorization is required is a payment transaction.

The electronic device 900 stores a first set of one or more criteria. The first set of one or more criteria includes an input-disabled criterion that is met when the input device (e.g., a fingerprint sensor of the electronic device 900 and/or a touch-sensitive display (e.g., the second display 904) of the electronic device 900 that is associated with the secure element) is not enabled for user input. For example, the electronic device 900 is not enabled for user input when the device is a laptop computer, and the laptop is "closed" (e.g., in clamshell mode). In a clamshell mode, the built-in integrated display of the laptop computer is closed, making the touch-sensitive display (e.g., the second display 904) of the electronic device 900 inaccessible to the user.

As illustrated in FIGS. 9B-3 to 9B-4, in accordance with a determination that the first set of one or more criteria is met, the first set of one or more criteria including the input-disabled criterion that is met when the input device is not enabled for user input, the electronic device 900 causes display, on the display, (e.g., on an external display different from a display of the electronic device) of a visual indication 920D of one or more steps to be taken to enable the input device for user input. In some examples, the visual indication 920D is displayed as part of a parameters interface 920 that prompts the user to open the electronic device 900. In some examples, the parameters interface 920 that prompts the user to open the electronic device slides into view from an area (e.g., an edge) of the display, as illustrated by the transition from FIG. 9B-3 to FIG. 9B-4. In some examples, the parameters interface 920 includes a graphical indication 920D prompting the user to open and directly use the electronic device 900 to provide authorization for the operation (e.g., payment transaction). In some examples, the parameters interface 920 includes a textual indication 920D prompting the user to open and directly use the electronic device 900 to provide authorization for the operation (e.g., "Open Laptop For Payment Authorization").

In some embodiments, the first set of one or more criteria stored in the electronic device 900 also includes a storing-credentials criterion that is met when the secure element of the electronic device has stored credentials (e.g., payment credentials). In some examples, the storing-credentials criterion is met when it is determined that the secure element of the electronic device 900 has been configured to store (and is storing) payment credentials available for use in a payment transaction.

In some embodiments, the first set of one or more criteria stored in the electronic device 900 also includes an authorized-account criterion that is met when an account actively logged into the electronic device 900 is enabled to authorize the secure element to release credentials (e.g., payment credentials). In some examples, the electronic device 900 is configured for use with multiple accounts. In some examples, an account of the multiple accounts is enabled to authorize the secure element to release credentials (e.g., payment credentials), and other accounts of the multiple accounts are not enabled to authorize the secure element to release credentials. In some examples, the account of the multiple accounts is enabled to authorize payments using the secure element of the electronic device 900. In some examples, the secure element includes credentials for various payments account, which are selectable by the user for use the operation.

In some embodiments, the first set of one or more criteria stored in the electronic device 900 also includes a proximity-device criterion that is met when the electronic device is in communication with a second electronic device that is in proximity to the electronic device and that is enabled to respond to the request for credentials. Additional details relating to this technique (e.g., the "hand-off" operation) are described throughout cross-referenced U.S. patent application Ser. No. 15/269,801, portions of which are included in Appendix C, in particular at FIGS. 8A-8M and paragraphs [0203]-[0232].

In some embodiments, as illustrated in FIG. 9B-5, once the user causes the electronic device to enable the input device, such as by opening the electronic device 900 (e.g., opens the laptop computer) such that the device is no longer in clamshell mode, the electronic device 900 causes display of the user interface 912 on an integrated display (e.g., the first display 902) of the electronic device. In some examples, the electronic device 900 continues to cause the external display 950 to concurrently display (e.g., duplicate) the user interface 912, as shown in FIG. 9B-5. In some examples, the electronic device 900 ceases to cause the external display 950 to display the user interface 912 once the electronic device is "open."

In accordance with the input device being enabled, the electronic device 900 proceeds with the operation (e.g., payment transaction) for which authorization is required, as described above with reference to FIGS. 7A to 7D-10 (e.g., using fingerprint authorization, passcode authorization, or a different type of authorization). For example, the electronic device receives user input (e.g., at the input device) for authorizing transmitting credentials for use in an operation associated with the request for credentials, and in response to receiving the input for authorizing transmitting credentials and in accordance with a determination that the input is consistent with authorization criteria, causes credentials to be released from the secure element for use in the operation.

Figures 1, 9C:
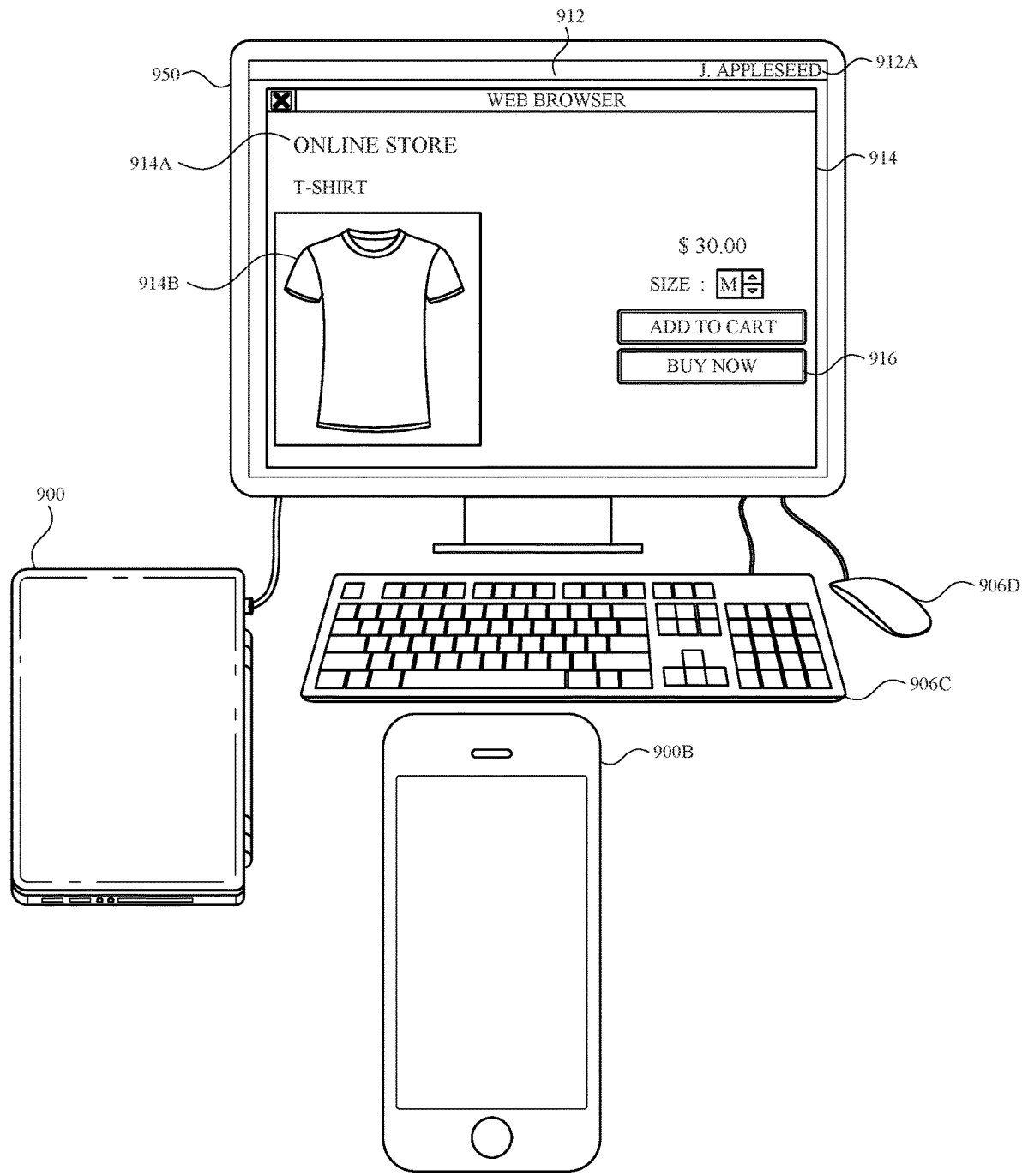
Figures 2, 9C:
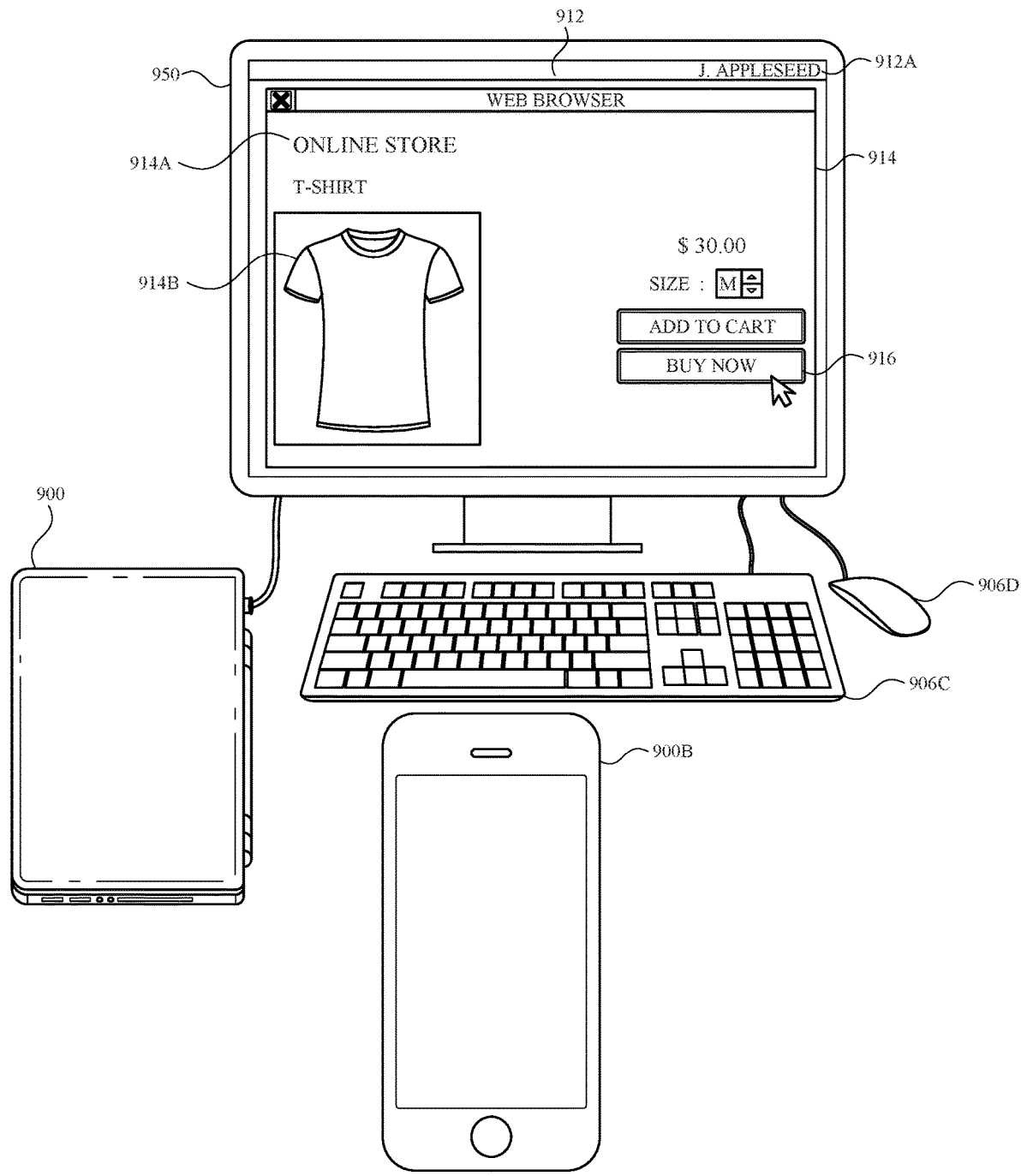
Figures 3, 9C:
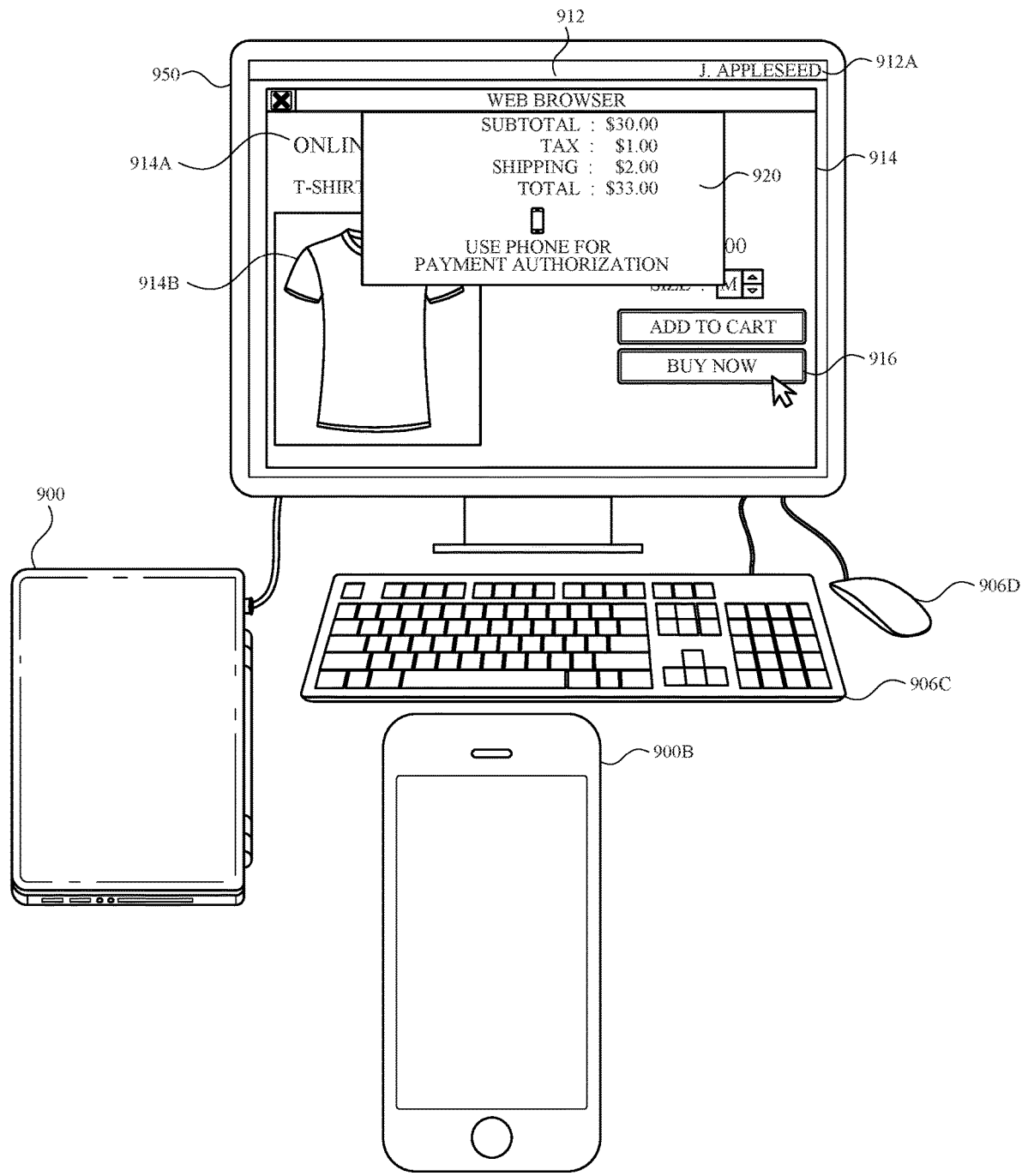
Figures 4, 9C:
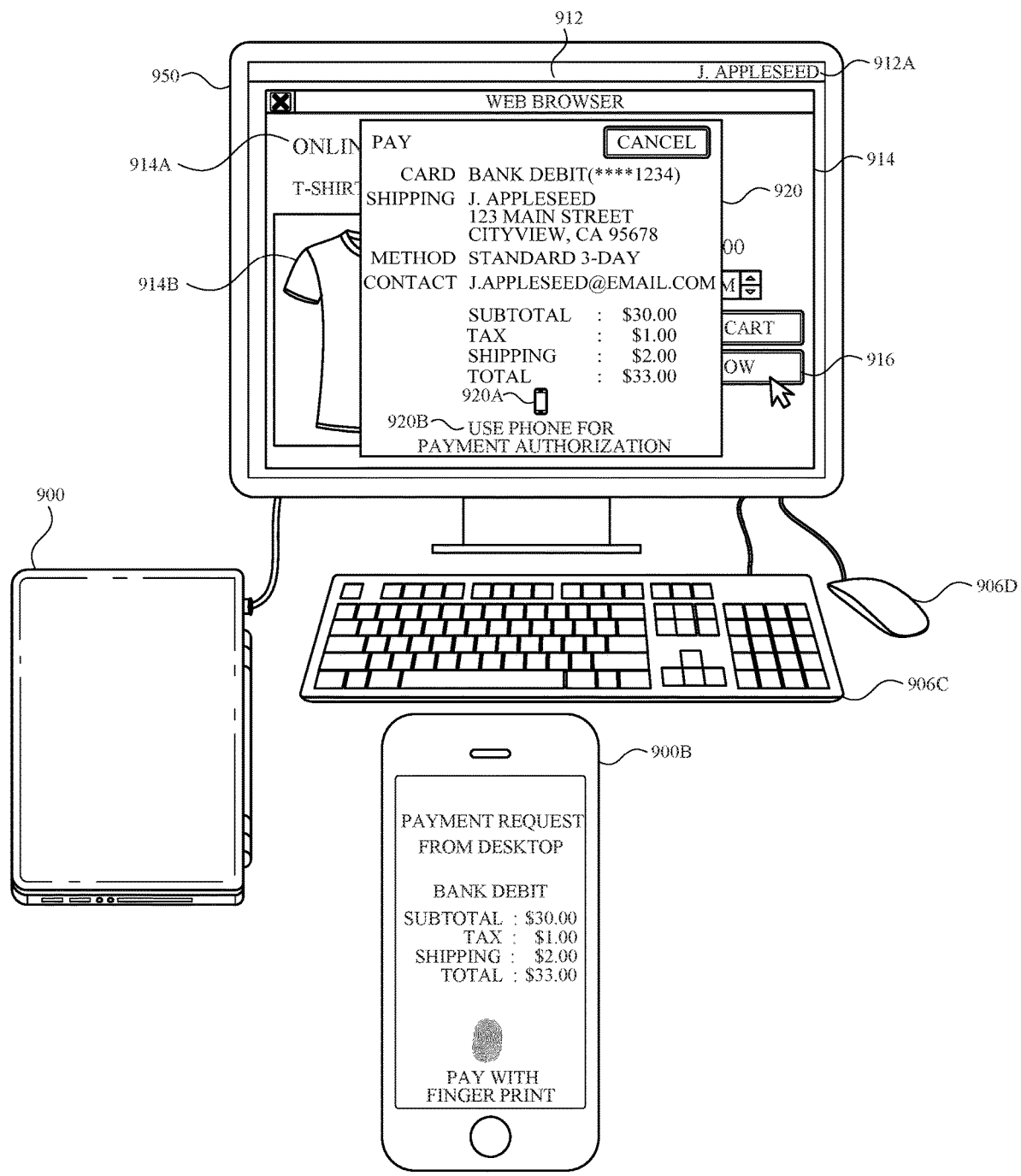
Figures 5, 9C:
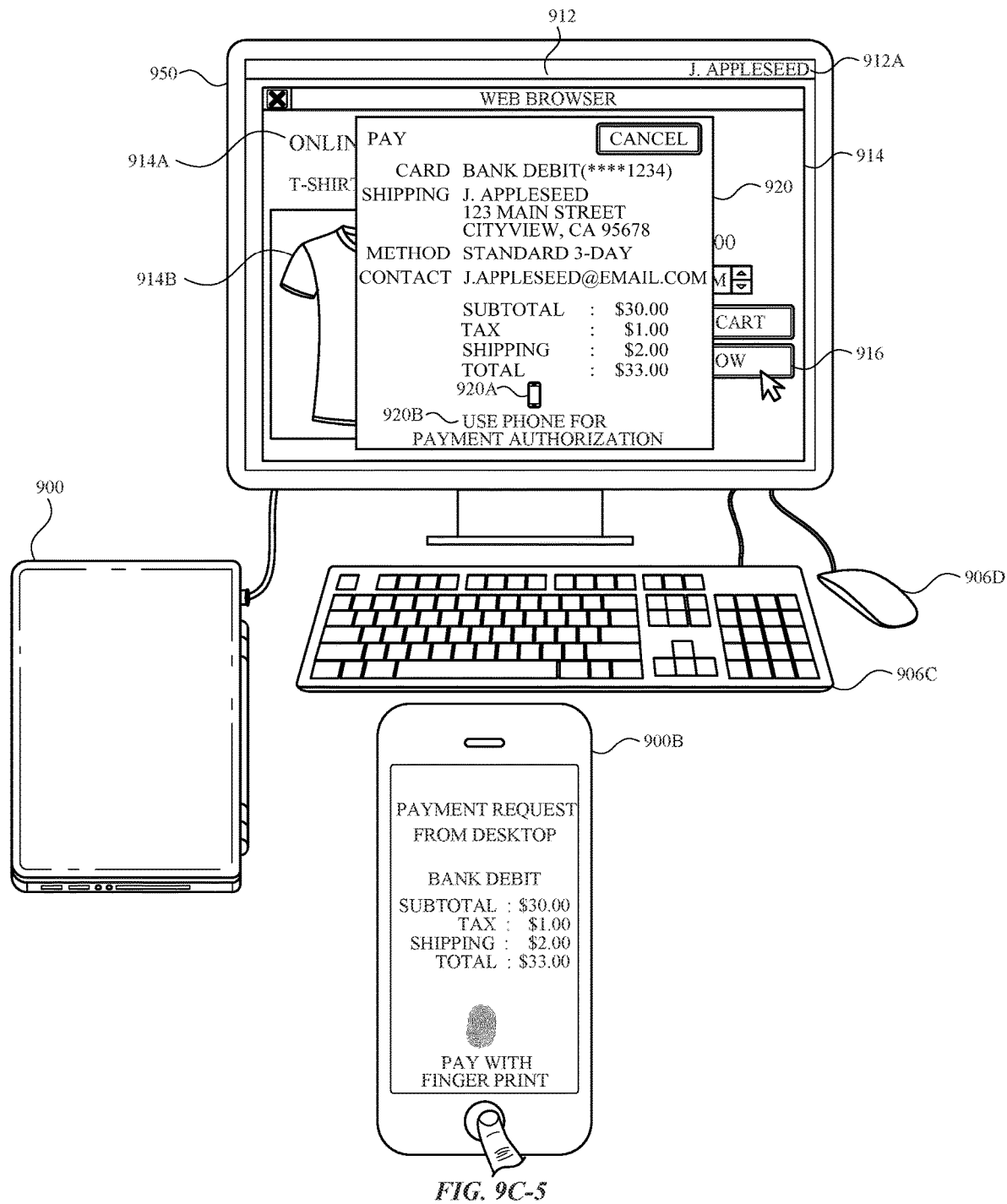
Figures 6, 9C:
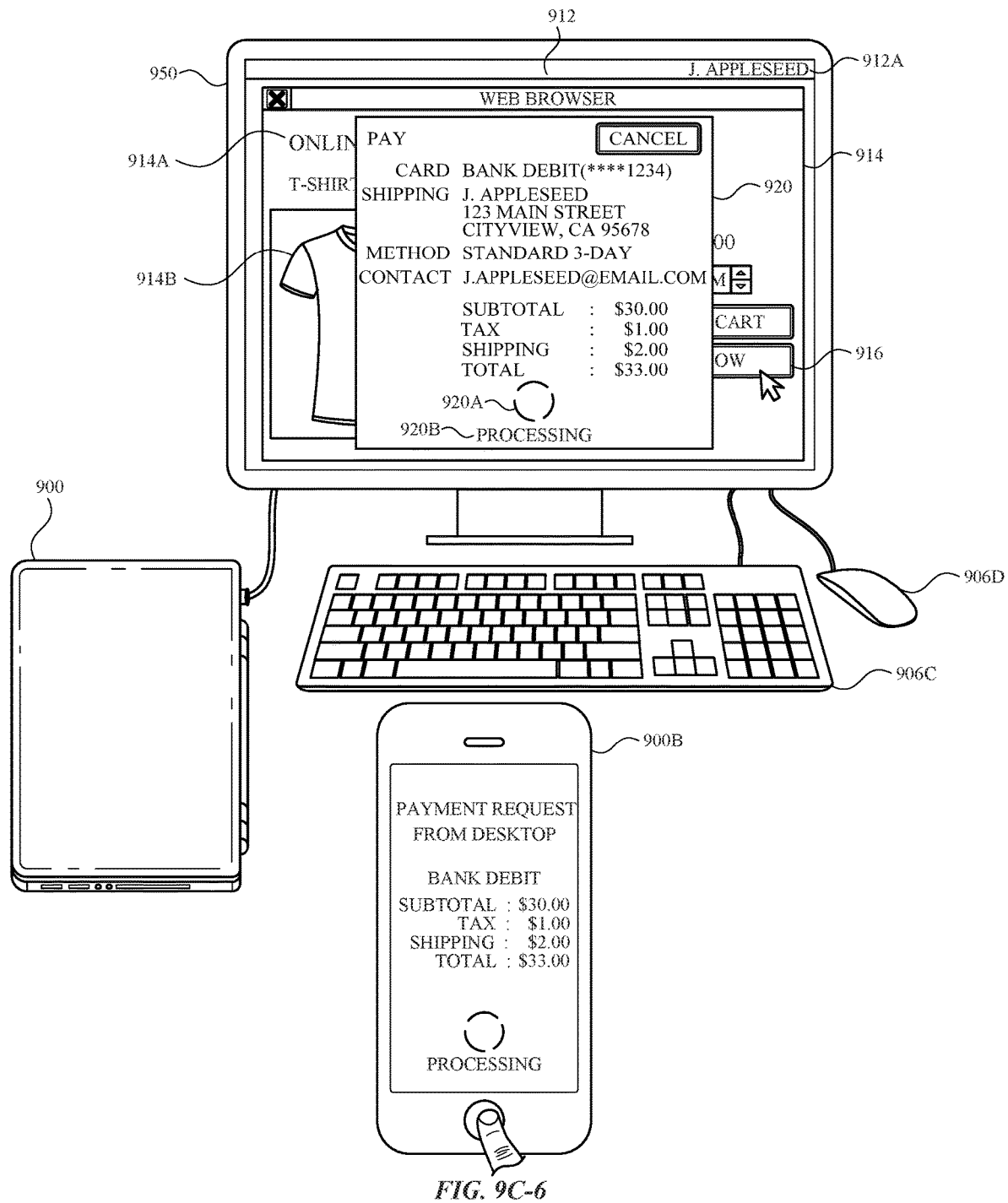
Figures 7, 9C:
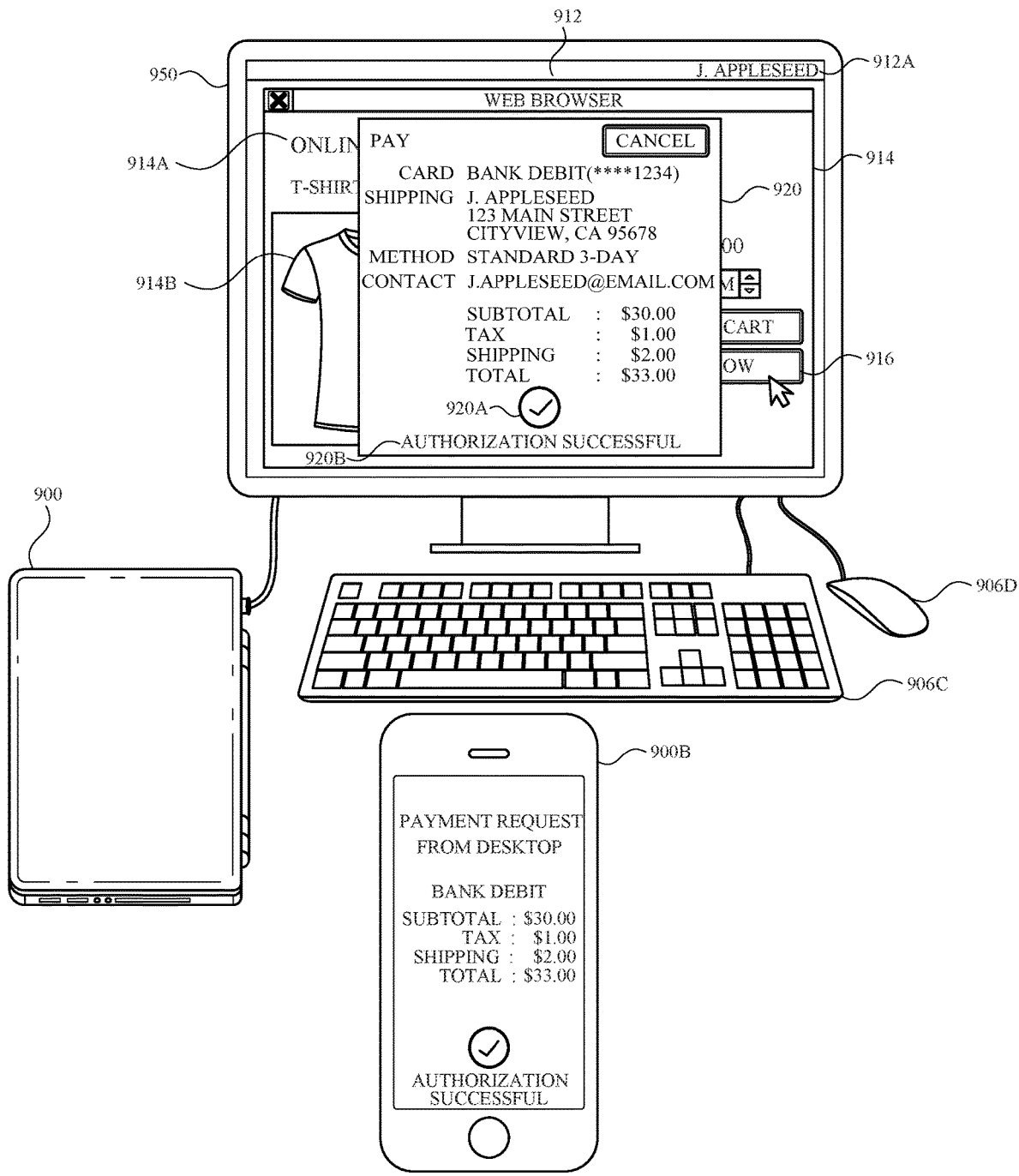

In some embodiments, as illustrated in FIGS. 9C-1 to 9C-7, the electronic device instructs the user to provide authorization at a second electronic device when a third set of one or more criteria is met.

In response to detecting activation of the payment affordance 916, and in accordance with a determination that the third set of one or more criteria is met, the third set of one or more criteria including a storing-credentials criterion that is met when the secure element has stored credentials, the electronic device 900 causes display, on the external display 950, of a parameters interface 920 (e.g., a payment sheet) for proceeding with the operation (e.g., the payment transaction). In some examples, as described in the transition from FIG. 9C-3 to FIG. 9C-4, the parameters interface 920 slides into view on the display (e.g., from an edge of the display). In some examples, the parameters interface 920 includes a graphical indication 920A (e.g., a graphical image of the second electronic device 900B) and/or a textual indication 920B (e.g., "Use Phone for Payment Authorization") informing the user to proceed with the operation (e.g., the payment transaction) using the second electronic device 900B (e.g., informing the user to use "hand-off").

In some embodiments, the parameters interface 920 is a payment sheet. In some examples, the payment sheet is a user interface of the operating system, rather than the first application. In some examples, the payment sheet is part of a first-party application provided by a provider of the operating system of the requesting device, wherein the first-party application is different from the first application. In some examples, the payment sheet includes user-selectable options for the payment transaction, such as a payment account option, shipping address option, a shipping method option, contact information options. In some examples, the payment sheet slides into display (e.g., into view on the one or more displays) in response to activation of the payment affordance. In some examples, the payment sheet at least partially obscures a webpage that includes the payment affordance. In some examples, subsequent to displaying the parameters interface that identifies one or more devices different from the electronic device, the electronic device receives information indicating whether authorization for responding to the request for credentials was provided at a device of the one or more devices, and in response, the electronic device provides an indication of whether authorization for responding to the request for credentials was provided at the device of the one or more devices.

In some embodiments, the third set of one or more criteria includes a not-authorized-account criterion that is met when an account actively logged into the electronic device is not enabled to authorize the secure element to release credentials (e.g., payment credentials). In some examples, the electronic device is configured for use with multiple accounts. In some examples, the logged-in account of the multiple accounts is not enabled to authorize the secure element to release credentials (e.g., payment credentials). In some examples, the logged-in account of the multiple accounts is not enabled to authorize payments using the secure element of the electronic device.

In some embodiments, as illustrated in FIGS. 9C-4 to 9C-7, in response to detecting activation of the payment affordance 916, the electronic device sends a request to the second electronic device 900B to receive authorization for the operation (e.g., the payment transaction). In some embodiments, at FIG. 9C-4, the second electronic device 900B displays transaction information and requests authentication information from the user. At FIG. 9C-5, the second electronic device 900B receives authentication information (e.g., fingerprint information, passcode information) from the user. At FIG. 9C-6, while the authorization for the operation (e.g., the payment transaction") is processing, the display of the second electronic device 900B includes information that is also included in the parameters interface 920 caused to be displayed on the display by the electronic device 900. If the authorization at the second electronic device 900B is successful, the second electronic device 900B causes a secure element of the second electronic device 900B to release credentials, which are transmitted by the second electronic device 900B to a remote server for use in the operation. The credentials correspond to a payment account specified by and, optionally, selected at the electronic device 900. At FIG. 9C-7, the electronic device 900 and the second electronic device 900B cause their corresponding displays to display an indication of whether the operation was successful (e.g., whether payment was authorized). Additional details relating to this technique (e.g., the "hand-off" operation) are described throughout cross-referenced U.S. patent application Ser. No. 15/269,801, portions of which are included in Appendix C, in particular at FIGS. 8A-8M and paragraphs [0203]-[0232].

Figure 9D:
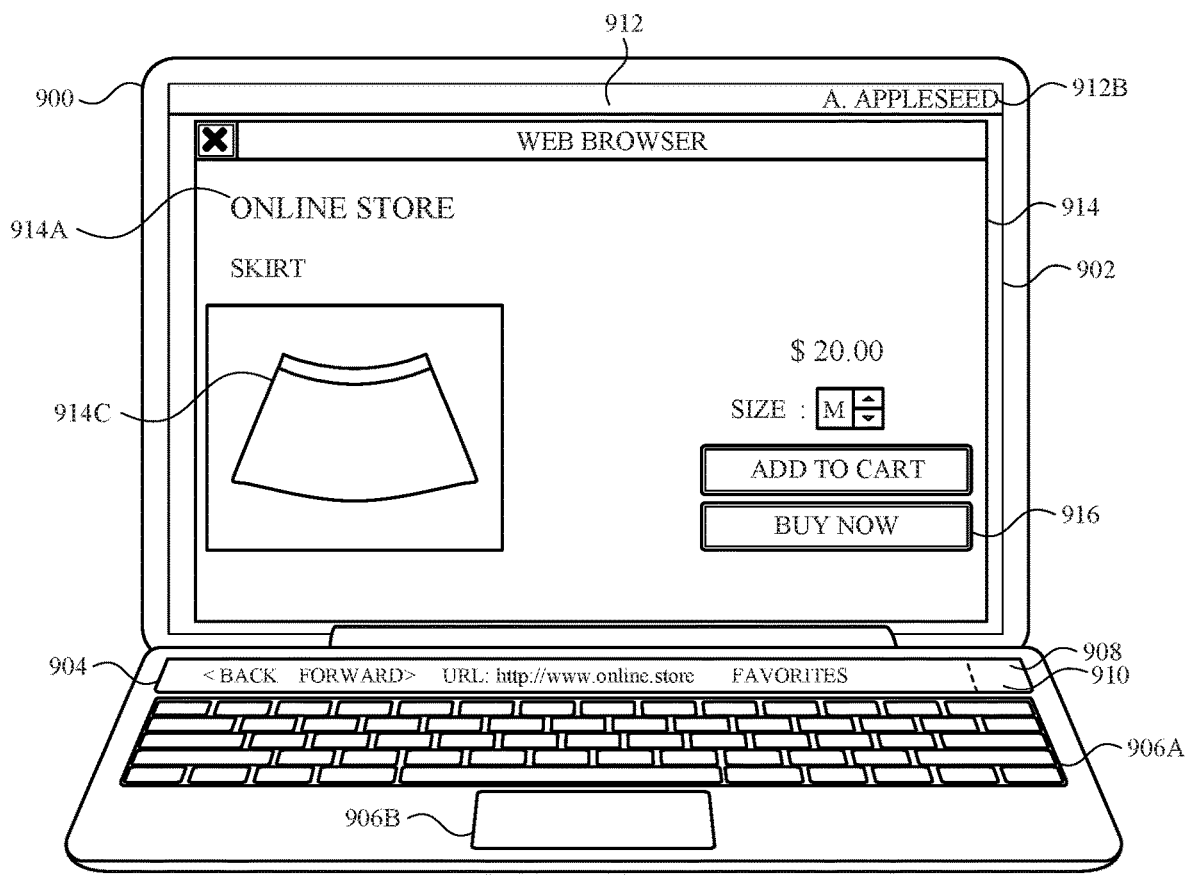
Figure 1:
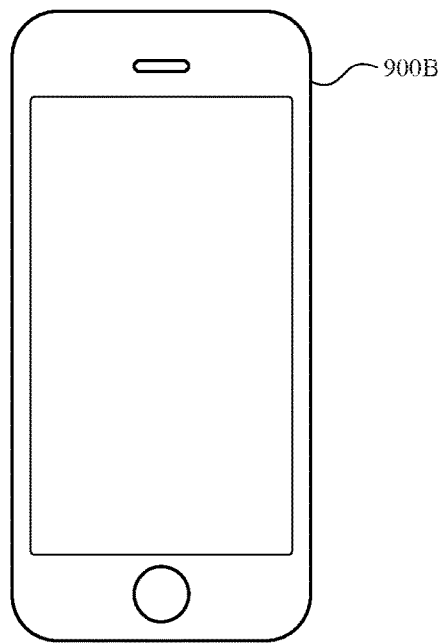
Figure 9D:
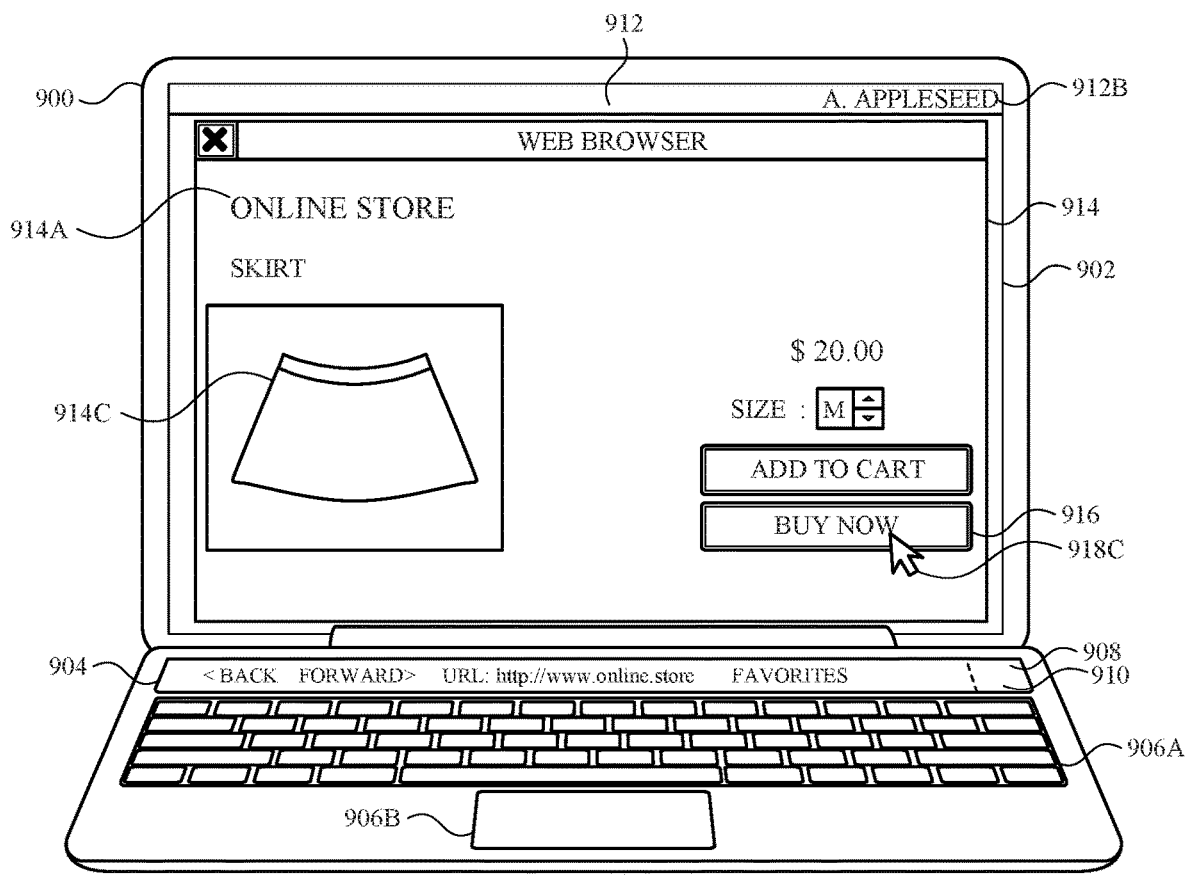
Figure 2:
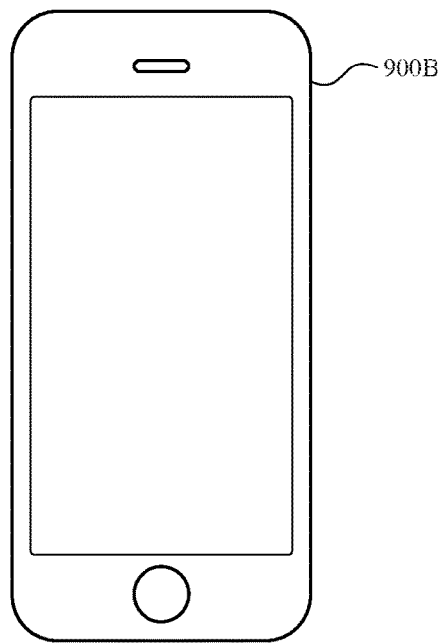
Figure 9D:
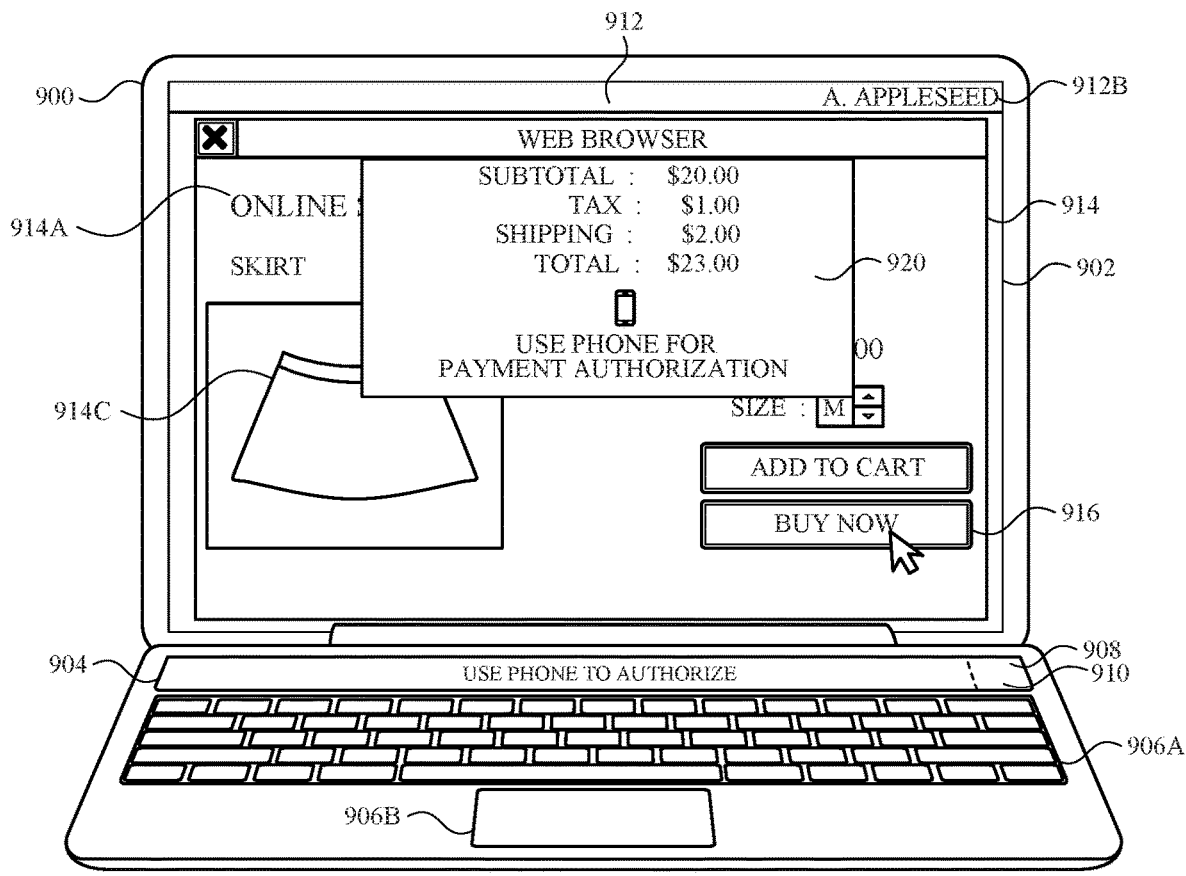
Figure 3:
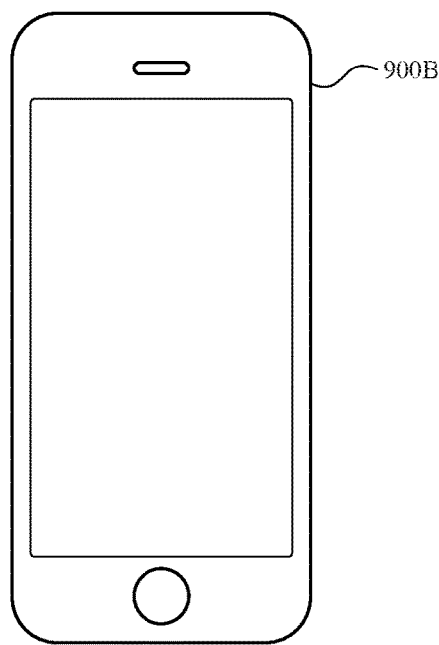
Figure 9D:
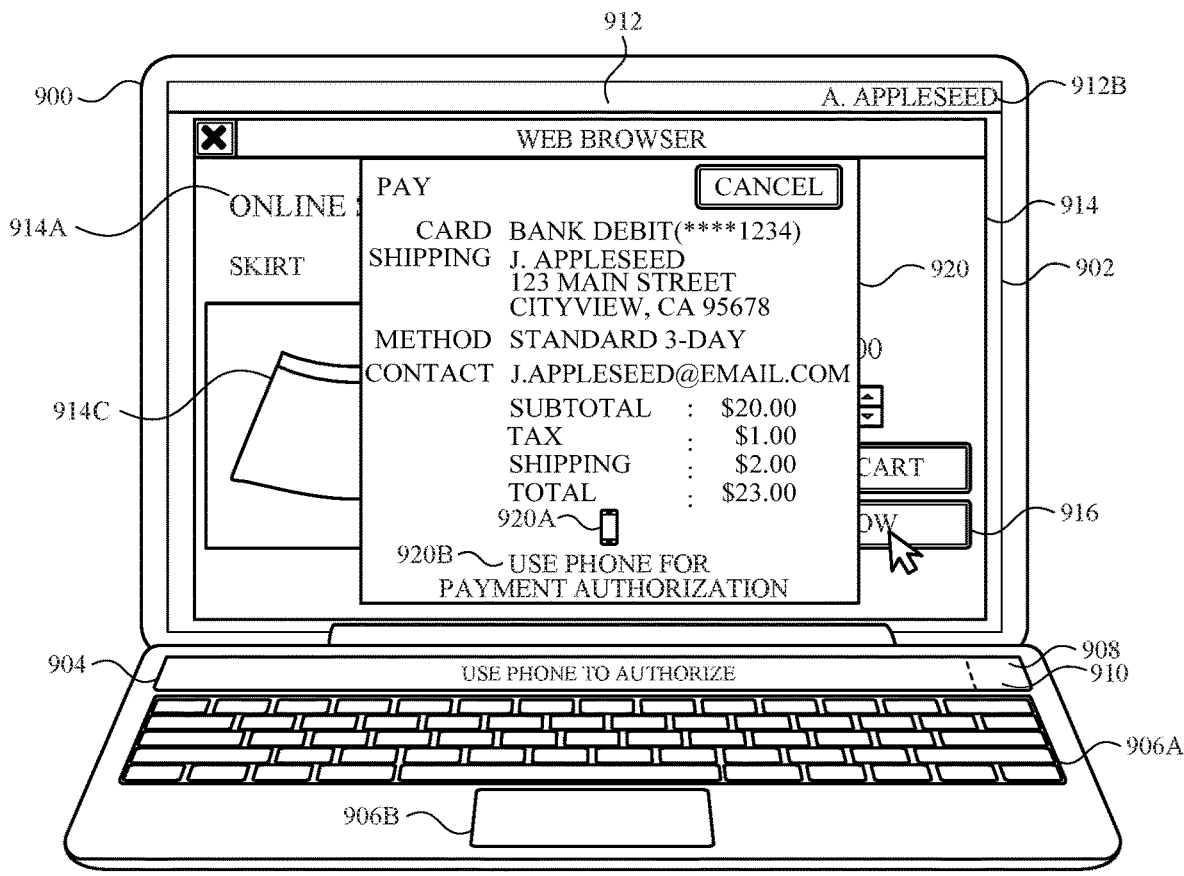
Figure 4:
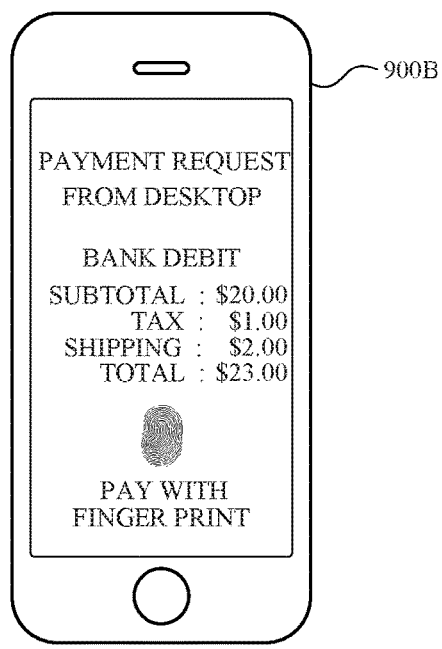
Figure 9D:
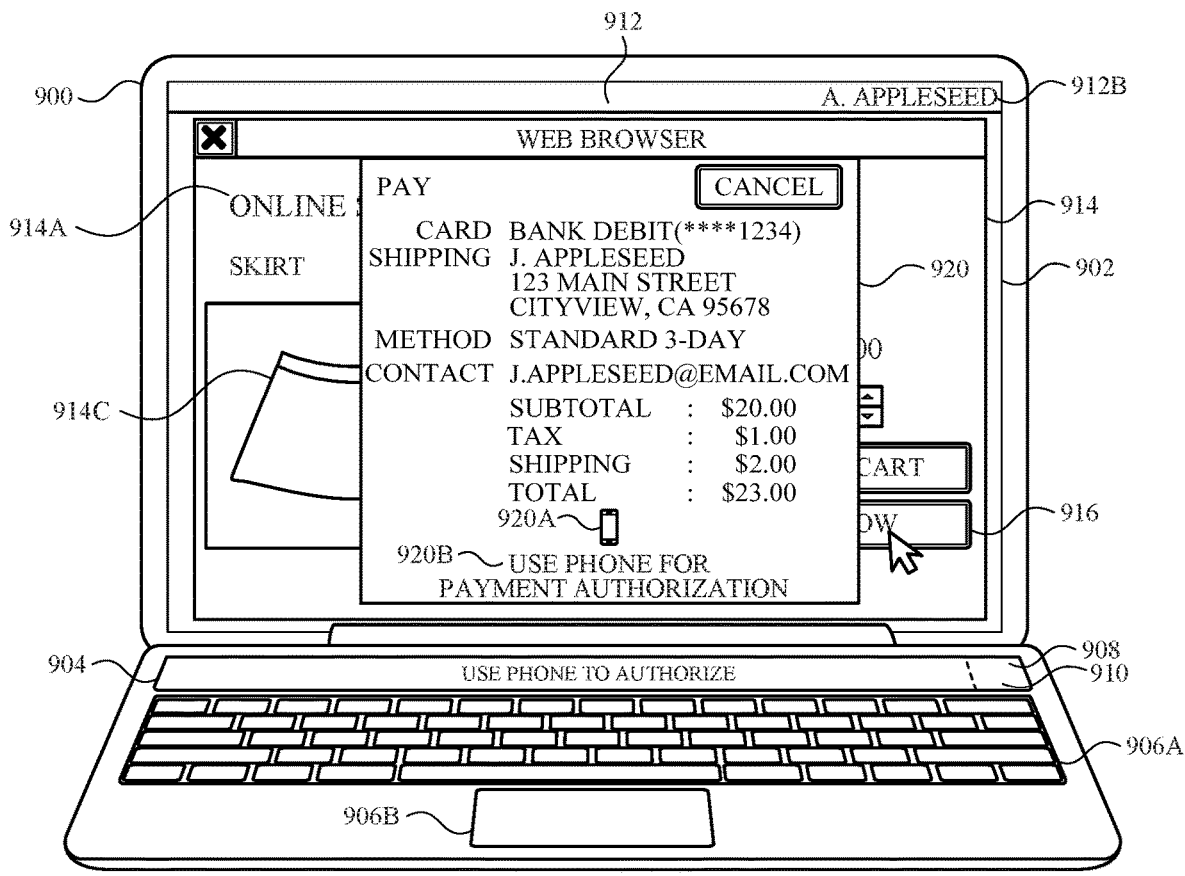
Figure 5:
Figure 9D:
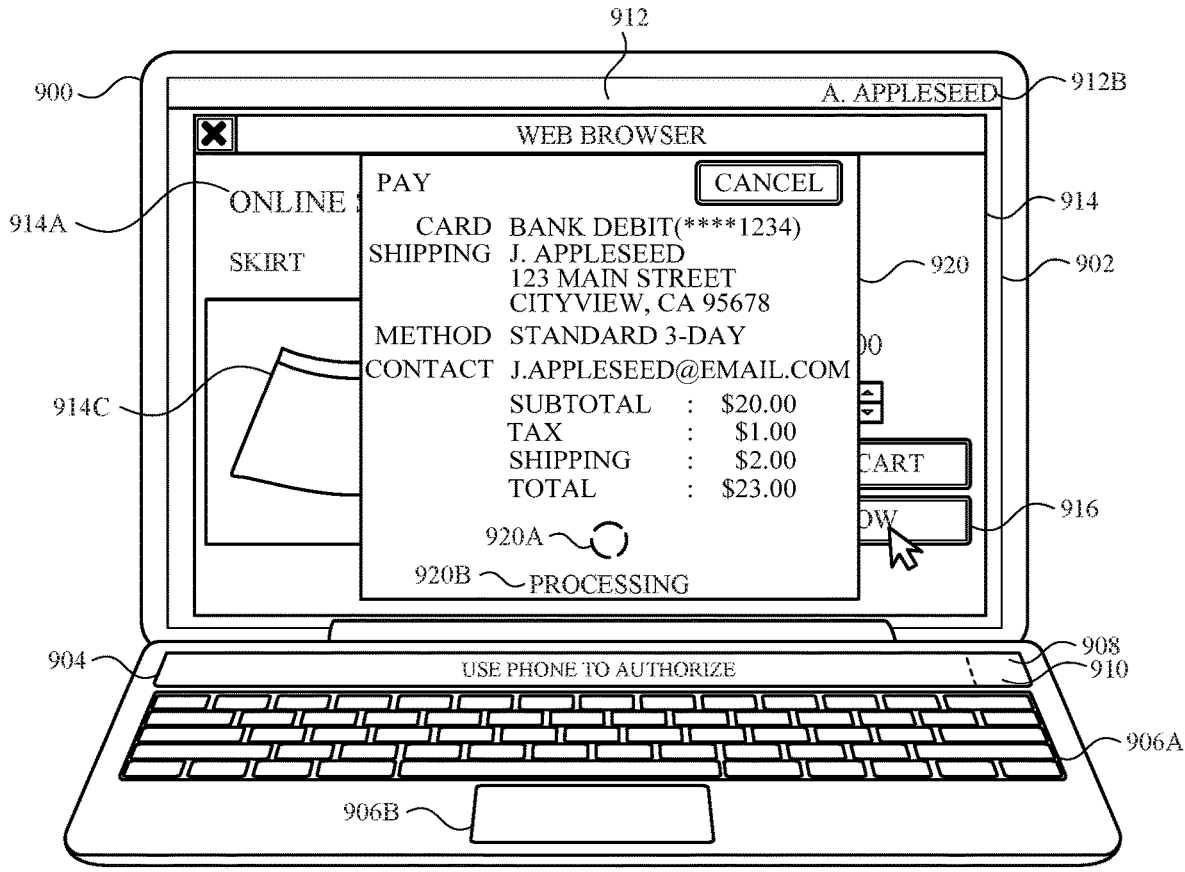
Figure 6:
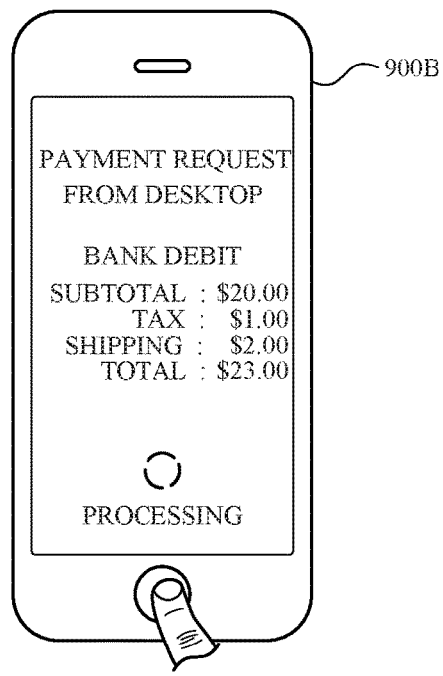
Figures 7, 9D:
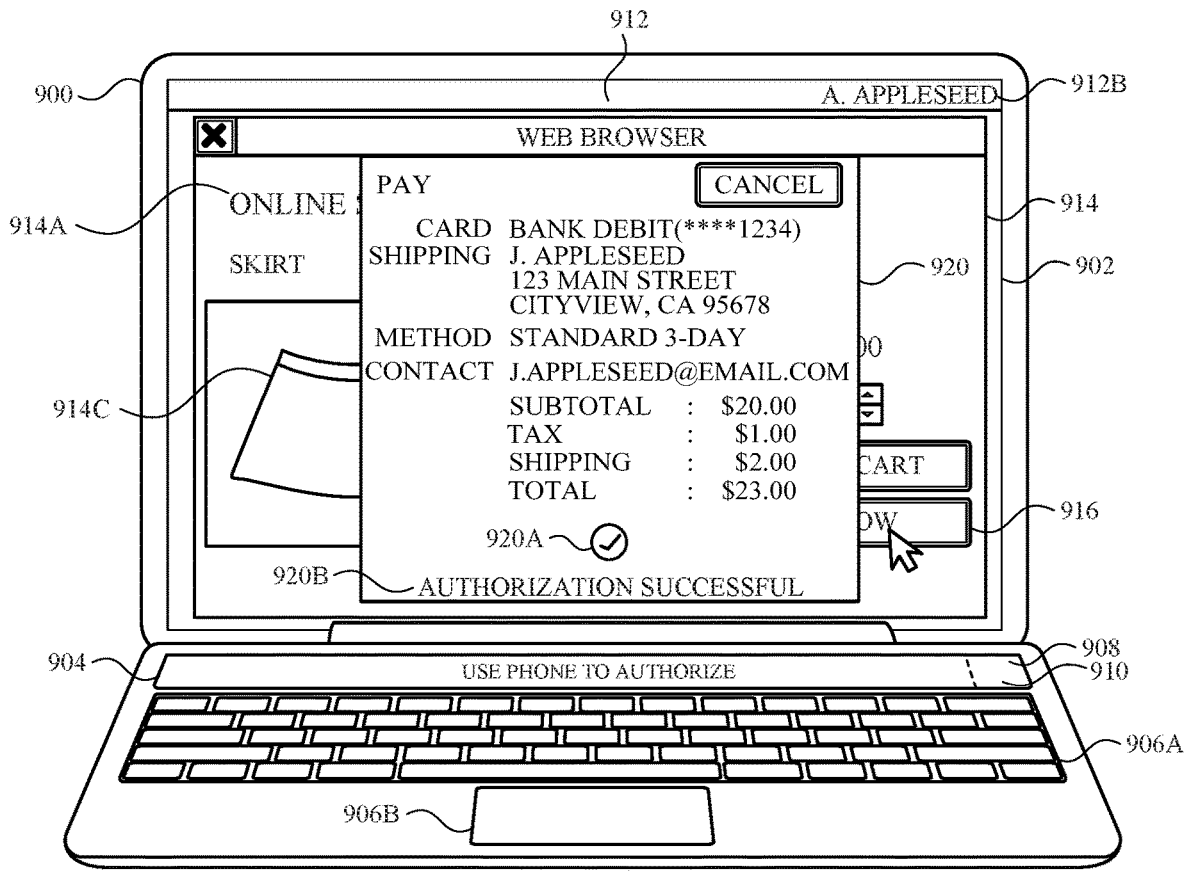

FIGS. 9D-1 to 9D-7 illustrate, in accordance with some embodiments, performing an operation (e.g., a payment transaction), the electronic device having multiple accounts (e.g., multiple user accounts). A first account (e.g., of "J. Appleseed") of the multiple accounts is an account (e.g., the only account) that is enabled to authorize the secure element of the electronic device 900 to release credentials. A second account (e.g., of "A. Appleseed") that is not enabled to authorize the secure element of the electronic device 900 to release credentials is actively logged into the electronic device 900. The electronic device 900 stores a third set of one or more criteria. In some embodiments, the input device of the electronic device 900 not enabled (e.g., the device is in clamshell mode). In some embodiments, the input device of the electronic device is enabled (e.g., the device is not in clamshell mode).

In some examples, the electronic device 900 causes display, on a display (e.g., an external monitor or an integrated display, such as the first display 902), an indication 912B that the second account (e.g., associated with "A. Appleseed") is actively logged into the electronic device.

In the example illustrated in FIG. 9D-1, the second user (e.g., "A. Appleseed") is browsing the Internet using a browser application 914 to purchase an item 914C from an online store 914A. The website of the online store 914A displayed on the browser application 914 contains a payment affordance 916 (e.g., a "buy now" affordance) corresponding to an operation for which authorization is required (e.g., to authorize a payment transaction). For example, the operation for which authorization is required is the online purchase of the item 914C.

FIG. 9D-2 illustrates the second user activating the payment affordance 916 to proceed with an operation (e.g., payment information for use in a payment transaction) for which authorization is required. In response to the second user selects the payment affordance 916, the electronic device 900 receives a request for credentials (e.g., transaction credentials) for the operation for which authorization is required. In some examples, receiving the request for credentials includes detecting, by the one or more input devices (e.g., a computer mouse, touch input), activation of the payment affordance 916 corresponding to the operation. In some examples, the request for credentials is received from a remote server by the electronic device 900. In some examples, the request is received from a locally executing application on the electronic device 900.

In some embodiments, as illustrated in FIG. 9D-3, in response to receiving the request for credentials, and in accordance with a determination that the third set of one or more criteria is met, the third set of one or more criteria including a storing-credentials criterion that is met when the secure element has stored credentials (e.g., payment credentials), the electronic device 900 causes display, on a display, (e.g., on the first display of the electronic device or on an external display different from the display of the electronic device and different from the touch-sensitive display) a parameters interface 920 corresponding to the request for credentials. The parameters interface 920 identifies (e.g., by 920A) one or more devices different from the electronic device for use in responding to the request for credentials. In some examples, the storing-credentials criterion is met when it is determined that the secure element has been configured to store (and is storing) payment credentials (e.g., available for use in a payment transaction).

In some embodiments, the third set of one or more criteria includes a not-authorized-account criterion that is met when an account actively logged into the electronic device is not enabled to authorize the secure element to release credentials (e.g., payment credentials). For example, in some examples, the electronic device is configured for use with multiple accounts. In some examples, the logged-in account of the multiple accounts is not enabled to authorize the secure element to release credentials (e.g., payment credentials). In some examples, the logged-in account of the multiple accounts is not enabled to authorize payments using the secure element of the electronic device.

In some examples, the third set of one or more criteria includes a proximity-device criterion that is met when the electronic device 900 is in communication with a second electronic device 900B that is in proximity to the electronic device 900 and that is enabled to respond to the request for credentials.

In some embodiments, as illustrated in FIGS. 9D-4 to 9D-7, in response to detecting activation of the payment affordance 916, the electronic device sends a request to the second electronic device 900B to receive authorization for the operation (e.g., the payment transaction). In some examples, the electronic device 900 transmits the request to the second electronic device identifying the operation (e.g., payment operation) for authorization. In some embodiments, at FIG. 9D-4, the second electronic device 900B displays transaction information and requests authentication information from the user. At FIG. 9D-5, the second electronic device 900B receives authentication information (e.g., fingerprint information, passcode information) from the user. At FIG. 9D-6, while the authorization for the operation (e.g., the payment transaction") is processing, the display of the second electronic device 900B includes information that is also included in the parameters interface 920 caused to be displayed on the display by the electronic device 900. If the authorization at the second electronic device 900B is successful, the second electronic device 900B causes a secure element of the second electronic device 900B to release credentials, which are transmitted by the second electronic device 900B to a remote server for use in the operation. The credentials correspond to a payment account specified by and, optionally, selected at the electronic device 900. At FIG. 9D-7, the electronic device 900 and the second electronic device 900B cause their corresponding displays to display an indication of whether the operation was successful (e.g., whether payment was authorized). In some examples, the electronic device 900 receives information from the second electronic device 900B indicating whether authorization was received at the second electronic device (and optionally displays a corresponding indication). In some examples, the electronic device receives 900 information from the second electronic device indicating whether the operation was successful, and optionally displays a corresponding indication. In some examples, in response to receiving the information from the second electronic device, the electronic device displays an indication of whether the authorization was successful and/or whether the operation was successful. Thus, the electronic device 900 uses a second electronic device 900B that is a remote device (e.g., a phone, a watch) to authorization the operation, such as by using fingerprint authorization at the second electronic device 900B. Additional details relating to this technique (e.g., the "hand-off" operation) are described throughout cross-referenced U.S. patent application Ser. No. 15/269,801, portions of which are included in Appendix C, in particular at FIGS. 8A-8M and paragraphs [0203]-[0232].

In some examples, the parameters interface 920 is a payment sheet. In some examples, the payment sheet is a user interface of the operating system, rather than the first application. In some examples, the payment sheet is part of a first-party application provided by a provider of the operating system of the requesting device, wherein the first-party application is different from the first application. In some examples, the payment sheet includes user-selectable options for the payment transaction, such as a payment account option, shipping address option, a shipping method option, contact information options. In some examples, the payment sheet slides into display (e.g., into view on the one or more displays) in response to activation of the payment affordance. In some examples, the payment sheet at least partially obscures a webpage that includes the payment affordance. In some examples, subsequent to displaying the parameters interface that identifies one or more devices different from the electronic device, the electronic device receives information indicating whether authorization for responding to the request for credentials was provided at a device of the one or more devices, and in response, the electronic device provides an indication of whether authorization for responding to the request for credentials was provided at the device of the one or more devices.

Figures 1, 9E:
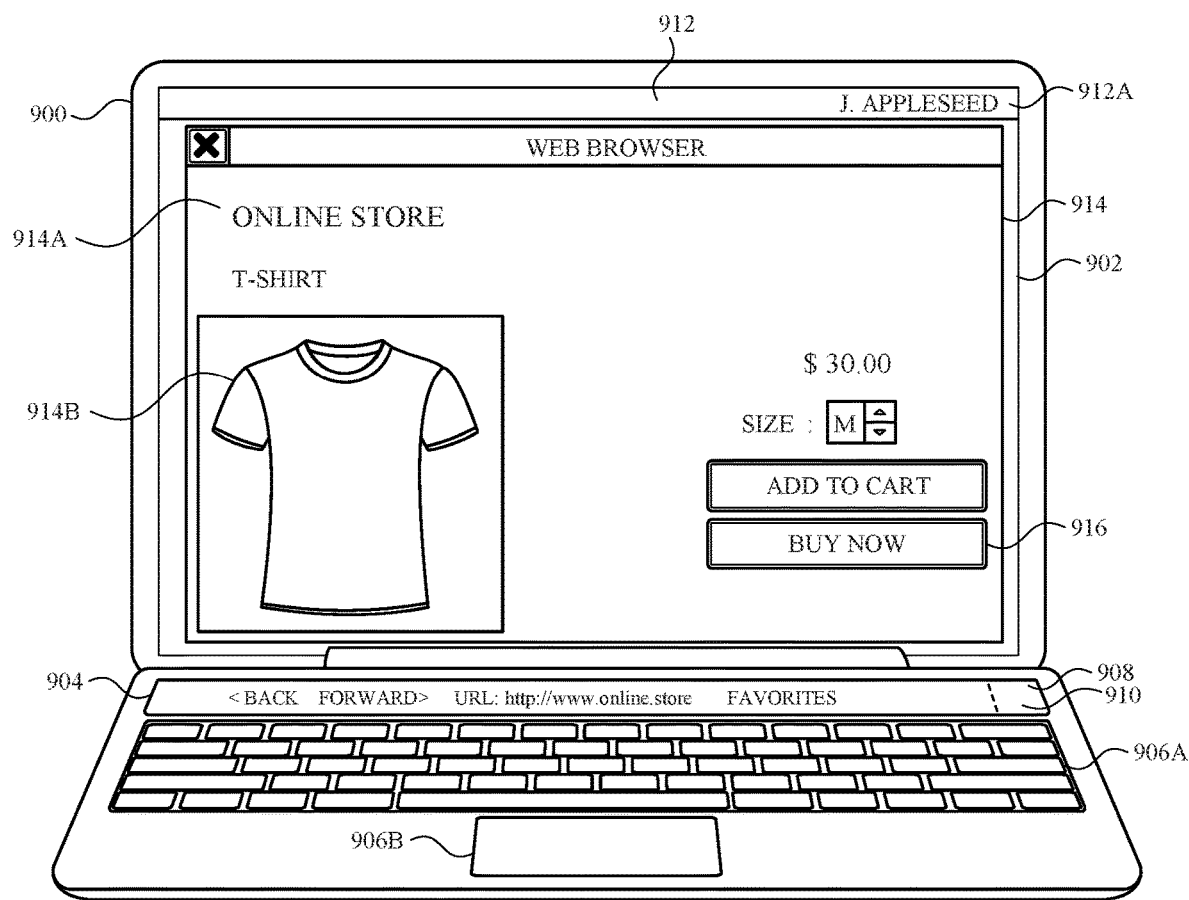
Figures 2, 9E:
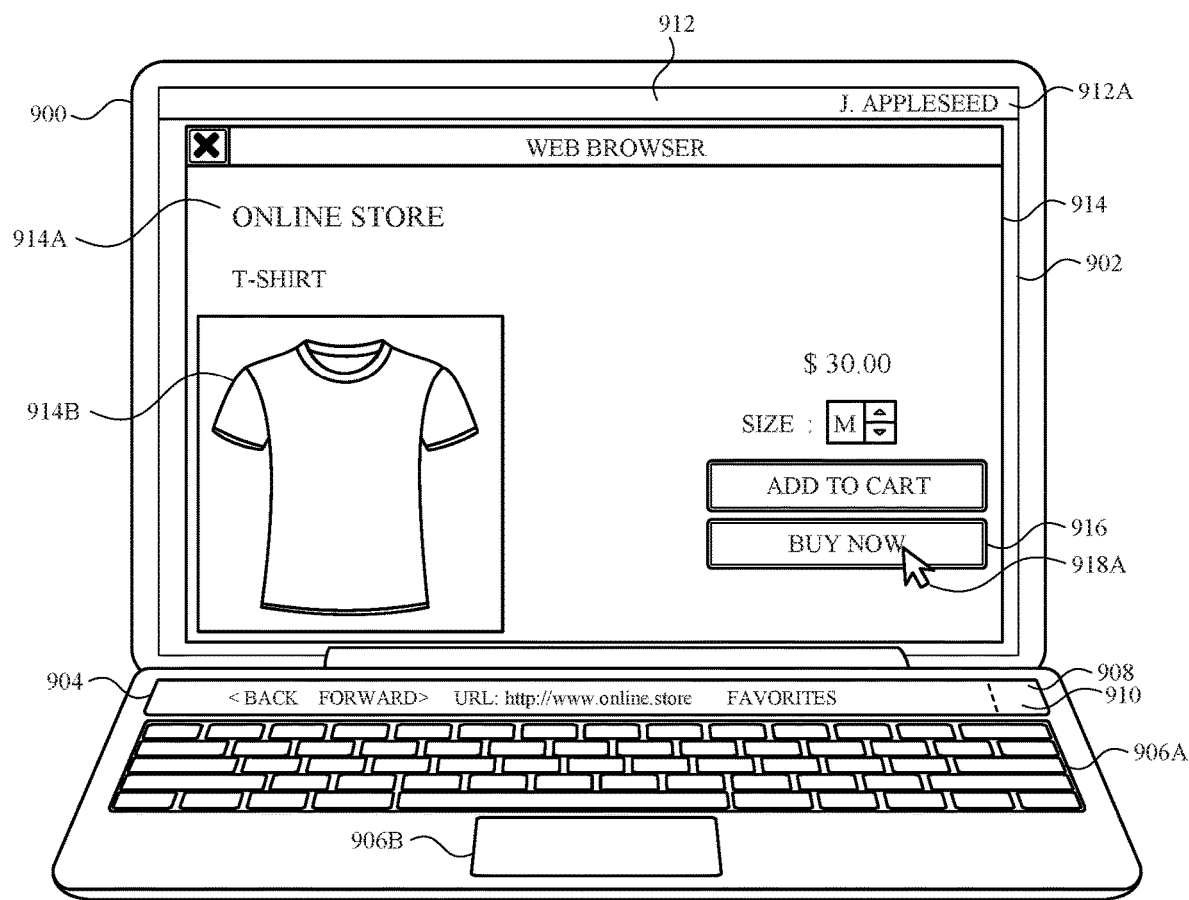
Figures 3, 9E:
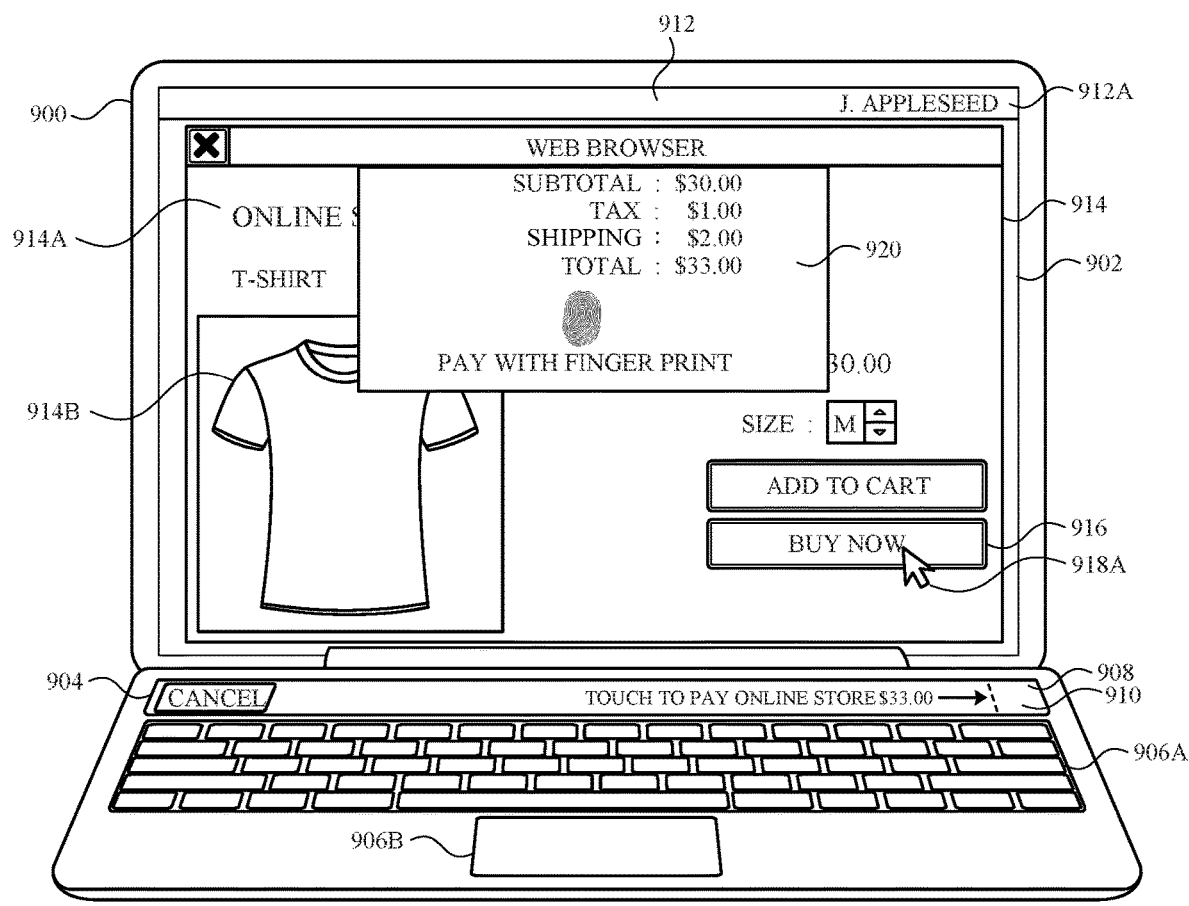
Figures 4, 9E:
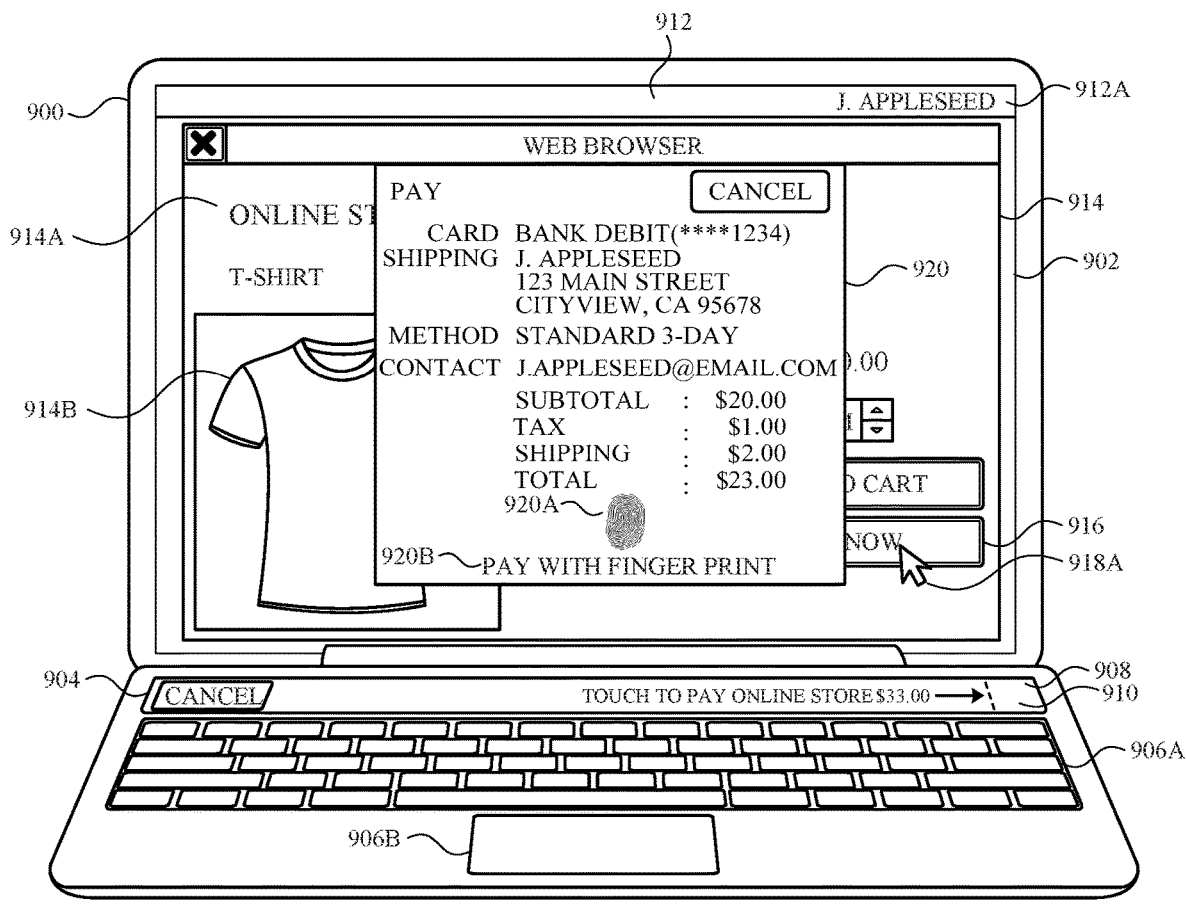
Figure 10A:
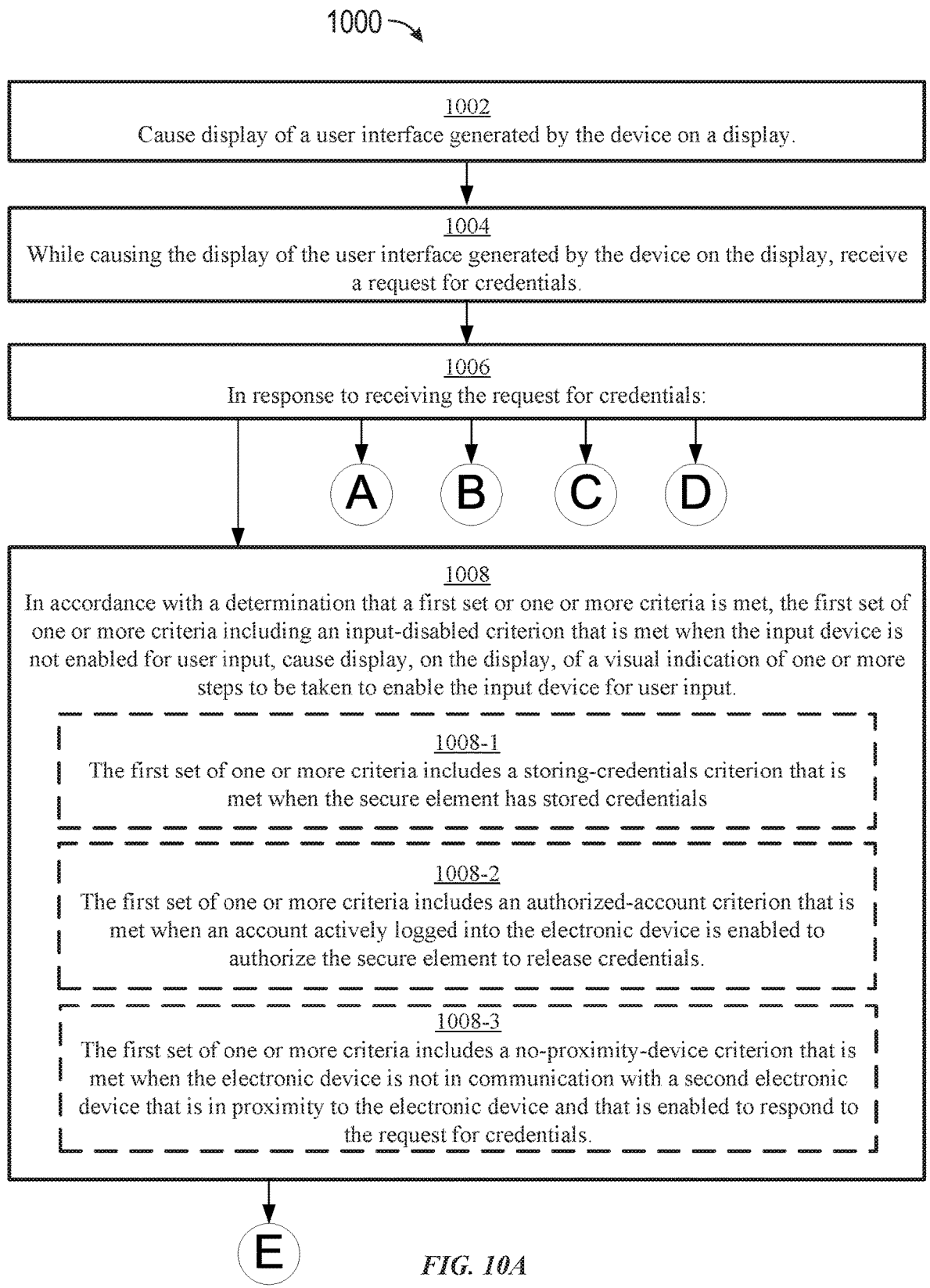
Figure 10B:
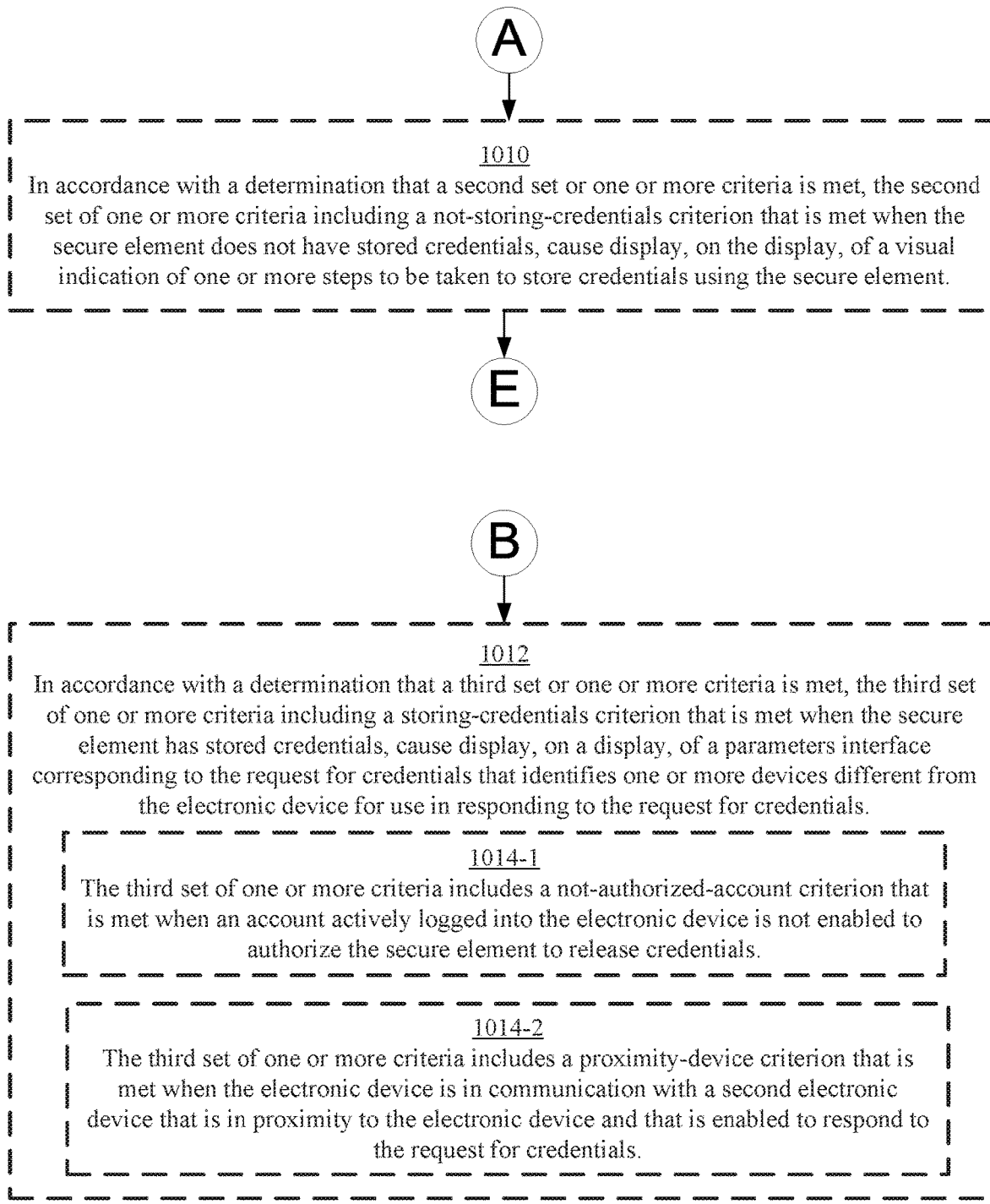
Figure 10D:
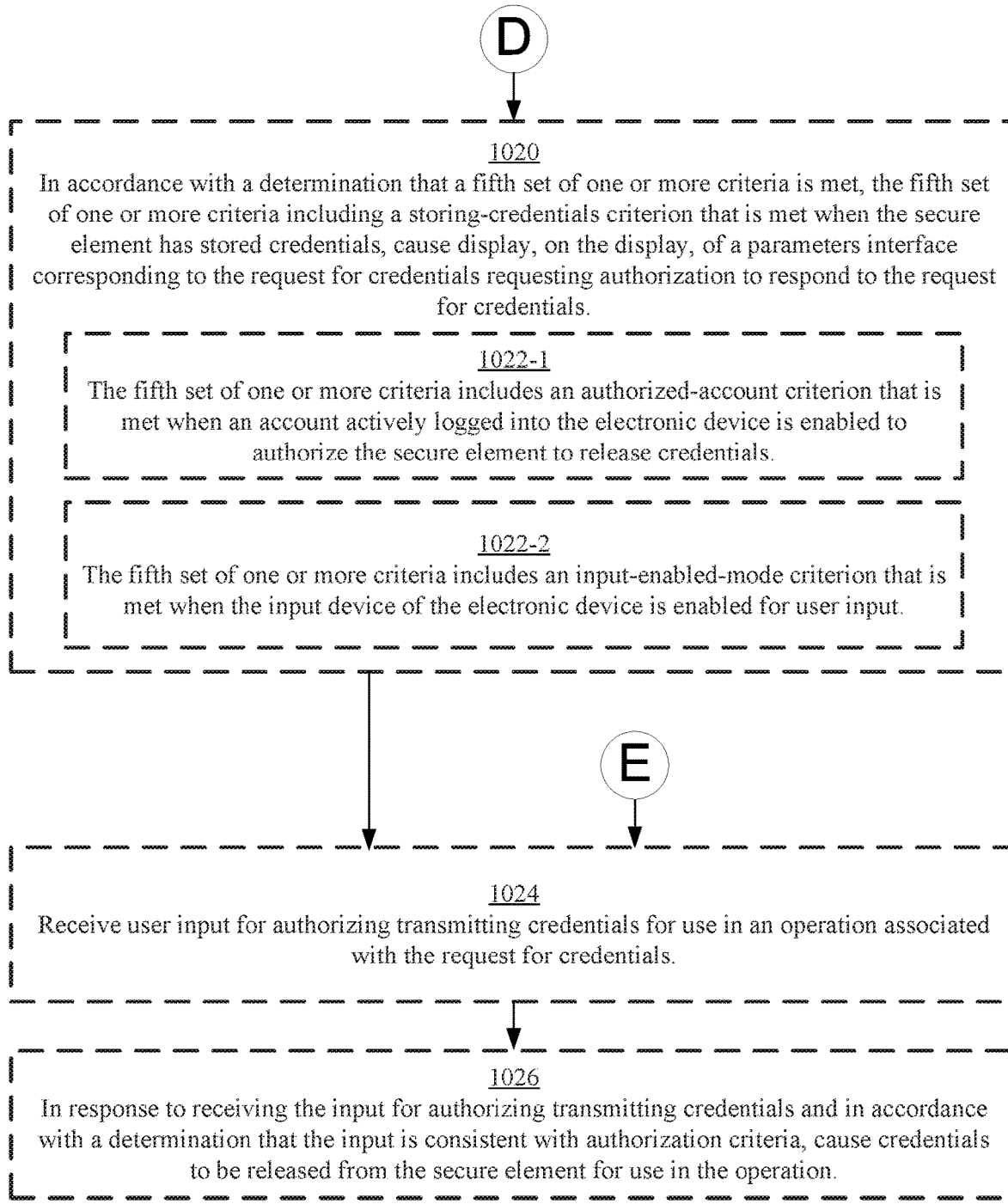

In some embodiments, as illustrated in FIGS. 9E-1 to 9E-4, the electronic device 900 prompts the user to provide authorization at the electronic device. The electronic device 900 stores a fifth set of one or more criteria. At FIG. 9E-1, the electronic device displays a web browser application, similar to the descriptions above.

FIG. 9E-2 illustrates the user activating the payment affordance 916 to proceed with an operation (e.g., payment information for use in a payment transaction) for which authorization is required. In response to the user activating the payment affordance 916, the electronic device 900 receives a request for credentials (e.g., transaction credentials) for the operation for which authorization is required. In some examples, receiving the request for credentials includes detecting, by the one or more input devices (e.g., a computer mouse, touch input), activation of the payment affordance 916 corresponding to the operation. In some examples, the request for credentials is received from a remote server by the electronic device 900. In some examples, the request is received from a locally executing application on the electronic device 900.

As illustrated in FIGS. 9E-3 to 9E-4, in some embodiments, in response to receiving the request for credentials, and in accordance with a determination that the fifth set of one or more criteria is met, the fifth set of one or more criteria including a storing-credentials criterion that is met when the secure element has stored credentials (e.g., payment credentials), the electronic device causes display, on the display (e.g., on the display of the electronic device or on an external display different from the display of the electronic device and different from the touch-sensitive display), of a parameters interface 920 corresponding to the request for credentials requesting authorization to respond to the request for credentials. In some examples, the storing-credentials criterion is met when it is determined that the secure element has been configured to store (and is storing) payment credentials available for use in a payment transaction. In some examples, the electronic device receives authorization (e.g., fingerprint authorization or passcode authorization that is consistent with an enrolled fingerprint or passcode, respectively) and, in response, causes the secure element to release credentials for use in a transaction corresponding to the request for credentials. In some examples, the released credentials are transmitted to a remote server for use in the transaction. This process of receiving authorization (e.g., via passcode, fingerprint, biometrics) is described in greater detail with respect to FIGS. 7A to 7D-10 and 8A-8B, above. In some examples, the parameters interface is a payment sheet. In some examples, the payment sheet is a user interface of the operating system, rather than the first application. In some examples, the payment sheet is part of a first-party application provided by a provider of the operating system of the requesting device, wherein the first-party application is different from the first application. In some examples, the payment sheet includes user-selectable options for the payment transaction, such as a payment account option, shipping address option, a shipping method option, contact information options. In some examples, the payment sheet slides into display (e.g., into view on the one or more displays) in response to activation of the payment affordance. In some examples, the payment sheet at least partially obscures a webpage that includes the payment affordance.

In some embodiments, the fifth set of one or more criteria includes an authorized-account criterion that is met when an account actively logged into the electronic device is enabled to authorize the secure element to release credentials (e.g., payment credentials). In some examples, the electronic device is configured for use with multiple accounts. In some examples, an account of the multiple accounts is enabled to authorize the secure element to release credentials (e.g., payment credentials), and other accounts of the multiple accounts are not enabled to authorize the secure element to release credentials. In some examples, the account of the multiple accounts is enabled to authorize payments using the secure element of the electronic device.

In some embodiments, the fifth set of one or more criteria includes an input-enabled-mode criterion that is met when the input device of the electronic device is enabled for user input. In some examples, the electronic device is a laptop and the input device is enabled for user input when the laptop is not in a clamshell mode. In some examples, the input device is enabled for user input when electronic device is a laptop that is not connected to an external display and when the laptop is open and turned on.

In some embodiments, as discussed above, the various sets of one or more criteria optionally exclude particular criteria. Thus, particular criteria need not be met for the set of one or more criteria to be met. For example, the various sets of one or more criteria can optionally be independent of (e.g., exclude) one or more of the following: whether the input-enabled-mode criterion or input-not-enabled-mode criterion are met, whether the storing-credentials criterion or the not-storing-credentials criterion are met, whether the storing-credentials criterion or the not-storing-credentials criterion are met, whether the authorized-account criterion or not-authorized-account criterion are met, whether the proximity-device criterion or no-proximity-device criterion are met.

FIGS. 10A-10D are a flow diagram illustrating a method for managing access to credentials for use in an operation using an electronic device (e.g., 900) in accordance with some embodiments. In some embodiments, method 1000 is performed at a device (e.g., 100, 300, 500, portable computing system 100 of cross-referenced U.S. Provisional Patent Application Ser. No. 62/368,988, portions of which are included in Appendix B, desktop computing system 200 of cross-referenced U.S. Provisional Patent Application Ser. No. 62/368,988, portions of which are included in Appendix B) with an input device (e.g., a fingerprint sensor and/or a touch-sensitive display that is associated with a secure element) for authorizing access to credentials (e.g., an input device that is integrated into a housing of the electronic device). Some operations in method 1000 are, optionally, combined, the order of some operations is, optionally, changed, and some operations are, optionally, omitted.

As described below, method 1000 provides an intuitive way for causing display of one or more steps to be taken to enable an input device for user input. The method reduces the cognitive burden on a user for managing access to credentials for use in an operation for which authorization is required, thereby creating a more efficient human-machine interface. For battery-operated computing devices, enabling a user to manage access to credentials for use in an operation faster and more efficiently conserves power and increases the time between battery charges.

In some embodiments, method 1000 is performed on a device connected to and causing display at an external display (e.g., 950). In some embodiments, method 1000 is performed on a device having a primary display (e.g., 902).

The electronic device (e.g., 900) causes display (1002) of a user interface (e.g., 912) generated by the device on a display (e.g., 950, an external display connected to the device). In some embodiments, the display is an external display (e.g., connected to the electronic device by a cable). In some embodiments, the display is a primary display of the electronic device (e.g., an integral part of the electronic device, the display integrated into the electronic device).

While causing display of the user interface (e.g., 912) generated by the electronic device (e.g., 900) on the display, the electronic device (e.g., 900) receives (1004) a request for credentials (e.g., payment credentials). In some examples, the request is received from a remote server. In some examples, the request is received from a locally executing application.

In response to receiving the request (1006) for credentials, and in accordance with a determination that a first set of one or more criteria is met, the first set of one or more criteria including an input-disabled criterion that is met when the input device is not enabled for user input, the electronic device (e.g., 900) causes display (1008), on the display (e.g., 902, 950) of a visual indication (e.g., 920A, 920D) of one or more steps to be taken to enable the input device for user input (e.g., steps to transition the device from a clamshell mode to non-clamshell mode). By displaying the visual indication of the one or more steps in response to determining that the input-disabled criterion is met, the electronic device informs the user of the internal state of the machine that caused the error and prompts the user to take an action to rectify address the error. For example, the electronic device (e.g., 900) is a laptop computer and the laptop computer is in a clamshell mode when the built-in display of the laptop computer is closed, making the touch-sensitive display of the device inaccessible. In some embodiments, the laptop computer is connected to an external display (e.g., 950), which causes the touch-sensitive display to be disabled for user input). Thus, the electronic device, by displaying the visual indication of the one or more steps, informs the user of the state of the electronic device (e.g., that the input device is disabled) and prompts the user to take action. Subsequent to causing display of the visual indication (e.g., 920D) of one or more steps to be taken to enable the input device for user input, the electronic device (e.g., 900) detects a request (e.g., detecting opening of the laptop computer) to enable the input device for user input and, in response, enables the user input device for user input. The electronic device (e.g., 900) receives user input at the input device authorizing release of credentials from a secure element of the device, and in response, releasing credentials from the secure element, and, subsequently, transmits the credentials to a remote server for use in a transaction corresponding to the request for credentials.

In some embodiments, the electronic device (e.g., 900) includes a secure element, and the first set of one or more criteria includes (1008-1) a storing-credentials criterion that is met when the secure element has stored credentials (e.g., payment credentials). In some examples, the storing-credentials criterion is met when it is determined that the secure element has been configured to store (and is storing) payment credentials available for use in a payment transaction.

In some embodiments, the first set of one or more criteria includes (1008-2) an authorized-account criterion that is met when an account actively logged into the electronic device (e.g., 900) is enabled to authorize the secure element to release credentials (e.g., payment credentials). By including the authorized-account criterion in the first set of one or more criteria, the electronic device recognizes that the actively logged in account is capable of authorizing release of credentials and prompts the user to take action to enable the device perform the release of credentials (e.g., in response to user authorization). In some examples, the electronic device (e.g., 900) is configured for use with multiple accounts. In some examples, an account of the multiple accounts is enabled to authorize the secure element to release credentials (e.g., payment credentials), and other accounts of the multiple accounts are not enabled to authorize the secure element to release credentials. In some examples, the account of the multiple accounts is enabled to authorize payments using the secure element of the electronic device (e.g., 900).

In some embodiments, the first set of one or more criteria includes an input-not-enabled-mode criterion that is met when the input device of the electronic device (e.g., 900) is not enabled for user input. In some examples, the electronic device (e.g., 900) is a laptop computer and the input device is not enabled for user input when the laptop computer is in a clamshell mode (e.g., wherein the built-in integrated display of the laptop computer is closed, making the touch-sensitive display of the electronic device inaccessible). The electronic device determines the state of the device and accordingly performs an appropriate action. In some examples, the input device is not enabled for user input when electronic device (e.g., 900) is a laptop computer that is connected to an external display (e.g., 950), which causes the touch-sensitive display to be disabled for user input. In some examples, the input-not-enabled-mode criterion is met when the electronic device (e.g., 900) is a laptop computer and the laptop computer is closed.

In some embodiments, the first set of one or more criteria includes (1008-3) a no-proximity-device criterion that is met when the electronic device (e.g., 900) is not in communication with a second electronic device (e.g., 900B) that is in proximity to the electronic device and that is enabled to respond to the request for credentials. By including the no-proximity-device criterion, the electronic device determines the state of the device and accordingly performs an appropriate action. Additional details relating to this technique (e.g., the "hand-off" operation) are described throughout cross-referenced U.S. patent application Ser. No. 15/269,801, portions of which are included in Appendix C, in particular at FIGS. 8A-8M and paragraphs [0203]-[0232].

In some embodiments, the electronic device (e.g., 900) includes a secure element and a second set of one or more criteria including a not-storing-credentials criterion that is met when the secure element does not have stored credentials (e.g., payment credentials). In some embodiments, in response to receiving the request for credentials, and in accordance with a determination that the second set of one or more criteria is met, the electronic device (e.g., 900) causes display (1010), on the display, (e.g., 902, 950) of a visual indication (e.g., 904A) of one or more steps to be taken to store credentials using the secure element (e.g., steps to provision the electronic device with a payment account, such as a credit card account). The electronic device determines the state of the device and accordingly performs an appropriate action, thereby improving the machine-man user interface. In some examples, the not-storing-credentials criterion is met when it is determined that the secure element is not storing payment credentials available for use in a payment transaction. In some examples, the electronic device (e.g., 900) provides a request to provision the electronic device with a payment account that is stored at a remote server. In some example, the electronic device (e.g., 900) displays a request for user input of payment account information, such as a credit card number and expiration date. Thus, by displaying the visual indication of the one or more steps, the electronic device informs the user of the state of the device (e.g., no credentials stored) and prompts the user to take an action before proceeding with the operation.

In some embodiments, the electronic device (e.g., 900) includes a secure element, and in response to receiving the request for credentials, and, in accordance with a determination that a third set of one or more criteria is met, the third set of one or more criteria including a storing-credentials criterion that is met when the secure element has stored credentials (e.g., payment credentials), the electronic device (e.g., 900) causes display (1012), on a display (e.g., 902, 950), a parameters interface (e.g., 920) corresponding to the request for credentials that identifies one or more devices different from the electronic device for use in responding to the request for credentials. The electronic device determines the state of the device (that it is able to request authorization through a different device) and accordingly provides the user with the ability to perform the operation using the different device, thereby creating an efficient machine-man interface. In some examples, the storing-credentials criterion is met when it is determined that the secure element has been configured to store (and is storing) payment credentials available for use in a payment transaction. Thus, by displaying the one or more different devices, the electronic device informs the user to use a device of the one or more different devices to take an action in order to proceed with the operation. Without such an indication, the user may not look at the other devices and, therefore, the process would halt.

In some examples, the parameters interface (e.g., 920) is a payment sheet. In some examples, the payment sheet is a user interface of the operating system, rather than the first application. By having the operating system display the parameters interface, the user gains confidence that the parameters interface is secure. In some examples, the payment sheet is part of a first-party application provided by a provider of the operating system of the requesting device, wherein the first-party application is different from the first application. In some examples, the payment sheet includes user-selectable options for the payment transaction, such as a payment account option, shipping address option, a shipping method option, and/or contact information options. In some examples, the payment sheet slides into display (e.g., into view on the one or more displays) in response to activation of the payment affordance 916. In some examples, the payment sheet at least partially obscures a webpage that includes the payment affordance. Additional details relating to this technique (e.g., the "hand-off" operation) are described throughout cross-referenced U.S. patent application Ser. No. 15/269,801, portions of which are included in Appendix C, in particular at FIGS. 8A-8M and paragraphs [0203]-[0232]. In some examples, subsequent to displaying the parameters interface 920 that identifies one or more devices different from the electronic device (e.g., 900), the electronic device receives information indicating whether authorization for responding to the request for credentials was provided at a device (e.g., 900B) of the one or more devices, and in response, the electronic device provides an indication of whether authorization for responding to the request for credentials was provided at the device (e.g., 900B) of the one or more devices.

In some embodiments, the third set of one or more criteria includes (1014-1) a not-authorized-account criterion that is met when an account actively logged into the electronic device (e.g., 900) is not enabled to authorize the secure element to release credentials (e.g., payment credentials). In some examples, the electronic device (e.g., 900) is configured for use with multiple accounts. In some examples, the logged-in account of the multiple accounts is not enabled to authorize the secure element to release credentials (e.g., payment credentials). In some examples, the logged-in account of the multiple accounts is not enabled to authorize payments using the secure element of the electronic device (e.g., 900).

In some embodiments, the third set of one or more criteria includes (1014-2) a proximity-device criterion that is met when the electronic device (e.g., 900) is in communication with a second electronic device (e.g., 900B) that is in proximity to the electronic device (e.g., 900) and that is enabled to respond to the request for credentials. In some examples, the electronic device (e.g., 900) transmits a request to the second electronic device (e.g., 900B) identifying the operation (e.g., payment operation) for authorization. In some examples, the electronic device (e.g., 900) receives information from the second electronic device (e.g., 900B) indicating whether authorization was received at the second electronic device. In some examples, the electronic device (e.g., 900) receives information from the second electronic device (e.g., 900B) indicating whether the operation was successful. In some examples, in response to receiving the information from the second electronic device (e.g., 900B), the electronic device (e.g., 900) displays an indication of whether the authorization was successful and/or whether the operation was successful. Thus, the electronic device (e.g., 900) uses a second electronic device (e.g., 900B) that is a remote device (e.g., a phone, a watch) to authorization the operation, such as by using fingerprint authorization at the second electronic device 900B. Additional details relating to this technique (e.g., the "hand-off" operation) are described throughout cross-referenced U.S. patent application Ser. No. 15/269,801, portions of which are included in Appendix C, in particular at FIGS. 8A-8M and paragraphs [0203]-[0232].

In some embodiments, the electronic device (e.g., 900) includes a secure element, and in response to receiving the request for credentials, in accordance with a determination that a fourth set of one or more criteria is met, the fourth set of one or more criteria including a storing-credentials criterion that is met when the secure element has stored credentials (e.g., payment credentials), the electronic device (e.g., 900) causes display (1016), on a display, (e.g., 902, 950) a parameters interface (e.g., 920) corresponding to the request for credentials that identifies one or more devices different from the electronic device for use in responding to the request for credentials. Thus, the electronic device determines the state of the device based on the criterion (e.g., that the secure element of the electronic device has stored) (and other criteria) and, if the set of criteria is met, displays a parameters interface that informs the user of the state of the device and provides the user with the ability to perform the operation using a different device. Additional details relating to this technique (e.g., the "hand-off" operation) are described throughout cross-referenced U.S. patent application Ser. No. 15/269,801, portions of which are included in Appendix C, in particular at FIGS. 8A-8M and paragraphs [0203]-[0232]. In some examples, the storing-credentials criterion is met when it is determined that the secure element has been configured to store (and is storing) payment credentials available for use in a payment transaction.

In some examples, the parameters interface (e.g., 920) is a payment sheet. In some examples, the payment sheet is a user interface of the operating system, rather than the first application. In some examples, the payment sheet is part of a first-party application provided by a provider of the operating system of the requesting device, wherein the first-party application is different from the first application. Thus, by causing display of the payment sheet as part of the user interface of the operating system (or first-party application provided), the electronic device signals to the user that the cause of the display of the payment sheet is a request for credentials (e.g., is in response to a genuine request for credentials) and that the corresponding parameters interface is therefore secure (e.g., securely displayed by the operating system of the device, rather than by a rogue process), thereby giving the user confidence in the operation and improving the machine-man interface. In some examples, the payment sheet includes user-selectable options for the payment transaction, such as a payment account option, shipping address option, a shipping method option, and/or contact information options. In some examples, the payment sheet slides into display (e.g., into view on the one or more displays) in response to activation of the payment affordance. In some examples, the payment sheet at least partially obscures a webpage that includes the payment affordance (e.g., 916). In some examples, subsequent to displaying the parameters interface (e.g., 920) that identifies one or more devices different from the electronic device (e.g., 900), the electronic device receives information indicating whether authorization for responding to the request for credentials was provided at a device (e.g., 900B) of the one or more devices, and in response, the electronic device (e.g., 900) provides an indication of whether authorization for responding to the request for credentials was provided at the device (e.g., 900B) of the one or more devices.

In some embodiments, the fourth set of one or more criteria includes (1018-1) an authorized-account criterion that is met when an account actively logged into the electronic device (e.g., 900) is enabled to authorize the secure element to release credentials (e.g., payment credentials). Thus, the electronic device determines the state of the device based on the criterion (e.g., whether the account actively logged in is enabled to authorize the secure element to release credentials) (in conjunction with other criteria) and, if the set of criteria is met, displays a parameters interface that informs the user of the state of the device and provides the user with the ability to perform the operation using a different device. In some examples, the electronic device (e.g., 900) is configured for use with multiple accounts. In some examples, an account of the multiple accounts is enabled to authorize the secure element to release credentials (e.g., payment credentials), and other accounts of the multiple accounts are not enabled to authorize the secure element to release credentials. In some examples, the account of the multiple accounts is enabled to authorize payments using the secure element of the electronic device.

In some embodiments, the fourth set of one or more criteria includes (1018-2 an input-not-enabled-mode criterion that is met when the input device of the electronic device (e.g., 900) is not enabled for user input. Thus, the electronic device determines the state of the device based on the criterion (e.g., whether the input device of the electronic device is enabled for user input) (in conjunction with other criteria) and, if the set of criteria is met, displays a parameters interface that informs the user of the state of the device and provides the user with the ability to perform the operation using a different device. In some examples, the electronic device (e.g., 900) is a laptop computer and the input device is not enabled for user input when the laptop computer is in a clamshell mode (e.g., wherein the built-in display of the laptop computer is closed, making the touch-sensitive display of the electronic device inaccessible). In some examples, the input device is not enabled for user input when electronic device (e.g., 900) is a laptop computer that is connected to an external display (e.g., 950), which causes the touch-sensitive display to be disabled for user input. In some examples, input-not-enabled criterion is met when the electronic device (e.g., 900) is a laptop computer and the laptop computer is closed.

In some embodiments, the fourth set of one or more criteria includes (1018-3) a proximity-device criterion that is met when the electronic device (e.g., 900) is in communication with a second electronic device that is in proximity to the electronic device (e.g., 900) and that is enabled to respond to the request for credentials. Thus, the electronic device determines the state of the device based on the criterion (e.g., whether a second device is in proximity to the electronic device that is enabled to respond to the request) (and in conjunction with other criteria) and, if the set of criteria is met, displays a parameters interface that informs the user of the state of the device and provides the user with the ability to perform the operation using a different device. Additional details relating to this technique (e.g., the "hand-off" operation) are described throughout cross-referenced U.S. patent application Ser. No. 15/269,801, portions of which are included in Appendix C, in particular at FIGS. 8A-8M and paragraphs [0203]-[0232].

In some embodiments, the electronic device (e.g., 900) includes a secure element, and in response to receiving the request for credentials, in accordance with a determination that a fifth set of one or more criteria is met, the fifth set of one or more criteria including a storing-credentials criterion that is met when the secure element has stored credentials (e.g., payment credentials), the electronic device (e.g., 900) causes display (1020), on the display (e.g., 902, 904, 950), of a parameters interface (e.g., 920) corresponding to the request for credentials requesting authorization to respond to the request for credentials. Thus, the electronic device determines the state of the device based on the criterion (e.g., whether the secure element of the electronic device has stored credentials) and, if the set of criteria is met, displays a parameters interface that informs the user of the state of the device and provides the user with the ability to respond to the request for credentials. In some examples, the storing-credentials criterion is met when it is determined that the secure element has been configured to store (and is storing) payment credentials available for use in a payment transaction.

In some examples, the electronic device (e.g., 900) receives authorization (e.g., fingerprint authorization or passcode authorization that is consistent with an enrolled fingerprint or passcode, respectively) and, in response, causes the secure element to release credentials for use in a transaction corresponding to the request for credentials, as described with reference to FIGS. 7A to 7D-10. By releasing credentials after receiving authorization (e.g., fingerprint or passcode authorization), the electronic device provides additional secure that helps to prevent unauthorized users from causing credentials to be released, thereby making the system more secure. In some examples, the released credentials are transmitted to a remote server for use in the transaction. In some examples, the parameters interface (e.g., 920) is a payment sheet. In some examples, the payment sheet is a user interface of the operating system, rather than the first application. In some examples, the payment sheet is part of a first-party application provided by a provider of the operating system of the requesting device, wherein the first-party application is different from the first application. In some examples, the payment sheet includes user-selectable options for the payment transaction, such as a payment account option, shipping address option, a shipping method option, and/or contact information options. In some examples, the payment sheet slides into display (e.g., into view on the one or more displays) in response to activation (e.g., 918A) of the payment affordance (e.g., 916). In some examples, the payment sheet at least partially obscures a webpage that includes the payment affordance (e.g., 916).

In some embodiments, the fifth set of one or more criteria includes (1022-1) an authorized-account criterion that is met when an account actively logged into the electronic device (e.g., 900) is enabled to authorize the secure element to release credentials (e.g., payment credentials). Thus, the electronic device determines the state of the device based on the criterion (e.g., whether the account actively logged in has particular permissions) and, if the set of criteria is met, displays a parameters interface that informs the user of the state of the device and provides the user with the ability to respond to the request for credentials. In some examples, the electronic device (e.g., 900) is configured for use with multiple accounts. In some examples, an account of the multiple accounts is enabled to authorize the secure element to release credentials (e.g., payment credentials), and other accounts of the multiple accounts are not enabled to authorize the secure element to release credentials. In some examples, the account of the multiple accounts is enabled to authorize payments using the secure element of the electronic device (e.g., 900). In some examples, the secure element includes credentials for various payments account, which are selectable by the user for use the operation.

In some embodiments, the fifth set of one or more criteria includes (1022-2) an input-enabled-mode criterion that is met when the input device of the electronic device (e.g., 900) is enabled for user input. Thus, the electronic device determines the state of the device based on the criterion (e.g., whether the input device of the electronic device is enabled) and, if the set of criteria is met, displays a parameters interface that informs the user of the state of the device and provides the user with the ability to respond to the request for credentials. In some examples, the electronic device (e.g., 900) is a laptop computer and the input device is enabled for user input when the laptop computer is not in a clamshell mode. In some examples, the input device is enabled for user input when electronic device (e.g., 900) is a laptop computer that is not connected to an external display (e.g., 950) and when the laptop computer is open and turned on.

In some examples, in response to receiving the request for credentials, the electronic device (e.g., 900) causes display, on a display (e.g., 902, 904, 950), a parameters interface (e.g., 920) corresponding to the request for credentials that identifies one or more devices different from the electronic device for use in responding to the request for credentials, as described above. Thus, the electronic device determines whether a device other than the electronic device is available for use in the operation and, if available, provides the user with the ability to perform the operation using the different device, thereby providing the user with an easier/more efficient way to proceed with the operation and creating an efficient machine-man interface. In some examples, the parameters interface that identifies one or more devices different from the electronic device (e.g., 900) is displayed, optionally, independent of one or more of the following: whether the input-enabled-mode criterion or input-not-enabled-mode criterion are met, whether the storing-credentials criterion or the not-storing-credentials criterion are met, whether the storing-credentials criterion or the not-storing-credentials criterion are met, whether the authorized-account criterion or not-authorized-account criterion are met. In some examples, the request for credentials that identifies one or more devices different from the electronic device (e.g., 900) is displayed when the proximity-device criterion that is met.

In some embodiments, the electronic device (e.g., 900) includes a secure element, and the electronic device (e.g., 900) receives (1024) user input (e.g., at the input device) for authorizing transmitting credentials for use in an operation associated with the request for credentials.

In some embodiments, in response to receiving the input for authorizing transmitting credentials and in accordance with a determination that the input is consistent with authorization criteria, the electronic device (e.g., 900) causes (1026) credentials to be released from the secure element for use in the operation (e.g., the payment transaction), as described above with reference to FIGS. 7A to 7D-10. By releasing credentials after receiving authorization (e.g., fingerprint or passcode authorization), the electronic device provides additional secure that helps to prevent unauthorized users from causing credentials to be released, thereby making the system more secure. In some examples, the authorization criteria include a criterion that is met when a fingerprint detected by a fingerprint sensor (e.g., 910) of the electronic device (e.g., 900) is consistent with an enrolled fingerprint that is authorized to release the credentials from the secure element. In some examples, the authorization criteria includes a criterion that is met when activation of an authorization affordance displayed on a second display (e.g., 904, at a secure location on the display) is detected and a criterion that is met when a received sequence of one or more characters (e.g., a passcode) is consistent with an enrolled passcode (e.g., a passcode stored at the electronic device) that is authorized to release the credentials from the secure element. In some examples, authorization criteria include an additional criterion that is met when activation of the authorization affordance is detected prior to receiving the sequence of characters.

Note that details of the processes described above with respect to method 1000 (e.g., FIGS. 10A-10D) are also applicable in an analogous manner to the methods described above and below. For example, methods 800 and 1200 optionally include one or more of the characteristics of the various methods described above with reference to method 1000. In some examples, the electronic devices 700, 900, and 1100 are the same electronic device. In some examples, the first display and second display described with reference to methods 800, 1000, and 1200 are analogous. For brevity, these details are not repeated below.

FIGS. 11A to 11M-4 illustrate exemplary devices and user interfaces for disambiguating between commands to change the account that is actively logged-in on the device and commands to cause credentials to be released from the secure element, using an electronic device 1100 (e.g., a laptop computer) with an integrated fingerprint sensor and a secure element (e.g., for securely storing credentials, such as transaction credentials), in accordance with some embodiments. The exemplary user interfaces depicted in these figures are used to illustrate the processes described below, including the processes in FIGS. 12A-12B.

Figure 11A:
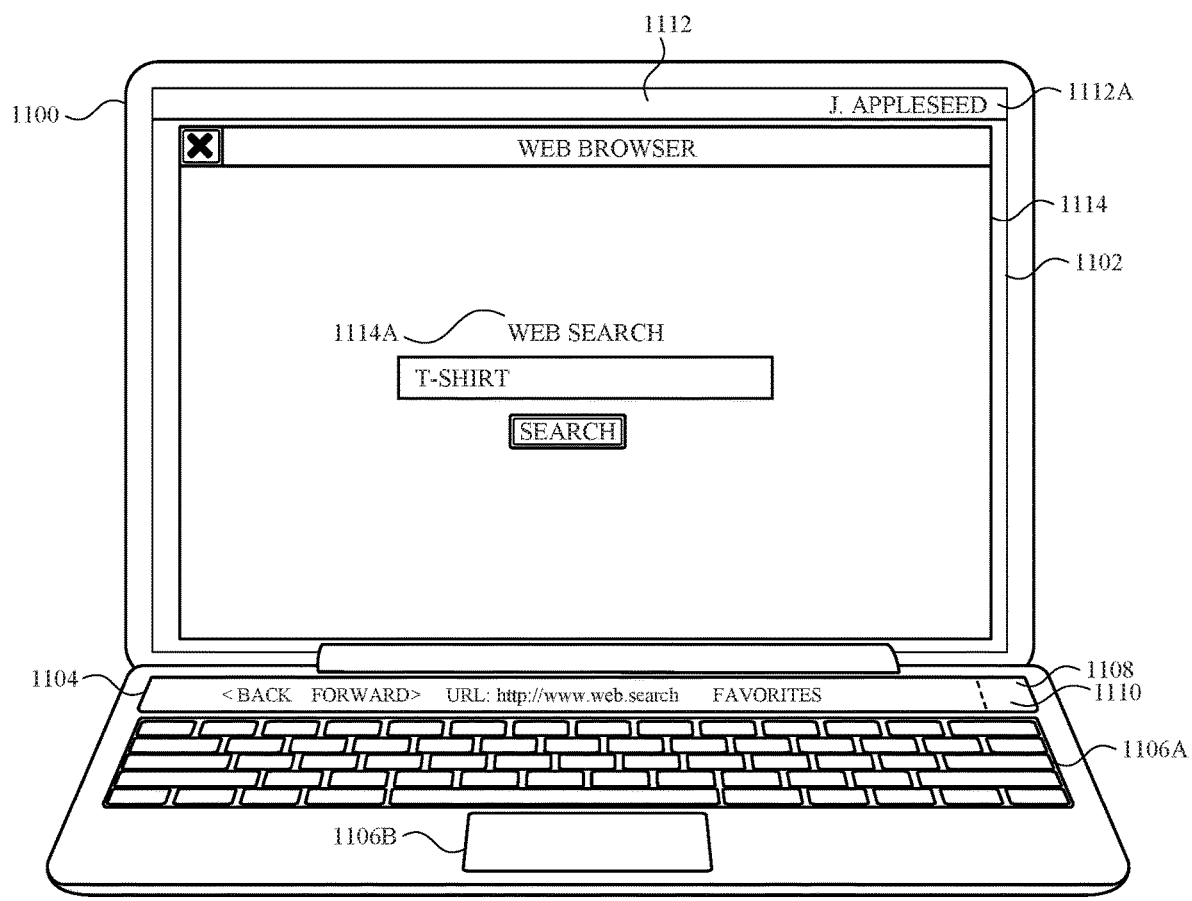
Figure 12A:
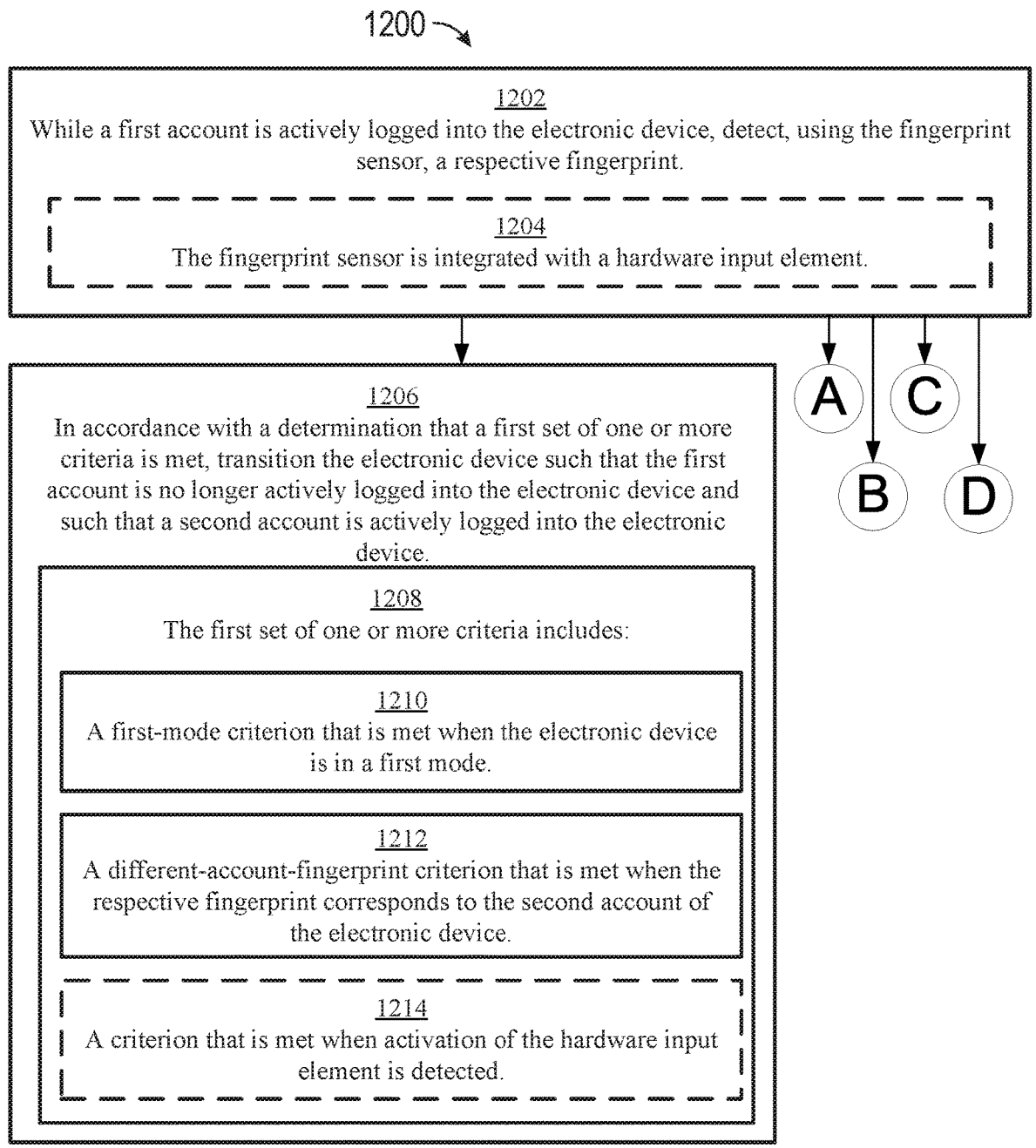

FIG. 11A illustrates an electronic device 1100 similar to that described with respect to FIGS. 7A to 7D-10. In some examples, electronic device 1100 is the same as electronic device 700. The electronic device 1100 has an integrated fingerprint sensor 1110 and a secure element (e.g., for securely storing credentials, such as transaction credentials). In some embodiments, the electronic device 1100 has a first display, a second display (that is different from the first display), one or more input devices (e.g., a touch-sensitive surface), and a secure element (e.g., for securely storing credentials, such as transaction credentials). The exemplary user interfaces depicted in these figures are used to illustrate the processes described below, including the processes in FIGS. 12A-12B.

In some embodiments, the first display 1102 of the electronic device 1100 is an integrated display of the electronic device and the second display 704 of the electronic device 1100 is a dynamic function row, such as the dynamic function row 5002 described with reference to FIGS. 5I-5N. In some embodiments, the second display 1104 (e.g., the dynamic function row) is separate from a physical keyboard 1106A of the device (e.g., the second display 1104 is included as part of a peripheral input mechanism). In some embodiments, the second display 1104 is integrated with another input device, such as a touchpad 1106B.

The electronic device 1100 includes a secure element that stores credentials (e.g., transaction credentials, such as payment account information or credit card information) of an associated account (e.g., of a user of the electronic device) registered on the electronic device, where the account is enabled to authorize the secure element to store and release credentials. In some examples, the credentials comprise payment information that is stored in the secure element of the electronic device 1100. In some examples, authorization information (e.g., an enrolled fingerprint) is used to cause the secure element to release the credentials.

In some embodiments, the second display 1104 (e.g., the dynamic function row) is paired with the secure element, and thus the second display 1104 is capable of and/or is authorized to cause the secure element to release credentials stored in the secure element. For example, the secure element and the second display 1104 are paired during the manufacturing process of the electronic device 1100. When the second display 1104 is paired with the secure element, replacement of either the second display 1104 or the secure element from the electronic device 1100 requires that the components be re-paired to again enable the secure element to store and to release credentials (e.g., transaction credentials). In some embodiments, the second display 1104 is paired with the secure element and the first display 1102 is not paired with the secure element, and thus the second display 1104 is capable of and/or is authorized to cause the secure element to release credentials stored in the secure element while the first display 1102 is not capable of and is not authorized to release credentials stored in the secure element.

The electronic device 1100 includes a fingerprint sensor 1110. In some embodiments, the fingerprint sensor 1110 is located adjacent to the second display 1104, as depicted in FIG. 7A. In some embodiments, the fingerprint sensor 1110 is a capacitive fingerprint reader. In some embodiments, the hardware input element 1108 is an input element that functions as both a power button (e.g., to power on and power off the electronic device 1100) and a fingerprint sensor. In some embodiments, the fingerprint sensor 1110 is integrated into the hardware input element 1108. In some examples, the hardware input element 1108 is an input element that is sensitive to changes in input intensity and that activates when pressed. In some examples, the hardware input element 1108 is an intensity-sensitive button with integrated intensity sensors that activates when an intensity (e.g., a characteristic intensity) of an input on the intensity-sensitive button exceeds an activation threshold. In some embodiments, the hardware input element 1108 forms a continuous touch-sensitive region with the second display 1104.

In some embodiments, the electronic device 1100 is configured for use with multiple accounts (e.g., a first account and a second account). In some examples, an account (e.g., the first account) of the multiple accounts is enabled to authorize the secure element to release credentials (e.g., payment credentials), and other accounts of the multiple accounts are not enabled to authorize the secure element to release credentials. In some examples, the account (e.g., the first account) of the multiple accounts is enabled to authorize payments using the secure element of the electronic device 1100. In some examples, the secure element includes credentials for various payments account, which are selectable by the user for use the operation.

As described in greater detail below, the electronic device 1100 stores a first set of one or more criteria. The first set of one or more criteria includes a first-mode criterion that is met when the electronic device 1100 is in a first mode (e.g., a mode where a parameters interface (e.g., a payment sheet) is not displayed on the first display 1102). In some examples, if in the first mode, the electronic device 1100 does not display, on the one or more displays, a parameters interface (e.g., a payment sheet, as described with reference to FIGS. 7C-1 to 7D-10). The first set of one or more criteria also includes a different-account-fingerprint criterion that is met when a fingerprint detected on the fingerprint sensor 1110 corresponds to an account (e.g., a second account) of the electronic device 1100 that is not actively logged onto the electronic device.

As described in greater detail below, the electronic device 1100 also stores a second set of one or more criteria. The second set of one or more criteria includes a second-mode criterion that is met when the electronic device 1100 is in a second mode (a mode, different from the first mode, where a parameter interface (e.g., a payment sheet) is displayed on the first display 1102). In some examples, if in the second mode, the electronic device 1100 displays, on the one or more displays, a parameters interface (e.g., a payment sheet, as described with reference to FIGS. 7C-1 to 7D-10). In some examples, the parameters interface corresponds to a payment transaction and the parameters interface includes an amount to be charged in the payment transaction. In some examples, the first mode and the second mode are mutually exclusive modes. In some examples, a parameters interface (e.g., a payment sheet, as described with reference to FIGS. 7C-1 to 7D-10), is displayed when the electronic device 1100 is in the second mode and not displayed when the electronic device 1100 is in first mode. The second set of one or more criteria also includes a current-account-fingerprint criterion that is met when a fingerprint detected on the fingerprint sensor 1110 corresponds to an account (e.g., a first account) of the electronic device 1100 that is actively logged-on to the electronic device (and is not met if the respective fingerprint corresponds to the second account).

Figure 11B:
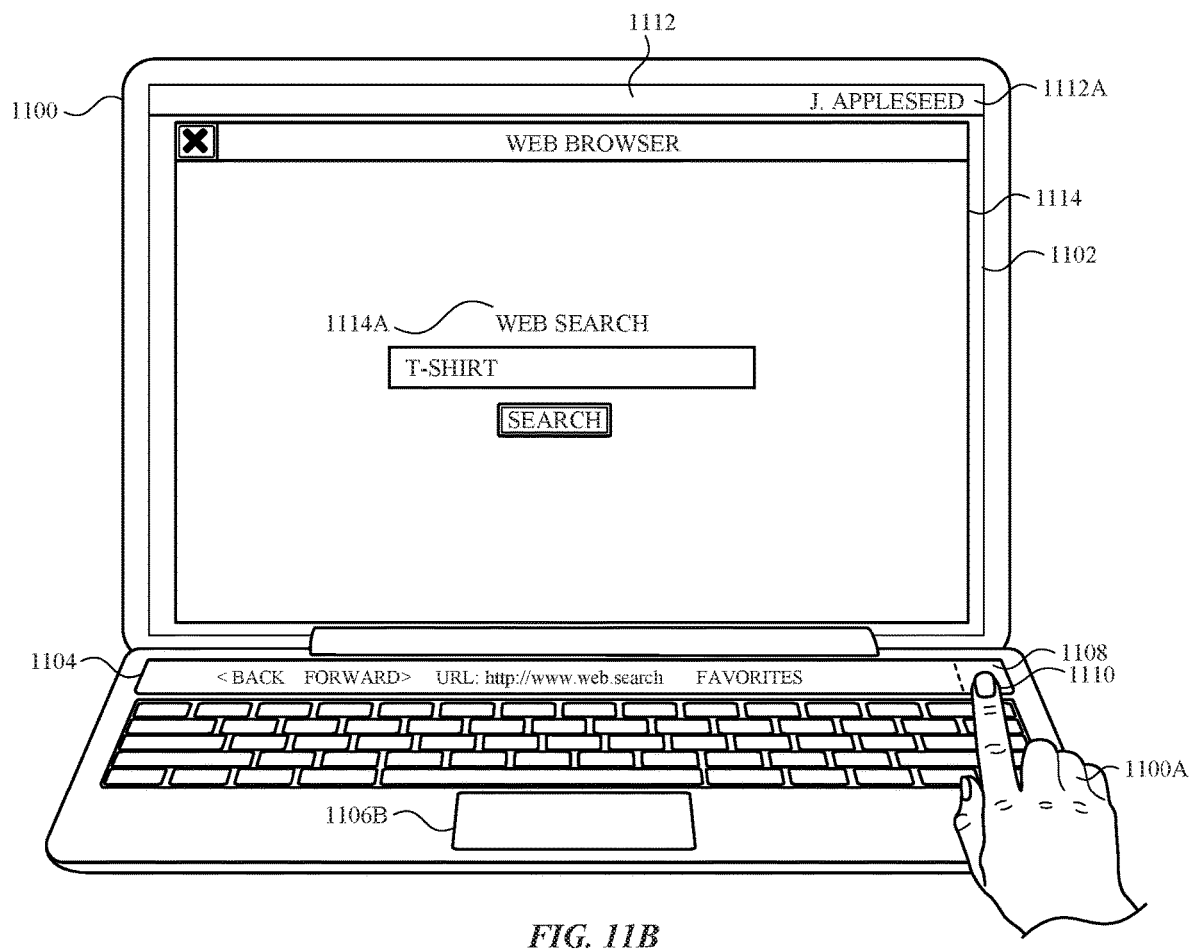
Figure 11C:
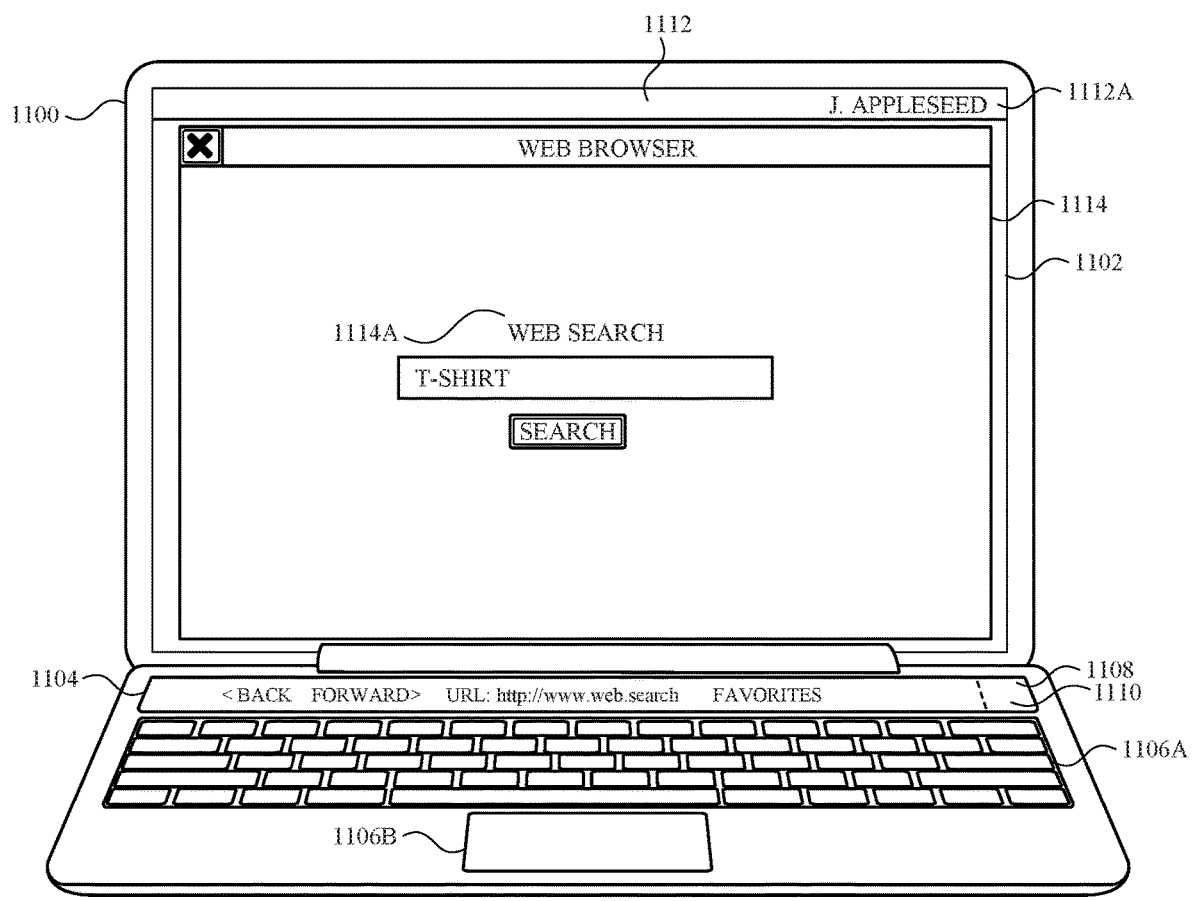
Figure 11D:
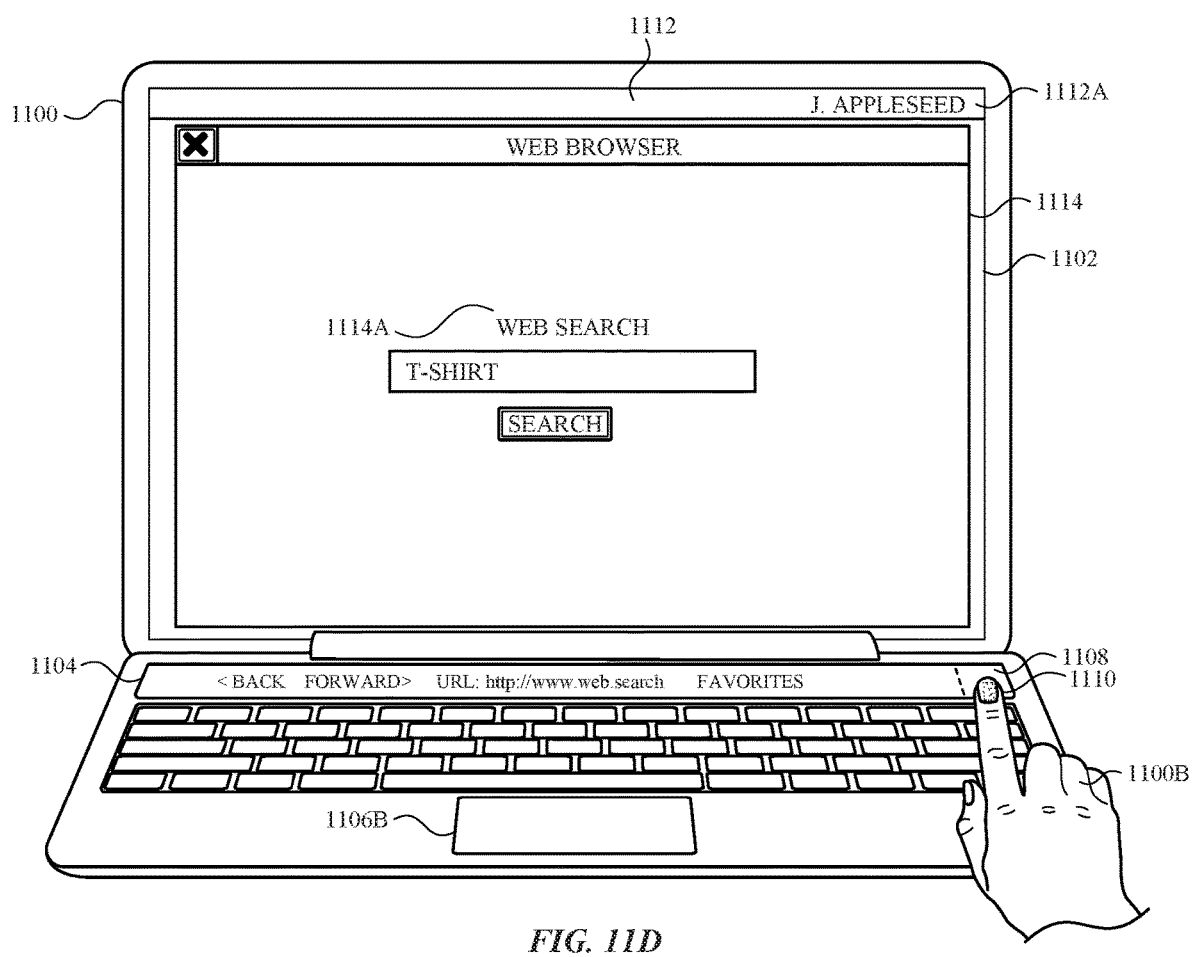
Figure 11E:
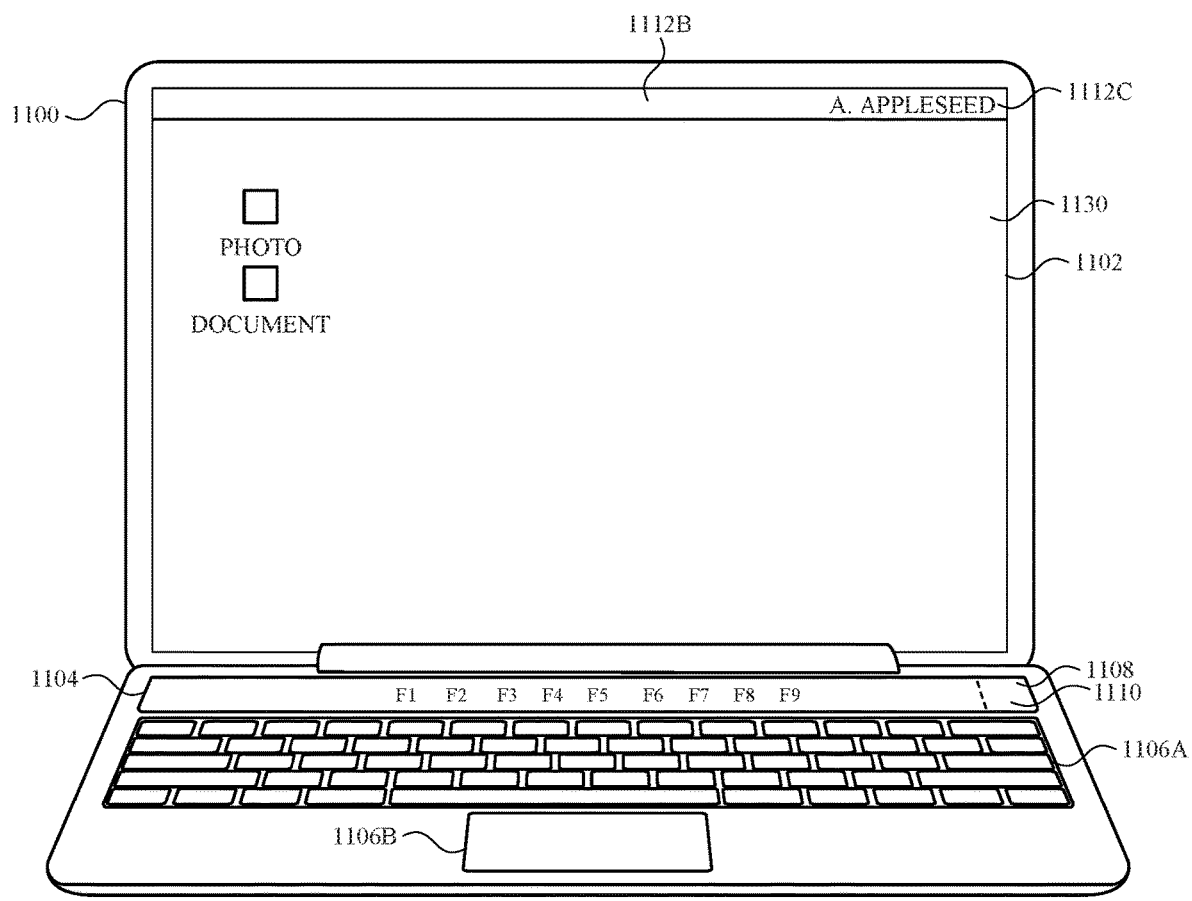

FIGS. 11A-11C illustrate that when the electronic device detects activation of the hardware input element 1108 by the first user when the first user is actively logged in, the electronic device does not change the actively logged in account. FIGS. 11C-11E illustrate that when the electronic device detects activation of the hardware input element 1108 by a second user when the first user is actively logged in, the electronic device changes the actively logged in account to that of the second user.

As illustrated in FIG. 11A, a first account (e.g., of a first user) is actively logged into the electronic device 1100. In some examples, the electronic device 1100 displays, on the first display 1102, an indication 1112A (e.g., name of the user associated with the logged-in account) of the first account (e.g., "J. Appleseed"). FIG. 11A also illustrates a browser application 1114 in a search page shown in the foreground of the user interface 1112 displayed on the first display 1102 of the electronic device 1100.

In some embodiments, the electronic device 1100 determines that the first set of one or more criteria is not met. In accordance with the determination that the first set of one or more criteria is not met, the electronic device 1100 maintains the first account as the actively logged-in account on the electronic device. That is, the electronic device 1100 forgoes transitioning the active user state of the device such that the first account is no longer actively logged into the electronic device and such that a second account (different from the first account) is actively logged into the electronic device. For example, FIG. 11B illustrates the electronic device 1100, while the first account (e.g., account of "J. Appleseed") is actively logged into the electronic device 1100, detecting (e.g., in conjunction with detecting activation of the hardware input element), using the fingerprint sensor 1110, a respective fingerprint. As illustrated in FIG. 11B, the detected respective fingerprint is that of the first user 1100A (e.g., "J. Appleseed") associated with the first account. In response, the electronic device 1100 determines that detected respective fingerprint is that of the first user 1100A (e.g., "J. Appleseed") associated with the first account, and, therefore, does not transition the electronic device 1100 such that the first account is no longer actively logged into the electronic device 1100. Thus, as illustrated in FIG. 11C, the first account remains actively logged into the electronic device 1100.

In some embodiments, the first set of one or more criteria also includes a criterion that is met when activation of the hardware input element 1108 is detected by the electronic device 1100. In some examples, detecting activation of the hardware input element 1108 includes detecting a contact on the hardware input element 1108 having a characteristic intensity that exceeds an intensity threshold.

If the electronic device 1100 determines that the first set of one or more criteria is met (and, for example, in response to detecting activation of the hardware input element), the electronic device 1100 transitions the active user state of the device such that the first account (e.g., the account associated with the first user (e.g., "J. Appleseed")) is no longer actively logged into the electronic device and such that a second account (different from the first account) is actively logged into the electronic device. For example, as illustrated in FIG. 11D, while the first account (e.g., account of the first user (e.g., "J. Appleseed")) is actively logged into the electronic device 1100, the electronic device 1100 detects (e.g., in conjunction with detecting activation of the hardware input element), using the fingerprint sensor 1110, a respective fingerprint of a second user 1100B (e.g., "A. Appleseed") associated with a second account, different from the first user 1100A (e.g., "J. Appleseed") associated with the first account.

As illustrated in FIG. 11E, in response to detecting the respective fingerprint of the second user 1100B (e.g., "A. Appleseed"), in accordance with a determination that the first set of one or more criteria is met (and, for example, in response to detecting activation of the hardware input element), the electronic device 1100 transitions the active user state such that the first account is no longer actively logged into the electronic device 1100 and such that the second account associated with the second user 1100B (e.g., "A. Appleseed") is actively logged into the electronic device 1100. As such, the user interface displayed on the first display 1102 transition from the user interface 1112 of the first user 1100A to the user interface 1112B of the second user. For example, the web browser 1114 is no longer displayed and interface 1130 with icons is displayed. In some examples, because the actively logged-in account on the electronic device 1100 has been transitioned from the first account (e.g., account of "J. Appleseed") to the second account (e.g., account of "A. Appleseed"), the indication 1112C of the actively logged-in user displayed on the first display 1102 is changed from the name of the first account (e.g., "J. Appleseed") to that of the second account (e.g., "A. Appleseed"). In some examples, both the first account (e.g., account of "J. Appleseed") and the second account (e.g., account of "A. Appleseed") remain logged into the electronic device 1100, though only one account is actively logged-in at any time. In some examples, the currently-actively logged-in account is the only account that is logged into the electronic device 1100, and the account that has been transitioned away is logged-off of the electronic device.

Figure 11F:
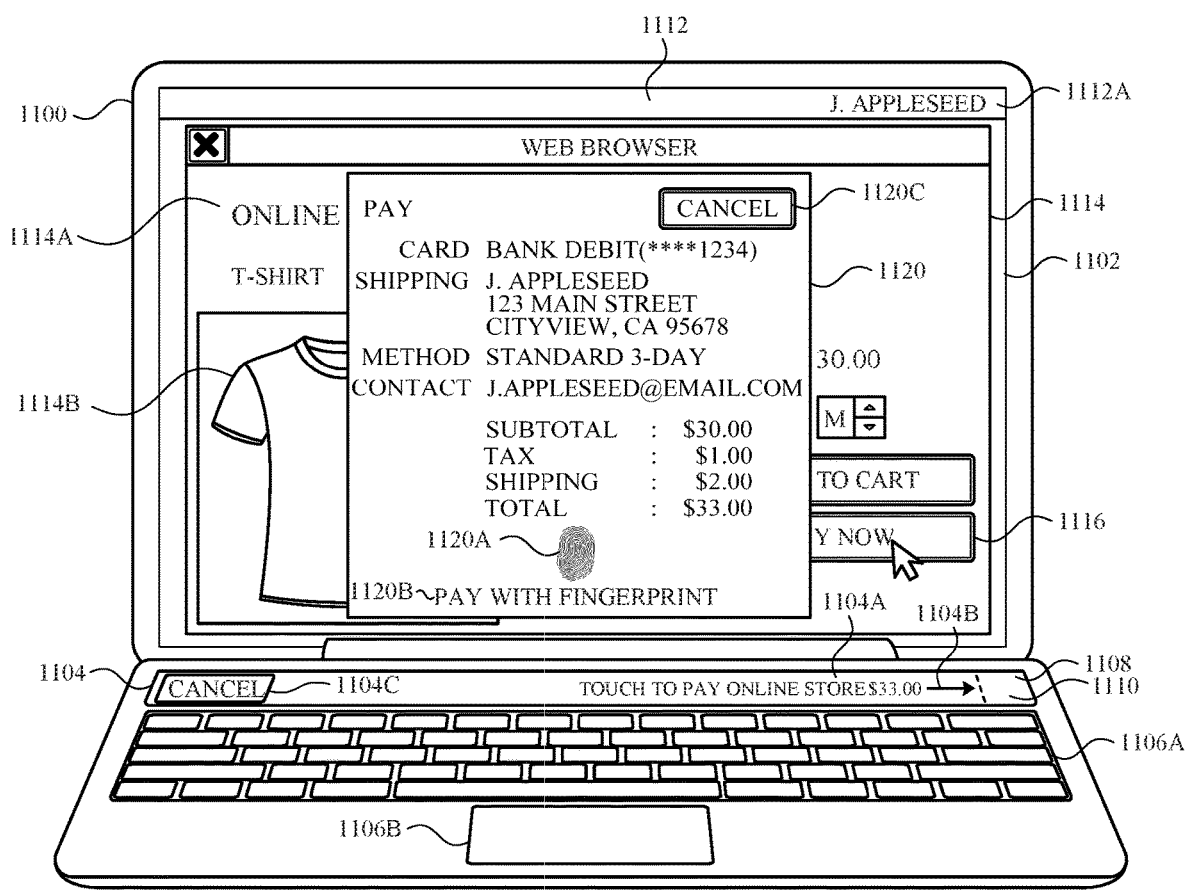
Figure 11G:
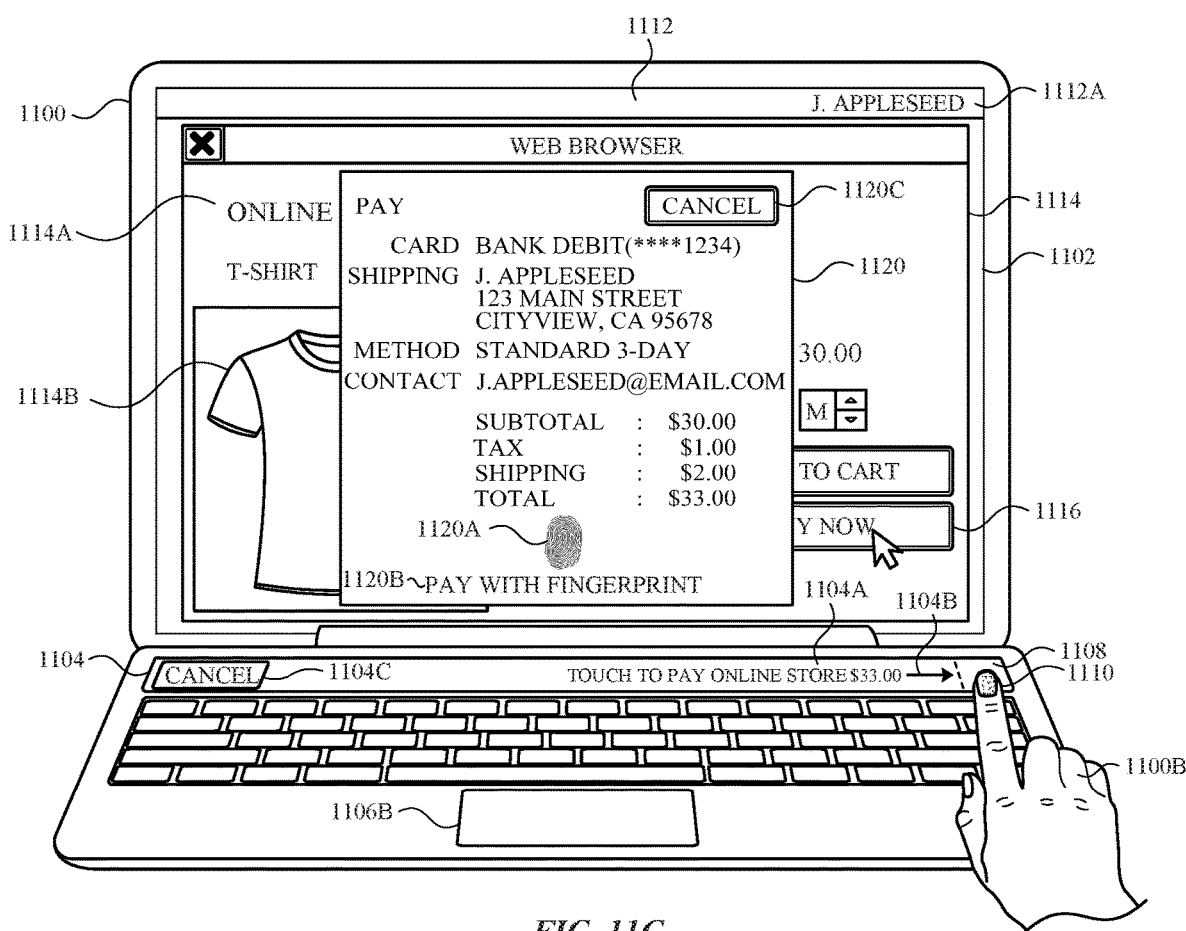
Figure 11H:
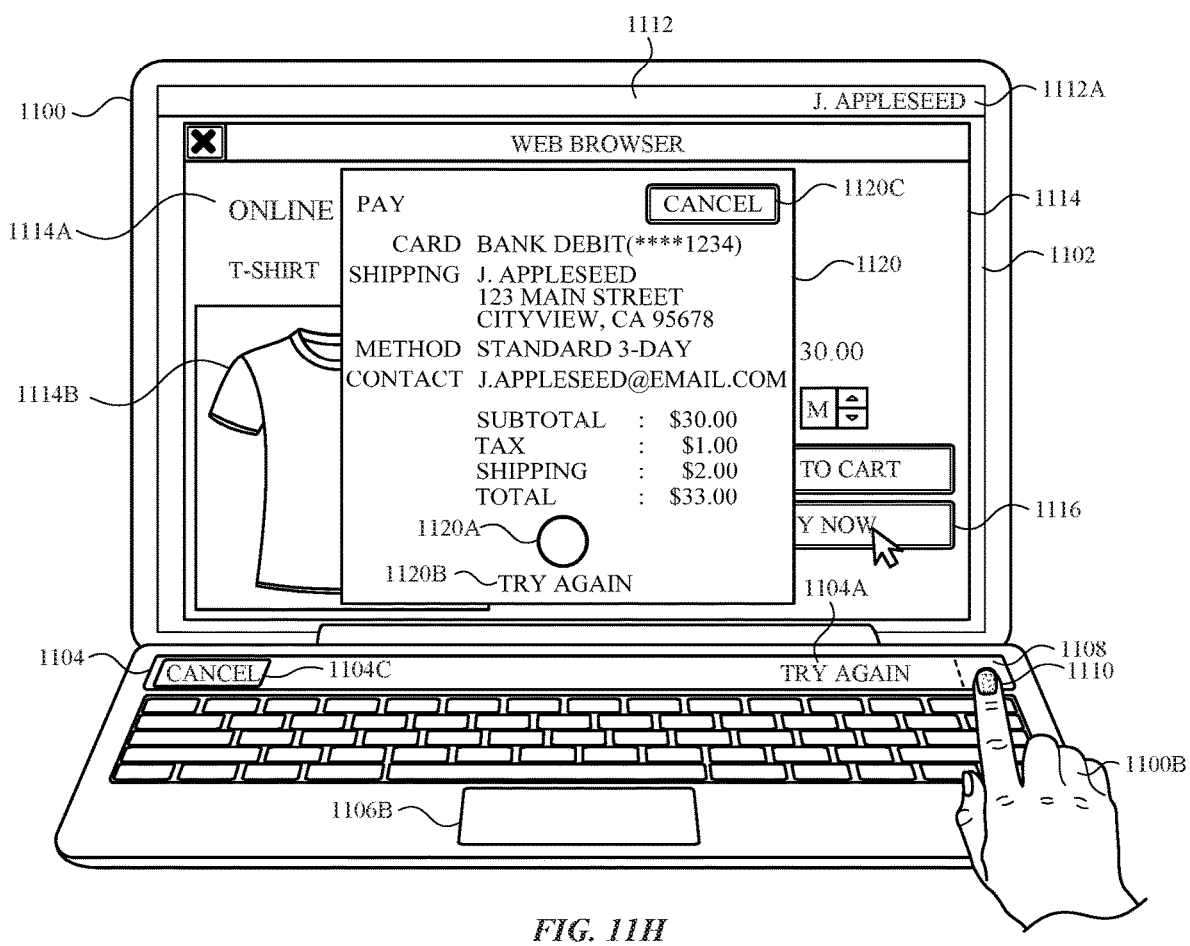
Figure 111:
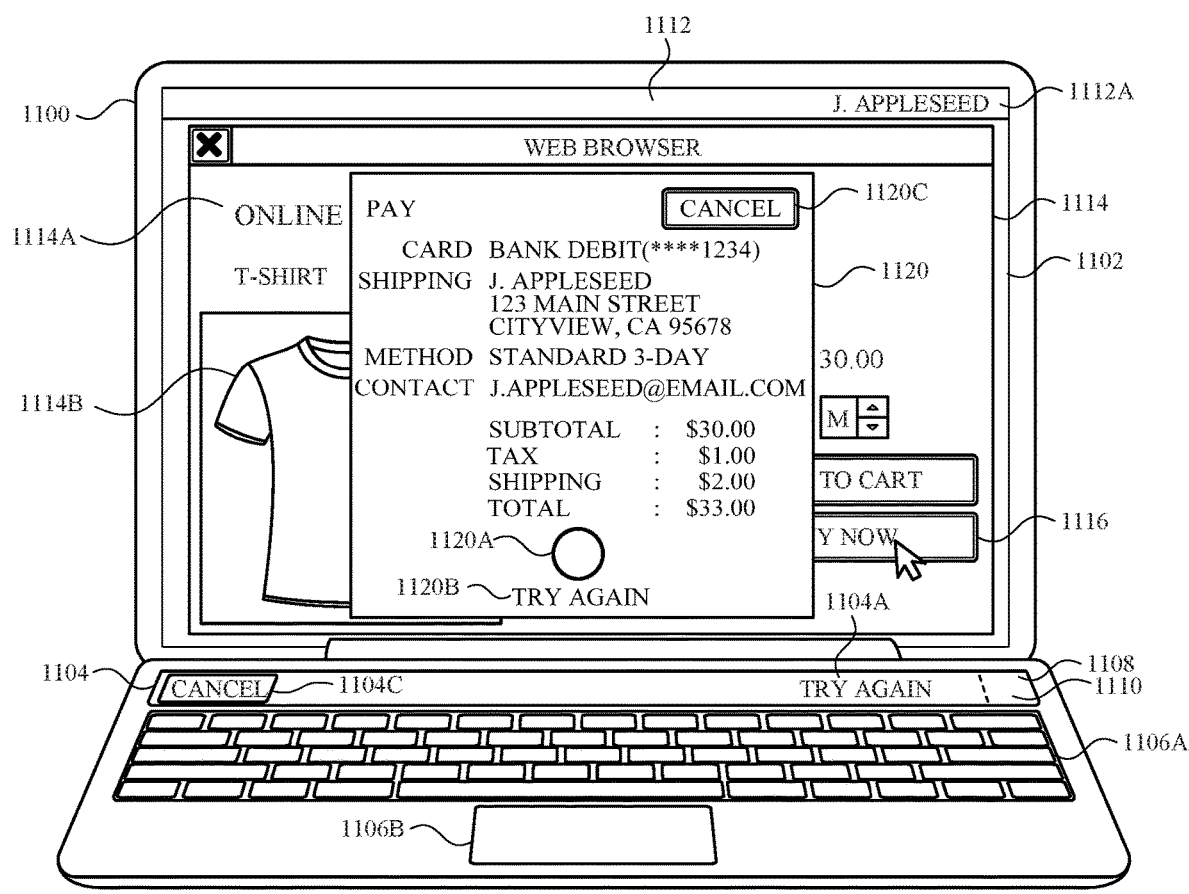

FIGS. 11F-11H illustrate the second user attempting (unsuccessfully) to authorize an operation or to become to actively logged-in user. FIGS. 11I-11L illustrate the first user authorizing the operation. FIG. 11F illustrates the electronic device 1100 with the first account (e.g., account of "J. Appleseed") actively logged onto the electronic device and the electronic device in the second mode (e.g., displaying a parameter interface 1120 (e.g., a payment sheet)). In some examples, the second mode is a mode in which the electronic device is requesting authorization for an operation, such as a payment transaction, and the first mode is a mode in which the electronic device is not requesting authorization for an operation, such as a payment transaction. For example, the electronic device 1100 displays, on the first display 1102, the parameters interface 1120 for the purchase of an item 1114B from an online store 1114A (for example, as described with reference to FIGS. 7A to 7D-10). In accordance with a determination that the second set of one or more criteria is met, the electronic device 1100 causes credentials to be released from the secure element for use in the operation (e.g., payment information for use in a payment transaction) for which authorization is required. Further, in some embodiments, subsequent to causing the credentials to be released from the secure element for use in the operation, the electronic device transmits the credentials to a remote server.

In accordance with a determination that a second set of one or more criteria is met, the electronic device 1100 causes credentials to be released from the secure element for use in the operation (e.g., payment information for use in a payment transaction), as, for example, described above with reference to FIGS. 7A to 7D-10.

In some embodiments, in accordance with a determination that the second set of one or more criteria is not met, the electronic device forgoes causing credentials to be released from the secure element for use in the operation (e.g., payment information for use in a payment transaction). For example, FIG. 11G illustrates the second user 1100B (e.g., "A. Appleseed") associated with the second account providing fingerprint input to attempt to authorize the operation (e.g., authorize the payment transaction). Because the actively logged-in account is the first account (e.g., account of "J. Appleseed") and the second user 1100B (e.g., "A. Appleseed") is not authorized to enable release of credentials on the electronic device 1100, the electronic device 1100 forgoes causing credentials to be released from the secure element for use in the operation (e.g., the payment transaction). Thus, in some examples, as illustrated in FIG. 11H, the electronic device 1100 displays, on the second display 1104, a visual indication 1104A (e.g., "Try Again") that the release of credentials was not successful. In some examples, the electronic device 1100 also displays, on the parameters interface 1120 displayed on the first display 1102, a graphical indication 1120A and a textual indication 1120B (e.g., "Try Again") that the release of credentials was not successful. Similarly, in some examples, the electronic device forgoes transitioning such that the second account is the actively logged in account when the device is in the second mode, even when the second user presses the hardware input element and provides fingerprint information.

By contrast, FIGS. 11I-11L illustrate the first user 1100A (e.g., "J. Appleseed") associated with the first account attempting to authorize the operation (e.g., authorize the payment transaction). FIG. 11I illustrates the electronic device 1100 after the second user (e.g., "A. Appleseed") attempted, and failed, to authorize the operation (e.g., authorize the payment transaction).

Figure 11J:
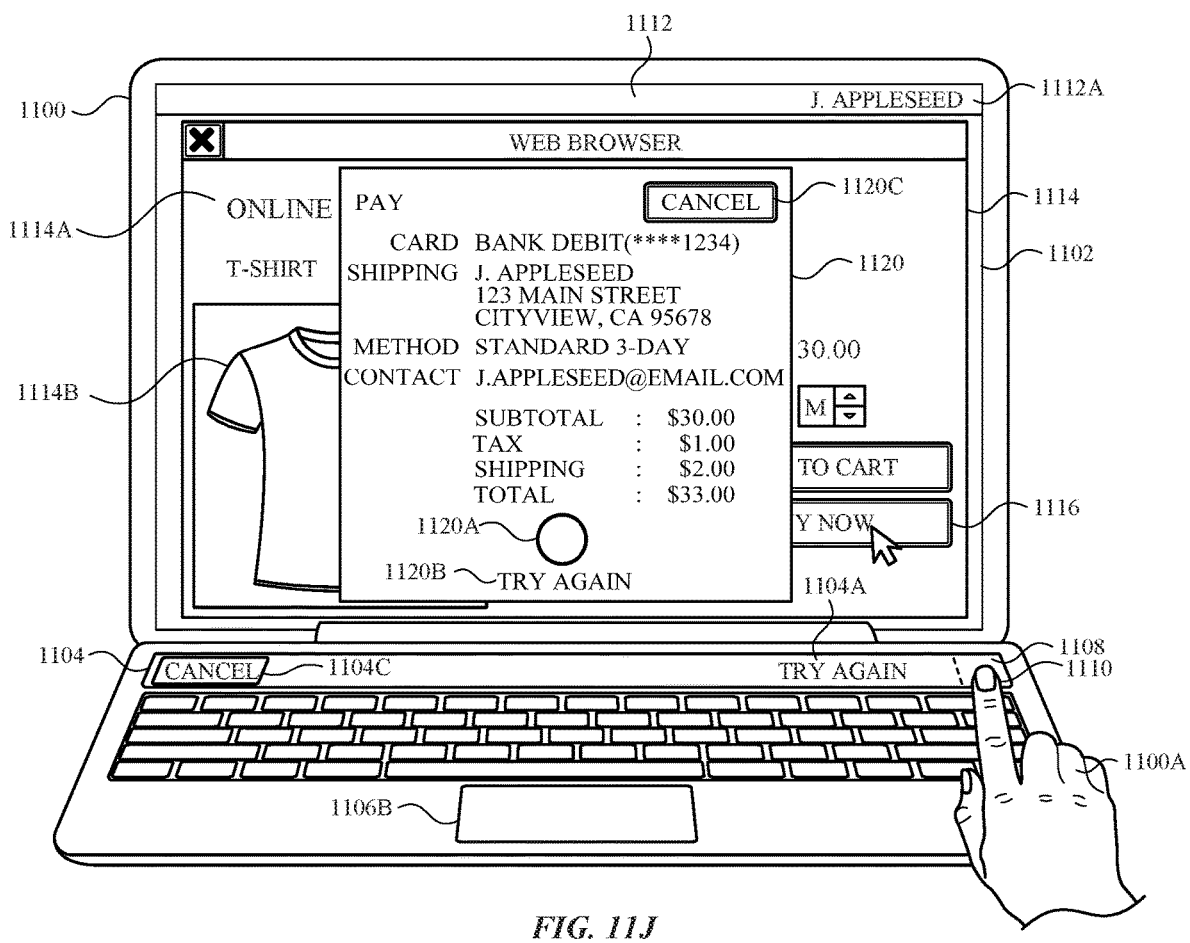

FIG. 11J illustrates the first user 1100A (e.g., "J. Appleseed") associated with the first account providing fingerprint input to attempt to authorize the operation. In response to receiving the input from the first user 1100A to authorize the operation, in accordance with a determination that the input from the first user 1100A is consistent with authorization criteria, the electronic device 1100 causes credentials to be released from the secure element for use in the operation (e.g., payment information for use in a payment transaction). In some embodiments, the authorization criteria includes a criterion that is met when the detected fingerprint of the first user 1100A is consistent with an enrolled fingerprint that is authorized to release the credentials from the secure element of the electronic device 1100.

Figure 11K:
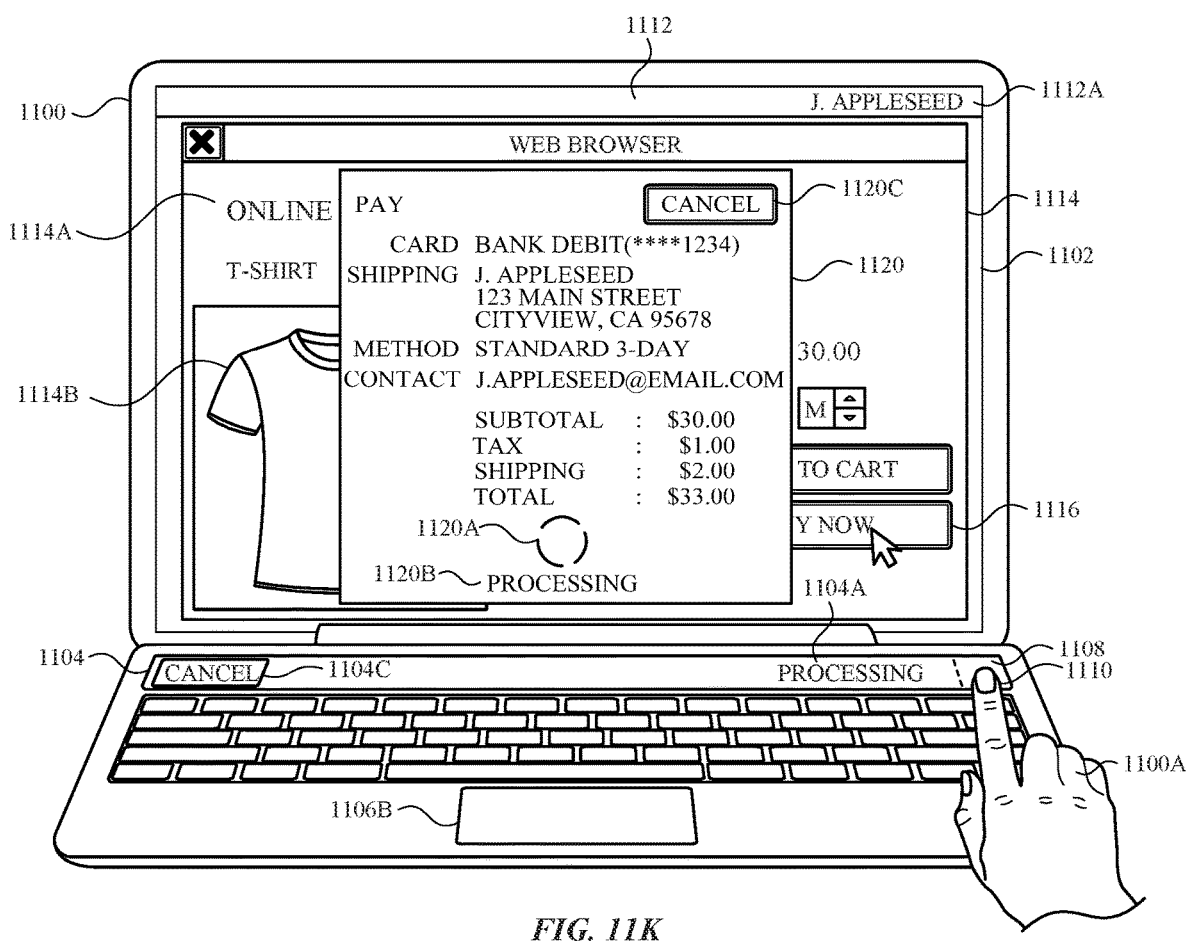

As illustrated in FIG. 11K, in some embodiments, prior to causing the credentials to be released from the secure element for use in the operation, the electronic device 1100 displays, on the second display 1104, a visual indication 1104A (e.g., "Processing") informing the user that the authorization is being processed (e.g., the consistency of the detected fingerprint of the user with the enrolled fingerprint is being determined). In some embodiments, the parameters interface 1120 (e.g., the payment sheet) on the first display 1102 also provides a graphical non-textual indication 1120A and a textual indication 1120B (e.g., "Processing") informing the user that the authorization is being processed (e.g., the consistency of the detected fingerprint of the user with the enrolled fingerprint is being determined).

Figure 11L:
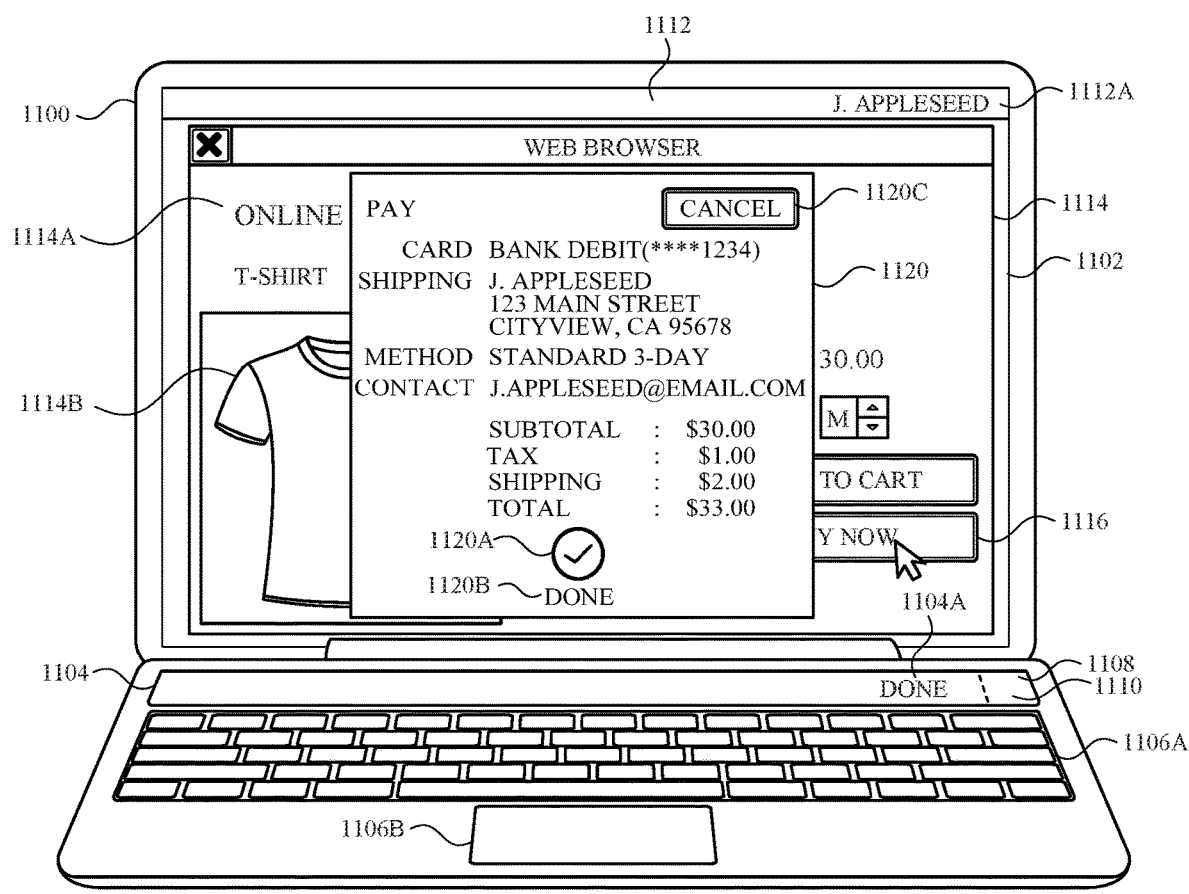

FIG. 11L illustrates, in accordance with some embodiments, the electronic device 1100 displaying, on the second display 1104, a visual indication 1104A informing the user that the authorization is complete (e.g., "Done," "Complete"). In some examples, the electronic device 1100 also displays, on the first display 1102, a graphical indication 1120A and a textual indication 1120B (e.g., "Done," "Complete") informing the user that the authorization is complete. The authorization is complete when it is determined that the fingerprint input from the user is consistent with the authorization criteria. In accordance with a determination that the fingerprint input from the user is consistent with the authorization criteria, the electronic device 1100 causes credentials to be released from the secure element for use in the operation (e.g., payment information for use in a payment transaction).

Figures 1, 11M:
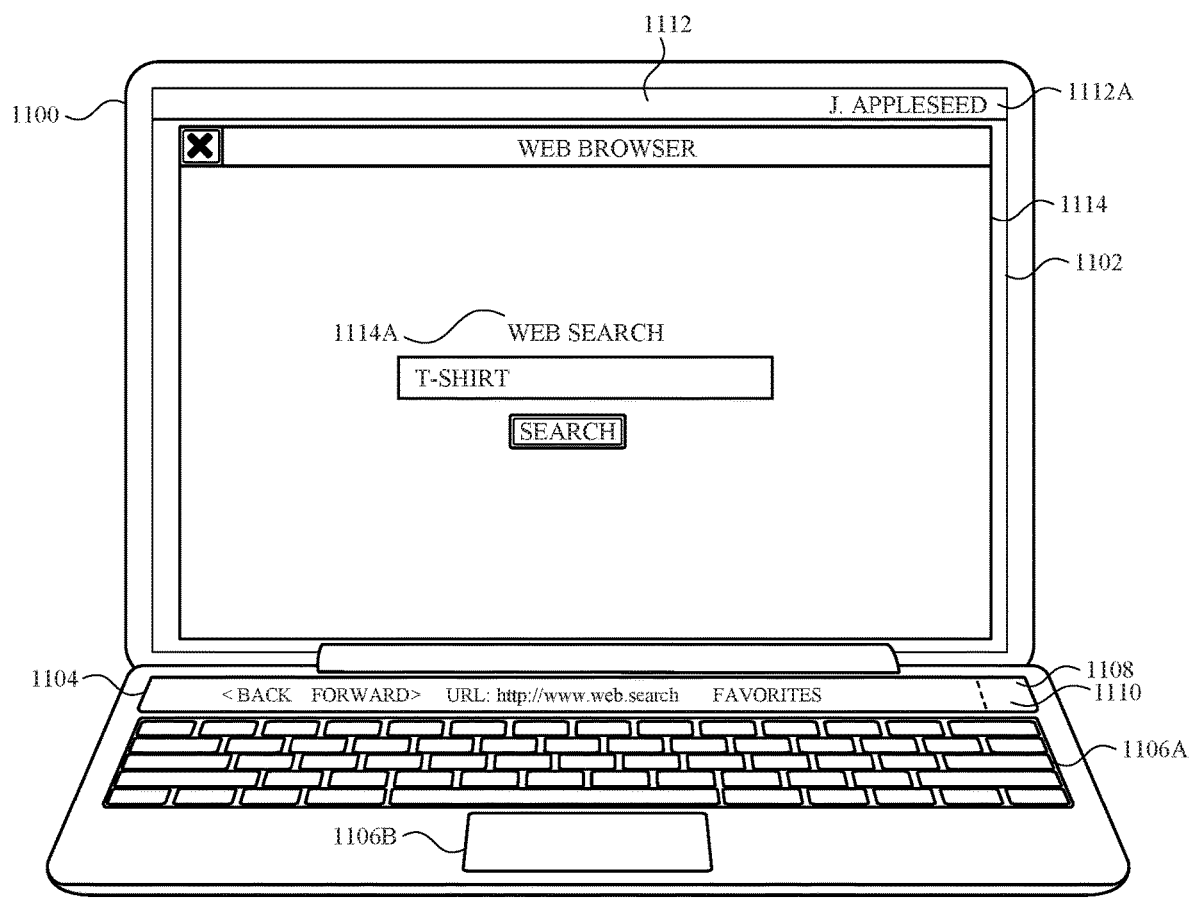
Figures 2, 11M:
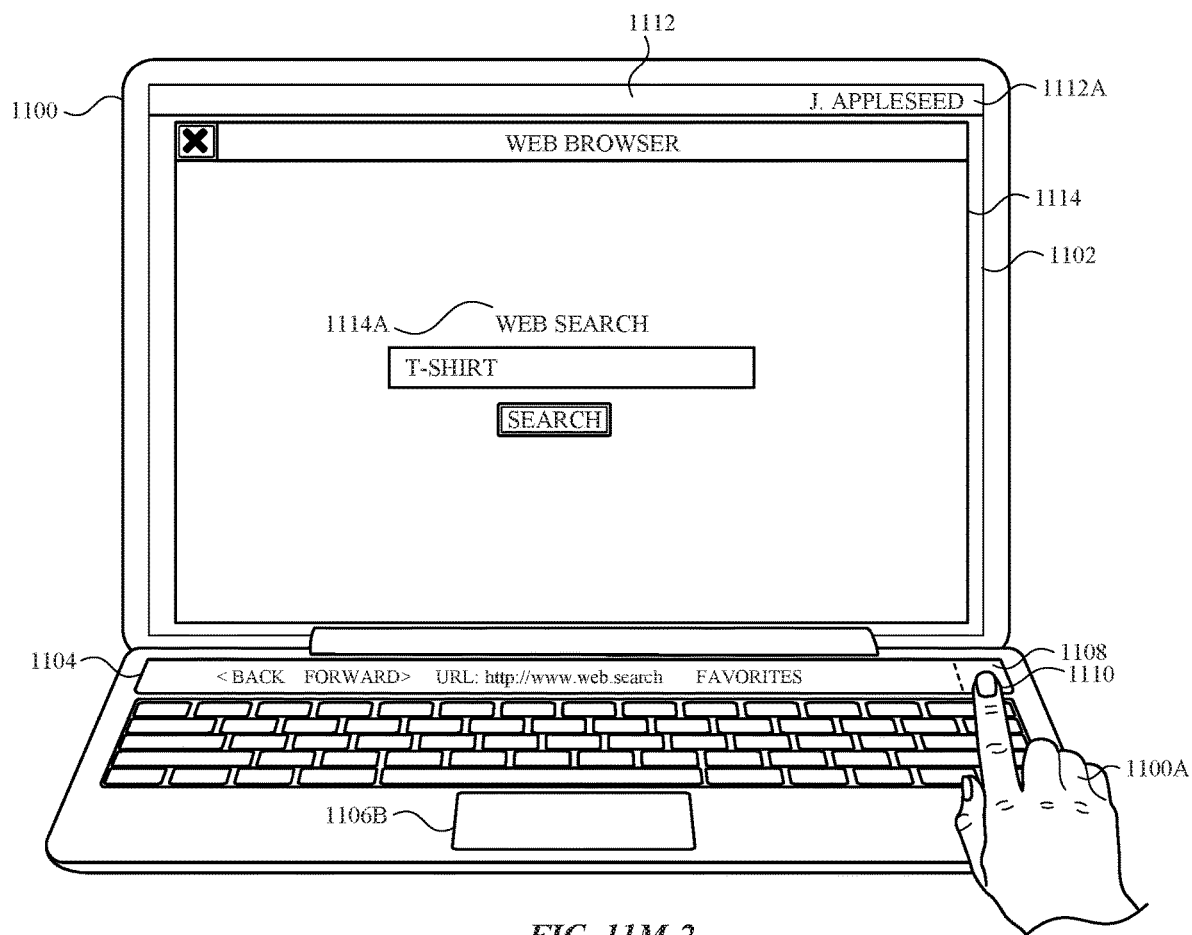
Figures 3, 11M:
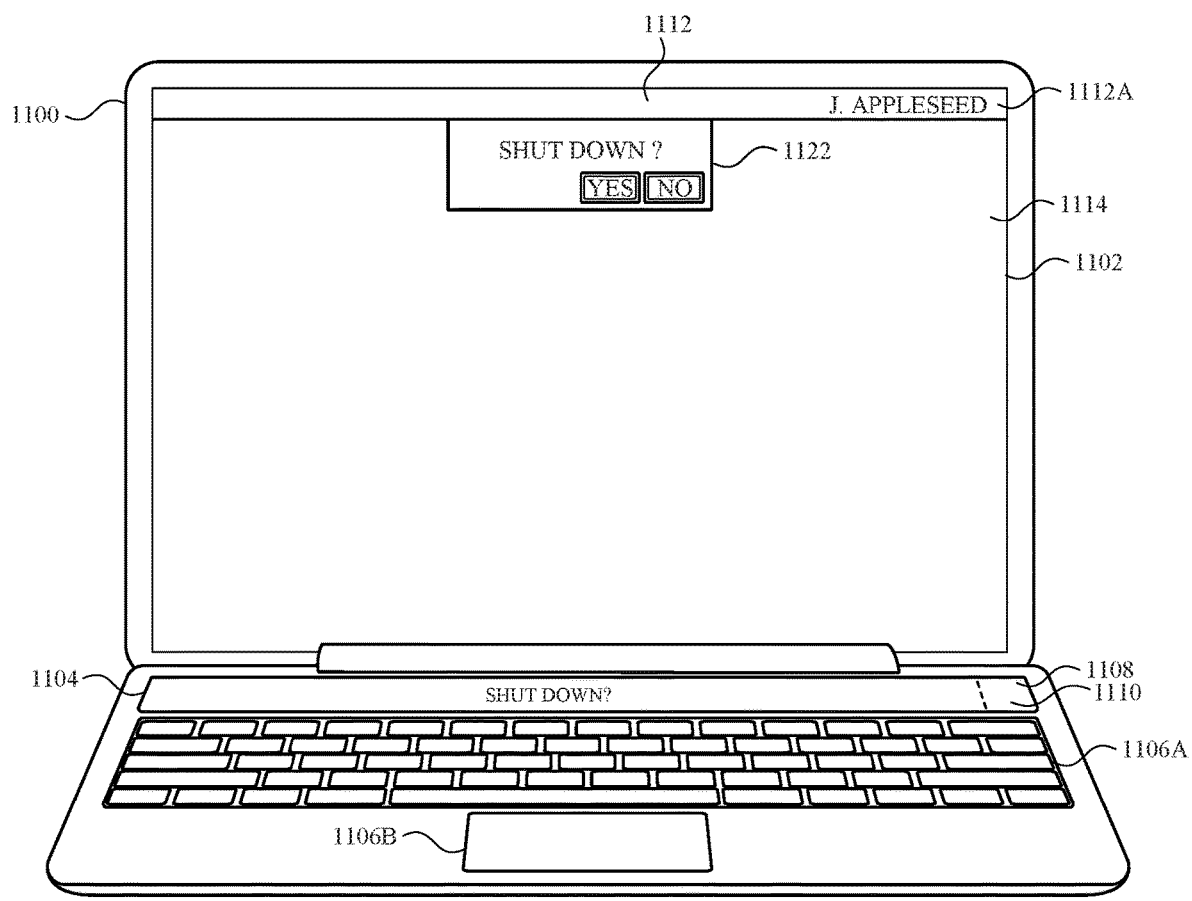
Figures 4, 11M:
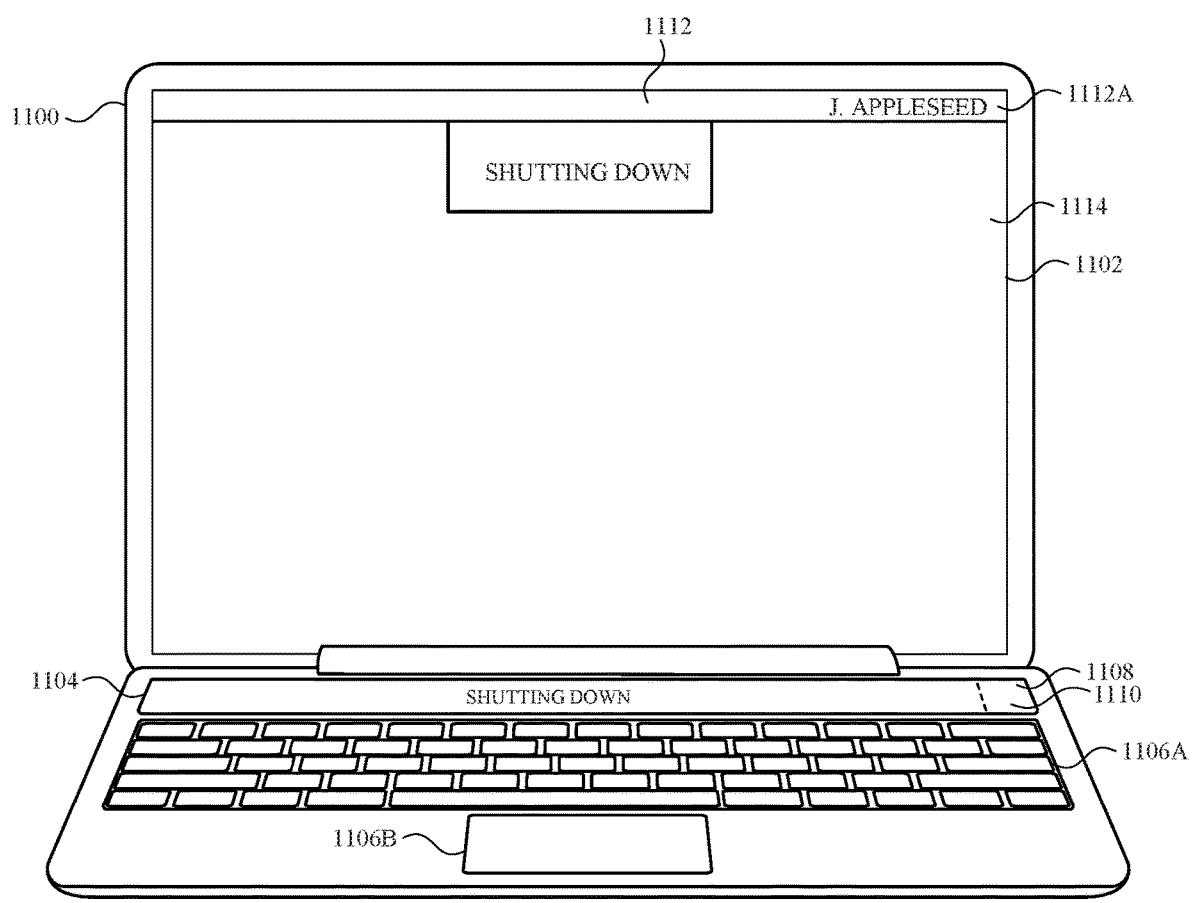

FIGS. 11M-1 to 11M-4 illustrate the electronic device 1100 responding to an activation of the hardware input element 1108 when the electronic device is in the first mode, in accordance with some embodiments. For example, FIG. 11M-1 illustrates the electronic device 1100 with a first account (e.g., account of "J. Appleseed") actively logged into the device. In some examples, the electronic device shows an indication 1112A that the first account is logged into the device.

In some embodiments, detecting activation of the hardware input element 1108 includes detecting a press of the hardware input element 1108 for a duration that does not exceed a first threshold duration. For example, detecting the press of the hardware input element 1108 comprises detecting a quick press and release of the hardware input element. For example, FIG. 11M-2 illustrates the user 1100A (e.g., "J. Appleseed") associated with the first account that is actively logged into the electronic device 1100 activating the hardware input element 1108.

In some embodiments, the device stores a third set of one or more criteria. The third set of one or more criteria includes a shut-down-press criterion that is met when activation of the hardware input element 1108 of the electronic device 1100 is detected for a duration that exceeds a first threshold duration and does not exceed a second threshold duration.

As illustrated in FIG. 11M-3, in accordance with a determination that the third set of one or more criteria is met (and, for example, in response to detecting a long press of the hardware button), the electronic device 1100 displays, on the one or more displays, a prompt 1122 to shut down the device. In response to detecting selection of the user agreeing to shut down the electronic device 1100 (e.g., detecting user selection of "Yes" on the displayed shutdown prompt 1122), the electronic device shuts down. In some examples, shutting down the electronic device 1100 includes the operating system of the device sending commands to terminate one or more processes running on the operating system in preparation for powering off the device (and optionally, forgoing causing credentials to be released from the secure element for use in the operation and forgoing transitioning the electronic device to be actively logged in using the second account).

As illustrated in FIG. 11M-4, after receiving confirmation from the user to shut down, the electronic device shuts down.

In some embodiments, the device stores a fourth set of one or more criteria. The fourth set of one or more criteria includes a power-down-press criterion that is met when the electronic device 1100 detects activation of the hardware input element 1108 for a duration that exceeds a second threshold duration (e.g., a minimum threshold duration of 5 seconds).

In accordance with a determination that the fourth set of one or more criteria is met (and, for example, in response to detecting an extra-long press of the hardware input element 1108), the electronic device 1100 abruptly powers off by forgoing the shutdown process (e.g., without transmitting termination instructions to one or more running processes). In some examples, if the electronic device 1100 detects the extra-long press of the hardware input element 1108 while the device is in the second mode (e.g., displaying a parameters interface (e.g., a payment sheet) for a payment transaction), the device forgoes causing credentials to be released from the secure element for use in the operation for which authorization is required. In some examples, if the electronic device 1100 detects the extra-long press of the hardware input element 1108 while the device is in the first mode (e.g., not displaying a parameters interface), the device forgoes transitioning from the actively-logged in account to a different account of the device that is not actively logged-in to the device.

FIGS. 12A-12B are a flow diagram illustrating a method for disambiguating between commands to change the account that is actively logged-in on the device and commands to cause credentials to be released from the secure element using an electronic device (e.g., 1100) in accordance with some embodiments. In some embodiments, method 1200 is performed at a device (e.g., 100, 300, 500, portable computing system 100 of cross-referenced U.S. Provisional Patent Application Ser. No. 62/368,988, portions of which are included in Appendix B, desktop computing system 200 of cross-referenced U.S. Provisional Patent Application Ser. No. 62/368,988, portions of which are included in Appendix B) with an integrated fingerprint sensor, a secure element, and, optionally, a hardware input element and one or more displays. Some operations in method 1200 are, optionally, combined, the order of some operations is, optionally, changed, and some operations are, optionally, omitted.

As described below, method 1200 provides an intuitive way for managing access to credentials for use in an operation. The method reduces the cognitive burden on a user for managing access to credentials for use in an operation for which authorization is required, thereby creating a more efficient human-machine interface. For battery-operated computing devices, enabling a user to manage access to credentials for use in an operation faster and more efficiently conserves power and increases the time between battery charges.

While a first account is actively logged into the electronic device (e.g., 1100), the device detects (1202) (e.g., in conjunction with detecting activation of a hardware input element (e.g., 1108)), using the fingerprint sensor (e.g., 1110), a respective fingerprint. In some embodiments, the fingerprint sensor (e.g., 1110) is integrated (1204) with the hardware input element (e.g., 1204). In some embodiments, the first account of the electronic device (e.g., 1100) is enabled to authorize the secure element to release credentials (e.g., payment credentials). In some examples, the electronic device (e.g., 1100) is configured for use with multiple accounts. In some examples, an account of the multiple accounts is enabled to authorize the secure element to release credentials (e.g., payment credentials), and other accounts of the multiple accounts are not enabled to authorize the secure element to release credentials. In some examples, the account of the multiple accounts is enabled to authorize payments using the secure element of the electronic device (e.g., 1100).

In accordance with a determination that a first set of one or more criteria is met (and, for example, in response to detecting activation of the hardware input element (e.g., 1108)), the electronic device (e.g., 1100) transitions (1206) such that the first account is no longer actively logged into the electronic device (e.g., 1100), and such that a second account (different from the first account) is actively logged into the device. Thus, the first set of criteria enables the electronic device to disambiguate between input for transitioning the device to another account (e.g., the another account corresponding to the second user) and input for performing other functions (such as releasing credentials), thereby improving the machine-man interface. In some examples, both the first account and the second account remain logged into the electronic device (e.g., 1100), while only one of the first account and the second account is actively logged into the electronic device.

The first set of one or more criteria (1208) includes, a first-mode criterion (1210) that is met when the electronic device (e.g., 1100) is in a first mode (e.g., a mode where a payment sheet is not displayed), and a different-account-fingerprint criterion (1212) that is met when the respective fingerprint corresponds to the second account of the device.

In some embodiments, the fingerprint sensor (e.g., 1110) is integrated with a hardware input element (e.g., 1108), and the first set of one or more criteria (1208) includes a criterion (1214) that is met when activation of the hardware input element (e.g., 1108) is detected. In some examples, the electronic device (e.g., 1100) detecting activation of the hardware input element (e.g., 1108) includes detecting a contact with a characteristic intensity on the hardware input element that exceeds an intensity threshold.

In some embodiments, in accordance with a determination that the first set of one or more criteria is not met, the electronic device (e.g., 1100) maintains (1216) the first account as actively logged into the device. For example, the electronic device (e.g., 1100) forgoes transitioning such that the first account is no longer actively logged into the device and a second account (different from the first account) is actively logged into the device.

In accordance with a determination that a second set of one or more criteria is met, the electronic device (e.g., 1100) causes (1218) credentials to be released from the secure element for use in the operation (e.g., payment information for use in a payment transaction). In some embodiments, subsequent to causing the credentials to be released from the secure element for use in the operation, the electronic device (e.g., 1100) transmits the credentials to a remote server.

The second set of one or more criteria (1220) includes a second-mode criterion (1222) that is met when the electronic device (e.g., 1100) is in a second mode (a mode where a payment sheet (such as a parameters interface) is displayed, different from the first mode) Thus, the second set of criteria enables the electronic device to disambiguate between input for authorizing release of credentials and input for performing other functions (such as transitioning the device to another account), thereby improving the machine-man interface. The second set of one or more criteria (1220) also includes a current-account-fingerprint criterion (1224) that is met when the respective fingerprint corresponds to the first account of the electronic device (and is not met when the respective fingerprint corresponds to the second account).

Thus, by determining whether the first set of one or more criteria is more or whether the second set of one or more criteria is met, the electronic device disambiguates the user's request to determine which operation the electronic device should perform.

In some embodiments, in accordance with a determination that the second set of one or more criteria is not met, the electronic device (e.g., 1100) forgoes (1226) causing credentials to be released from the secure element for use in the operation.

In some embodiments, the first mode and the second mode are mutually exclusive. In some embodiments, the electronic device (e.g., 1100) further includes one or more displays, and the device displays, on a display (e.g., 1102, 1104) of the one or more displays, a parameters interface (e.g., 1120) during the second mode. In some examples, the parameters interface (e.g., 1120) corresponds to a payment transaction and the parameters interface includes an amount to be charged in the payment transaction. Thus, when the parameters interface is displayed, the electronic device indicates to the user that the device is in the second mode and, optionally, limits the use of a fingerprint sensor or input element of the device for authorizing a payment transaction corresponding to the displayed parameters interface, which reduces the likelihood that a user will unintentionally cause the device to transition to another account (e.g., when a user not authorized to make payments attempts to authorize a payment), thereby creating a more efficient machine-man interface.

In some embodiments, the electronic device (e.g., 1100) further includes one or more displays (e.g., 1102, 1104), and device does not display, on the one or more displays (e.g., 1102, 1104), the parameters interface (e.g., 1120) during the first mode.

In some embodiments, the electronic device (e.g., 1100) detecting activation of the hardware input element (e.g., 1108) includes detecting a press of the hardware input element (e.g., 1108) for a duration that does not exceed a first threshold duration. In some examples, the electronic device 1100 detects a quick press and release of the hardware input element (e.g., 1108).

In some embodiments, the electronic device (e.g., 1100) further includes one or more displays (e.g., 1102, 1104), and the fingerprint sensor (e.g., 1110) is integrated with a hardware input element (e.g., 1108) of the device. In some examples, the fingerprint sensor (e.g., 1110) being integrated with the hardware input element (e.g., 1108) allows the user to provide a fingerprint of their finger and concurrently activate (e.g., press) the hardware input element (e.g., 1108) with a single action (e.g., press of the hardware input element with the user's finger), thereby reducing the number of required user inputs and creating a more efficient machine-man interface.

In some embodiments, in accordance with a determination that a third set of one or more criteria is met (and, for example, in response to detecting a long press of the hardware input element), the electronic device (e.g., 1100) displays (1228), on a display (e.g., 1102, 1014) of the one or more displays, a prompt (e.g., 1122) to shut down the electronic device. Thus, the third set of criteria enables the electronic device to disambiguate between input for requesting a shut down of the electronic device and input for performing other functions, thereby improving the machine-man interface. By prompting the user with the prompt when the third set criteria is met, the electronic device informs the user of the state of the device (prepared to shut down) and, optionally, allows the user to confirm or cancel the shutdown procedure. Further, the same hardware input element can be used for initiating various functions, which reduces the need for extraneous hardware elements, thereby uncluttering the user interface and improving the machine-man interface. In some examples, shutting down the electronic device (e.g., 1100) includes the operating system sending commands to terminate one or more processes running on the operating system in preparation for powering off the electronic device (and optionally, forgoing causing credentials to be released from the secure element for use in the operation and forgoing transitioning the electronic device to be actively logged in using the second account).

In some embodiments, the third set of one or more criteria (1230) includes a shut-down-press criterion (1232) that is met when activation of the hardware input element (e.g., 1108) is detected for a duration that exceeds a first threshold duration and does not exceed a second threshold duration.

In some embodiments, the fingerprint sensor (e.g., 1110) is integrated with a hardware input element (e.g., 1108) of the electronic device (e.g., 1100). In some embodiments, in accordance with a determination that a fourth set of one or more criteria is met (and, for example, in response to detecting an extra-long press of the hardware input element), the electronic device (e.g., 1100) powers off without shutting down (e.g., without gracefully shutdown down by sending termination instructions to one or more running processes). Thus, the fourth set of criteria enables the electronic device to disambiguate between input for requesting a power down of the electronic device and input for performing other functions (e.g., such as a request for shutting down the electronic device), thereby improving the machine-man interface. Further, the same hardware input element can be used for initiating various functions, which reduces the need for extraneous hardware elements, thereby uncluttering the user interface and improving the machine-man interface. In some examples, the electronic device (e.g., 1100) also forgoes causing credentials to be released from the secure element for use in the operation, and forgoes transitioning the device to be actively logged in to the second account. In some embodiments, the fourth set of one or more criteria includes a power-down-press criterion that is met when activation of the hardware input element (e.g., 1108) is detected for a duration that exceeds a second threshold duration (e.g., 5 seconds).

Note that details of the processes described above with respect to method 1200 (e.g., FIGS. 12A-12B) are also applicable in an analogous manner to the methods described above. For example, methods 800 and 1000 optionally include one or more of the characteristics of the various methods described above with reference to method 1200. In some examples, the electronic devices 700, 900, and 1100 are the same electronic device. In some examples, the first display and second display described with reference to methods 800, 1000, and 1200 are analogous. For brevity, these details are not repeated below.

Figure 13:
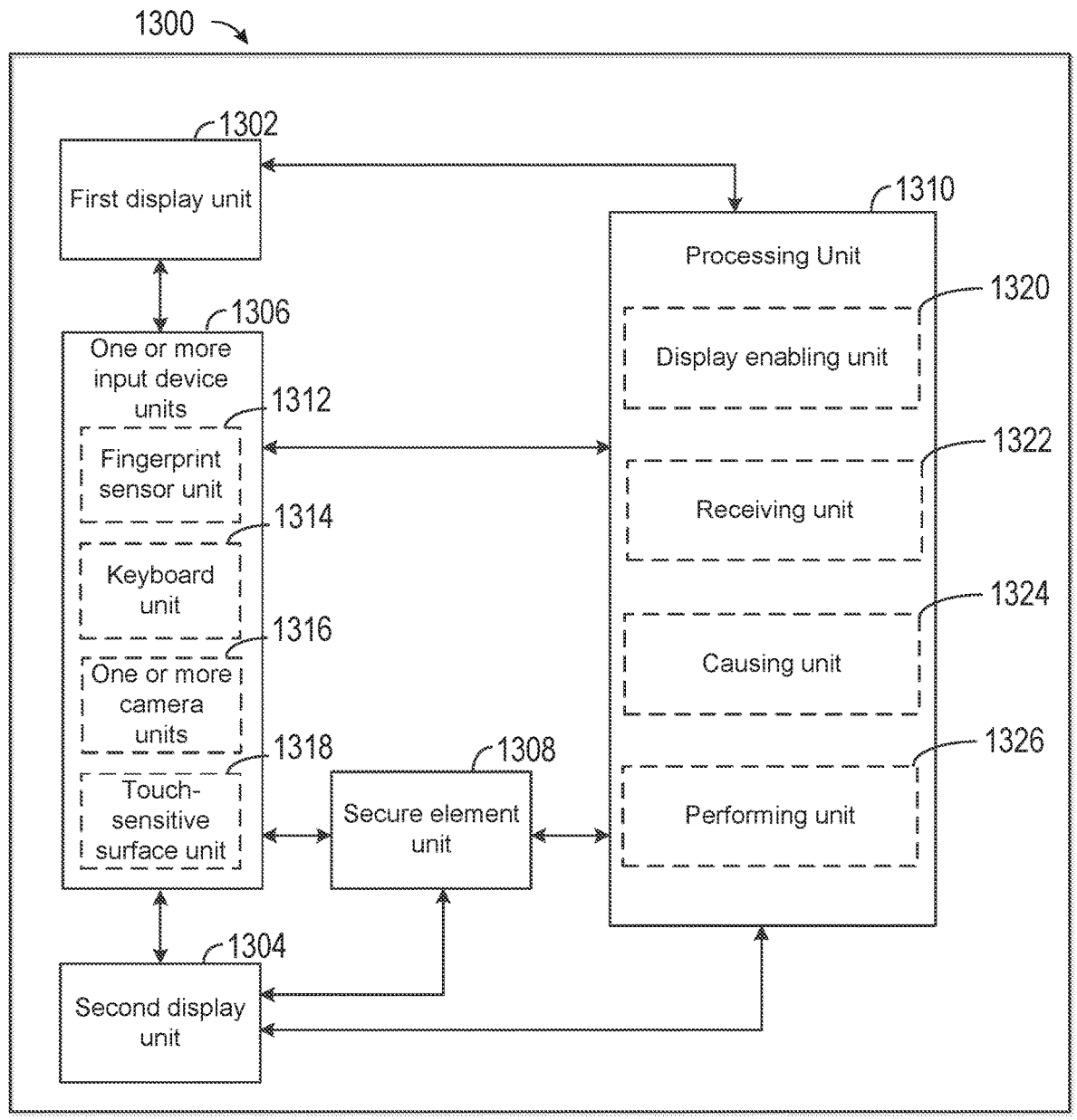
FIGS. 13-15 illustrate functional block diagrams in accordance with some embodiments.

In accordance with some embodiments, FIG. 13 shows an exemplary functional block diagram of an electronic device 1300 configured in accordance with the principles of the various described embodiments. In accordance with some embodiments, the functional blocks of electronic device 1300 are configured to perform the techniques described above. The functional blocks of the device 1300 are, optionally, implemented by hardware, software, or a combination of hardware and software to carry out the principles of the various described examples. It is understood by persons of skill in the art that the functional blocks described in FIG. 13 are, optionally, combined or separated into sub-blocks to implement the principles of the various described examples. Therefore, the description herein optionally supports any possible combination or separation or further definition of the functional blocks described herein.

As shown in FIG. 13, an electronic device 1300 includes a first display unit 1302 configured to display a graphic user interface, a second display unit 1304 configured to display a graphic user interface, one or more input device units 1306, a secure element unit 1308, and a processing unit 1310 coupled to the first display unit 1302, the second display unit 1304, the one or more input device units 1306, and the secure element unit 1308. In some embodiments, the one or more input device units 1306 includes a fingerprint sensor unit 1312, a keyboard unit 1314, one or more camera units 1316, and a touch-sensitive surface unit 1318. In some embodiments, the processing unit 1310 includes a display enabling unit 1320, a receiving unit 1322, a causing unit 1324, and a performing unit 1326.

The processing unit 1310 is configured to: receive (e.g., using the receiving unit 1322), a request for credentials for an operation for which authorization is required; in response to receiving the request for credentials: enable display (e.g., using the display enabling unit 1320), on the first display unit 1302, of a parameters interface for the operation for which authorization is required; while displaying the parameters interface, enable display (e.g., using the display enabling unit 1320), on the second display unit 1304, of a visual indication of one or more steps to be taken to authorize the operation; receive (e.g., using the receiving unit 1322), using the one or more input device units 1306, input that corresponds to the visual indication of the one or more steps; and in response to receiving the input, in accordance with a determination that the input is consistent with authorization criteria, cause (e.g., using the causing unit 1324), credentials to be released from the secure element unit 1308 for use in the operation.

In some embodiments, the one or more input device units 1306 include a fingerprint sensor unit 1312, and wherein: the visual indication comprises an indication that a fingerprint input is requested; receiving the input that corresponds to the visual indication of the one or more steps includes detecting, by the fingerprint sensor unit 1312, a fingerprint; and the authorization criteria includes a criterion that is met when the detected fingerprint is consistent with an enrolled fingerprint that is authorized to release the credentials from the secure element unit 1308.

In some embodiments, the processing unit 1310 is further configured to: in accordance with a determination that the input is not consistent with authorization criteria: forgo causing (e.g., using the causing unit 1324) credentials to be released from the secure element unit 1308 for use in the operation.

In some embodiments, the visual indication comprises an animation that indicates a location of the fingerprint sensor unit 1312 on the electronic device 1300.

In some embodiments, the authorization criteria includes a criterion that is met when activation of an authorization affordance displayed on the second display unit 1304 is detected and a criterion that is met when a received sequence of one or more characters is consistent with a passcode that is authorized to release the credentials from the secure element unit 1308.

In some embodiments, the processing unit 1310 is further configured to: enable display (e.g., using the display enabling unit 1320), on the second display unit 1304, of the authorization affordance; wherein the visual indication of the one or more steps comprises an indication that activation of the authorization affordance displayed on the second display unit 1304 is requested; and wherein receiving the input that corresponds to the visual indication of the one or more steps includes: detecting activation of the authorization affordance; and receiving, by the one or more input device units 1306, a sequence of characters.

In some embodiments, the one or more input device units 1306 includes a keyboard unit 1314 that is not paired with the secure element unit 1308; and the received sequence of characters is passed from a first processor unit associated with the keyboard unit 1314 to a second processor unit associated with the secure element unit 1308 and the second display unit 1304.

In some embodiments, the processing unit 1310 is further configured to: subsequent to receiving the sequence of characters, and in accordance with a determination that the received sequence of characters is not consistent with the enrolled passcode, forgo causing (e.g., using the causing unit 1324) credentials to be released from the secure element unit 1308 for use in the operation.

In some embodiments, the one or more input device units 1306 includes one or more camera units 1316, and wherein: the visual indication comprises an indication that a biometric identification is requested; receiving the input that corresponds to the visual indication of the one or more steps includes detecting, by the one or more camera units 1316, biometric information; and the authorization criteria includes a criterion that is met when the detected biometric information is consistent with enrolled biometric information that is authorized to release the credentials from the secure element unit 1308.

In some embodiments, the second display unit 1304 is paired with the secure element unit 1308; and the first display unit 1302 is not paired with the secure element unit 1304.

In some embodiments, in accordance with a determination that the electronic device 1300 is configured to use one or more enrolled fingerprints to authorize the operation, the visual indication of one or more steps to be taken to authorize the operation includes an indication for the user to provide a fingerprint input; and in accordance with a determination that the electronic device 1300 is not configured to use one or more enrolled fingerprints to authorize the operation, the visual indication of one or more steps to be taken to authorize the operation includes an indication for the user to activate an authorization affordance for initiating a process for receiving a passcode.

In some embodiments, the processing unit 1310 is further configured to: prior to receiving the request for credentials, enabling displaying (e.g., using the display enabling unit 1320), on the first display unit 1302, of a payment affordance corresponding to the operation for which authorization is required; and wherein receiving the request for credentials includes detecting, by the one or more input device units 1306, activation of the payment affordance corresponding to the operation for which authorization is required.

In some embodiments, the credentials include payment information that is stored in the secure element unit 1308.

In some embodiments, the parameters interface for the operation for which authorization is required includes a first cancel affordance, which when activated, causes the electronic device 1300 to cease displaying (e.g., using the display enabling unit 1320), on the second display unit 1304, the visual indication of the one or more steps to be taken to authorize the operation.

In some embodiments, the processing unit 1310 is further configured to: in response to receiving the request for credentials: enable display (e.g., using the display enabling unit 1320), on the second display unit 1304, of a second cancel affordance, which when activated, causes the electronic device 1300 to cease displaying (e.g., using the display enabling unit 1320), on the second display unit 1304, the visual indication of the one or more steps to be taken to authorize the operation.

In some embodiments, the processing unit 1310 is further configured to: while enabling display, on the first display unit 1302, of the parameters interface for the operation for which authorization is required: forgo performing (e.g., using the performing unit 1326) any function in response to receiving, at a touch-sensitive surface unit 1318 corresponding to the second display unit 1304, touch input at one or more locations of the touch-sensitive surface unit 1318 corresponding to the second display unit 1304 that do not correspond to the second cancel affordance.

In some embodiments, the visual indication of one or more steps to be taken to authorize the operation displayed on the second display unit 1304 is displayed at a secure location on the second display unit 1304 at which a first application cannot cause displays and at which a second application can cause displays.

In some embodiments, the fingerprint sensor unit 1312 is integrated into a hardware input element, the processing unit 1310 further configured to: while the parameters interface for the operation for which authorization is required is displayed, forgo performing (e.g., using the performing unit 1326) any function by the electronic device 1300 in response to detecting activation of the hardware input element.

The operations described above with reference to FIGS. 8A-8B are, optionally, implemented by components depicted in FIGS. 1A-1B or FIG. 13. For example, receiving operation 806, displaying operation 808, displaying operation 810, and receiving operation 822 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 14:
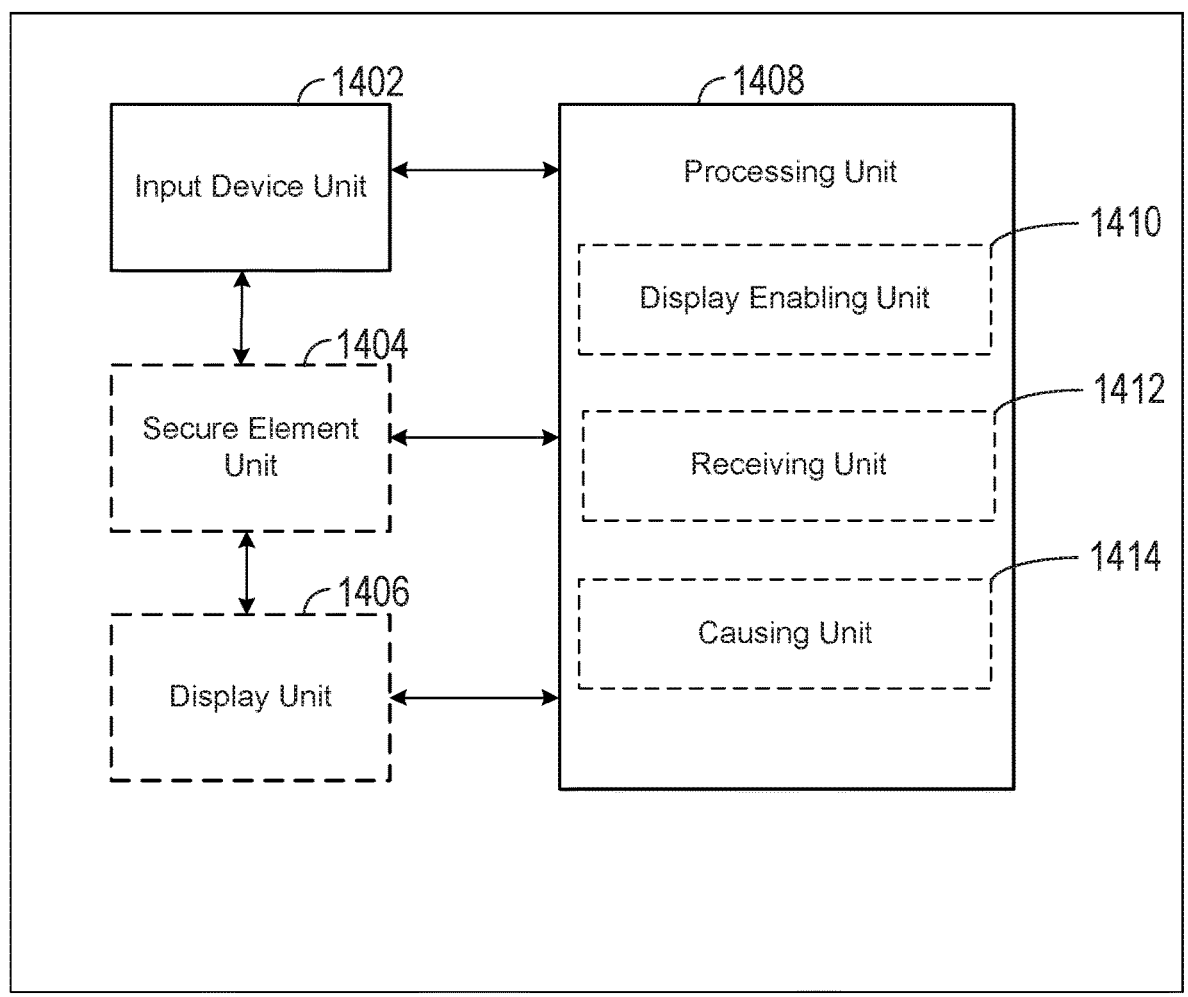

In accordance with some embodiments, FIG. 14 shows an exemplary functional block diagram of an electronic device 1400 configured in accordance with the principles of the various described embodiments. In accordance with some embodiments, the functional blocks of electronic device 1400 are configured to perform the techniques described above. The functional blocks of the device 1400 are, optionally, implemented by hardware, software, or a combination of hardware and software to carry out the principles of the various described examples. It is understood by persons of skill in the art that the functional blocks described in FIG. 14 are, optionally, combined or separated into sub-blocks to implement the principles of the various described examples. Therefore, the description herein optionally supports any possible combination or separation or further definition of the functional blocks described herein.

As shown in FIG. 14, an electronic device 1400 includes an input device unit 1402 for authorizing access to credentials, optionally, a secure element unit 1404, optionally, a display unit 1406, and a processing unit 1408 coupled to the input device unit 1402. In some embodiments, the processing unit 1408 is further coupled to the secure element unit 1404 and the display unit 1406. In some embodiments, the processing unit 1408 includes a display enabling unit 1410, a receiving unit 1412, and a causing unit 1414.

The processing unit 1408 is configured to: cause display (e.g., with display enabling unit 1410) of a user interface generated by the device on a display unit; while causing display of the user interface generated by the device 1400 on the display unit, receive (e.g., with receiving unit 1412) a request for credentials; and in response to receiving the request for credentials: in accordance with a determination that a first set of one or more criteria is met, the first set of one or more criteria including an input-disabled criterion that is met when the input device unit 1402 is not enabled for user input, cause display (e.g., with display enabling unit 1410), on the display unit, of a visual indication of one or more steps to be taken to enable the input device unit 1402 for user input.

In some embodiments, the processing unit 1408 is further configured to: receive (e.g., with receiving unit 1412) user input for authorizing transmitting credentials for use in an operation associated with the request for credentials; and in response to receiving the input for authorizing transmitting credentials and in accordance with a determination that the input is consistent with authorization criteria, cause (e.g., with causing unit 1414) credentials to be released from the secure element unit 1404 for use in the operation.

In some embodiments, the display unit is an external display.

In some embodiments, the display unit 1406 is a primary display of the electronic device 1400.

In some embodiments, the first set of one or more criteria includes a storing-credentials criterion that is met when the secure element unit 1404 has stored credentials.

In some embodiments, the first set of one or more criteria includes an authorized-account criterion that is met when an account actively logged into the electronic device 1400 is enabled to authorize the secure element unit 1404 to release credentials.

In some embodiments, the first set of one or more criteria includes an input-not-enabled-mode criterion that is met when the input device unit 1402 of the electronic device 1400 is not enabled for user input.

In some embodiments, the first set of one or more criteria includes a no-proximity-device criterion that is met when the electronic device 1400 is not in communication with a second electronic device that is in proximity to the electronic device 1400 and that is enabled to respond to the request for credentials.

In some embodiments, the processing unit 1408 is further configured to: in response to receiving the request for credentials: in accordance with a determination that a second set of one or more criteria is met, the second set of one or more criteria including a not-storing-credentials criterion that is met when the secure element unit 1404 does not have stored credentials, cause display (e.g., with display enabling unit 1410), on the display unit, of a visual indication of one or more steps to be taken to store credentials using the secure element unit 1404.

In some embodiments, the processing unit 1408 is further configured to: in response to receiving the request for credentials: in accordance with a determination that a third set of one or more criteria is met, the third set of one or more criteria including a storing-credentials criterion that is met when the secure element unit 1404 has stored credentials, cause display (e.g., with display enabling unit 1410), on a display unit, a parameters interface corresponding to the request for credentials that identifies one or more devices different from the electronic device 1400 for use in responding to the request for credentials.

In some embodiments, the third set of one or more criteria includes a not-authorized-account criterion that is met when an account actively logged into the electronic device 1400 is not enabled to authorize the secure element unit 1404 to release credentials.

In some embodiments, the third set of one or more criteria includes a proximity-device criterion that is met when the electronic device 1400 is in communication with a second electronic device that is in proximity to the electronic device 1400 and that is enabled to respond to the request for credentials.

In some embodiments, the processing unit 1408 is further configured to: in response to receiving the request for credentials: in accordance with a determination that a fourth set of one or more criteria is met, the fourth set of one or more criteria including a storing-credentials criterion that is met when the secure element unit 1404 has stored credentials, cause display (e.g., with a display enabling unit 1410), on a display unit, a parameters interface corresponding to the request for credentials that identifies one or more devices different from the electronic device 1400 for use in responding to the request for credentials.

In some embodiments, the fourth set of one or more criteria includes an authorized-account criterion that is met when an account actively logged into the electronic device 1400 is enabled to authorize the secure element unit 1404 to release credentials.

In some embodiments, the fourth set of one or more criteria includes an input-not-enabled-mode criterion that is met when the input device unit 1402 of the electronic device 1400 is not enabled for user input.

In some embodiments, the fourth set of one or more criteria includes a proximity-device criterion that is met when the electronic device 1400 is in communication with a second electronic device that is in proximity to the electronic device 1400 and that is enabled to respond to the request for credentials.

In some embodiments, the processing unit 1408 is further configured to: in response to receiving the request for credentials: in accordance with a determination that a fifth set of one or more criteria is met, the fifth set of one or more criteria including a storing-credentials criterion that is met when the secure element unit 1404 has stored credentials, cause display (e.g., with display enabling unit 1410), on the display unit, of a parameters interface corresponding to the request for credentials requesting authorization to respond to the request for credentials.

In some embodiments, the fifth set of one or more criteria includes an authorized-account criterion that is met when an account actively logged into the electronic device 1400 is enabled to authorize the secure element unit 1404 to release credentials.

In some embodiments, the fifth set of one or more criteria includes an input-enabled-mode criterion that is met when the input device unit 1402 of the electronic device 1400 is enabled for user input.

The operations described above with reference to FIGS. 10A-10D are, optionally, implemented by components depicted in FIGS. 1A-1B or FIG. 14. For example, causing operation 1002, receiving operation 1004, and causing operation 1008 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 15:
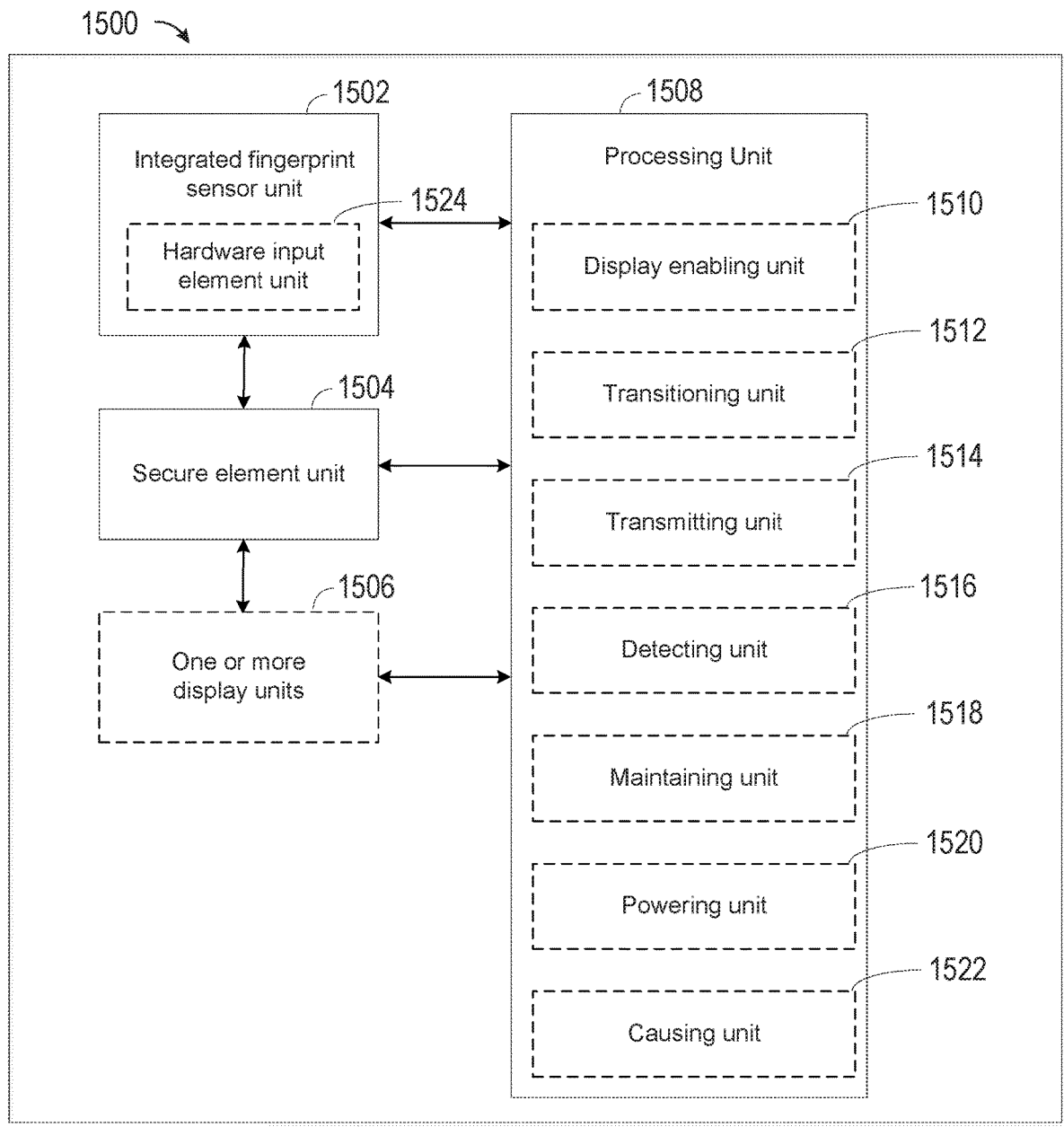

In accordance with some embodiments, FIG. 15 shows an exemplary functional block diagram of an electronic device 1500 configured in accordance with the principles of the various described embodiments. In accordance with some embodiments, the functional blocks of electronic device 1500 are configured to perform the techniques described above. The functional blocks of the device 1500 are, optionally, implemented by hardware, software, or a combination of hardware and software to carry out the principles of the various described examples. It is understood by persons of skill in the art that the functional blocks described in FIG. 15 are, optionally, combined or separated into sub-blocks to implement the principles of the various described examples. Therefore, the description herein optionally supports any possible combination or separation or further definition of the functional blocks described herein.

As shown in FIG. 15, an electronic device 1500 includes an integrated fingerprint sensor unit 1502, a secure element unit 1504, and, optionally, one or more display units 1506 configured to display a graphic user interface, and a processing unit 1508 coupled to the integrated fingerprint sensor unit 1502, the secure element unit 1504, and, optionally, the one or more display units 1506. In some embodiments, the integrated fingerprint sensor unit 1502 is integrated with a hardware input element unit 1524. In some embodiments, the processing unit 1508 includes a display enabling unit 1510, a transitioning unit 1512, a transmitting unit 1514, a detecting unit 1516, a maintaining unit 1518, a powering unit 1520, and a causing unit 1522.

The processing unit 1508 is configured to: while a first account is actively logged into the electronic device 1500: detect (e.g., using the detecting unit 1516), using the integrated fingerprint sensor unit 1502, a respective fingerprint; in accordance with a determination that a first set of one or more criteria is met, transition (e.g., using the transitioning unit 1512) the electronic device 1500 such that the first account is no longer actively logged into the electronic device 1500 and such that a second account is actively logged into the electronic device 1500; wherein the first set of one or more criteria includes: a first-mode criterion that is met when the electronic device 1500 is in a first mode, and a different-account-fingerprint criterion that is met when the respective fingerprint corresponds to the second account of the electronic device 1500; in accordance with a determination that a second set of one or more criteria is met, cause (e.g. using the causing unit 1522) credentials to be released from the secure element unit 1504 for use in the operation; and wherein the second set of one or more criteria includes: a second-mode criterion that is met when the electronic device 1500 is in a second mode, and a current-account-fingerprint criterion that is met when the respective fingerprint corresponds to the first account of the electronic device 1500.

In some embodiments, the processing unit 1508 is further configured to: subsequent to causing, using the causing unit 1522, the credentials to be released from the secure element unit 1504 for use in the operation, transmit (e.g. using the transmitting unit 1514) the credentials to a remote server.

In some embodiments, the integrated fingerprint sensor unit 1502 is integrated with a hardware input element unit 1524, and wherein the first set of one or more criteria includes a criterion that is met when activation of the hardware input element unit 1524 is detected.

In some embodiments, the processing unit 1508 is further configured to: in accordance with a determination that the first set of one or more criteria is not met, maintain (e.g. using the maintaining unit 1518) the first account as actively logged into the electronic device 1500.

In some embodiments, the processing unit 1508 is further configured to: in accordance with a determination that the first set of one or more criteria is met, forgo causing (e.g. using the causing unit 1522) credentials to be released from the secure element unit 1504 for use in the operation.

In some embodiments, the first mode and the second mode are mutually exclusive.

In some embodiments, the electronic device 1500 further includes one or more display units 1506, and wherein a parameters interface is displayed, on the one or more display unit 1506 of the one or more display units 1506, during the second mode.

In some embodiments, the electronic device 1500 further includes one or more display units 1506, and wherein the parameters interface is not displayed, on the one or more display units 1506, during the first mode.

In some embodiments, detecting activation of the hardware input element unit 1524 includes detecting a press of the hardware input element unit 1524 for a duration that does not exceed a first threshold duration.

In some embodiments, the electronic device 1500 further includes one or more display units 1506, and wherein the integrated fingerprint sensor unit 1502 is integrated with a hardware input element unit 1524 of the electronic device 1500, wherein the processing unit 1508 is further configured to: in accordance with a determination that a third set of one or more criteria is met, enable display (e.g. using the display enabling unit 1510), on a display unit of the one or more display units 1506, of a prompt to shut down the electronic device 1500; and wherein the third set of one or more criteria includes: a shut-down-press criterion that is met when activation of the hardware input element unit 1524 is detected for a duration that exceeds a first threshold duration and does not exceed a second threshold duration.

In some embodiments, the integrated fingerprint sensor unit 1502 is integrated with a hardware input element unit 1524 of the electronic device 1500, wherein the processing unit 1508 is further configured to: in accordance with a determination that a fourth set of one or more criteria is met, power off (e.g. using the powering unit 1520) the electronic device 1500 without shutting down the electronic device 1500; and wherein the fourth set of one or more criteria includes: a power-down-press criterion that is met when activation of the hardware input element unit 1524 is detected for a duration that exceeds a second threshold duration.

In some embodiments, the first account of the electronic device 1500 is enabled to authorize the secure element unit 1504 to release credentials.

The operations described above with reference to FIGS. 12A-12B are, optionally, implemented by components depicted in FIGS. 1A-1B or FIG. 15. For example, detecting operation 1202, transitioning operation 1206, and causing operation 1218 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
   an input device for authorizing access to credentials;
   one or more processors; and
   memory storing one or more programs configured to be executed by the one or more processors, the one or more programs including instructions for:
     causing display of a user interface generated by the device on a display;
     while causing display of the user interface generated by the device on the display, receiving a request for credentials; and
     in response to receiving the request for credentials:
       in accordance with a determination that a first set of one or more criteria is met, the first set of one or more criteria including an input-disabled criterion that is met when the input device is not enabled for user input, causing display, on the display, of a visual indication of one or more steps to be taken to enable the input device for user input.

2. The electronic device of claim 1, wherein the electronic device includes a secure element, and wherein the one or more programs further include instructions for:
   receiving user input for authorizing transmitting credentials for use in an operation associated with the request for credentials; and
   in response to receiving the input for authorizing transmitting credentials and in accordance with a determination that the input is consistent with authorization criteria, causing credentials to be released from the secure element for use in the operation.

3. The electronic device of claim 1, wherein the display is an external display.

4. The electronic device of claim 1, wherein the display is a primary display of the electronic device.

5. The electronic device of claim 1, wherein the electronic device includes a secure element, and wherein the first set of one or more criteria includes a storing-credentials criterion that is met when the secure element has stored credentials.

6. The electronic device of claim 1, wherein the electronic device includes a secure element, and wherein the first set of one or more criteria includes an authorized-account criterion that is met when an account actively logged into the electronic device is enabled to authorize the secure element to release credentials.

7. The electronic device of claim 1, wherein the first set of one or more criteria includes an input-not-enabled-mode criterion that is met when the input device of the electronic device is not enabled for user input.

8. The electronic device of claim 1, wherein the first set of one or more criteria includes a no-proximity-device criterion that is met when the electronic device is not in communication with a second electronic device that is in proximity to the electronic device and that is enabled to respond to the request for credentials.

9. The electronic device of claim 1, wherein the electronic device includes a secure element, and wherein the one or more programs further include instructions for:
   in response to receiving the request for credentials:
     in accordance with a determination that a second set of one or more criteria is met, the second set of one or more criteria including a not-storing-credentials criterion that is met when the secure element does not have stored credentials, causing display, on the display, of a visual indication of one or more steps to be taken to store credentials using the secure element.

10. The electronic device of claim 1, wherein the electronic device includes a secure element, and wherein the one or more programs further include instructions for:
    in response to receiving the request for credentials:
      in accordance with a determination that a third set of one or more criteria is met, the third set of one or more criteria including a storing-credentials criterion that is met when the secure element has stored credentials, causing display, on a display, of a parameters interface corresponding to the request for credentials that identifies one or more devices different from the electronic device for use in responding to the request for credentials.

11. The electronic device of claim 10, wherein the third set of one or more criteria includes a not-authorized-account criterion that is met when an account actively logged into the electronic device is not enabled to authorize the secure element to release credentials.

12. The electronic device of claim 10, wherein the third set of one or more criteria includes a proximity-device criterion that is met when the electronic device is in communication with a second electronic device that is in proximity to the electronic device and that is enabled to respond to the request for credentials.

13. The electronic device of claim 1, wherein the electronic device includes a secure element, and wherein the one or more programs further include instructions for:
    in response to receiving the request for credentials:
      in accordance with a determination that a fourth set of one or more criteria is met, the fourth set of one or more criteria including a storing-credentials criterion that is met when the secure element has stored credentials, causing display, on a display, of a parameters interface corresponding to the request for credentials that identifies one or more devices different from the electronic device for use in responding to the request for credentials.

14. The electronic device of claim 13, wherein the fourth set of one or more criteria includes an authorized-account criterion that is met when an account actively logged into the electronic device is enabled to authorize the secure element to release credentials.

15. The electronic device of claim 13, wherein the fourth set of one or more criteria includes an input-not-enabled-mode criterion that is met when the input device of the electronic device is not enabled for user input.

16. The electronic device of claim 13, wherein the fourth set of one or more criteria includes a proximity-device criterion that is met when the electronic device is in communication with a second electronic device that is in proximity to the electronic device and that is enabled to respond to the request for credentials.

17. The electronic device of claim 1, wherein the electronic device includes a secure element, and wherein the one or more programs further include instructions for:
in response to receiving the request for credentials:
in accordance with a determination that a fifth set of one or more criteria is met, the fifth set of one or more criteria including a storing-credentials criterion that is met when the secure element has stored credentials, causing display, on the display, of a parameters interface corresponding to the request for credentials requesting authorization to respond to the request for credentials.

18. The electronic device of claim 17, wherein the fifth set of one or more criteria includes an authorized-account criterion that is met when an account actively logged into the electronic device is enabled to authorize the secure element to release credentials.

19. The electronic device of claim 17, wherein the fifth set of one or more criteria includes an input-enabled-mode criterion that is met when the input device of the electronic device is enabled for user input.

20. A non-transitory computer-readable storage medium storing one or more programs configured to be executed by one or more processors of an electronic device with an input device for authorizing access to credentials, the one or more programs including instructions for:
causing display of a user interface generated by the device on a display;
while causing display of the user interface generated by the device on the display, receiving a request for credentials; and
in response to receiving the request for credentials:
in accordance with a determination that a first set of one or more criteria is met, the first set of one or more criteria including an input-disabled criterion that is met when the input device is not enabled for user input, causing display, on the display, of a visual indication of one or more steps to be taken to enable the input device for user input.

21. The non-transitory computer-readable storage medium of claim 20, wherein the electronic device includes a secure element, and wherein the one or more programs further include instructions for:
receiving user input for authorizing transmitting credentials for use in an operation associated with the request for credentials; and
in response to receiving the input for authorizing transmitting credentials and in accordance with a determination that the input is consistent with authorization criteria, causing credentials to be released from the secure element for use in the operation.

22. The non-transitory computer-readable storage medium of claim 20, wherein the display is an external display.

23. The non-transitory computer-readable storage medium of claim 20, wherein the display is a primary display of the electronic device.

24. The non-transitory computer-readable storage medium of claim 20, wherein the electronic device includes a secure element, and wherein the first set of one or more criteria includes a storing-credentials criterion that is met when the secure element has stored credentials.

25. The non-transitory computer-readable storage medium of claim 20, wherein the electronic device includes a secure element, and wherein the first set of one or more criteria includes an authorized-account criterion that is met when an account actively logged into the electronic device is enabled to authorize the secure element to release credentials.

26. The non-transitory computer-readable storage medium of claim 20, wherein the first set of one or more criteria includes an input-not-enabled-mode criterion that is met when the input device of the electronic device is not enabled for user input.

27. The non-transitory computer-readable storage medium of claim 20, wherein the first set of one or more criteria includes a no-proximity-device criterion that is met when the electronic device is not in communication with a second electronic device that is in proximity to the electronic device and that is enabled to respond to the request for credentials.

28. The non-transitory computer-readable storage medium of claim 20, wherein the electronic device includes a secure element, and wherein the one or more programs further include instructions for:
in response to receiving the request for credentials:
in accordance with a determination that a second set of one or more criteria is met, the second set of one or more criteria including a not-storing-credentials criterion that is met when the secure element does not have stored credentials, causing display, on the display, of a visual indication of one or more steps to be taken to store credentials using the secure element.

29. The non-transitory computer-readable storage medium of claim 20, wherein the electronic device includes a secure element, and wherein the one or more programs further include instructions for:
in response to receiving the request for credentials:
in accordance with a determination that a third set of one or more criteria is met, the third set of one or more criteria including a storing-credentials criterion that is met when the secure element has stored credentials, causing display, on a display, of a parameters interface corresponding to the request for credentials that identifies one or more devices different from the electronic device for use in responding to the request for credentials.

30. The non-transitory computer-readable storage medium of claim 29, wherein the third set of one or more criteria includes a not-authorized-account criterion that is met when an account actively logged into the electronic device is not enabled to authorize the secure element to release credentials.

31. The non-transitory computer-readable storage medium of claim 29, wherein the third set of one or more criteria includes a proximity-device criterion that is met when the electronic device is in communication with a second electronic device that is in proximity to the electronic device and that is enabled to respond to the request for credentials.

32. The non-transitory computer-readable storage medium of claim 20, wherein the electronic device includes a secure element, and wherein the one or more programs further include instructions for:
in response to receiving the request for credentials:
in accordance with a determination that a fourth set of one or more criteria is met, the fourth set of one or more criteria including a storing-credentials criterion that is met when the secure element has stored credentials, causing display, on a display, of a parameters interface corresponding to the request for credentials that identifies one or more devices different from the electronic device for use in responding to the request for credentials.

33. The non-transitory computer-readable storage medium of claim 32, wherein the fourth set of one or more criteria includes an authorized-account criterion that is met when an account actively logged into the electronic device is enabled to authorize the secure element to release credentials.

34. The non-transitory computer-readable storage medium of claim 32, wherein the fourth set of one or more criteria includes an input-not-enabled-mode criterion that is met when the input device of the electronic device is not enabled for user input.

35. The non-transitory computer-readable storage medium of claim 32, wherein the fourth set of one or more criteria includes a proximity-device criterion that is met when the electronic device is in communication with a second electronic device that is in proximity to the electronic device and that is enabled to respond to the request for credentials.

36. The non-transitory computer-readable storage medium of claim 20, wherein the electronic device includes a secure element, and wherein the one or more programs further include instructions for:
in response to receiving the request for credentials:
in accordance with a determination that a fifth set of one or more criteria is met, the fifth set of one or more criteria including a storing-credentials criterion that is met when the secure element has stored credentials, causing display, on the display, of a parameters interface corresponding to the request for credentials requesting authorization to respond to the request for credentials.

37. The non-transitory computer-readable storage medium of claim 36, wherein the fifth set of one or more criteria includes an authorized-account criterion that is met when an account actively logged into the electronic device is enabled to authorize the secure element to release credentials.

38. The non-transitory computer-readable storage medium of claim 36, wherein the fifth set of one or more criteria includes an input-enabled-mode criterion that is met when the input device of the electronic device is enabled for user input.

39. A method, comprising:
at an electronic device with an input device for authorizing access to credentials:
causing display of a user interface generated by the device on a display;
while causing display of the user interface generated by the device on the display, receiving a request for credentials; and
in response to receiving the request for credentials:
in accordance with a determination that a first set of one or more criteria is met, the first set of one or more criteria including an input-disabled criterion that is met when the input device is not enabled for user input, causing display, on the display, of a visual indication of one or more steps to be taken to enable the input device for user input.

40. The method of claim 39, wherein the electronic device includes a secure element, further comprising:
receiving user input for authorizing transmitting credentials for use in an operation associated with the request for credentials; and
in response to receiving the input for authorizing transmitting credentials and in accordance with a determination that the input is consistent with authorization criteria, causing credentials to be released from the secure element for use in the operation.

41. The method of claim 39, wherein the display is an external display.

42. The method of claim 39, wherein the display is a primary display of the electronic device.

43. The method of claim 39, wherein the electronic device includes a secure element, and wherein the first set of one or more criteria includes a storing-credentials criterion that is met when the secure element has stored credentials.

44. The method of claim 39, wherein the electronic device includes a secure element, and wherein the first set of one or more criteria includes an authorized-account criterion that is met when an account actively logged into the electronic device is enabled to authorize the secure element to release credentials.

45. The method of claim 39, wherein the first set of one or more criteria includes an input-not-enabled-mode criterion that is met when the input device of the electronic device is not enabled for user input.

46. The method of claim 39, wherein the first set of one or more criteria includes a no-proximity-device criterion that is met when the electronic device is not in communication with a second electronic device that is in proximity to the electronic device and that is enabled to respond to the request for credentials.

47. The method of claim 39, wherein the electronic device includes a secure element, further comprising:
in response to receiving the request for credentials:
in accordance with a determination that a second set of one or more criteria is met, the second set of one or more criteria including a not-storing-credentials criterion that is met when the secure element does not have stored credentials, causing display, on the display, of a visual indication of one or more steps to be taken to store credentials using the secure element.

48. The method of claim 39, wherein the electronic device includes a secure element, further comprising:
in response to receiving the request for credentials:
in accordance with a determination that a third set of one or more criteria is met, the third set of one or more criteria including a storing-credentials criterion that is met when the secure element has stored credentials, causing display, on a display, of a parameters interface corresponding to the request for credentials that identifies one or more devices different from the electronic device for use in responding to the request for credentials.

49. The method of claim 48, wherein the third set of one or more criteria includes a not-authorized-account criterion that is met when an account actively logged into the electronic device is not enabled to authorize the secure element to release credentials.

50. The method of claim 48, wherein the third set of one or more criteria includes a proximity-device criterion that is met when the electronic device is in communication with a second electronic device that is in proximity to the electronic device and that is enabled to respond to the request for credentials.

51. The method of claim 39, wherein the electronic device includes a secure element, further comprising:
in response to receiving the request for credentials:
in accordance with a determination that a fourth set of one or more criteria is met, the fourth set of one or more criteria including a storing-credentials criterion that is met when the secure element has stored credentials, causing display, on a display, of a parameters interface corresponding to the request for credentials that identifies one or more devices different from the electronic device for use in responding to the request for credentials.

52. The method of claim 51, wherein the fourth set of one or more criteria includes an authorized-account criterion that is met when an account actively logged into the electronic device is enabled to authorize the secure element to release credentials.

53. The method of claim 51, wherein the fourth set of one or more criteria includes an input-not-enabled-mode criterion that is met when the input device of the electronic device is not enabled for user input.

54. The method of claim 51, wherein the fourth set of one or more criteria includes a proximity-device criterion that is met when the electronic device is in communication with a second electronic device that is in proximity to the electronic device and that is enabled to respond to the request for credentials.

55. The method of claim 39, wherein the electronic device includes a secure element, further comprising:
in response to receiving the request for credentials:
in accordance with a determination that a fifth set of one or more criteria is met, the fifth set of one or more criteria including a storing-credentials criterion that is met when the secure element has stored credentials, causing display, on the display, of a parameters interface corresponding to the request for credentials requesting authorization to respond to the request for credentials.

56. The method of claim 55, wherein the fifth set of one or more criteria includes an authorized-account criterion that is met when an account actively logged into the electronic device is enabled to authorize the secure element to release credentials.

57. The method of claim 55, wherein the fifth set of one or more criteria includes an input-enabled-mode criterion that is met when the input device of the electronic device is enabled for user input.

* * * * *